United States Patent
Van Os et al.

(10) Patent No.: US 10,748,153 B2
(45) Date of Patent: Aug. 18, 2020

(54) USER INTERFACE FOR PAYMENTS

(71) Applicant: Apple Inc., Cupertino, CA (US)

(72) Inventors: Marcel Van Os, San Francisco, CA (US); Christopher D. Adams, San Jose, CA (US); Charles Ahn, Portola Valley, CA (US); Pablo F. Caro, San Francisco, CA (US); George R. Dicker, Sunnyvale, CA (US); Craig M. Federighi, Los Altos Hills, CA (US); Woo-Ram Lee, Bellevue, WA (US); Brian Tucker, Sunnyvale, CA (US); Giancarlo Yerkes, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/164,561

(22) Filed: Oct. 18, 2018

(65) Prior Publication Data
US 2019/0050867 A1    Feb. 14, 2019

Related U.S. Application Data

(63) Continuation of application No. 15/992,722, filed on May 30, 2018, which is a continuation of application
(Continued)

(51) Int. Cl.
*G06Q 20/10* (2012.01)
*G06Q 30/06* (2012.01)
(Continued)

(52) U.S. Cl.
CPC ....... *G06Q 20/40145* (2013.01); *G06Q 20/10* (2013.01); *G06Q 20/102* (2013.01);
(Continued)

(58) Field of Classification Search
CPC .................................................. G06Q 40/00
(Continued)

(56) References Cited

U.S. PATENT DOCUMENTS 4,803,487 A    2/1989  Willard et al.
5,175,854 A   12/1992  Cheung et al.
(Continued)

FOREIGN PATENT DOCUMENTS

AU    2015100708 A4    3/2015
AU    2015100709 A4    7/2015
(Continued)

OTHER PUBLICATIONS

Decision to Refuse received for European Patent Application No. 12770400.5, dated Nov. 8, 2018, 12 pages.
(Continued)

*Primary Examiner* — Kirsten S Apple
(74) *Attorney, Agent, or Firm* — Dentons US LLP

(57) ABSTRACT

The present disclosure relates to making payments with a mobile device. In one example process, the mobile device receives and stores information for one or more payment accounts on the mobile device. The mobile device is used to make payments using the payment accounts. In some examples, authorization to proceed with a payment is performed before each purchase made by the user. The authorization process can include receiving a verification of the user, such as a fingerprint scan or passcode. In some examples, a payment account is selected from among available payment accounts. In some examples, an indication is displayed of a digital item associated with a purchased item. In some examples, a payment transaction is initiated with participants of an ongoing communication. In some
(Continued)

examples, an application of a retailer is invoked based on the availability of the application. In some examples, a purchase recommendation is provided.

33 Claims, 77 Drawing Sheets

Related U.S. Application Data

No. 14/503,072, filed on Sep. 30, 2014, now Pat. No. 10,043,185.

(60) Provisional application No. 62/047,545, filed on Sep. 8, 2014, provisional application No. 62/004,886, filed on May 29, 2014.

(51) Int. Cl.
| | |
|---|---|
| *G06Q 20/40* | (2012.01) |
| *G06Q 20/32* | (2012.01) |
| *G06Q 20/38* | (2012.01) |
| *G06Q 20/36* | (2012.01) |
| *H04L 29/08* | (2006.01) |
| *H04M 1/725* | (2006.01) |
| *G06Q 20/22* | (2012.01) |

(52) U.S. Cl.
CPC ........... *G06Q 20/227* (2013.01); *G06Q 20/32* (2013.01); *G06Q 20/322* (2013.01); *G06Q 20/327* (2013.01); *G06Q 20/3223* (2013.01); *G06Q 20/3224* (2013.01); *G06Q 20/3278* (2013.01); *G06Q 20/36* (2013.01); *G06Q 20/3821* (2013.01); *G06Q 20/40* (2013.01); *G06Q 20/401* (2013.01); *G06Q 20/405* (2013.01); *G06Q 20/4014* (2013.01); *G06Q 30/0631* (2013.01); *H04L 67/10* (2013.01); *H04M 1/72522* (2013.01); *H04M 1/72561* (2013.01)

(58) Field of Classification Search
USPC ............................................... 703/35; 705/38
See application file for complete search history.

(56) References Cited

U.S. PATENT DOCUMENTS

| | | | |
|---|---|---|---|
| 5,615,384 | A | 3/1997 | Allard et al. |
| 5,617,031 | A | 4/1997 | Tuttle |
| 5,729,219 | A | 3/1998 | Armstrong et al. |
| 5,801,763 | A | 9/1998 | Suzuki |
| 5,815,657 | A | 9/1998 | Williams et al. |
| 5,828,773 | A | 10/1998 | Setlak et al. |
| 5,838,306 | A | 11/1998 | O'Connor et al. |
| 5,853,327 | A | 12/1998 | Gilboa |
| 5,917,913 | A | 6/1999 | Wang |
| 5,920,313 | A | 7/1999 | Diedrichsen et al. |
| 5,933,134 | A | 8/1999 | Shieh |
| 5,974,150 | A | 10/1999 | Kaish et al. |
| 6,111,517 | A | 8/2000 | Atick et al. |
| 6,141,436 | A | 10/2000 | Srey et al. |
| 6,151,208 | A | 11/2000 | Bartlett |
| 6,151,593 | A | 11/2000 | Cho et al. |
| 6,167,353 | A | 12/2000 | Piernot et al. |
| 6,173,402 | B1 | 1/2001 | Chapman |
| 6,190,174 | B1 | 2/2001 | Lam |
| 6,192,380 | B1 | 2/2001 | Light et al. |
| 6,208,336 | B1 | 3/2001 | Carter |
| 6,219,793 | B1 | 4/2001 | Li et al. |
| 6,247,066 | B1 | 6/2001 | Tanaka |
| 6,260,027 | B1 * | 7/2001 | Takahashi ............... G06Q 20/02 705/64 |
| 6,282,656 | B1 | 8/2001 | Wang |
| 6,289,114 | B1 | 9/2001 | Mainguet |
| 6,317,835 | B1 | 11/2001 | Bilger et al. |
| 6,323,846 | B1 | 11/2001 | Westerman et al. |
| 6,337,919 | B1 | 1/2002 | Dunton |
| 6,398,646 | B1 | 6/2002 | Wei et al. |
| 6,408,087 | B1 | 6/2002 | Kramer |
| 6,421,453 | B1 | 7/2002 | Kanevsky et al. |
| 6,570,557 | B1 | 5/2003 | Westerman et al. |
| 6,573,883 | B1 | 6/2003 | Bartlett |
| 6,597,378 | B1 | 7/2003 | Shiraishi et al. |
| 6,618,806 | B1 | 9/2003 | Brown et al. |
| 6,639,584 | B1 | 10/2003 | Li |
| 6,677,932 | B1 | 1/2004 | Westerman |
| 6,709,333 | B1 | 3/2004 | Bradford et al. |
| 6,720,860 | B1 | 4/2004 | Narayanaswami |
| 6,795,569 | B1 | 9/2004 | Setlak |
| 6,822,769 | B1 | 11/2004 | Drinkwater et al. |
| 6,842,182 | B2 | 1/2005 | Ungar et al. |
| 6,871,349 | B1 | 3/2005 | Akhond et al. |
| 6,889,138 | B1 | 5/2005 | Krull et al. |
| 6,941,001 | B1 | 9/2005 | Bolle et al. |
| 6,944,818 | B2 | 9/2005 | Newman et al. |
| 6,963,349 | B1 | 11/2005 | Nagasaki |
| 6,980,081 | B2 | 12/2005 | Anderson |
| 6,981,042 | B1 | 12/2005 | Rey |
| 7,027,619 | B2 | 4/2006 | Pavlidis et al. |
| 7,030,860 | B1 | 4/2006 | Hsu et al. |
| 7,039,221 | B1 | 5/2006 | Tumey et al. |
| 7,057,607 | B2 | 6/2006 | Mayoraz et al. |
| 7,079,652 | B1 | 7/2006 | Harris |
| 7,081,905 | B1 | 7/2006 | Raghunath |
| 7,088,342 | B2 | 8/2006 | Rekimoto et al. |
| 7,098,896 | B2 | 8/2006 | Kushler et al. |
| 7,099,850 | B1 * | 8/2006 | Mann, II ............... G06Q 20/16 380/28 |
| 7,124,300 | B1 | 10/2006 | Lemke |
| 7,130,664 | B1 | 10/2006 | Williams |
| 7,155,411 | B1 | 12/2006 | Blinn et al. |
| 7,190,349 | B2 | 3/2007 | Kim et al. |
| 7,190,816 | B2 | 3/2007 | Mitsuyu et al. |
| 7,239,728 | B1 | 7/2007 | Choi et al. |
| 7,305,350 | B1 | 12/2007 | Bruecken |
| 7,346,778 | B1 | 3/2008 | Guiter et al. |
| 7,347,361 | B2 | 3/2008 | Lovett |
| 7,370,244 | B2 | 5/2008 | Breitling et al. |
| 7,414,613 | B2 | 8/2008 | Simelius |
| 7,415,720 | B2 | 8/2008 | Jung |
| 7,420,546 | B2 | 9/2008 | Abdallah et al. |
| 7,448,042 | B1 | 11/2008 | Engber et al. |
| 7,454,192 | B1 | 11/2008 | Zhu |
| 7,496,527 | B2 | 2/2009 | Silverstein et al. |
| 7,529,563 | B1 | 5/2009 | Pitroda |
| 7,542,592 | B2 | 6/2009 | Singh et al. |
| 7,546,470 | B2 | 6/2009 | Schultz |
| 7,614,008 | B2 | 11/2009 | Ording |
| 7,630,522 | B2 | 12/2009 | Popp et al. |
| 7,633,076 | B2 | 12/2009 | Huppi et al. |
| 7,644,019 | B2 | 1/2010 | Woda et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,676,748 | B1 | 3/2010 | Barrus et al. |
| 7,689,508 | B2 * | 3/2010 | Davis ..................... G06Q 20/10 455/406 |
| 7,697,729 | B2 | 4/2010 | Howell et al. |
| 7,705,737 | B2 | 4/2010 | Senga |
| 7,730,401 | B2 | 6/2010 | Gillespie et al. |
| 7,734,930 | B2 | 6/2010 | Kirovski et al. |
| 7,738,916 | B2 | 6/2010 | Fukuda |
| 7,810,720 | B2 | 10/2010 | Lovett |
| 7,818,399 | B1 | 10/2010 | Ross et al. |
| 7,843,471 | B2 | 11/2010 | Doan et al. |
| 7,844,914 | B2 | 11/2010 | Andre et al. |
| 7,860,536 | B2 | 12/2010 | Jobs et al. |
| 7,890,422 | B1 | 2/2011 | Hirka et al. |
| 7,921,297 | B2 | 4/2011 | Ortiz et al. |
| 7,957,762 | B2 | 6/2011 | Herz et al. |
| RE42,574 | E | 7/2011 | Cockayne |
| 8,006,002 | B2 | 8/2011 | Kalayjian et al. |

(56) References Cited

U.S. PATENT DOCUMENTS

| | | |
|---|---|---|
| 8,006,299 B2 | 8/2011 | Suominen |
| 8,018,440 B2 | 9/2011 | Townsend et al. |
| 8,042,157 B2 | 10/2011 | Bennett et al. |
| 8,050,997 B1 | 11/2011 | Nosek et al. |
| 8,060,571 B2 | 11/2011 | Rao |
| 8,095,634 B2 | 1/2012 | Rao |
| 8,112,787 B2 | 2/2012 | Buer |
| 8,121,945 B2 | 2/2012 | Rackley, III et al. |
| 8,145,912 B2 | 3/2012 | McLean |
| 8,195,507 B2 | 6/2012 | Postrel |
| 8,195,576 B1 | 6/2012 | Grigg et al. |
| 8,239,784 B2 | 8/2012 | Hotelling et al. |
| 8,254,647 B1 | 8/2012 | Nechyba et al. |
| 8,279,180 B2 | 10/2012 | Hotelling et al. |
| 8,311,514 B2 | 11/2012 | Bandyopadhyay et al. |
| 8,336,086 B2 | 12/2012 | Seo |
| 8,341,557 B2 | 12/2012 | Pisula et al. |
| 8,368,658 B2 | 2/2013 | Brisebois et al. |
| 8,381,135 B2 | 2/2013 | Hotelling et al. |
| 8,392,259 B2 | 3/2013 | MacGillivray et al. |
| 8,395,658 B2 | 3/2013 | Corson |
| 8,396,265 B1 | 3/2013 | Ross et al. |
| 8,438,400 B2 | 5/2013 | Hoghaug et al. |
| 8,452,654 B1 * | 5/2013 | Wooters ............. G06Q 30/0234 |
| | | 705/14.34 |
| 8,453,940 B2 | 6/2013 | Diamond |
| 8,467,766 B2 | 6/2013 | Rackley et al. |
| 8,479,122 B2 | 7/2013 | Hotelling et al. |
| 8,514,186 B2 | 8/2013 | Tan et al. |
| 8,526,915 B2 | 9/2013 | Kakiuchi et al. |
| 8,554,694 B1 | 10/2013 | Ward et al. |
| 8,560,004 B1 | 10/2013 | Tsvetkov et al. |
| 8,571,937 B2 | 10/2013 | Rose et al. |
| 8,583,549 B1 * | 11/2013 | Mohsenzadeh ...... G06Q 20/227 |
| | | 705/39 |
| 8,606,640 B2 * | 12/2013 | Brody ................ G06Q 20/0655 |
| | | 705/26.1 |
| 8,619,034 B2 | 12/2013 | Grad |
| 8,638,385 B2 | 1/2014 | Bhogal |
| 8,706,628 B2 | 4/2014 | Phillips |
| 8,762,272 B1 | 6/2014 | Cozens et al. |
| 8,763,896 B2 | 7/2014 | Kushevsky et al. |
| 8,769,624 B2 | 7/2014 | Cotterill |
| 8,782,775 B2 | 7/2014 | Fadell et al. |
| 8,788,838 B1 | 7/2014 | Fadell et al. |
| 8,831,677 B2 | 9/2014 | Villa-Real |
| 8,836,768 B1 | 9/2014 | Rafii et al. |
| 8,842,082 B2 | 9/2014 | Migos et al. |
| 8,880,055 B1 | 11/2014 | Clement et al. |
| 8,892,474 B1 | 11/2014 | Inskeep et al. |
| 8,894,462 B2 | 11/2014 | Leyland et al. |
| 8,924,259 B2 | 12/2014 | Neighman et al. |
| 8,924,292 B1 | 12/2014 | Ellis et al. |
| 8,931,703 B1 | 1/2015 | Mullen et al. |
| 8,942,420 B2 | 1/2015 | Kim et al. |
| 8,943,580 B2 | 1/2015 | Fadell et al. |
| 8,949,618 B1 | 2/2015 | Lee et al. |
| 8,949,902 B1 | 2/2015 | Fabian-isaacs et al. |
| 8,963,806 B1 | 2/2015 | Starner et al. |
| 9,002,322 B2 | 4/2015 | Cotterill |
| 9,013,423 B2 | 4/2015 | Ferren |
| 9,038,167 B2 | 5/2015 | Fadell et al. |
| 9,053,293 B2 | 6/2015 | Latzina |
| 9,128,601 B2 | 9/2015 | Fadell et al. |
| 9,134,896 B2 | 9/2015 | Fadell et al. |
| 9,177,130 B2 | 11/2015 | Nechyba et al. |
| 9,179,298 B2 | 11/2015 | Jung et al. |
| 9,244,604 B1 | 1/2016 | Lewbel et al. |
| 9,250,795 B2 | 2/2016 | Fadell et al. |
| 9,253,375 B2 | 2/2016 | Milanfar et al. |
| 9,269,083 B1 | 2/2016 | Jarajapu et al. |
| 9,274,647 B2 | 3/2016 | Fadell et al. |
| 9,304,624 B2 | 4/2016 | Fadell et al. |
| 9,305,310 B2 | 4/2016 | Radhakrishnan et al. |
| 9,324,067 B2 | 4/2016 | Van Os et al. |
| 9,329,771 B2 | 5/2016 | Fadell et al. |
| 9,355,393 B2 | 5/2016 | Purves et al. |
| 9,411,460 B2 | 8/2016 | Dumont et al. |
| 9,436,381 B2 | 9/2016 | Migos et al. |
| 9,483,763 B2 | 11/2016 | Van Os et al. |
| 9,495,531 B2 | 11/2016 | Fadell et al. |
| 9,519,771 B2 | 12/2016 | Fadell et al. |
| 9,519,901 B1 * | 12/2016 | Dorogusker ......... G06Q 20/401 |
| 9,526,127 B1 | 12/2016 | Taubman et al. |
| 9,547,419 B2 | 1/2017 | Yang et al. |
| 9,569,605 B1 | 2/2017 | Schneider et al. |
| 9,600,709 B2 | 3/2017 | Russo |
| 9,716,825 B1 | 7/2017 | Manzari et al. |
| 9,779,585 B2 | 10/2017 | Dupuis et al. |
| 9,817,549 B2 | 11/2017 | Chandrasekaran |
| 9,842,330 B1 | 12/2017 | Van Os et al. |
| 9,847,999 B2 | 12/2017 | Van Os et al. |
| 9,898,642 B2 | 2/2018 | Han et al. |
| 10,003,738 B2 | 6/2018 | Lautenbach et al. |
| 10,073,541 B1 | 9/2018 | Baldwin |
| 10,248,779 B2 | 4/2019 | Song et al. |
| 10,334,054 B2 | 6/2019 | Van Os et al. |
| 10,482,461 B2 | 11/2019 | Van Os et al. |
| 2001/0031072 A1 | 10/2001 | Dobashi et al. |
| 2001/0039497 A1 | 11/2001 | Hubbard |
| 2001/0044906 A1 | 11/2001 | Kanevsky et al. |
| 2001/0047365 A1 | 11/2001 | Yonaitis |
| 2001/0047488 A1 | 11/2001 | Verplaetse et al. |
| 2002/0015024 A1 | 2/2002 | Westerman et al. |
| 2002/0023215 A1 | 2/2002 | Wang et al. |
| 2002/0029169 A1 | 3/2002 | Oki et al. |
| 2002/0059295 A1 | 5/2002 | Ludtke et al. |
| 2002/0087262 A1 | 7/2002 | Bullock et al. |
| 2002/0095588 A1 | 7/2002 | Shigematsu et al. |
| 2002/0097145 A1 | 7/2002 | Tumey et al. |
| 2002/0136435 A1 | 9/2002 | Prokoski |
| 2002/0141586 A1 | 10/2002 | Margalit et al. |
| 2002/0190960 A1 | 12/2002 | Kuo et al. |
| 2002/0191029 A1 | 12/2002 | Gillespie et al. |
| 2002/0191817 A1 | 12/2002 | Sato et al. |
| 2003/0006280 A1 | 1/2003 | Seita et al. |
| 2003/0028639 A1 | 2/2003 | Yamamoto et al. |
| 2003/0046557 A1 | 3/2003 | Miller et al. |
| 2003/0048173 A1 | 3/2003 | Shigematsu et al. |
| 2003/0061157 A1 | 3/2003 | Hirka et al. |
| 2003/0097413 A1 | 5/2003 | Vishik et al. |
| 2003/0115490 A1 | 6/2003 | Russo et al. |
| 2003/0118217 A1 | 6/2003 | Kondo et al. |
| 2003/0120934 A1 | 6/2003 | Ortiz |
| 2003/0128237 A1 | 7/2003 | Sakai |
| 2003/0132974 A1 | 7/2003 | Bodin |
| 2003/0138136 A1 | 7/2003 | Umezaki et al. |
| 2003/0142227 A1 | 7/2003 | Van Zee |
| 2003/0163710 A1 | 8/2003 | Ortiz et al. |
| 2003/0171984 A1 | 9/2003 | Wodka et al. |
| 2003/0181201 A1 | 9/2003 | Bomze et al. |
| 2003/0184528 A1 | 10/2003 | Kawasaki et al. |
| 2003/0188183 A1 | 10/2003 | Lee et al. |
| 2003/0200184 A1 | 10/2003 | Dominguez et al. |
| 2003/0210127 A1 | 11/2003 | Anderson |
| 2004/0030934 A1 | 2/2004 | Mizoguchi et al. |
| 2004/0044953 A1 | 3/2004 | Watkins et al. |
| 2004/0073432 A1 | 4/2004 | Stone |
| 2004/0076310 A1 | 4/2004 | Hersch et al. |
| 2004/0085300 A1 | 5/2004 | Matusis |
| 2004/0085351 A1 | 5/2004 | Tokkonen |
| 2004/0088564 A1 | 5/2004 | Norman |
| 2004/0100389 A1 | 5/2004 | Naito et al. |
| 2004/0113819 A1 | 6/2004 | Gauthey et al. |
| 2004/0122685 A1 * | 6/2004 | Bunce ................... G06Q 20/04 |
| | | 705/67 |
| 2004/0131237 A1 | 7/2004 | Machida |
| 2004/0135801 A1 | 7/2004 | Thompson et al. |
| 2004/0150630 A1 | 8/2004 | Hinckley et al. |
| 2004/0169722 A1 | 9/2004 | Pena |
| 2004/0172562 A1 | 9/2004 | Berger et al. |
| 2004/0181695 A1 | 9/2004 | Walker |
| 2004/0196400 A1 | 10/2004 | Stavely et al. |
| 2004/0229560 A1 | 11/2004 | Maloney |

(56) References Cited

U.S. PATENT DOCUMENTS

| | | |
|---|---|---|
| 2004/0230843 A1 | 11/2004 | Jansen |
| 2004/0239648 A1 | 12/2004 | Abdallah et al. |
| 2004/0242200 A1 | 12/2004 | Maeoka et al. |
| 2004/0250138 A1 | 12/2004 | Schneider |
| 2004/0254891 A1 | 12/2004 | Blinn et al. |
| 2004/0260955 A1 | 12/2004 | Mantyla |
| 2005/0012723 A1 | 1/2005 | Pallakoff |
| 2005/0024341 A1 | 2/2005 | Gillespie et al. |
| 2005/0040962 A1 | 2/2005 | Funkhouser et al. |
| 2005/0041841 A1 | 2/2005 | Yoo et al. |
| 2005/0052471 A1 | 3/2005 | Nagasaki |
| 2005/0060554 A1 | 3/2005 | O'donoghue |
| 2005/0071188 A1 | 3/2005 | Thuerk |
| 2005/0071635 A1 | 3/2005 | Furuyama |
| 2005/0078855 A1 | 4/2005 | Chandler et al. |
| 2005/0079896 A1 | 4/2005 | Kokko et al. |
| 2005/0093834 A1 | 5/2005 | Abdallah et al. |
| 2005/0093868 A1 | 5/2005 | Hinckley |
| 2005/0097171 A1 | 5/2005 | Hikichi |
| 2005/0097608 A1 | 5/2005 | Penke et al. |
| 2005/0100198 A1 | 5/2005 | Nakano et al. |
| 2005/0105778 A1 | 5/2005 | Sung et al. |
| 2005/0111708 A1 | 5/2005 | Chou |
| 2005/0113071 A1 | 5/2005 | Nagata |
| 2005/0114686 A1 | 5/2005 | Ball et al. |
| 2005/0117601 A1 | 6/2005 | Anderson et al. |
| 2005/0144452 A1 | 6/2005 | Lynch et al. |
| 2005/0169503 A1 | 8/2005 | Howell et al. |
| 2005/0174325 A1 | 8/2005 | Setlak |
| 2005/0187873 A1 | 8/2005 | Labrou et al. |
| 2005/0190059 A1 | 9/2005 | Wehrenberg |
| 2005/0191159 A1 | 9/2005 | Benko |
| 2005/0204173 A1 | 9/2005 | Chang |
| 2005/0206501 A1 | 9/2005 | Farhat |
| 2005/0210417 A1 | 9/2005 | Marvit et al. |
| 2005/0221798 A1 | 10/2005 | Sengupta et al. |
| 2005/0226472 A1 | 10/2005 | Komura |
| 2005/0237194 A1 | 10/2005 | Voba |
| 2005/0246722 A1 | 11/2005 | Shier et al. |
| 2005/0250538 A1* | 11/2005 | Narasimhan ........... G06Q 20/12 455/558 |
| 2005/0253814 A1 | 11/2005 | Ghassabian |
| 2005/0253817 A1 | 11/2005 | Rytivaara et al. |
| 2005/0254086 A1 | 11/2005 | Shouno |
| 2005/0278728 A1 | 12/2005 | Klementiev |
| 2006/0000900 A1 | 1/2006 | Fernandes et al. |
| 2006/0017692 A1 | 1/2006 | Wehrenberg et al. |
| 2006/0020623 A1 | 1/2006 | Terai et al. |
| 2006/0021003 A1 | 1/2006 | Fisher et al. |
| 2006/0025923 A1 | 2/2006 | Dotan et al. |
| 2006/0026536 A1 | 2/2006 | Hotelling et al. |
| 2006/0032908 A1 | 2/2006 | Sines |
| 2006/0033724 A1 | 2/2006 | Chaudhri et al. |
| 2006/0053392 A1 | 3/2006 | Salmimaa et al. |
| 2006/0056664 A1 | 3/2006 | Iwasaki |
| 2006/0064313 A1 | 3/2006 | Steinbarth et al. |
| 2006/0064372 A1 | 3/2006 | Gupta |
| 2006/0075228 A1 | 4/2006 | Black et al. |
| 2006/0075250 A1 | 4/2006 | Liao |
| 2006/0078176 A1 | 4/2006 | Abiko et al. |
| 2006/0079973 A1 | 4/2006 | Bacharach |
| 2006/0080525 A1 | 4/2006 | Ritter et al. |
| 2006/0093183 A1 | 5/2006 | Hosoi |
| 2006/0093192 A1 | 5/2006 | Bechtel |
| 2006/0097172 A1 | 5/2006 | Park |
| 2006/0102843 A1 | 5/2006 | Bazakos et al. |
| 2006/0104488 A1 | 5/2006 | Bazakos et al. |
| 2006/0115130 A1 | 6/2006 | Kozlay |
| 2006/0116555 A1 | 6/2006 | Pavlidis et al. |
| 2006/0120707 A1 | 6/2006 | Kusakari et al. |
| 2006/0132455 A1 | 6/2006 | Rimas-Ribikauskas et al. |
| 2006/0135064 A1 | 6/2006 | Cho et al. |
| 2006/0136087 A1 | 6/2006 | Higashiura |
| 2006/0136734 A1 | 6/2006 | Telek et al. |
| 2006/0150087 A1 | 7/2006 | Cronenberger et al. |
| 2006/0156028 A1 | 7/2006 | Aoyama et al. |
| 2006/0165060 A1 | 7/2006 | Dua |
| 2006/0173749 A1 | 8/2006 | Ward et al. |
| 2006/0179404 A1 | 8/2006 | Yolleck et al. |
| 2006/0181518 A1 | 8/2006 | Shen et al. |
| 2006/0192868 A1 | 8/2006 | Wakamori |
| 2006/0197750 A1 | 9/2006 | Kerr et al. |
| 2006/0197753 A1 | 9/2006 | Hotelling |
| 2006/0206709 A1 | 9/2006 | Labrou et al. |
| 2006/0208065 A1* | 9/2006 | Mendelovich ......... G06Q 20/04 235/380 |
| 2006/0214910 A1 | 9/2006 | Mizuno et al. |
| 2006/0219776 A1 | 10/2006 | Finn |
| 2006/0224645 A1 | 10/2006 | Kadi |
| 2006/0234764 A1 | 10/2006 | Gamo et al. |
| 2006/0239517 A1 | 10/2006 | Creasey et al. |
| 2006/0274920 A1 | 12/2006 | Tochikubo et al. |
| 2006/0282671 A1 | 12/2006 | Burton |
| 2006/0285663 A1 | 12/2006 | Rathus et al. |
| 2006/0288226 A1 | 12/2006 | Kowal |
| 2006/0288234 A1 | 12/2006 | Azar et al. |
| 2006/0294007 A1 | 12/2006 | Barthelemy |
| 2006/0294025 A1 | 12/2006 | Mengerink |
| 2007/0008066 A1 | 1/2007 | Fukuda |
| 2007/0013662 A1 | 1/2007 | Fauth |
| 2007/0014439 A1 | 1/2007 | Ando |
| 2007/0016958 A1 | 1/2007 | Bodepudi et al. |
| 2007/0021194 A1 | 1/2007 | Aida |
| 2007/0061126 A1 | 3/2007 | Russo et al. |
| 2007/0061889 A1 | 3/2007 | Sainaney |
| 2007/0067642 A1 | 3/2007 | Singhal |
| 2007/0073649 A1 | 3/2007 | Kikkoji et al. |
| 2007/0089164 A1 | 4/2007 | Gao et al. |
| 2007/0096283 A1 | 5/2007 | Ljung et al. |
| 2007/0096765 A1 | 5/2007 | Kagan |
| 2007/0106942 A1 | 5/2007 | Sanaka et al. |
| 2007/0109274 A1 | 5/2007 | Reynolds |
| 2007/0110287 A1 | 5/2007 | Kim et al. |
| 2007/0123205 A1 | 5/2007 | Lee et al. |
| 2007/0131759 A1 | 6/2007 | Cox et al. |
| 2007/0143628 A1 | 6/2007 | Genda |
| 2007/0150842 A1 | 6/2007 | Chaudhri et al. |
| 2007/0180492 A1 | 8/2007 | Hassan et al. |
| 2007/0186106 A1 | 8/2007 | Ting et al. |
| 2007/0188409 A1 | 8/2007 | Repetto et al. |
| 2007/0189583 A1 | 8/2007 | Shimada et al. |
| 2007/0194110 A1 | 8/2007 | Esplin et al. |
| 2007/0194113 A1 | 8/2007 | Esplin et al. |
| 2007/0204037 A1 | 8/2007 | Kunz et al. |
| 2007/0208743 A1 | 9/2007 | Sainaney |
| 2007/0220273 A1 | 9/2007 | Campisi |
| 2007/0226778 A1 | 9/2007 | Pietruszka |
| 2007/0230773 A1 | 10/2007 | Nagao et al. |
| 2007/0236330 A1 | 10/2007 | Cho et al. |
| 2007/0236475 A1 | 10/2007 | Wherry |
| 2007/0239921 A1 | 10/2007 | Toorians et al. |
| 2007/0240079 A1 | 10/2007 | Flynt et al. |
| 2007/0250573 A1 | 10/2007 | Rothschild |
| 2007/0253604 A1 | 11/2007 | Inoue et al. |
| 2007/0254712 A1 | 11/2007 | Chitti |
| 2007/0255564 A1* | 11/2007 | Yee ........................ G10L 17/24 704/246 |
| 2007/0259716 A1 | 11/2007 | Mattice et al. |
| 2007/0260558 A1 | 11/2007 | Look |
| 2007/0277224 A1 | 11/2007 | Osborn et al. |
| 2007/0280515 A1 | 12/2007 | Goto |
| 2007/0287423 A1 | 12/2007 | Kakiuchi et al. |
| 2008/0001703 A1 | 1/2008 | Goto |
| 2008/0006762 A1 | 1/2008 | Fadell et al. |
| 2008/0016443 A1 | 1/2008 | Hiroshima et al. |
| 2008/0027947 A1 | 1/2008 | Pritchett et al. |
| 2008/0032801 A1 | 2/2008 | Brunet De Courssou |
| 2008/0040265 A1 | 2/2008 | Rackley, III et al. |
| 2008/0040786 A1 | 2/2008 | Chang |
| 2008/0041936 A1 | 2/2008 | Vawter |
| 2008/0042983 A1 | 2/2008 | Kim et al. |
| 2008/0048878 A1 | 2/2008 | Boillot |
| 2008/0049984 A1 | 2/2008 | Poo et al. |
| 2008/0052181 A1 | 2/2008 | Devitt-carolan et al. |

(56) References Cited

U.S. PATENT DOCUMENTS

| | | |
|---|---|---|
| 2008/0054081 A1* | 3/2008 | Mullen ............... G06K 19/077 235/494 |
| 2008/0067626 A1 | 3/2008 | Hirler et al. |
| 2008/0069412 A1 | 3/2008 | Champagne et al. |
| 2008/0072045 A1 | 3/2008 | Mizrah |
| 2008/0077673 A1 | 3/2008 | Thomas |
| 2008/0078831 A1 | 4/2008 | Johnson et al. |
| 2008/0092245 A1 | 4/2008 | Alward et al. |
| 2008/0114678 A1 | 5/2008 | Bennett et al. |
| 2008/0120029 A1 | 5/2008 | Zelek et al. |
| 2008/0120707 A1 | 5/2008 | Ramia |
| 2008/0133931 A1 | 6/2008 | Kosaka |
| 2008/0141126 A1 | 6/2008 | Johnson et al. |
| 2008/0165136 A1 | 7/2008 | Christie et al. |
| 2008/0165255 A1 | 7/2008 | Christie et al. |
| 2008/0172598 A1 | 7/2008 | Jacobsen et al. |
| 2008/0178283 A1 | 7/2008 | Pratt et al. |
| 2008/0208681 A1 | 8/2008 | Hammad et al. |
| 2008/0208762 A1 | 8/2008 | Arthur et al. |
| 2008/0212849 A1 | 9/2008 | Gao |
| 2008/0214191 A1 | 9/2008 | Yach et al. |
| 2008/0221903 A1 | 9/2008 | Kanevsky et al. |
| 2008/0229409 A1 | 9/2008 | Miller et al. |
| 2008/0246917 A1 | 10/2008 | Phinney et al. |
| 2008/0247519 A1 | 10/2008 | Abella et al. |
| 2008/0250481 A1 | 10/2008 | Beck et al. |
| 2008/0284741 A1 | 11/2008 | Hsu et al. |
| 2008/0292074 A1 | 11/2008 | Boni et al. |
| 2008/0292144 A1 | 11/2008 | Kim |
| 2008/0309632 A1 | 12/2008 | Westerman et al. |
| 2008/0314971 A1 | 12/2008 | Faith et al. |
| 2008/0317292 A1 | 12/2008 | Baker et al. |
| 2008/0320391 A1 | 12/2008 | Lemay et al. |
| 2009/0005165 A1 | 1/2009 | Arezina et al. |
| 2009/0006292 A1 | 1/2009 | Block |
| 2009/0006991 A1 | 1/2009 | Lindberg et al. |
| 2009/0023433 A1 | 1/2009 | Walley et al. |
| 2009/0030793 A1 | 1/2009 | Fordyce, III |
| 2009/0031375 A1 | 1/2009 | Sullivan et al. |
| 2009/0036165 A1 | 2/2009 | Brede |
| 2009/0037326 A1 | 2/2009 | Chitti et al. |
| 2009/0037742 A1 | 2/2009 | Narayanaswami |
| 2009/0048959 A1 | 2/2009 | Omura et al. |
| 2009/0054044 A1 | 2/2009 | Ikemori et al. |
| 2009/0055484 A1 | 2/2009 | Vuong et al. |
| 2009/0055843 A1 | 2/2009 | Engber et al. |
| 2009/0057396 A1 | 3/2009 | Barbour et al. |
| 2009/0061837 A1 | 3/2009 | Chaudhri et al. |
| 2009/0063851 A1 | 3/2009 | Nijdam |
| 2009/0064055 A1 | 3/2009 | Chaudhri et al. |
| 2009/0067685 A1 | 3/2009 | Boshra et al. |
| 2009/0067689 A1 | 3/2009 | Porter et al. |
| 2009/0074255 A1 | 3/2009 | Holm |
| 2009/0083847 A1 | 3/2009 | Fadell et al. |
| 2009/0083850 A1 | 3/2009 | Fadell et al. |
| 2009/0088207 A1 | 4/2009 | Sweeney et al. |
| 2009/0091541 A1 | 4/2009 | Chen |
| 2009/0094134 A1 | 4/2009 | Toomer et al. |
| 2009/0094681 A1 | 4/2009 | Sadler et al. |
| 2009/0106558 A1 | 4/2009 | Delgrosso et al. |
| 2009/0119754 A1 | 5/2009 | Schubert |
| 2009/0122149 A1 | 5/2009 | Ishii |
| 2009/0135678 A1 | 5/2009 | Godat |
| 2009/0138194 A1 | 5/2009 | Geelen |
| 2009/0158390 A1 | 6/2009 | Guan |
| 2009/0159696 A1* | 6/2009 | Mullen ............ G06K 19/06206 235/493 |
| 2009/0160609 A1 | 6/2009 | Lin et al. |
| 2009/0164878 A1 | 6/2009 | Cottrille |
| 2009/0165107 A1 | 6/2009 | Tojo et al. |
| 2009/0167706 A1 | 7/2009 | Tan et al. |
| 2009/0168756 A1 | 7/2009 | Kurapati et al. |
| 2009/0173784 A1 | 7/2009 | Yang |
| 2009/0175509 A1 | 7/2009 | Gonion et al. |
| 2009/0176565 A1 | 7/2009 | Kelly |
| 2009/0182674 A1 | 7/2009 | Patel et al. |
| 2009/0193514 A1 | 7/2009 | Adams et al. |
| 2009/0195402 A1 | 8/2009 | Izadi et al. |
| 2009/0195469 A1 | 8/2009 | Lim et al. |
| 2009/0199130 A1 | 8/2009 | Tsern et al. |
| 2009/0199188 A1 | 8/2009 | Fujimaki |
| 2009/0201257 A1 | 8/2009 | Saitoh et al. |
| 2009/0203315 A1 | 8/2009 | Kawabata et al. |
| 2009/0207743 A1 | 8/2009 | Huq et al. |
| 2009/0210308 A1 | 8/2009 | Toomer et al. |
| 2009/0213081 A1 | 8/2009 | Case, Jr. |
| 2009/0215533 A1 | 8/2009 | Zalewski et al. |
| 2009/0222748 A1 | 9/2009 | Lejeune et al. |
| 2009/0224874 A1 | 9/2009 | Dewar et al. |
| 2009/0228938 A1 | 9/2009 | White et al. |
| 2009/0241169 A1 | 9/2009 | Dhand et al. |
| 2009/0256817 A1 | 10/2009 | Perlin et al. |
| 2009/0258667 A1 | 10/2009 | Suzuki et al. |
| 2009/0258677 A1 | 10/2009 | Ellis et al. |
| 2009/0307139 A1 | 12/2009 | Mardikar et al. |
| 2009/0325630 A1 | 12/2009 | Tiitola et al. |
| 2009/0327744 A1 | 12/2009 | Hatano |
| 2009/0327975 A1 | 12/2009 | Stedman |
| 2009/0328162 A1 | 12/2009 | Kokumai et al. |
| 2010/0008535 A1 | 1/2010 | Abulafia et al. |
| 2010/0008545 A1 | 1/2010 | Ueki et al. |
| 2010/0020034 A1 | 1/2010 | Kim |
| 2010/0023449 A1 | 1/2010 | Skowronek et al. |
| 2010/0026453 A1 | 2/2010 | Yamamoto et al. |
| 2010/0026640 A1 | 2/2010 | Kim et al. |
| 2010/0027854 A1 | 2/2010 | Chatterjee et al. |
| 2010/0034432 A1 | 2/2010 | Ono et al. |
| 2010/0042517 A1 | 2/2010 | Paintin et al. |
| 2010/0042835 A1 | 2/2010 | Lee et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0082485 A1 | 4/2010 | Lin et al. |
| 2010/0100839 A1 | 4/2010 | Tseng et al. |
| 2010/0107229 A1 | 4/2010 | Najafi et al. |
| 2010/0114731 A1 | 5/2010 | Kingston et al. |
| 2010/0125456 A1 | 5/2010 | Weng et al. |
| 2010/0125816 A1 | 5/2010 | Bezos |
| 2010/0131190 A1 | 5/2010 | Terauchi et al. |
| 2010/0146384 A1 | 6/2010 | Peev et al. |
| 2010/0149090 A1 | 6/2010 | Morris et al. |
| 2010/0153265 A1 | 6/2010 | Hershfield et al. |
| 2010/0158327 A1 | 6/2010 | Kangas et al. |
| 2010/0159909 A1 | 6/2010 | Stifelman |
| 2010/0161434 A1 | 6/2010 | Herwig et al. |
| 2010/0164684 A1 | 7/2010 | Sasa et al. |
| 2010/0164864 A1 | 7/2010 | Chou |
| 2010/0185446 A1 | 7/2010 | Homma et al. |
| 2010/0185871 A1 | 7/2010 | Scherrer et al. |
| 2010/0191570 A1* | 7/2010 | Michaud ............... G06Q 30/02 705/7.33 |
| 2010/0194682 A1 | 8/2010 | Orr et al. |
| 2010/0205091 A1* | 8/2010 | Graziano ............ G06Q 20/102 705/40 |
| 2010/0207721 A1 | 8/2010 | Nakajima et al. |
| 2010/0216425 A1 | 8/2010 | Smith |
| 2010/0223145 A1 | 9/2010 | Dragt |
| 2010/0243741 A1* | 9/2010 | Eng .................. G06K 19/005 235/487 |
| 2010/0265204 A1 | 10/2010 | Tsuda |
| 2010/0267362 A1 | 10/2010 | Smith et al. |
| 2010/0269156 A1 | 10/2010 | Hohlfeld et al. |
| 2010/0272250 A1 | 10/2010 | Yap et al. |
| 2010/0273461 A1 | 10/2010 | Choi |
| 2010/0275259 A1 | 10/2010 | Adams et al. |
| 2010/0287513 A1 | 11/2010 | Singh et al. |
| 2010/0302016 A1 | 12/2010 | Zaborowski |
| 2010/0302168 A1 | 12/2010 | Giancarlo et al. |
| 2010/0306107 A1 | 12/2010 | Nahari |
| 2010/0311397 A1 | 12/2010 | Li |
| 2010/0313263 A1 | 12/2010 | Uchida et al. |
| 2010/0332993 A1 | 12/2010 | Bousseton et al. |
| 2011/0013813 A1 | 1/2011 | Yamamoto et al. |
| 2011/0054268 A1 | 3/2011 | Fidacaro et al. |

(56) References Cited

U.S. PATENT DOCUMENTS

| | | |
|---|---|---|
| 2011/0059769 A1 | 3/2011 | Brunolli |
| 2011/0078025 A1 | 3/2011 | Shrivastav |
| 2011/0078614 A1 | 3/2011 | Lee et al. |
| 2011/0081860 A1 | 4/2011 | Brown et al. |
| 2011/0088086 A1 | 4/2011 | Swink et al. |
| 2011/0099079 A1 | 4/2011 | White |
| 2011/0106671 A1 | 5/2011 | Minnis et al. |
| 2011/0122294 A1 | 5/2011 | Suh et al. |
| 2011/0138166 A1 | 6/2011 | Peszek et al. |
| 2011/0138450 A1 | 6/2011 | Kesanupalli et al. |
| 2011/0142234 A1 | 6/2011 | Rogers |
| 2011/0145049 A1 | 6/2011 | Hertel et al. |
| 2011/0149874 A1 | 6/2011 | Reif |
| 2011/0153628 A1 | 6/2011 | Basu et al. |
| 2011/0159959 A1 | 6/2011 | Mallinson et al. |
| 2011/0164269 A1 | 7/2011 | Kamishiro |
| 2011/0175703 A1 | 7/2011 | Benkley, III |
| 2011/0184820 A1 | 7/2011 | Mon et al. |
| 2011/0187497 A1 | 8/2011 | Chin |
| 2011/0187647 A1 | 8/2011 | Woloszynski et al. |
| 2011/0201306 A1* | 8/2011 | Ali Al-Harbi .......... G06F 21/42 455/411 |
| 2011/0202417 A1 | 8/2011 | Dewakar et al. |
| 2011/0214158 A1 | 9/2011 | Pasquero et al. |
| 2011/0218849 A1 | 9/2011 | Rutigliano et al. |
| 2011/0225057 A1 | 9/2011 | Webb et al. |
| 2011/0230769 A1 | 9/2011 | Yamazaki |
| 2011/0231914 A1 | 9/2011 | Hung |
| 2011/0244796 A1 | 10/2011 | Khan et al. |
| 2011/0251892 A1 | 10/2011 | Laracey |
| 2011/0258537 A1 | 10/2011 | Rives et al. |
| 2011/0283334 A1 | 11/2011 | Choi et al. |
| 2011/0286640 A1 | 11/2011 | Kwon et al. |
| 2011/0300829 A1 | 12/2011 | Nurmi et al. |
| 2012/0009896 A1 | 1/2012 | Bandyopadhyay et al. |
| 2012/0022872 A1 | 1/2012 | Gruber et al. |
| 2012/0024947 A1 | 2/2012 | Naelon |
| 2012/0028609 A1 | 2/2012 | Hruska |
| 2012/0032891 A1 | 2/2012 | Parivar et al. |
| 2012/0036029 A1 | 2/2012 | Esplin et al. |
| 2012/0036556 A1 | 2/2012 | Lebeau et al. |
| 2012/0072546 A1 | 3/2012 | Etchegoyen |
| 2012/0078751 A1 | 3/2012 | Macphail et al. |
| 2012/0081282 A1 | 4/2012 | Chin |
| 2012/0084210 A1 | 4/2012 | Farahmand |
| 2012/0089300 A1 | 4/2012 | Wolterman |
| 2012/0089507 A1 | 4/2012 | Zhang et al. |
| 2012/0101881 A1 | 4/2012 | Taylor et al. |
| 2012/0101887 A1 | 4/2012 | Harvey et al. |
| 2012/0105367 A1 | 5/2012 | Son et al. |
| 2012/0109764 A1 | 5/2012 | Martin et al. |
| 2012/0110431 A1 | 5/2012 | Rosenfeld et al. |
| 2012/0116669 A1 | 5/2012 | Lee et al. |
| 2012/0123937 A1 | 5/2012 | Spodak |
| 2012/0127206 A1 | 5/2012 | Thompson et al. |
| 2012/0136780 A1 | 5/2012 | El-awady et al. |
| 2012/0136781 A1 | 5/2012 | Fridman et al. |
| 2012/0139698 A1 | 6/2012 | Tsui et al. |
| 2012/0185397 A1 | 7/2012 | Levovitz |
| 2012/0191603 A1 | 7/2012 | Nuzzi |
| 2012/0192065 A1 | 7/2012 | Migos et al. |
| 2012/0192093 A1 | 7/2012 | Migos et al. |
| 2012/0192094 A1 | 7/2012 | Goertz |
| 2012/0197740 A1 | 8/2012 | Grigg et al. |
| 2012/0198531 A1 | 8/2012 | Ort et al. |
| 2012/0200489 A1 | 8/2012 | Miyashita et al. |
| 2012/0209748 A1 | 8/2012 | Small |
| 2012/0215553 A1* | 8/2012 | Leston .................. G06Q 10/10 705/2 |
| 2012/0215647 A1 | 8/2012 | Powell et al. |
| 2012/0216113 A1 | 8/2012 | Li |
| 2012/0221464 A1 | 8/2012 | Pasquero et al. |
| 2012/0232968 A1 | 9/2012 | Calman et al. |
| 2012/0235921 A1 | 9/2012 | Laubach |
| 2012/0236037 A1 | 9/2012 | Lessing et al. |
| 2012/0238363 A1 | 9/2012 | Watanabe et al. |
| 2012/0245985 A1 | 9/2012 | Cho et al. |
| 2012/0245986 A1 | 9/2012 | Regan et al. |
| 2012/0271712 A1* | 10/2012 | Katzin .................. G06Q 30/06 705/14.51 |
| 2012/0280917 A1 | 11/2012 | Toksvig et al. |
| 2012/0283871 A1 | 11/2012 | Chai et al. |
| 2012/0284185 A1 | 11/2012 | Mettler et al. |
| 2012/0287290 A1 | 11/2012 | Jain |
| 2012/0290376 A1 | 11/2012 | Dryer et al. |
| 2012/0290449 A1 | 11/2012 | Mullen et al. |
| 2012/0290472 A1 | 11/2012 | Mullen et al. |
| 2012/0291121 A1 | 11/2012 | Huang et al. |
| 2012/0293438 A1 | 11/2012 | Chaudhri et al. |
| 2012/0303268 A1 | 11/2012 | Su et al. |
| 2012/0310760 A1 | 12/2012 | Phillips et al. |
| 2012/0311499 A1 | 12/2012 | Dellinger et al. |
| 2012/0316777 A1 | 12/2012 | Kitta |
| 2012/0317023 A1 | 12/2012 | Moon et al. |
| 2012/0322370 A1 | 12/2012 | Lee |
| 2012/0322371 A1 | 12/2012 | Lee |
| 2012/0331411 A1 | 12/2012 | Dempsey |
| 2013/0006637 A1 | 1/2013 | Kanevsky et al. |
| 2013/0006746 A1 | 1/2013 | Moore |
| 2013/0013499 A1* | 1/2013 | Kalgi .................... G06Q 20/12 705/41 |
| 2013/0015946 A1 | 1/2013 | Lau et al. |
| 2013/0030934 A1* | 1/2013 | Bakshi .................. G06Q 20/40 705/18 |
| 2013/0031217 A1 | 1/2013 | Rajapakse |
| 2013/0041654 A1 | 2/2013 | Walker et al. |
| 2013/0047034 A1 | 2/2013 | Salomon et al. |
| 2013/0047233 A1 | 2/2013 | Fisk et al. |
| 2013/0050263 A1 | 2/2013 | Khoe et al. |
| 2013/0054336 A1* | 2/2013 | Graylin ................. H04L 67/02 705/14.26 |
| 2013/0065482 A1 | 3/2013 | Trickett |
| 2013/0067545 A1 | 3/2013 | Hanes |
| 2013/0074194 A1 | 3/2013 | White et al. |
| 2013/0076591 A1 | 3/2013 | Sirpal et al. |
| 2013/0080162 A1 | 3/2013 | Chang et al. |
| 2013/0080272 A1 | 3/2013 | Ronca et al. |
| 2013/0080275 A1 | 3/2013 | Ronca et al. |
| 2013/0082819 A1 | 4/2013 | Cotterill |
| 2013/0085931 A1 | 4/2013 | Runyan |
| 2013/0085936 A1 | 4/2013 | Law et al. |
| 2013/0086637 A1 | 4/2013 | Cotterill |
| 2013/0102281 A1 | 4/2013 | Kande et al. |
| 2013/0103519 A1 | 4/2013 | Kountotsis et al. |
| 2013/0106603 A1 | 5/2013 | Weast et al. |
| 2013/0110719 A1 | 5/2013 | Carter et al. |
| 2013/0115932 A1 | 5/2013 | Williams et al. |
| 2013/0117022 A1 | 5/2013 | Chen et al. |
| 2013/0122866 A1 | 5/2013 | Huang |
| 2013/0124319 A1 | 5/2013 | Hodge et al. |
| 2013/0124423 A1 | 5/2013 | Fisher |
| 2013/0125016 A1 | 5/2013 | Pallakoff et al. |
| 2013/0129162 A1 | 5/2013 | Cheng et al. |
| 2013/0134212 A1 | 5/2013 | Chang |
| 2013/0141325 A1 | 6/2013 | Bailey |
| 2013/0144706 A1 | 6/2013 | Qawami et al. |
| 2013/0145448 A1 | 6/2013 | Newell |
| 2013/0148867 A1 | 6/2013 | Wang |
| 2013/0151360 A1 | 6/2013 | Scipioni et al. |
| 2013/0151414 A1 | 6/2013 | Zhu et al. |
| 2013/0159178 A1 | 6/2013 | Colon et al. |
| 2013/0166679 A1 | 6/2013 | Kuwahara |
| 2013/0169549 A1 | 7/2013 | Seymour et al. |
| 2013/0179304 A1 | 7/2013 | Swist |
| 2013/0185059 A1 | 7/2013 | Riccardi |
| 2013/0189953 A1 | 7/2013 | Mathews |
| 2013/0189963 A1 | 7/2013 | Epp et al. |
| 2013/0194066 A1 | 8/2013 | Rahman et al. |
| 2013/0198112 A1 | 8/2013 | Bhat |
| 2013/0200146 A1 | 8/2013 | Moghadam |
| 2013/0212655 A1 | 8/2013 | Hoyos et al. |
| 2013/0216108 A1 | 8/2013 | Hwang et al. |
| 2013/0218721 A1 | 8/2013 | Borhan et al. |
| 2013/0219285 A1 | 8/2013 | Iwasaki |

(56) References Cited

U.S. PATENT DOCUMENTS

| | | |
|---|---|---|
| 2013/0219303 A1 | 8/2013 | Eriksson et al. |
| 2013/0222323 A1 | 8/2013 | Mckenzie |
| 2013/0226792 A1* | 8/2013 | Kushevsky .......... G06Q 20/322 705/41 |
| 2013/0227413 A1 | 8/2013 | Thorsander et al. |
| 2013/0232073 A1 | 9/2013 | Sheets et al. |
| 2013/0234924 A1 | 9/2013 | Janefalkar et al. |
| 2013/0238455 A1 | 9/2013 | Laracey |
| 2013/0239202 A1 | 9/2013 | Adams et al. |
| 2013/0243264 A1 | 9/2013 | Aoki |
| 2013/0244615 A1 | 9/2013 | Miller |
| 2013/0246202 A1 | 9/2013 | Tobin |
| 2013/0262857 A1 | 10/2013 | Neuman et al. |
| 2013/0275300 A1 | 10/2013 | Killian et al. |
| 2013/0279768 A1 | 10/2013 | Boshra |
| 2013/0282533 A1 | 10/2013 | Foran-owens et al. |
| 2013/0282577 A1 | 10/2013 | Milne |
| 2013/0297414 A1 | 11/2013 | Goldfarb et al. |
| 2013/0304651 A1 | 11/2013 | Smith |
| 2013/0307792 A1 | 11/2013 | Andres et al. |
| 2013/0320080 A1 | 12/2013 | Olson et al. |
| 2013/0322665 A1 | 12/2013 | Bennett et al. |
| 2013/0326563 A1 | 12/2013 | Mulcahy et al. |
| 2013/0332358 A1 | 12/2013 | Zhao |
| 2013/0332364 A1 | 12/2013 | Templeton et al. |
| 2013/0332826 A1 | 12/2013 | Karunamuni et al. |
| 2013/0333006 A1 | 12/2013 | Tapling et al. |
| 2013/0336527 A1 | 12/2013 | Nechyba et al. |
| 2013/0336545 A1 | 12/2013 | Pritikin et al. |
| 2013/0339436 A1 | 12/2013 | Gray |
| 2013/0342672 A1 | 12/2013 | Gray et al. |
| 2013/0345975 A1 | 12/2013 | Vulcano et al. |
| 2013/0346273 A1 | 12/2013 | Stockton et al. |
| 2013/0346302 A1 | 12/2013 | Purves et al. |
| 2013/0346882 A1 | 12/2013 | Shiplacoff et al. |
| 2014/0003597 A1 | 1/2014 | Lazaridis et al. |
| 2014/0003677 A1 | 1/2014 | Han et al. |
| 2014/0006285 A1 | 1/2014 | Chi et al. |
| 2014/0006949 A1 | 1/2014 | Briand et al. |
| 2014/0009399 A1 | 1/2014 | Zhang |
| 2014/0013422 A1 | 1/2014 | Janus et al. |
| 2014/0015546 A1 | 1/2014 | Frederick |
| 2014/0015786 A1 | 1/2014 | Honda |
| 2014/0019352 A1* | 1/2014 | Shrivastava ....... G06Q 20/3674 705/41 |
| 2014/0025513 A1 | 1/2014 | Cooke et al. |
| 2014/0025520 A1 | 1/2014 | Mardikar et al. |
| 2014/0036099 A1 | 2/2014 | Balassanian |
| 2014/0047560 A1 | 2/2014 | Meyer et al. |
| 2014/0052553 A1 | 2/2014 | Uzo |
| 2014/0058860 A1 | 2/2014 | Roh et al. |
| 2014/0058935 A1 | 2/2014 | Mijares |
| 2014/0058939 A1 | 2/2014 | Savla |
| 2014/0058941 A1 | 2/2014 | Moon et al. |
| 2014/0064155 A1 | 3/2014 | Evans |
| 2014/0067654 A1 | 3/2014 | Hanson et al. |
| 2014/0068740 A1 | 3/2014 | Lecun et al. |
| 2014/0068751 A1 | 3/2014 | Last |
| 2014/0070957 A1 | 3/2014 | Longinotti-buitoni et al. |
| 2014/0073252 A1 | 3/2014 | Lee et al. |
| 2014/0074407 A1 | 3/2014 | Hernandez-silveira et al. |
| 2014/0074569 A1 | 3/2014 | Francis et al. |
| 2014/0074635 A1 | 3/2014 | Reese et al. |
| 2014/0074716 A1 | 3/2014 | Ni |
| 2014/0074717 A1 | 3/2014 | Evans |
| 2014/0081854 A1 | 3/2014 | Sanchez et al. |
| 2014/0084857 A1 | 3/2014 | Liu et al. |
| 2014/0085460 A1 | 3/2014 | Park et al. |
| 2014/0089196 A1 | 3/2014 | Paya et al. |
| 2014/0092025 A1 | 4/2014 | Pala et al. |
| 2014/0094124 A1 | 4/2014 | Dave et al. |
| 2014/0094143 A1 | 4/2014 | Ayotte |
| 2014/0095225 A1 | 4/2014 | Williams et al. |
| 2014/0099886 A1 | 4/2014 | Monroe |
| 2014/0101056 A1 | 4/2014 | Wendling |
| 2014/0109024 A1 | 4/2014 | Miyazaki |
| 2014/0112555 A1 | 4/2014 | Fadell et al. |
| 2014/0115695 A1 | 4/2014 | Fadell et al. |
| 2014/0118519 A1 | 5/2014 | Sahin |
| 2014/0122331 A1 | 5/2014 | Vaish et al. |
| 2014/0128035 A1 | 5/2014 | Sweeney |
| 2014/0129435 A1* | 5/2014 | Pardo .................. G06Q 20/36 705/41 |
| 2014/0129441 A1 | 5/2014 | Blanco et al. |
| 2014/0134947 A1 | 5/2014 | Stouder-studenmund |
| 2014/0138435 A1 | 5/2014 | Khalid |
| 2014/0139454 A1 | 5/2014 | Mistry et al. |
| 2014/0140587 A1 | 5/2014 | Ballard et al. |
| 2014/0142851 A1 | 5/2014 | Larmo et al. |
| 2014/0143145 A1 | 5/2014 | Kortina et al. |
| 2014/0143693 A1 | 5/2014 | Goossens et al. |
| 2014/0143737 A1 | 5/2014 | Mistry et al. |
| 2014/0143784 A1 | 5/2014 | Mistry et al. |
| 2014/0149198 A1 | 5/2014 | Kim et al. |
| 2014/0155031 A1 | 6/2014 | Lee et al. |
| 2014/0156531 A1 | 6/2014 | Poon et al. |
| 2014/0157153 A1 | 6/2014 | Yuen et al. |
| 2014/0160033 A1 | 6/2014 | Brikman et al. |
| 2014/0164082 A1* | 6/2014 | Sun .................. G06Q 30/0214 705/14.16 |
| 2014/0164241 A1 | 6/2014 | Neuwirth |
| 2014/0165000 A1 | 6/2014 | Fleizach et al. |
| 2014/0167986 A1 | 6/2014 | Parade et al. |
| 2014/0172533 A1 | 6/2014 | Andrews et al. |
| 2014/0173450 A1 | 6/2014 | Akula |
| 2014/0173455 A1 | 6/2014 | Shimizu et al. |
| 2014/0180582 A1 | 6/2014 | Pontarelli et al. |
| 2014/0181747 A1 | 6/2014 | Son |
| 2014/0187163 A1 | 7/2014 | Fujita |
| 2014/0187856 A1 | 7/2014 | Holoien et al. |
| 2014/0188673 A1 | 7/2014 | Graham et al. |
| 2014/0191715 A1 | 7/2014 | Wechlin et al. |
| 2014/0195815 A1 | 7/2014 | Taveau et al. |
| 2014/0197234 A1 | 7/2014 | Hammad |
| 2014/0207659 A1 | 7/2014 | Erez et al. |
| 2014/0207680 A1 | 7/2014 | Rephlo |
| 2014/0222436 A1 | 8/2014 | Binder et al. |
| 2014/0222664 A1 | 8/2014 | Milne |
| 2014/0236840 A1 | 8/2014 | Islam |
| 2014/0237389 A1 | 8/2014 | Ryall et al. |
| 2014/0244365 A1* | 8/2014 | Price ...................... G07B 15/00 705/13 |
| 2014/0244493 A1* | 8/2014 | Kenyon ................ G06Q 20/36 705/41 |
| 2014/0244495 A1 | 8/2014 | Davis et al. |
| 2014/0254891 A1 | 9/2014 | Lee et al. |
| 2014/0258292 A1 | 9/2014 | Thramann et al. |
| 2014/0258828 A1 | 9/2014 | Lymer et al. |
| 2014/0279442 A1 | 9/2014 | Luoma et al. |
| 2014/0279474 A1 | 9/2014 | Evans et al. |
| 2014/0279497 A1 | 9/2014 | Qaim-maqami et al. |
| 2014/0279556 A1 | 9/2014 | Priebatsch et al. |
| 2014/0282987 A1 | 9/2014 | Narendra et al. |
| 2014/0283128 A1 | 9/2014 | Shepherd et al. |
| 2014/0292396 A1 | 10/2014 | Bruwer et al. |
| 2014/0292641 A1 | 10/2014 | Cho et al. |
| 2014/0297385 A1 | 10/2014 | Ryan |
| 2014/0298432 A1 | 10/2014 | Brown |
| 2014/0298478 A1 | 10/2014 | Kim et al. |
| 2014/0304809 A1 | 10/2014 | Fadell et al. |
| 2014/0311447 A1 | 10/2014 | Surnilla et al. |
| 2014/0313307 A1 | 10/2014 | Oh et al. |
| 2014/0320387 A1 | 10/2014 | Eriksson et al. |
| 2014/0337207 A1 | 11/2014 | Zhang et al. |
| 2014/0337450 A1 | 11/2014 | Choudhary et al. |
| 2014/0337931 A1 | 11/2014 | Cotterill |
| 2014/0343843 A1 | 11/2014 | Yanku |
| 2014/0344082 A1 | 11/2014 | Soundararajan |
| 2014/0344896 A1 | 11/2014 | Pak et al. |
| 2014/0344904 A1 | 11/2014 | Venkataramani et al. |
| 2014/0359140 A1 | 12/2014 | Shankarraman |
| 2014/0359481 A1 | 12/2014 | Dawson et al. |
| 2014/0365113 A1 | 12/2014 | Mcgavran et al. |
| 2014/0366159 A1 | 12/2014 | Cohen |

(56) References Cited

U.S. PATENT DOCUMENTS

| | | |
|---|---|---|
| 2014/0370807 A1 | 12/2014 | Lei et al. |
| 2014/0372309 A1 | 12/2014 | Shirey et al. |
| 2014/0375835 A1 | 12/2014 | Bos |
| 2014/0380465 A1 | 12/2014 | Fadell et al. |
| 2015/0002696 A1 | 1/2015 | He et al. |
| 2015/0006376 A1 | 1/2015 | Nuthulapati et al. |
| 2015/0012417 A1 | 1/2015 | Joao et al. |
| 2015/0012425 A1 | 1/2015 | Mathew |
| 2015/0012435 A1 | 1/2015 | Ramavarjula et al. |
| 2015/0014141 A1 | 1/2015 | Rao et al. |
| 2015/0017956 A1 | 1/2015 | Jeong |
| 2015/0019944 A1 | 1/2015 | Kalgi |
| 2015/0033364 A1 | 1/2015 | Wong |
| 2015/0039494 A1 | 2/2015 | Sinton et al. |
| 2015/0043790 A1 | 2/2015 | Ono et al. |
| 2015/0044965 A1 | 2/2015 | Kamon et al. |
| 2015/0046336 A1 | 2/2015 | Cummins |
| 2015/0051846 A1 | 2/2015 | Masuya |
| 2015/0056957 A1 | 2/2015 | Mardikar et al. |
| 2015/0058146 A1 | 2/2015 | Gaddam et al. |
| 2015/0058191 A1 | 2/2015 | Khan et al. |
| 2015/0061972 A1 | 3/2015 | Seo et al. |
| 2015/0065035 A1 | 3/2015 | Kim et al. |
| 2015/0066758 A1 | 3/2015 | Denardis et al. |
| 2015/0067580 A1 | 3/2015 | Um et al. |
| 2015/0074418 A1 | 3/2015 | Lee et al. |
| 2015/0074615 A1 | 3/2015 | Han et al. |
| 2015/0077362 A1 | 3/2015 | Seo |
| 2015/0089407 A1 | 3/2015 | Suzuki |
| 2015/0089636 A1 | 3/2015 | Martynov et al. |
| 2015/0094031 A1 | 4/2015 | Liu |
| 2015/0095174 A1 | 4/2015 | Dua |
| 2015/0095175 A1 | 4/2015 | Dua |
| 2015/0112752 A1 | 4/2015 | Wagner et al. |
| 2015/0120545 A1 | 4/2015 | Fiore et al. |
| 2015/0121405 A1 | 4/2015 | Ekselius et al. |
| 2015/0124053 A1 | 5/2015 | Tamura et al. |
| 2015/0127539 A1 | 5/2015 | Ye et al. |
| 2015/0135282 A1 | 5/2015 | Kong et al. |
| 2015/0146945 A1 | 5/2015 | Han et al. |
| 2015/0153850 A1 | 6/2015 | Fujii et al. |
| 2015/0154589 A1 | 6/2015 | Li |
| 2015/0170146 A1 | 6/2015 | Ji et al. |
| 2015/0178878 A1 | 6/2015 | Huang |
| 2015/0185896 A1 | 7/2015 | Gwin et al. |
| 2015/0186152 A1 | 7/2015 | Jothiswaran et al. |
| 2015/0186636 A1 | 7/2015 | Tharappel et al. |
| 2015/0186871 A1 | 7/2015 | Laracey |
| 2015/0195133 A1 | 7/2015 | Sheets et al. |
| 2015/0208244 A1 | 7/2015 | Nakao |
| 2015/0213560 A1 | 7/2015 | Aabye et al. |
| 2015/0215128 A1 | 7/2015 | Pal |
| 2015/0220924 A1* | 8/2015 | Bakker ............. G06Q 20/4014 |
| | | 705/14.27 |
| 2015/0227922 A1 | 8/2015 | Filler |
| 2015/0229750 A1 | 8/2015 | Zhou et al. |
| 2015/0235055 A1 | 8/2015 | An et al. |
| 2015/0242611 A1 | 8/2015 | Cotterill |
| 2015/0242837 A1 | 8/2015 | Yarbrough et al. |
| 2015/0249540 A1 | 9/2015 | Khalil et al. |
| 2015/0254661 A1 | 9/2015 | Lanc |
| 2015/0257004 A1 | 9/2015 | Shanmugam et al. |
| 2015/0286694 A1 | 10/2015 | Kaplinger et al. |
| 2015/0295921 A1 | 10/2015 | Cao |
| 2015/0302493 A1 | 10/2015 | Batstone et al. |
| 2015/0302510 A1 | 10/2015 | Godsey et al. |
| 2015/0310259 A1 | 10/2015 | Lau et al. |
| 2015/0324615 A1 | 11/2015 | Matsumoto et al. |
| 2015/0326985 A1 | 11/2015 | Priyantha et al. |
| 2015/0334567 A1 | 11/2015 | Chen et al. |
| 2015/0339652 A1 | 11/2015 | Park et al. |
| 2015/0346845 A1 | 12/2015 | Di Censo et al. |
| 2015/0348001 A1 | 12/2015 | Van os et al. |
| 2015/0348002 A1 | 12/2015 | Van os et al. |
| 2015/0348009 A1 | 12/2015 | Brown et al. |
| 2015/0348014 A1 | 12/2015 | Van os et al. |
| 2015/0348018 A1* | 12/2015 | Campos ............. G06Q 20/36 |
| | | 705/41 |
| 2015/0348029 A1 | 12/2015 | Van os et al. |
| 2015/0350448 A1 | 12/2015 | Coffman et al. |
| 2015/0363632 A1 | 12/2015 | Ahn et al. |
| 2015/0365400 A1 | 12/2015 | Cox |
| 2015/0370529 A1 | 12/2015 | Zambetti et al. |
| 2016/0005024 A1 | 1/2016 | Harrell |
| 2016/0005028 A1 | 1/2016 | Mayblum et al. |
| 2016/0012417 A1 | 1/2016 | Mizon |
| 2016/0012465 A1 | 1/2016 | Sharp |
| 2016/0019536 A1* | 1/2016 | Ortiz ............. G06Q 20/3221 |
| | | 705/67 |
| 2016/0021003 A1 | 1/2016 | Pan |
| 2016/0026779 A1 | 1/2016 | Grigg et al. |
| 2016/0034887 A1 | 2/2016 | Lee |
| 2016/0048705 A1 | 2/2016 | Coffman et al. |
| 2016/0050199 A1 | 2/2016 | Ganesan |
| 2016/0061613 A1 | 3/2016 | Jung et al. |
| 2016/0061623 A1 | 3/2016 | Pahwa et al. |
| 2016/0062487 A1 | 3/2016 | Foss et al. |
| 2016/0062572 A1 | 3/2016 | Yang et al. |
| 2016/0063235 A1 | 3/2016 | Tussy |
| 2016/0086176 A1 | 3/2016 | Silva pinto et al. |
| 2016/0092665 A1 | 3/2016 | Cowan et al. |
| 2016/0092877 A1 | 3/2016 | Chew |
| 2016/0100156 A1 | 4/2016 | Zhou et al. |
| 2016/0104034 A1 | 4/2016 | Wilder et al. |
| 2016/0104228 A1 | 4/2016 | Sundaresan |
| 2016/0132864 A1 | 5/2016 | Barrese et al. |
| 2016/0134488 A1 | 5/2016 | Straub et al. |
| 2016/0147987 A1 | 5/2016 | Jang et al. |
| 2016/0148384 A1 | 5/2016 | Bud et al. |
| 2016/0154956 A1 | 6/2016 | Fadell et al. |
| 2016/0171482 A1 | 6/2016 | Muncey et al. |
| 2016/0180305 A1 | 6/2016 | Dresser et al. |
| 2016/0188860 A1 | 6/2016 | Lee et al. |
| 2016/0224966 A1 | 8/2016 | Van os et al. |
| 2016/0224973 A1 | 8/2016 | Van os et al. |
| 2016/0232513 A1* | 8/2016 | Purves ............. G06F 17/30525 |
| 2016/0232516 A1 | 8/2016 | Dayan et al. |
| 2016/0238402 A1 | 8/2016 | Mcgavran et al. |
| 2016/0239701 A1 | 8/2016 | Lee et al. |
| 2016/0241543 A1 | 8/2016 | Jung et al. |
| 2016/0241555 A1 | 8/2016 | Vo et al. |
| 2016/0253665 A1 | 9/2016 | Van os et al. |
| 2016/0259489 A1 | 9/2016 | Yang |
| 2016/0260414 A1 | 9/2016 | Yang |
| 2016/0267779 A1 | 9/2016 | Kuang |
| 2016/0269540 A1 | 9/2016 | Butcher et al. |
| 2016/0294557 A1 | 10/2016 | Baldwin et al. |
| 2016/0308859 A1 | 10/2016 | Barry et al. |
| 2016/0314290 A1 | 10/2016 | Baca et al. |
| 2016/0335495 A1 | 11/2016 | Kim et al. |
| 2016/0342832 A1 | 11/2016 | Bud et al. |
| 2016/0345172 A1 | 11/2016 | Cotterill |
| 2016/0350522 A1 | 12/2016 | Chi et al. |
| 2016/0358133 A1 | 12/2016 | Van os et al. |
| 2016/0358134 A1 | 12/2016 | Van os et al. |
| 2016/0358167 A1 | 12/2016 | Van os et al. |
| 2016/0358168 A1 | 12/2016 | Van os et al. |
| 2016/0358180 A1* | 12/2016 | Van Os ............. G06Q 20/3278 |
| 2016/0358199 A1 | 12/2016 | Van os et al. |
| 2016/0364561 A1 | 12/2016 | Lee |
| 2016/0378961 A1 | 12/2016 | Park |
| 2016/0378966 A1 | 12/2016 | Alten |
| 2017/0004507 A1 | 1/2017 | Henderson et al. |
| 2017/0011210 A1 | 1/2017 | Cheong et al. |
| 2017/0017834 A1 | 1/2017 | Sabitov et al. |
| 2017/0032375 A1 | 2/2017 | Van os et al. |
| 2017/0038856 A1 | 2/2017 | Missig et al. |
| 2017/0046507 A1 | 2/2017 | Archer et al. |
| 2017/0046704 A1 | 2/2017 | Buchner et al. |
| 2017/0054731 A1 | 2/2017 | Cotterill |
| 2017/0063851 A1 | 3/2017 | Kim et al. |
| 2017/0070680 A1 | 3/2017 | Kobayashi |
| 2017/0083188 A1 | 3/2017 | Yang et al. |
| 2017/0139517 A9 | 5/2017 | Morton et al. |

(56) References Cited

U.S. PATENT DOCUMENTS

| | | | |
|---|---|---|---|
| 2017/0147186 A1 | 5/2017 | Velusamy et al. |
| 2017/0160098 A1 | 6/2017 | Mcgavran et al. |
| 2017/0161018 A1 | 6/2017 | Lemay et al. |
| 2017/0169202 A1 | 6/2017 | Duggan et al. |
| 2017/0169204 A1 | 6/2017 | Fadell et al. |
| 2017/0180637 A1 | 6/2017 | Lautenbach et al. |
| 2017/0185760 A1 | 6/2017 | Wilder |
| 2017/0193214 A1 | 7/2017 | Shim et al. |
| 2017/0193314 A1 | 7/2017 | Kim et al. |
| 2017/0199997 A1 | 7/2017 | Fadell et al. |
| 2017/0235361 A1 | 8/2017 | Rigazio et al. |
| 2017/0244703 A1 | 8/2017 | Lee et al. |
| 2017/0300897 A1* | 10/2017 | Ferenczi ............ G06Q 20/367 |
| 2017/0329949 A1 | 11/2017 | Civelli |
| 2017/0339151 A1 | 11/2017 | Van os et al. |
| 2017/0357972 A1 | 12/2017 | Van os et al. |
| 2017/0357973 A1 | 12/2017 | Van os et al. |
| 2018/0021954 A1 | 1/2018 | Fischer et al. |
| 2018/0068313 A1 | 3/2018 | Van os et al. |
| 2018/0082282 A1 | 3/2018 | Van os et al. |
| 2018/0088761 A1 | 3/2018 | Schobel et al. |
| 2018/0088787 A1 | 3/2018 | Bereza et al. |
| 2018/0109629 A1 | 4/2018 | Van os et al. |
| 2018/0114010 A1 | 4/2018 | Van os et al. |
| 2018/0117944 A1* | 5/2018 | Lee .................... G06F 21/62 |
| 2018/0144178 A1 | 5/2018 | Han et al. |
| 2018/0158066 A1 | 6/2018 | Van os et al. |
| 2018/0173928 A1 | 6/2018 | Han et al. |
| 2018/0173929 A1 | 6/2018 | Han et al. |
| 2018/0173930 A1 | 6/2018 | Han et al. |
| 2018/0268747 A1 | 9/2018 | Braun |
| 2018/0276673 A1 | 9/2018 | Van os et al. |
| 2018/0302790 A1 | 10/2018 | Cotterill |
| 2018/0321826 A1 | 11/2018 | Bereza et al. |
| 2019/0003849 A1 | 1/2019 | Pahwa et al. |
| 2019/0080066 A1 | 3/2019 | Van Os et al. |
| 2019/0080070 A1 | 3/2019 | Van Os et al. |
| 2019/0080071 A1 | 3/2019 | Van Os et al. |
| 2019/0080072 A1 | 3/2019 | Van Os et al. |
| 2019/0080189 A1 | 3/2019 | Van Os et al. |
| 2019/0124510 A1 | 4/2019 | Cotterill et al. |
| 2019/0173996 A1 | 6/2019 | Butcher et al. |
| 2019/0213021 A1 | 7/2019 | Missig et al. |
| 2019/0220647 A1 | 7/2019 | Han et al. |
| 2019/0243957 A1 | 8/2019 | Fadell et al. |
| 2019/0289079 A1 | 9/2019 | Van Os et al. |
| 2019/0370448 A1 | 12/2019 | Devine et al. |
| 2019/0370583 A1 | 12/2019 | Van Os et al. |
| 2020/0065470 A1 | 2/2020 | Van Os et al. |
| 2020/0065821 A1 | 2/2020 | Van Os et al. |

FOREIGN PATENT DOCUMENTS

| | | |
|---|---|---|
| AU | 2016100796 A4 | 12/2016 |
| CN | 1163669 A | 10/1997 |
| CN | 1183475 A | 6/1998 |
| CN | 1220433 A | 6/1999 |
| CN | 1452739 A | 10/2003 |
| CN | 1484425 A | 3/2004 |
| CN | 1685357 A | 10/2005 |
| CN | 1742252 A | 3/2006 |
| CN | 1801708 A | 7/2006 |
| CN | 1836397 A | 9/2006 |
| CN | 1908981 A | 2/2007 |
| CN | 101035335 A | 9/2007 |
| CN | 101039184 A | 9/2007 |
| CN | 101171604 A | 4/2008 |
| CN | 101299694 A | 11/2008 |
| CN | 101341718 A | 1/2009 |
| CN | 101730907 A | 6/2010 |
| CN | 101796764 A | 8/2010 |
| CN | 101809581 A | 8/2010 |
| CN | 102004908 A | 4/2011 |
| CN | 102096546 A | 6/2011 |
| CN | 102164213 A | 8/2011 |
| CN | 102209321 A | 10/2011 |
| CN | 102244676 A | 11/2011 |
| CN | 102282578 A | 12/2011 |
| CN | 102396205 A | 3/2012 |
| CN | 102663303 A | 9/2012 |
| CN | 102737313 A | 10/2012 |
| CN | 102833423 A | 12/2012 |
| CN | 103188280 A | 7/2013 |
| CN | 103210366 A | 7/2013 |
| CN | 103413218 A | 11/2013 |
| CN | 103701605 A | 4/2014 |
| CN | 103778533 A | 5/2014 |
| CN | 104038256 A | 9/2014 |
| CN | 104077534 A | 10/2014 |
| CN | 104205785 A | 12/2014 |
| CN | 104252675 A | 12/2014 |
| CN | 104272854 A | 1/2015 |
| CN | 104281430 A | 1/2015 |
| CN | 104346297 A | 2/2015 |
| CN | 105051651 A | 11/2015 |
| CN | 105320864 A | 2/2016 |
| CN | 105389491 A | 3/2016 |
| CN | 105787718 A | 7/2016 |
| CN | 105844468 A | 8/2016 |
| CN | 105868613 A | 8/2016 |
| CN | 105893814 A | 8/2016 |
| CN | 106095247 A | 11/2016 |
| CN | 106156566 A | 11/2016 |
| CN | 106355058 A | 1/2017 |
| CN | 106462383 A | 2/2017 |
| CN | 106485123 A | 3/2017 |
| CN | 106778222 A | 5/2017 |
| CN | 109769397 A | 5/2019 |
| DE | 10153591 A1 | 5/2003 |
| EP | 0593386 A2 | 4/1994 |
| EP | 0836074 A2 | 4/1998 |
| EP | 0923018 A2 | 6/1999 |
| EP | 1422589 A1 | 5/2004 |
| EP | 1614992 A1 | 1/2006 |
| EP | 1626330 A1 | 2/2006 |
| EP | 1645989 A2 | 4/2006 |
| EP | 1736908 A2 | 12/2006 |
| EP | 1835697 A2 | 9/2007 |
| EP | 1858238 A2 | 11/2007 |
| EP | 1950678 A1 | 7/2008 |
| EP | 2096413 A1 | 9/2009 |
| EP | 2150031 A1 | 2/2010 |
| EP | 1835697 A3 | 6/2010 |
| EP | 2247087 A1 | 11/2010 |
| EP | 2306692 A1 | 4/2011 |
| EP | 2309410 A1 | 4/2011 |
| EP | 2341315 A1 | 7/2011 |
| EP | 1626330 A4 | 1/2012 |
| EP | 2428947 A2 | 3/2012 |
| EP | 2466260 A1 | 6/2012 |
| EP | 2523439 A1 | 11/2012 |
| EP | 2632131 A1 | 8/2013 |
| EP | 2654275 A1 | 10/2013 |
| EP | 2672377 A2 | 12/2013 |
| EP | 2674889 A2 | 12/2013 |
| EP | 2701107 A1 | 2/2014 |
| EP | 2713298 A1 | 4/2014 |
| EP | 2720442 A1 | 4/2014 |
| EP | 2725537 A1 | 4/2014 |
| EP | 2960822 A1 | 12/2015 |
| EP | 2993619 A1 | 3/2016 |
| EP | 3057024 A1 | 8/2016 |
| EP | 3076334 A1 | 10/2016 |
| EP | 1835697 B1 | 5/2018 |
| EP | 3373132 A2 | 9/2018 |
| GB | 2184576 A | 6/1987 |
| GB | 2312040 A | 10/1997 |
| GB | 2313460 A | 11/1997 |
| GB | 2360618 A | 9/2001 |
| GB | 2466038 A | 6/2010 |
| GB | 2505476 A | 3/2012 |
| GB | 2500321 A | 9/2013 |
| JP | 4-158434 A | 6/1992 |
| JP | 6-284182 A | 10/1994 |

(56) References Cited

FOREIGN PATENT DOCUMENTS

| | | |
|---|---|---|
| JP | 7-146942 A | 6/1995 |
| JP | 9-128208 A | 5/1997 |
| JP | 9-221950 A | 8/1997 |
| JP | 9-292262 A | 11/1997 |
| JP | 10-069346 A | 3/1998 |
| JP | 10-232934 A | 9/1998 |
| JP | 10-269358 A | 10/1998 |
| JP | 11-39385 A | 2/1999 |
| JP | 11-73530 A | 3/1999 |
| JP | 11-183183 A | 7/1999 |
| JP | 11-185016 A | 7/1999 |
| JP | 11-242745 A | 9/1999 |
| JP | 2000-259477 A | 9/2000 |
| JP | 2000-315118 A | 11/2000 |
| JP | 2001-92554 A | 4/2001 |
| JP | 2001-92586 A | 4/2001 |
| JP | 2001-318751 A | 11/2001 |
| JP | 2001-331758 A | 11/2001 |
| JP | 2002-99854 A | 4/2002 |
| JP | 2002-149171 A | 5/2002 |
| JP | 2002-515145 A | 5/2002 |
| JP | 2002-183093 A | 6/2002 |
| JP | 2002-207525 A | 7/2002 |
| JP | 2002-288137 A | 10/2002 |
| JP | 2003-16398 A | 1/2003 |
| JP | 2003-67343 A | 3/2003 |
| JP | 2003-141541 A | 5/2003 |
| JP | 2003-143290 A | 5/2003 |
| JP | 2003-295994 A | 10/2003 |
| JP | 2003-298689 A | 10/2003 |
| JP | 2003-346059 A | 12/2003 |
| JP | 2004-086866 A | 3/2004 |
| JP | 2004-252736 A | 9/2004 |
| JP | 2004-258738 A | 9/2004 |
| JP | 2004-265353 A | 9/2004 |
| JP | 2004-287592 A | 10/2004 |
| JP | 2004-532477 A | 10/2004 |
| JP | 2004-313459 A | 11/2004 |
| JP | 2004-334788 A | 11/2004 |
| JP | 2004-348600 A | 12/2004 |
| JP | 2004-348601 A | 12/2004 |
| JP | 2004-356816 A | 12/2004 |
| JP | 2005-4490 A | 1/2005 |
| JP | 2005-071225 A | 3/2005 |
| JP | 2005-84991 A | 3/2005 |
| JP | 2005-122700 A | 5/2005 |
| JP | 2005-202578 A | 7/2005 |
| JP | 2005-521961 A | 7/2005 |
| JP | 2005-523505 A | 8/2005 |
| JP | 2005-327076 A | 11/2005 |
| JP | 2005-339425 A | 12/2005 |
| JP | 2006-12080 A | 1/2006 |
| JP | 2006-31182 A | 2/2006 |
| JP | 2006-85559 A | 3/2006 |
| JP | 2006-93912 A | 4/2006 |
| JP | 2006-107288 A | 4/2006 |
| JP | 2006-114018 A | 4/2006 |
| JP | 2006-115043 A | 4/2006 |
| JP | 2006-163960 A | 6/2006 |
| JP | 2006-172180 A | 6/2006 |
| JP | 2006-189999 A | 7/2006 |
| JP | 2006-191245 A | 7/2006 |
| JP | 2006-197071 A | 7/2006 |
| JP | 2006-202278 A | 8/2006 |
| JP | 2006-215705 A | 8/2006 |
| JP | 2006-221468 A | 8/2006 |
| JP | 2006-259931 A | 9/2006 |
| JP | 2006-277670 A | 10/2006 |
| JP | 2006-303701 A | 11/2006 |
| JP | 2006-308375 A | 11/2006 |
| JP | 2007-11667 A | 1/2007 |
| JP | 2007-34637 A | 2/2007 |
| JP | 2007-52574 A | 3/2007 |
| JP | 2007-058397 A | 3/2007 |
| JP | 2007-071008 A | 3/2007 |
| JP | 2007-124667 A | 5/2007 |
| JP | 2007-128201 A | 5/2007 |
| JP | 2007-135149 A | 5/2007 |
| JP | 2007-148801 A | 6/2007 |
| JP | 2007-226293 A | 9/2007 |
| JP | 2007-334637 A | 12/2007 |
| JP | 2008-70926 A | 3/2008 |
| JP | 2008-102860 A | 5/2008 |
| JP | 2008-250601 A | 10/2008 |
| JP | 2008-306667 A | 12/2008 |
| JP | 2009-9350 A | 1/2009 |
| JP | 2009-9434 A | 1/2009 |
| JP | 2009-15543 A | 1/2009 |
| JP | 2009-49878 A | 3/2009 |
| JP | 2009-99076 A | 5/2009 |
| JP | 2009-134521 A | 6/2009 |
| JP | 2009-136456 A | 6/2009 |
| JP | 2009-258991 A | 11/2009 |
| JP | 2010-9513 A | 1/2010 |
| JP | 2010-28404 A | 2/2010 |
| JP | 2010-61402 A | 3/2010 |
| JP | 2010-152506 A | 7/2010 |
| JP | 2010-271779 A | 12/2010 |
| JP | 2010-541046 A | 12/2010 |
| JP | 2011-054120 A | 3/2011 |
| JP | 2011-97287 A | 5/2011 |
| JP | 2011-519439 A | 7/2011 |
| JP | 2012-8951 A | 1/2012 |
| JP | 2012-8985 A | 1/2012 |
| JP | 2012-504273 A | 2/2012 |
| JP | 2012-508930 A | 4/2012 |
| JP | 2012-114676 A | 6/2012 |
| JP | 2012-164070 A | 8/2012 |
| JP | 2012-194661 A | 10/2012 |
| JP | 2012-198625 A | 10/2012 |
| JP | 2012-208645 A | 10/2012 |
| JP | 2012-215981 A | 11/2012 |
| JP | 2012-529699 A | 11/2012 |
| JP | 2013-20496 A | 1/2013 |
| JP | 2013-25357 A | 2/2013 |
| JP | 2013-25409 A | 2/2013 |
| JP | 2013-30052 A | 2/2013 |
| JP | 2013-34322 A | 2/2013 |
| JP | 2013-58828 A | 3/2013 |
| JP | 2013-120468 A | 6/2013 |
| JP | 2013-530445 A | 7/2013 |
| JP | 2013-149206 A | 8/2013 |
| JP | 2013-533532 A | 8/2013 |
| JP | 5267966 B2 | 8/2013 |
| JP | 2013-191234 A | 9/2013 |
| JP | 2013-206274 A | 10/2013 |
| JP | 2013-218663 A | 10/2013 |
| JP | 2013-222410 A | 10/2013 |
| JP | 2014-503891 A | 2/2014 |
| JP | 2014-44719 A | 3/2014 |
| JP | 2014-44724 A | 3/2014 |
| JP | 2014-53692 A | 3/2014 |
| JP | 2014-75155 A | 4/2014 |
| JP | 2014-41616 A | 6/2014 |
| JP | 2014-102845 A | 6/2014 |
| JP | 2014-123169 A | 7/2014 |
| JP | 2014-191653 A | 10/2014 |
| JP | 2015-14923 A | 1/2015 |
| JP | 2015-75877 A | 4/2015 |
| JP | 2016-53766 A | 4/2016 |
| JP | 2016-71655 A | 5/2016 |
| JP | 2016-521403 A | 7/2016 |
| JP | 6023162 B2 | 11/2016 |
| JP | 2016-224960 A | 12/2016 |
| JP | 2017-16170 A | 1/2017 |
| JP | 2017-138846 A | 8/2017 |
| KR | 10-2002-0019031 A | 3/2002 |
| KR | 10-2002-0022295 A | 3/2002 |
| KR | 10-2002-0087665 A | 11/2002 |
| KR | 10-2004-0049502 A | 6/2004 |
| KR | 10-2004-0067514 A | 7/2004 |
| KR | 10-2005-0061975 A | 6/2005 |
| KR | 10-2006-0098024 A | 9/2006 |
| KR | 10-0652624 B1 | 12/2006 |

(56) References Cited

FOREIGN PATENT DOCUMENTS

| | | |
|---|---|---|
| KR | 10-2007-0026808 A | 3/2007 |
| KR | 10-0805341 B1 | 2/2008 |
| KR | 10-2008-0064395 A | 7/2008 |
| KR | 10-2009-0100320 A | 9/2009 |
| KR | 10-2010-0074218 A | 7/2010 |
| KR | 10-20111-0056561 A | 5/2011 |
| KR | 10-2011-0078008 A | 7/2011 |
| KR | 10-2011-0093729 A | 8/2011 |
| KR | 10-2012-0040693 A | 4/2012 |
| KR | 10-2012-0057800 A | 6/2012 |
| KR | 10-1184865 B1 | 9/2012 |
| KR | 10-2013-0027326 A | 3/2013 |
| KR | 10-1253392 B1 | 4/2013 |
| KR | 10-2013-0116905 A | 10/2013 |
| KR | 10-1330962 B1 | 11/2013 |
| KR | 10-2014-0018019 A | 2/2014 |
| KR | 10-2014-0026263 A | 3/2014 |
| KR | 10-2014-0027029 A | 3/2014 |
| KR | 10-2014-0055429 A | 5/2014 |
| KR | 10-2014-0105309 A | 9/2014 |
| KR | 10-2014-0121764 A | 10/2014 |
| KR | 10-2014-0137400 A | 12/2014 |
| KR | 10-2016-0012636 A | 2/2016 |
| KR | 10-2016-0045633 A | 4/2016 |
| KR | 10-2016-0054573 A | 5/2016 |
| KR | 10-1820573 B1 | 1/2018 |
| TW | 200529636 A | 9/2005 |
| TW | 200601176 A | 1/2006 |
| TW | 200642408 A | 12/2006 |
| TW | 200919255 A | 5/2009 |
| TW | 201012152 A | 3/2010 |
| TW | 201137722 A | 11/2011 |
| TW | 201215086 A | 4/2012 |
| TW | 201316247 A | 4/2013 |
| TW | 201324310 A | 6/2013 |
| TW | 201409345 A | 3/2014 |
| TW | 201509168 A | 4/2015 |
| TW | M474482 U | 11/2016 |
| WO | 97/41528 A1 | 11/1997 |
| WO | 98/58346 A1 | 12/1998 |
| WO | 99/44114 A1 | 9/1999 |
| WO | 01/80017 A1 | 10/2001 |
| WO | 2003/083793 A2 | 10/2003 |
| WO | 2003/93765 A2 | 11/2003 |
| WO | 2004/029862 A1 | 4/2004 |
| WO | 2004/104813 A1 | 12/2004 |
| WO | 2005/008568 A1 | 1/2005 |
| WO | 2005/020036 A2 | 3/2005 |
| WO | 2005/106774 A2 | 11/2005 |
| WO | 2006/051462 A1 | 5/2006 |
| WO | 2007/000012 A1 | 1/2007 |
| WO | 2007/008321 A2 | 1/2007 |
| WO | 2007/029710 A1 | 3/2007 |
| WO | 2007/041834 A1 | 4/2007 |
| WO | 2007/060102 A1 | 5/2007 |
| WO | 2007/070014 A1 | 6/2007 |
| WO | 2007/072447 A2 | 6/2007 |
| WO | 2007/073422 A1 | 6/2007 |
| WO | 2007/076210 A1 | 7/2007 |
| WO | 2007/105937 A1 | 9/2007 |
| WO | 2007/116521 A1 | 10/2007 |
| WO | 2008/008101 A2 | 1/2008 |
| WO | 2008/147457 A1 | 12/2008 |
| WO | 2009/042392 A2 | 4/2009 |
| WO | 2010/039337 A2 | 4/2010 |
| WO | 2010/056484 A2 | 5/2010 |
| WO | 2010/077960 A2 | 7/2010 |
| WO | 2010/120972 A1 | 10/2010 |
| WO | 2010/128442 A2 | 11/2010 |
| WO | 2011/063516 A1 | 6/2011 |
| WO | 2012/078079 A2 | 6/2012 |
| WO | 2012/083113 A2 | 6/2012 |
| WO | 2012/172970 A1 | 12/2012 |
| WO | 2013/000150 A1 | 1/2013 |
| WO | 2013/017736 A1 | 2/2013 |
| WO | 2013/023224 A2 | 2/2013 |
| WO | 2013/066659 A1 | 5/2013 |
| WO | 2013/096943 A1 | 6/2013 |
| WO | 2013/103912 A1 | 7/2013 |
| WO | 2013/157330 A1 | 10/2013 |
| WO | 2013/169875 A2 | 11/2013 |
| WO | 2013/177548 A1 | 11/2013 |
| WO | 2014/012456 A1 | 1/2014 |
| WO | 2014/033939 A1 | 3/2014 |
| WO | 2014/074407 A1 | 5/2014 |
| WO | 2014/078965 A1 | 5/2014 |
| WO | 2014/147297 A1 | 9/2014 |
| WO | 2014/171734 A2 | 10/2014 |
| WO | 2015/009581 A1 | 1/2015 |
| WO | 2015/030912 A1 | 3/2015 |
| WO | 2015/051361 A1 | 4/2015 |
| WO | 2015/057320 A1 | 4/2015 |
| WO | 2015/062410 A1 | 5/2015 |
| WO | 2015/069153 A1 | 5/2015 |
| WO | 2015/088141 A1 | 6/2015 |
| WO | 2015/112868 A1 | 7/2015 |
| WO | 2015/187608 A | 12/2015 |
| WO | 2015/195216 A1 | 12/2015 |
| WO | 2015/196448 A1 | 12/2015 |
| WO | 2016/111808 A1 | 7/2016 |
| WO | 2016/123309 A1 | 8/2016 |
| WO | 2016/126374 A1 | 8/2016 |
| WO | 2016/201037 A1 | 12/2016 |
| WO | 2017/030223 A1 | 2/2017 |
| WO | 2008/024454 A1 | 2/2018 |
| WO | 2018/226265 A1 | 12/2018 |

OTHER PUBLICATIONS

Final Office Action received for U.S. Appl. No. 13/076,411, dated Nov. 8, 2018, 10 pages.
Final Office Action received for U.S. Appl. No. 15/872,685, dated Oct. 26, 2018, 10 pages.
Final Office Action received for U.S. Appl. No. 15/899,966, dated Nov. 5, 2018, 10 Pages.
Final Office Action received for U.S. Appl. No. 15/250,152, dated Nov. 16, 2018, 30 pages.
Minutes of the Oral Proceedings received for European Application No. 12770400.5, dated Nov. 6, 2018, 8 pages.
Non-Final Office Action Received for U.S. Appl. No. 14/871,635, dated Nov. 16, 2018, 36 pages.
Non-Final Office Action received for U.S. Appl. No. 15/866,341, dated Nov. 13, 2018, 11 pages.
Notice of Allowance received for Taiwanese Patent Application No. 104128689, dated Aug. 28, 2018, 5 pages (2 pages of English Translation and 3 pages of Official copy).
Office Action received for Chinese Patent Application No. 201780002398.4, dated Sep. 12, 2018, 17 pages (5 pages of English Translation and 12 pages of Official Copy).
Office Action received for Danish Patent Application No. PA201770804, dated Nov. 6, 2018, 4 pages.
Office Action received for Korean Patent Application No. 10-2017-7034677, dated Nov. 1, 2018, 5 pages (2 pages of English Translation and 3 pages of Official Copy.
Summons to Attend Oral Proceedings received for European Patent Application No. 13795330.3, dated Oct. 19, 2018, 13 pages.
Decision to Grant received for European Patent Application No. 14853215.3, dated Sep. 27, 2018, 2 pages.
Final Office Action received for U.S. Appl. No. 15/057,835, dated Sep. 21, 2018, 9 pages.
Non-Final Office Action received for U.S. Appl. No. 14/869,877, dated Oct. 5, 2018, 19 pages.
Non-Final Office Action received for U.S. Appl. No. 15/274,910, dated Oct. 18, 2018, 26 pages.
Non-Final Office Action received for U.S. Appl. No. 14/503,296, dated Sep. 18, 2018, 20 pages.
Non-Final Office Action received for U.S. Appl. No. 15/845,794, dated Oct. 15, 2018, 8 pages.
Non-Final Office Action received for U.S. Appl. No. 15/945,610, dated Sep. 20, 2018, 9 pages.

(56) References Cited

OTHER PUBLICATIONS

Office Action received for European Patent Application No. 15168475.0, dated Oct. 5, 2018, 4 pages.
Office Action received for Australian Patent Application No. 2018101014, dated Sep. 19, 2018, 4 pages.
Office Action received for Chinese Patent Application No. 201610459968.X, dated Aug. 23, 2018, 14 pages (6 pages of English Translation and 8 pages of Official Copy).
Office Action received for Chinese Patent Application No. 201710093861.2, dated Sep. 14, 2018, 15 pages (6 pages of English Translation and 9 pages of Official copy).
Office Action received for European Patent Application No. 16703893.4, dated Sep. 17, 2018, 7 pages.
Office Action received for Japanese Patent Application No. 2016-569665, dated Aug. 20, 2018, 9 pages (4 pages of English Translation and 5 pages of Official Copy).
Office Action received for Korean Patent Application No. 10-2016-7035555, dated Sep. 18, 2018, 9 pages (4 pages of English Translation and 5 pages of Official Copy).
Office Action received for Korean Patent Application No. 10-2017-0022582, dated Sep. 19, 2018, 6 pages (2 pages of English Translation and 4 pages of Official Copy).
Office Action received for Korean Patent Application No. 10-2017-7012145, dated Sep. 13, 2018, 6 pages (3 pages of English Translation and 3 pages of Official Copy).
Notice of Allowance received for Taiwanese Patent Application No. 107121719, dated Sep. 27, 2018, 7 pages (3 pages of English Translation and 4 pages of Official Copy).
Adrianisen, "Samsung Galaxy S8 Face Recognition—Register Your Face Review!", Retrieved from < https://www.youtube.com/watch?v=04KVPaCJq94>, Apr. 27, 2017, 1 page.
Phonebuff, "How to Use Face Unlock on Android 4.0 ICS", Retrieved from <https://www.youtube.com/watch?v=0ASf6jkpFKE>, Dec. 15, 2011, 1 page.
Schofield, Tim, "Face Unlock Demonstration on the HTC EVO 4G LTE", Retrieved from <https://www.youtube.com/watch?v=TNL9Or_9SWg>, May 31, 2012, 1 page.
"Does Apple Pay Change Payment?", Nov. 1, 2014, 11 pages (4 pages of English Translation and 7 pages of Official copy).
"iOS Security", Apr. 2015, 55 pages.
"Real Solution of Two-step-authentication Password Management for Authentication Enhancement", Mar. 24, 2014, 11 pages (3 pages of English Translation and 8 pages of Official copy).
Advisory Action received for U.S. Appl. No. 12/207,374, dated Feb. 25, 2013, 3 pages.
Advisory Action received for U.S. Appl. No. 12/207,374, dated May 15, 2014, 3 pages.
Advisory Action received for U.S. Appl. No. 13/076,411, dated Mar. 10, 2014, 6 pages.
Advisory Action received for U.S. Appl. No. 14/311,214, dated Feb. 10, 2015, 4 pages.
Advisory Action received for U.S. Appl. No. 14/503,296, dated Oct. 2, 2015, 3 pages.
Advisory Action received for U.S. Appl. No. 14/869,715, dated Feb. 8, 2017, 3 pages.
Advisory Action received for U.S. Appl. No. 14/869,715, dated May 18, 2017, 6 pages.
Advisory Action received for U.S. Appl. No. 14/869,877, dated Jan. 5, 2017, 3 pages.
Advisory Action received for U.S. Appl. No. 14/870,793, dated Apr. 13, 2017, 3 pages.
Advisory Action received for U.S. Appl. No. 15/137,944, dated May 11, 2017, 6 pages.
Cazlar, "[ios] Mapsgps (formerly Pebbgps) is Now Available—Now with Colour Turn-by-turn Directions!" Online Available at <https://forums.pebble.com/t/ios-mapsgps-formerly-pebbgps-is-now-available-now-with-colour-turn-by-turn-directions/5584>, 2013, 31 pages.
Certificate of Examination received for Australian Patent Application No. 2017101425, dated Jan. 17, 2018, 2 pages.
Certification of Examination received for Australian Patent Application No. 2017100553, dated Jan. 17, 2018, 2 pages.
Corrected Notice of Allowance received for U.S. Appl. No. 14/836,754, dated May 23, 2018, 2 pages.
Corrected Notice of Allowance received for U.S. Appl. No. 15/017,436, dated Sep. 2, 2016, 5 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/269,801, dated Oct. 3, 2017, 4 pages.
Corrected Notice of Allowance received for U.S. Appl. No. 15/357,873, dated Jan. 19, 2018, 2 pages.
Corrected Notice of Allowance received for U.S. Appl. No. 15/357,873, dated Mar. 16, 2018, 2 pages.
Decision from Intellectual Property Tribunal received for Korean Patent Application No. 10-2011-7023152, dated Feb. 17, 2015, 22 pages (7 pages of English Translation and 15 pages of Official copy).
Decision to Grant received for Danish Patent Application No. PA201570664, dated Feb. 20, 2017, 2 pages.
Decision to Grant received for Danish Patent Application No. PA201570665, dated Apr. 26, 2017, 2 pages.
Decision to Grant received for Danish Patent Application No. PA201670042, dated Mar. 19, 2018, 2 pages.
Decision to Grant received for Danish Patent Application No. PA201670628, dated Nov. 20, 2017, 2 pages.
Decision to Grant received for the European Patent Application No. 12181538.5, dated Jul. 2, 2015, 1 pages.
Decision to Refuse received for European Patent Application No. 08834386.8, dated Apr. 8, 2013, 8 pages.
Easyvideoguides, "Mapquest", available on: https://www.youtube.com/watch?v=7sDIDNM2bCI, Dec. 26, 2007, 4 pages.
Ehowtech, "How to Get Written Directions on a Garmin: Using a Garmin", available online at: https://www.youtube.com/watch?v=s_EKT6qH4LI, Dec. 2, 2012, 1 page.
Examination Report received for Australian Patent Application No. 2015202397, dated Feb. 29, 2016, 4 pages.
Examiners Answer to Appeal Brief received for U.S. Appl. No. 14/870,793, dated Apr. 16, 2018, 15 pages.
Examiners Pre-review Report received for Japanese Patent Application No. 2013-098406, dated Oct. 8, 2015, 7 pages (4 pages of English Translation and 3 pages of Official copy).
Extended European Search Report (includes Partial European Search Report and European Search Opinion) received for European Patent Application No. 13171145.9, dated Feb. 5, 2014, 6 pages.
Extended European Search Report (includes Partial European Search Report and European Search Opinion) received for European Patent Application No. 15168475.0, dated Oct. 21, 2015, 6 pages.
Extended European Search Report received for European Patent Application No. 14853215.3, dated Sep. 13, 2016, 9 pages.
Extended European Search Report received for European Patent Application No. 12181538.5, dated Oct. 23, 2012, 6 pages.
Extended European Search Report received for European Patent Application No. 16177139.9, dated Nov. 4, 2016, 7 pages.
Extended European Search Report received for European Patent Application No. 16201159.7, dated Mar. 27, 2017, 12 pages.
Extended European Search Report received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 16803996.4, dated Feb. 7, 2018, 8 pages.
Extended European Search Report received for European Patent Application No. 16804040.0, dated Feb. 26, 2018, 9 pages.
Extended European Search Report received for European Patent Application No. 17799904.2, dated Jul. 30, 2018, 7 pages.
Extended European Search Report received for European Patent Application No. 18154163.2, dated Mar. 2, 2018, 4 pages.
Final Office Action received for Korean Patent Application No. 10-2014-7004772, dated Oct. 21, 2014, 5 pages (2 pages of English Translation and 3 pages of Official copy).

(56) References Cited

OTHER PUBLICATIONS

Final Office Action received for U.S. Appl. No. 14/503,327, dated May 18, 2017, 10 pages.
Final Office Action received for U.S. Appl. No. 12/207,370, dated Dec. 13, 2011, 15 pages.
Final Office Action received for U.S. Appl. No. 12/207,370, dated Feb. 15, 2013, 17 pages.
Final Office Action received for U.S. Appl. No. 12/207,374, dated Jan. 31, 2014, 12 pages.
Final Office Action received for U.S. Appl. No. 12/207,374, dated Nov. 6, 2012, 25 pages.
Final Office Action received for U.S. Appl. No. 12/207,374, dated Oct. 21, 2011, 16 pages.
Final Office Action received for U.S. Appl. No. 13/076,414, dated Feb. 19, 2014, 10 pages.
Final Office Action received for U.S. Appl. No. 13/243,045, dated Aug. 5, 2015, 10 pages.
Final Office Action received for U.S. Appl. No. 13/248,882, dated Dec. 4, 2013, 22 pages.
Final Office Action received for U.S. Appl. No. 14/142,669, dated Jun. 12, 2015, 14 pages.
Final Office Action received for U.S. Appl. No. 14/285,378, dated Jul. 23, 2015, 19 pages.
Final Office Action received for U.S. Appl. No. 14/311,214, dated Jan. 8, 2015, 12 pages.
Final Office Action received for U.S. Appl. No. 14/311,214, dated Sep. 24, 2015, 15 pages.
Final Office Action received for U.S. Appl. No. 14/479,088, dated Mar. 11, 2015, 10 pages.
Final Office Action received for U.S. Appl. No. 14/480,183, dated Jun. 28, 2017, 14 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Jul. 2, 2015, 7 pages.
Final Office Action received for U.S. Appl. No. 14/503,296, dated Jun. 4, 2018, 8 pages.
Final Office Action received for U.S. Appl. No. 14/612,214, dated Dec. 7, 2015, 13 pages.
Final Office Action received for U.S. Appl. No. 14/719,217, dated Feb. 23, 2017, 37 pages.
Final Office Action received for U.S. Appl. No. 14/836,754, dated Jun. 14, 2017, 23 pages.
Final Office Action received for U.S. Appl. No. 14/839,897, dated Jan. 10, 2018, 16 pages.
Final Office Action received for U.S. Appl. No. 14/869,715, dated Jun. 17, 2016, 35 pages.
Final Office Action received for U.S. Appl. No. 14/869,715, dated Mar. 7, 2017, 41 pages.
Final Office Action received for U.S. Appl. No. 14/869,715, dated Oct. 6, 2016, 37 pages.
Final Office Action received for U.S. Appl. No. 14/869,831, dated Aug. 2, 2016, 14 pages.
Final Office Action received for U.S. Appl. No. 14/869,831, dated Jul. 30, 2018, 31 pages.
Final Office Action received for U.S. Appl. No. 14/869,831, dated May 19, 2017, 20 pages.
Final Office Action received for U.S. Appl. No. 14/869,877, dated Apr. 26, 2018, 18 pages.
Final Office Action received for U.S. Appl. No. 14/869,877, dated Aug. 3, 2016, 13 pages.
Final Office Action received for U.S. Appl. No. 14/870,694, dated Apr. 7, 2017, 16 pages.
Final Office Action received for U.S. Appl. No. 14/870,726, dated Apr. 19, 2017, 17 pages.
Final Office Action received for U.S. Appl. No. 14/870,793, dated Jan. 19, 2017, 16 pages.
Final Office Action received for U.S. Appl. No. 14/871,635, dated Jan. 18, 2018, 33 pages.
Final Office Action received for U.S. Appl. No. 14/871,654, dated Nov. 16, 2017, 32 pages.
Final Office Action received for U.S. Appl. No. 15/137,944, dated Feb. 27, 2017, 10 pages.
Final Office Action received for U.S. Appl. No. 15/470,752, dated Mar. 13, 2018, 14 pages.
Final Office Action received for U.S. Appl. No. 13/166,737, dated Jul. 3, 2014, 17 pages.
Final Office Action received for U.S. Appl. No. 14/836,754, dated Mar. 22, 2016, 17 pages.
Final Office Action received for U.S. Appl. No. 14/836,754, dated Mar. 31, 2017, 24 pages.
Final Office Action received for U.S. Appl. No. 15/250,152, dated Aug. 23, 2017, 24 pages.
Final Office Action received in U.S. Appl. No. 13/076,411, dated Nov. 15, 2013, 11 pages.
Haris, "Google Maps Navigation on Android 2.0", Sizzled Core, Online available at <http://www.sizzledcore.com/2009/10/29/google-maps-navigation-on-android-20/>, Oct. 29, 2009, 6 pages.
Idex, "Idex Fingerprint Sensor Mobile Glass Display", Youtube, available at <https://www.youtube.com/watch?v=X1dAIP5sFzw>, Apr. 11, 2013, 2 pages.
Intention to Grant received for Danish Patent Application No. PA201570665, dated Feb. 28, 2017, 2 pages.
Intention to Grant received for Danish Patent Application No. PA201570773, dated Mar. 9, 2018, 2 pages.
Intention to Grant received for Danish Patent Application No. PA201670042, dated Jan. 29, 2018, 2 pages.
Intention to Grant received for Danish Patent Application No. PA201670628, dated Aug. 28, 2017, 2 pages.
Intention to Grant received for European Patent Application No. 12181538.5, dated Feb. 20, 2015, 8 pages.
Intention to Grant received for European Patent Application No. 14853215.3, dated Jun. 27, 2018, 9 pages.
Intention to Grant received for European Patent Application No. 15724160.5, dated Mar. 7, 2018, 8 pages.
International Preliminary Report on Patentability received for PCT Patent Application No. PCT/US2008/075738, completed on Jan. 28, 2010, 15 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2013/067634, dated May 12, 2016, 9 pages.
International Preliminary Report on Patentability received for PCT Patent Application No. PCT/US2014/054800, dated Mar. 31, 2016, 27 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2015/030199, dated Dec. 15, 2016, 7 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2015/046892, dated Mar. 16, 2017, 14 pages.
International Preliminary Report on Patentability received for PCT Patent Application No. PCT/US2015/047507, dated Mar. 16, 2017, 16 pages.

(56) References Cited

OTHER PUBLICATIONS

International Preliminary Report on Patentability received for PCT Patent Application No. PCT/US2015/055165, dated Sep. 21, 2017, 15 pages.
International Preliminary Report on Patentability received for PCT Patent Application No. PCT/US2016/015316, dated Aug. 10, 2017, 10 pages.
International Preliminary Report on Patentability received for PCT Patent Application No. PCT/US2016/016621, dated Aug. 24, 2017, 8 pages.
International Preliminary Report on Patentability received for PCT Patent Application No. PCT/US2016/033751, dated Dec. 14, 2017, 11 pages.
International Preliminary Report on Patentability received for PCT Patent Application No. PCT/US2016/034175, dated Dec. 14, 2017, 14 pages.
International Preliminary Report on Patentability Received for PCT Patent Application No. PCT/US2016/044990, dated Feb. 15, 2018, 8 pages.
International Search Report and Written Opinion for PCT Patent Application No. PCT/US2016/044990, dated Nov. 23, 2016, 11 pages.
International Search Report and Written Opinion received for PCT Patent Application No. PCT/US17/31086, dated Sep. 8, 2017, 15 pages.
International Search Report and Written Opinion received for PCT Patent Application No. PCT/US2008/075738, dated Jul. 2, 2009, 14 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2013/067634, dated Apr. 16, 2014, 11 pages.
International Search Report and Written Opinion received for PCT Patent Application No. PCT/US2014/054800, dated Jan. 29, 2015, 33 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2015/033326, dated Aug. 10, 2015, 13 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2015/046892, dated Jan. 27, 2016, 20 pages.
International Search Report and Written Opinion received for PCT Patent Application No. PCT/US2015/047507, dated Feb. 22, 2016, 22 pages.
International Search Report and Written Opinion received for PCT Patent Application No. PCT/US2015/055165, dated Apr. 20, 2016, 22 pages.
International Search Report and Written Opinion received for PCT Patent Application No. PCT/US2016/016621, dated May 9, 2016, 12 pages.
International Search Report and Written Opinion received for PCT Patent Application No. PCT/US2016/033751, dated Oct. 5, 2016, 14 pages.
International Search Report and Written Opinion received for PCT Patent Application No. PCT/US2016/034175, dated Oct. 7, 2016, 17 pages.
International Search Report and Written Opinion received for PCT Patent Application No. PCT/US2017/031748, dated Aug. 29, 2017, 14 pages.
International Search Report and Written Opinion received for PCT Patent Application No. PCT/US2017/032240, dated Sep. 21, 2017, 33 pages.
International Search Report and Written Opinion received for PCT Patent Application No. PCT/US2017/058368, dated Feb. 23, 2018, 12 pages.
International Search Report and Written Opinion received for PCT Patent Application No. PCT/US2017/49500, dated Jan. 18, 2018, 18 pages.
International Search Report and Written Opinion received for PCT Patent Application no. PCT/US2016/015316, dated Mar. 8, 2016, 13 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US17/32240, dated Jul. 12, 2017, 2 pages.
Invitation to Pay Additional Fee received for PCT Patent Application No. PCT/US2017/031748, dated Jun. 21, 2017, 2 pages.
Invitation to Pay Additional Fee received for PCT Patent Application No. PCT/US2017/49500, dated Nov. 14, 2017, 3 pages.
Invitation to Pay Additional Fee received for PCT Patent Application No. PCT/US2017/058368, dated Dec. 14, 2017, 2 pages.
Invitation to Pay Additional Fees and Partial Search Report received for PCT Patent Application No. PCT/US2015/046892, dated Nov. 4, 2015, 5 pages.
Invitation to Pay Additional Fees received for PCT Patent Application No. PCT/US2014/054800, dated Oct. 31, 2014, 2 pages.
Invitation to Pay Additional Fees received for PCT Patent Application No. PCT/US2015/047507, dated Jan. 4, 2016, 8 pages.
Invitation to Pay Additional Fees received for PCT Patent Application No. PCT/US2015/055165, dated Jan. 18, 2016, 6 pages.
Invitation to Pay Additional Fees received for PCT Patent Application No. PCT/US2016/033751, dated Jul. 22, 2016, 2 pages.
Invitation to Pay Additional Fees received for PCT Patent Application No. PCT/US2016/034175, dated Aug. 11, 2016, 3 pages.
Invitation to Pay Additional Fees received for PCT Patent Application No. PCT/US2016/044990, dated Sep. 29, 2016, 3 pages.
Iphoneblog, "Ios 5.0.1 Security Flaw—Bypass the Passcode—Access Camera Roll", Youtube, available at <https://www.youtube.com/watch?v=qd0Fwgaymb0>, Feb. 24, 2012, 2 pages.
Kamijo, Noboru, "Next Generation Mobile System—Watchpad1. 5", Available at <http://researcher.ibm.com/researcher/view_group_subpage.php?id=5617>, retrieved on Jul. 4, 2015, 2 pages.
Komachi, Aneem, "Time Attendance—Face Recognition—Biometrics", Available at <https://www.youtube.com/watch?v=ascITiiiSbc>, Feb. 9, 2010, 1 page.
Naver Blog, "How to Use Smart Wallet and Registered Card", Online Available at <http://feena74.blog.me/140185758401>, Mar. 29, 2013, 20 pages.
Non-Final Office Action received for U.S. Appl. No. 14/503,327, dated Sep. 12, 2016, 10 pages.
Non-Final Office Action received for U.S. Appl. No. 14/836,754, dated Nov. 17, 2015, 15 pages.
Non-Final Office Action received for U.S. Appl. No. 14/869,715, dated Jan. 29, 2016, 62 pages.
Non-Final Office Action received for U.S. Appl. No. 12/207,370, dated Aug. 2, 2012, 16 pages.
Non-Final Office Action received for U.S. Appl. No. 12/207,370, dated May 6, 2011, 15 pages.
Non-Final Office Action received for U.S. Appl. No. 12/207,370, dated Oct. 17, 2013, 17 pages.
Non-Final Office Action received for U.S. Appl. No. 12/207,374, dated Apr. 15, 2011, 13 pages.
Non-Final Office Action received for U.S. Appl. No. 12/207,374, dated Jun. 7, 2013, 26 pages.
Non-Final Office Action received for U.S. Appl. No. 12/207,374, dated May 24, 2012, 20 pages.
Non-Final Office Action received for U.S. Appl. No. 13/076,407, dated Dec. 5, 2013, 16 pages.

(56) References Cited

OTHER PUBLICATIONS

Non-Final Office Action received for U.S. Appl. No. 13/076,411, dated Jun. 13, 2013, 9 pages.
Non-Final Office Action received for U.S. Appl. No. 13/076,411, dated Mar. 21, 2018, 10 pages.
Non-Final Office Action received for U.S. Appl. No. 13/076,414, dated Aug. 21, 2013, 8 pages.
Non-Final Office Action received for U.S. Appl. No. 13/243,045, dated Mar. 17, 2015, 9 pages.
Non-Final Office Action received for U.S. Appl. No. 13/243,326, dated Feb. 14, 2013, 13 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 14/142,669, dated Oct. 28, 2015, 14 pages.
Non-Final Office Action received for U.S. Appl. No. 14/142,669, dated Sep. 12, 2014, 11 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/311,214, dated Apr. 10, 2015, 12 pages.
Non-Final Office Action received for U.S. Appl. No. 14/311,214, dated Sep. 18, 2014, 10 pages.
Non-Final Office Action received for U.S. Appl. No. 14/479,088, dated Jul. 6, 2015, 10 pages.
Non-Final Office Action received for U.S. Appl. No. 14/479,088, dated Nov. 18, 2014, 8 pages.
Non-Final Office Action received for U.S. Appl. No. 14/480,183, dated Oct. 18, 2016, 12 pages.
Non-Final Office Action received for U.S. Appl. No. 14/503,072, dated Jan. 26, 2015, 12 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Jan. 30, 2015, 16 pages.
Non-Final Office Action received for U.S. Appl. No. 14/503,296, dated Oct. 5, 2016, 11 pages.
Non-Final Office Action received for U.S. Appl. No. 14/503,381, dated May 13, 2015, 13 pages.
Non-Final Office Action received for U.S. Appl. No. 14/612,214, dated Jul. 29, 2015, 12 pages.
Non-Final Office Action received for U.S. Appl. No. 14/642,366, dated Aug. 24, 2015, 7 pages.
Non-Final Office Action received for U.S. Appl. No. 14/719,217, dated Jul. 28, 2016, 28 pages.
Non-Final Office Action received for U.S. Appl. No. 14/836,754, dated Aug. 16, 2017, 25 pages.
Non-Final Office Action received for U.S. Appl. No. 14/836,754, dated Oct. 21, 2016, 18 pages.
Non-Final Office Action received for U.S. Appl. No. 14/839,897, dated May 18, 2017, 11 pages.
Non-Final Office Action received for U.S. Appl. No. 14/839,903, dated Feb. 26, 2018, 10 pages.
Non-Final Office Action received for U.S. Appl. No. 14/839,913, dated Jul. 28, 2016, 12 pages.
Non-Final Office Action received for U.S. Appl. No. 14/839,913, dated Mar. 2, 2016, 11 pages.
Non-Final Office Action received for U.S. Appl. No. 14/864,011, dated Jan. 21, 2016, 10 pages.
Non-Final Office Action received for U.S. Appl. No. 14/864,011, dated Jun. 10, 2016, 10 pages.
Non-Final Office Action received for U.S. Appl. No. 14/869,715, dated Oct. 11, 2016, 37 pages.
Non-Final Office Action received for U.S. Appl. No. 14/869,831, dated Nov. 22, 2017, 17 pages.
Non-Final Office Action received for U.S. Appl. No. 14/869,877, dated Jan. 29, 2016, 18 pages.
Non-Final Office Action received for U.S. Appl. No. 14/869,877, dated Jun. 16, 2017, 17 pages.
Non-Final Office Action received for U.S. Appl. No. 14/870,694, dated Sep. 23, 2016, 13 pages.
Non-Final Office Action received for U.S. Appl. No. 14/870,726, dated Sep. 16, 2016, 12 pages.
Non-Final Office Action received for U.S. Appl. No. 14/870,793, dated Apr. 19, 2016, 17 pages.
Non-Final Office Action received for U.S. Appl. No. 14/871,635, dated May 5, 2017, 23 pages.
Non-Final Office Action received for U.S. Appl. No. 14/871,654, dated May 4, 2017, 23 pages.
Non-Final Office Action received for U.S. Appl. No. 15/033,551, dated May 24, 2018, 26 pages.
Non-Final Office Action received for U.S. Appl. No. 15/057,835, dated Jan. 3, 2018, 8 pages.
Non-Final Office Action received for U.S. Appl. No. 15/134,638, dated Sep. 20, 2016, 6 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/269,801, dated Dec. 30, 2016, 17 pages.
Non-Final Office Action received for U.S. Appl. No. 15/274,086, dated Jan. 11, 2017, 21 pages.
Non-Final Office Action received for U.S. Appl. No. 15/294,439, dated Jan. 26, 2018, 18 pages.
Non-Final Office Action received for U.S. Appl. No. 15/433,238, dated Nov. 3, 2017, 6 pages.
Non-Final Office Action received for U.S. Appl. No. 15/470,752, dated Aug. 28, 2018, 12 pages.
Non-Final Office Action received for U.S. Appl. No. 15/470,752, dated Jul. 28, 2017, 11 pages.
Non-Final Office Action received for U.S. Appl. No. 15/872,685, dated Mar. 27, 2018, 9 pages.
Non-Final Office Action received for U.S. Appl. No. 15/899,966, dated May 4, 2018, 10 pages.
Non-Final Office Action received for U.S. Appl. No. 15/900,047, dated May 8, 2018, 7 pages.
Non-Final Office Action received for U.S. Appl. No. 13/166,737, dated Oct. 24, 2013, 10 pages.
Non-Final Office Action received for U.S. Appl. No. 14/503,364, dated Feb. 3, 2016, 16 pages.
Non-Final Office Action received for U.S. Appl. No. 14/869,831, dated Jan. 29, 2016, 18 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Notice of Acceptance received for Australian Patent Application No. 2008305338, dated Oct. 27, 2011, 1 page.
Notice of Acceptance received for Australian Patent Application No. 2013404001, dated Nov. 21, 2017, 3 pages.
Notice of Acceptance received for Australian Patent Application No. 2014334869, dated Jan. 3, 2018, 3 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2016201310, dated Feb. 21, 2018, 3 pages.
Notice of Acceptance received for Australian Patent Application No. 2016203896, dated Mar. 2, 2018, 3 pages.
Notice of Acceptance received for Australian Patent Application No. 2016203898 dated Feb. 21, 2018, 3 pages.
Notice of Acceptance received for Australian Patent Application No. 2016211504, dated Oct. 17, 2017, 3 pages.

(56) References Cited

OTHER PUBLICATIONS

Notice of Acceptance received for Australian Patent Application No. 2017201064, dated Feb. 20, 2018, 3 pages.
Notice of Allowance received for Australian Patent Application No. 2015202397, dated Feb. 15, 2017, 3 pages.
Notice of Allowance received for Chinese Patent Application No. 200880108306.1, dated Oct. 28, 2014, 2 pages (Official copy only).
Notice of Allowance received for Chinese Patent Application No. 201280047459.6, dated Jan. 31, 2018, 2 pages (1 page of English Translation and 1 page of Official copy).
Notice of Allowance received for Chinese Patent Application No. 201520357381.9, dated Jul. 29, 2015, 4 pages (2 pages of English Translation and 2 pages of Official copy).
Notice of Allowance received for Chinese Patent Application No. 201520358683.8, dated Mar. 10, 2016, 5 pages (3 pages of English Translation and 2 pages of Official copy).
Notice of Allowance received for Chinese Patent Application No. 201620480708.6, dated Apr. 20, 2017, 3 pages (2 pages of English Translation and 1 page of Official copy).
Notice of Allowance received for Chinese Patent Application No. 201620480846.4, dated Apr. 20, 2017, 3 pages (2 pages of English Translation and 1 page of Official copy).
Notice of Allowance received for Danish Patent Application No. PA201570771, dated Sep. 2, 2016, 2 pages.
Notice of Allowance received for Danish Patent Application No. PA201570773, dated Apr. 26, 2018, 2 pages.
Notice of Allowance received for Japanese Patent Application No. 2013-098406, dated Jan. 23, 2017, 18 pages. (Official copy only).
Notice of Allowance received for Japanese Patent Application No. 2015-083696, dated Jan. 6, 2017, 3 pages (Official copy only).
Notice of Allowance received for Japanese Patent Application No. 2016-224508, dated Jun. 20, 2017, 3 pages (Official copy only).
Notice of Allowance received for Japanese Patent Application No. 2016-527367, dated Jul. 30, 2018, 4 pages (1 page of English Translation and 3 pages of Official Copy).
Notice of Allowance received for Japanese Patent Application No. 2016-540927, dated May 14, 2018, 4 pages (1 page of English Translation and 3 pages of Official copy).
Notice of Allowance received for Japanese Patent Application No. 2017-013383, dated Mar. 31, 2017, 3 pages. (Official copy only).
Notice of Allowance received for Japanese Patent Application No. 2018-008937, dated Jul. 2, 2018, 4 pages (1 page of English Translation and 3 pages of Official copy).
Notice of Allowance received for Japanese Patent Application No. 2018-504997, dated Aug. 3, 2018, 4 pages (1 page of English Translation and 3 pages of Official copy).
Notice of Allowance received for Korean Patent Application No. 10-2010-7008899, dated Feb. 12, 2016, 3 pages (1 page of English Translation and 2 pages of Official copy).
Notice of Allowance received for Korean Patent Application No. 10-2014-7004771, dated Oct. 29, 2015, 3 pages (1 page of English Translation and 2 pages of Official copy).
Notice of Allowance received for Korean Patent Application No. 10-2014-7004772, dated Feb. 12, 2016, 4 pages (1 page of English Translation and 3 pages of Official copy).
Notice of Allowance received for Korean Patent Application No. 10-2014-7004773, dated Jan. 7, 2016, 3 pages (1 pages English Translation and 2 pages of Official copy).
Notice of Allowance received for Korean Patent Application No. 10-2014-7025441, dated Feb. 26, 2016, 3 pages (1 page English Translation and 2 pages of Official copy).
Notice of Allowance received for Korean Patent Application No. 10-2015-7004548, dated Feb. 26, 2016, 3 pages (1 page English Translation and 2 pages of Official copy).
Notice of Allowance received for Korean Patent Application No. 10-2016-7009347, dated May 10, 2018, 4 pages (1 page of English Translation and 3 pages of Official copy).
Notice of Allowance received for Korean Patent Application No. 10-2016-7009632, dated Aug. 17, 2018, 4 pages (1 page of English Translation and 3 pages of Official copy).
Notice of Allowance received for Korean Patent Application No. 10-2017-0022365, dated Mar. 27, 2018, 4 pages (1 page of English Translation and 3 pages of Official copy).
Notice of Allowance received for Korean Patent Application No. 10-2017-0022546, dated Feb. 27, 2018, 4 pages (1 page of English Translation and 3 pages of Official copy).
Notice of Allowance received for Korean Patent Application No. 10-2017-7024513, dated Apr. 20, 2018, 5 pages (2 pages of English Translation and 3 pages of Official copy).
Notice of Allowance received for Korean Patent Application No. 10-2018-7001854, dated Aug. 21, 2018, 4 pages (1 page of English Translation and 3 pages of Official Copy).
Notice of Allowance received for Taiwan Patent Application No. 097134592, dated Aug. 12, 2014, 3 pages (Official copy only).
Notice of Allowance received for Taiwan Patent Application No. 101107082, dated Oct. 22, 2014, 2 pages (Official copy only).
Notice of Allowance received for Taiwanese Patent Application No. 103131074, dated Nov. 17, 2015, 3 pages (Official copy only).
Notice of Allowance received for Taiwanese Patent Application No. 103136545, dated Nov. 27, 2017, 4 pages (1 page of English Translation of Search Report and 3 pages of Official copy).
Notice of Allowance received for Taiwanese Patent Application No. 104114953, dated Oct. 17, 2017, 3 pages (Official copy only).
Notice of Allowance received for Taiwanese Patent Application No. 104128700, dated Mar. 27, 2017, 3 pages (Official copy only).
Notice of Allowance received for Taiwanese Patent Application No. 104133756, dated Nov. 30, 2017, 5 pages (2 pages of English Translation and 3 pages of Official copy).
Notice of Allowance received for Taiwanese Patent Application No. 104133757, dated Jan. 18, 2017, 3 pages (Official copy only).
Notice of Allowance received for Taiwanese Patent Application No. 104140890, dated Oct. 25, 2017, 5 pages (Official copy only).
Notice of Allowance received for Taiwanese Patent Application No. 106141250, dated May 24, 2018, 7 pages (3 pages of English Translation and 4 pages of Official copy).
Notice of Allowance received for the U.S. Appl. No. 14/503,381, dated Dec. 16, 2015, 8 pages.
Notice of Allowance received for U.S. Appl. No. 13/076,407, dated May 20, 2014, 9 pages.
Notice of Allowance received for U.S. Appl. No. 12/207,370, dated Jun. 7, 2013, 9 pages.
Notice of Allowance received for U.S. Appl. No. 12/207,370, dated Mar. 6, 2014, 5 pages.
Notice of Allowance received for U.S. Appl. No. 12/207,374, dated Aug. 29, 2014, 8 pages.
Notice of Allowance received for U.S. Appl. No. 12/207,374, dated Dec. 4, 2014, 8 pages.
Notice of Allowance received for U.S. Appl. No. 13/076,414, dated Aug. 26, 2015, 7 pages.
Notice of Allowance received for U.S. Appl. No. 13/076,414, dated May 4, 2016, 7 pages.
Notice of Allowance received for U.S. Appl. No. 13/243,326, dated Sep. 23, 2013, 11 pages.
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 14/142,657, dated Jan. 8, 2015, 5 pages.
Notice of Allowance received for U.S. Appl. No. 14/142,657, dated Jul. 23, 2015, 2 pages.
Notice of Allowance received for U.S. Appl. No. 14/142,657, dated Jun. 29, 2015, 7 pages.
Notice of Allowance received for U.S. Appl. No. 14/142,657, dated Sep. 10, 2014, 9 pages.
Notice of Allowance received for U.S. Appl. No. 14/142,661, dated Aug. 3, 2015, 10 pages.
Notice of Allowance received for U.S. Appl. No. 14/142,661, dated Dec. 3, 2015, 2 pages.
Notice of Allowance received for U.S. Appl. No. 14/142,661, dated Sep. 28, 2015, 9 pages.
Notice of Allowance received for U.S. Appl. No. 14/142,669, dated Aug. 25, 2016, 2 pages.

(56) References Cited

OTHER PUBLICATIONS

Notice of Allowance received for U.S. Appl. No. 14/142,669, dated Jun. 14, 2016, 5 pages.
Notice of Allowance received for U.S. Appl. No. 14/142,669, dated Sep. 21, 2016, 2 pages.
Notice of Allowance received for U.S. Appl. No. 14/142,674, dated Feb. 18, 2015, 7 pages.
Notice of Allowance received for U.S. Appl. No. 14/142,674, dated Jan. 23, 2015, 7 pages.
Notice of Allowance received for U.S. Appl. No. 14/142,674, dated Sep. 26, 2014, 18 pages.
Notice of Allowance received for U.S. Appl. No. 14/255,765, dated Jun. 12, 2014, 10 pages.
Notice of Allowance received for U.S. Appl. No. 14/285,378, dated May 19, 2016, 10 pages.
Notice of Allowance received for U.S. Appl. No. 14/479,088, dated Dec. 23, 2015, 5 pages.
Notice of Allowance received for U.S. Appl. No. 14/479,088, dated Jan. 11, 2016, 2 pages.
Notice of Allowance received for U.S. Appl. No. 14/479,088, dated Mar. 9, 2016, 2 pages.
Notice of Allowance received for U.S. Appl. No. 14/479,088, dated Nov. 12, 2015, 7 pages.
Notice of Allowance received for U.S. Appl. No. 14/480,183, dated Nov. 29, 2017, 7 pages.
Notice of Allowance received for U.S. Appl. No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,327, dated Mar. 22, 2018, 5 pages.
Notice of Allowance received for U.S. Appl. No. 14/503,327, dated Nov. 30, 2017, 5 pages.
Notice of Allowance received for U.S. Appl. No. 14/503,364, dated Jun. 16, 2016, 11 pages.
Notice of Allowance received for U.S. Appl. No. 14/642,366, dated Jan. 14, 2016, 8 pages.
Notice of Allowance received for U.S. Appl. No. 14/661,796, dated Jul. 7, 2015, 10 pages.
Notice of Allowance received for U.S. Appl. No. 14/661,796, dated Jul. 23, 2015, 2 pages.
Notice of Allowance received for U.S. Appl. No. 14/836,754, dated May 10, 2018, 27 pages.
Notice of Allowance received for U.S. Appl. No. 14/839,913, dated Aug. 11, 2016, 5 pages.
Notice of Allowance received for U.S. Appl. No. 14/864,011, dated Apr. 28, 2016, 5 pages.
Notice of Allowance received for U.S. Appl. No. 14/864,011, dated Oct. 5, 2016, 5 pages.
Notice of Allowance received for U.S. Appl. No. 14/869,715, dated Dec. 19, 2017, 32 pages.
Notice of Allowance received for U.S. Appl. No. 14/870,694, dated Jul. 31, 2018, 7 pages.
Notice of Allowance received for U.S. Appl. No. 14/870,726, dated Sep. 11, 2018, 9 pages.
Notice of Allowance received for U.S. Appl. No. 14/871,654, dated May 22, 2018, 22 pages.
Notice of Allowance received for U.S. Appl. No. 14/873,023, dated Dec. 23, 2015, 10 pages.
Notice of Allowance received for U.S. Appl. No. 14/873,023, dated Jan. 14, 2016, 2 pages.
Notice of Allowance received for U.S. Appl. No. 15/017,436, dated May 27, 2016, 17 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/137,944, dated Dec. 21, 2017, 8 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/274,086, dated Jun. 7, 2017, 8 pages.
Notice of Allowance received for U.S. Appl. No. 15/274,086, dated Oct. 19, 2017, 9 pages.
Notice of Allowance received for U.S. Appl. No. 15/294,439, dated Sep. 10, 2018, 9 pages.
Notice of Allowance received for U.S. Appl. No. 15/357,873, dated Aug. 23, 2017, 10 pages.
Notice of Allowance received for U.S. Appl. No. 15/357,873, dated Jan. 8, 2018, 9 pages.
Notice of Allowance received for U.S. Appl. No. 15/433,238, dated May 17, 2018, 7 pages.
Notice of Allowance received for U.S. Appl. No. 15/899,996, dated Apr. 24, 2018, 9 pages.
Notice of Allowance received for U.S. Appl. No. 14/311,214, dated Jan. 21, 2016, 7 pages.
Notice of Final Rejection received for Korean Patent Application No. 10-2014-7004773, dated Jun. 12, 2015, 6 pages (3 pages English Translation and 3 pages of Official copy).
Notice of Preliminary Rejection received for Korean Patent Application No. 10-2014-7025441, dated Jun. 12, 2015, 9 pages (4 pages of English Translation and 5 pages of Official copy).
Notice of Preliminary Rejection received for Korean Patent Application No. 10-2015-7004548, dated Jun. 12, 2015, 8 pages (4 pages of English Translation and 4 pages of Official copy).
Notice of Preliminary Rejection received from Korean Patent Application No. 10-2015-7010262, dated Jun. 12, 2015, 5 pages (2 pages of English Translation and 3 pages of Official copy).
Npasqua, "Maps: Ability to Swipe Step by Step in Turn-by-turn Mode", 2012, Apple Support Communities, https://discussions.apple.com/thread/4424256?start=O&tstart=0, Oct. 12, 2012, 4 pages.
Oates, Nathan, "Pebbgps", Available online at:—https://pebble.devpost.com/submissions/21694-pebbgps, Mar. 16, 2014, 2 pages.
Office Action received for Australian Patent Application No. 2008305338, dated Mar. 21, 2011, 3 pages.
Office Action received for Australian Patent Application No. 2008305338, dated Oct. 19, 2010, 3 pages.
Office Action received for Australian Patent Application No. 2012200716, dated Jul. 16, 2014, 4 pages.
Office Action received for Australian Patent Application No. 2012200716, dated Nov. 15, 2013, 3 pages.
Office Action received for Australian Patent Application No. 2013404001, dated Aug. 3, 2017, 5 pages.
Office Action received for Australian Patent Application No. 2013404001, dated Nov. 26, 2016, 3 pages.
Office Action received for Australian Patent Application No. 2014204462, dated May 8, 2015, 4 pages.
Office Action received for Australian Patent Application No. 2014204462, dated Apr. 29, 2016, 3 pages.
Office Action received for Australian Patent Application No. 2014334869, dated Jan. 11, 2017, 4 pages.
Office Action received for Australian Patent Application No. 2015100708, dated Sep. 8, 2015, 4 pages.
Office Action received for Australian Patent Application No. 2015100709, dated Sep. 9, 2015 (examination Report 1), 4 pages.
Office Action received for Australian Patent Application No. 2015100709, dated Sep. 9, 2015 (examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2015302298, dated Apr. 4, 2018, 3 pages.
Office Action received for Australian Patent Application No. 2015302298, dated Sep. 14, 2017, 3 pages.
Office Action received for Australian Patent Application No. 2015385757, dated Sep. 11, 2017, 3 pages.
Office Action received for Australian Patent Application No. 2016100090, dated Apr. 13, 2016, 7 pages.

(56) References Cited

OTHER PUBLICATIONS

Office Action received for Australian Patent Application No. 2016100090, dated Oct. 7, 2016, 3 pages.
Office Action received for Australian Patent Application No. 2016100155, dated May 4, 2016, 7 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2016102031, dated Feb. 28, 2017, 4 pages.
Office Action received for Australian Patent Application No. 2016201310, dated Feb. 28, 2017, 3 pages.
Office Action received for Australian Patent Application No. 2016203896, dated Jan. 19, 2018, 4 pages.
Office Action received for Australian Patent Application No. 2016203896, dated Mar. 6, 2017, 3 pages.
Office Action received for Australian Patent Application No. 2016203898, dated Dec. 19, 2017, 4 pages.
Office Action received for Australian Patent Application No. 2016203898, dated Feb. 17, 2017, 3 pages.
Office Action received for Australian Patent Application No. 2017100070, dated Mar. 16, 2017, 6 pages.
Office Action received for Australian Patent Application No. 2017100231, dated Apr. 13, 2017, 3 pages.
Office Action received for Australian Patent Application No. 2017100328, dated May 16, 2017, 3 pages.
Office Action received for Australian Patent Application No. 2017100328, dated Oct. 16, 2017, 6 pages.
Office Action received for Australian Patent Application No. 2017100553, dated Aug. 4, 2017, 5 pages.
Office Action received for Australian Patent Application No. 2017100558, dated Feb. 27, 2018, 3 pages.
Office Action received for Australian Patent Application No. 2017100558, dated Sep. 1, 2017, 5 pages.
Office Action received for Australian Patent Application No. 2017101375, dated Dec. 1, 2017, 3 pages.
Office Action received for Australian Patent Application No. 2017101375, dated Feb. 19, 2018, 4 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2018200485, dated Mar. 15, 2018, 3 pages.
Office Action received for Australian Patent Application No. 2018203732, dated Jun. 21, 2018, 3 pages.
Office Action received for Chinese Patent Application No. 200880108306.1, dated Aug. 24, 2011, 10 pages (English Translation only).
Office Action received for Chinese Patent Application No. 200880108306.1, dated Mar. 20, 2012, 8 pages (English Translation only).
Office Action received for Chinese Patent Application No. 200880108306.1, dated Mar. 27, 2014, 6 pages (3 pages of English Translation and 3 pages of Office Action).
Office Action received for Chinese Patent Application No. 201380080659.6, dated Apr. 4, 2018, 15 pages (5 pages of English Translation and 10 pages of Official copy).
Office Action received for Chinese Patent Application No. 201410407626.4, dated May 21, 2018, 13 pages (4 Page of English Translation and 9 pages of Official copy).
Office Action received for Chinese Patent Application No. 201410407626.4, dated Oct. 31, 2016, 10 pages (4 pages of English Translation and 6 pages of Official copy).
Office Action received for Chinese Patent Application No. 201410407626.4, dated Sep. 11, 2017, 11 pages (3 pages of English Translation and 8 pages of Official copy).
Office Action received for Chinese Patent Application No. 201480058054.1, dated May 3, 2018, 18 pages (4 pages of English Translation and 14 pages of Official copy).
Office Action received for Chinese Patent Application No. 201510284896.5, dated Jun. 28, 2018, 15 pages (4 pages of English Translation and 11 pages of Official copy).
Office Action received for Chinese Patent Application No. 201520358683.8, dated Sep. 2, 2015, 4 pages (2 pages of English Translation and 2 pages of Official copy).
Office Action received for Chinese Patent Application No. 201620101636.x, dated May 25, 2016, 3 pages (1 page of English Translation and 2 pages of Official copy).
Office Action received for Chinese Patent Application No. 201620101636.x, dated Oct. 13, 2016, 3 pages (1 page of English Translation and 2 pages of Official copy).
Office Action received for Chinese Patent Application No. 201620119869.2, dated Jun. 3, 2016, 2 pages (1 page of English Translation and 1 page of Official copy).
Office Action received for Chinese Patent Application No. 201620119869.2, dated Nov. 22, 2016, 2 pages (Official copy only).
Office Action received for Chinese Patent Application No. 201620480708.6, dated Jan. 9, 2017, 3 pages (1 page of English Translation and 2 pages of Official copy).
Office Action received for Chinese Patent Application No. 201620480708.6, dated Sep. 14, 2016, 3 pages (1 page of English Translation and 2 pages of Official copy).
Office Action received for Chinese Patent Application No. 201620480846.4, dated Jan. 9, 2017, 3 pages (1 page of English Translation and 2 pages of Official copy).
Office Action received for Chinese Patent Application No. 201620480846.4, dated Sep. 14, 2016, 3 pages (1 page of English Translation and 2 pages of Official copy).
Office Action received for Chinese Patent Application No. 201620509362.8, dated Feb. 10, 2017, 2 pages (Official copy only).
Office Action received for Chinese Patent Application No. 201620509362.8, dated Oct. 21, 2016, 3 pages (1 pages of English Translation and 2 pages of Official copy).
Office Action received for Chinese Patent Application No. 201620509515.9, dated Nov. 9, 2016, 2 pages (1 page of English Translation and 1 page of Official copy).
Office Action received for Danish Patent Application No. Pa 201670709, dated Jul. 21, 2017, 4 pages.
Office Action received for Danish Patent Application No. Pa 201670709, dated Nov. 30, 2016, 10 pages.
Office Action received for Danish Patent Application No. PA201570664, dated Dec. 14, 2016, 2 pages.
Office Action received for Danish Patent Application No. PA201570664, dated Jun. 3, 2016, 3 pages.
Office Action received for Danish Patent Application No. PA201570664, dated Mar. 15, 2016, 10 pages.
Office Action received for Danish Patent Application No. PA201570665, dated Mar. 31, 2016, 9 pages.
Office Action received for Danish Patent Application No. PA201570665, dated Sep. 5, 2016, 3 pages.

(56) References Cited

OTHER PUBLICATIONS

Office Action received for Danish Patent Application No. PA201570771, dated Jun. 13, 2016, 3 pages.
Office Action received for Danish Patent Application No. PA201570771, dated Mar. 17, 2016, 8 pages.
Office Action received for Danish Patent Application No. PA201570773, dated Aug. 28, 2017, 3 pages.
Office Action received for Danish Patent Application No. PA201570773, dated Feb. 15, 2017, 3 pages.
Office Action received for Danish Patent Application No. PA201570773, dated Mar. 18, 2016, 9 pages.
Office Action received for Danish Patent Application No. PA201570773, dated Sep. 12, 2016, 3 pages.
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670042, dated Sep. 25, 2017, 2 pages.
Office Action received for Danish Patent Application No. PA201670074, dated Apr. 7, 2016, 8 pages.
Office Action received for Danish Patent Application No. PA201670074, dated Jun. 28, 2016, 5 pages.
Office Action received for Danish Patent Application No. PA201670074, dated Mar. 16, 2017, 2 pages.
Office Action received for Danish Patent Application No. PA201670362, dated Jan. 29, 2018, 3 pages.
Office Action received for Danish Patent Application No. PA201670362, dated Jun. 1, 2017, 6 pages.
Office Action received for Danish Patent Application No. PA201670362, dated Nov. 21, 2016, 11 pages.
Office Action received for Danish Patent Application No. PA201670363, dated Feb. 12, 2018, 2 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action Received for Danish Patent Application No. PA201670622, dated Aug. 17, 2018, 4 pages.
Office Action received for Danish Patent Application No. PA201670622, dated May 30, 2017, 4 pages.
Office Action received for Danish Patent Application No. PA201670622, dated Nov. 1, 2017, 5 pages.
Office Action received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201670710, dated Dec. 8, 2016, 10 pages.
Office Action received for Danish Patent Application No. PA201670710, dated Sep. 25, 2017, 6 pages.
Office Action received for Danish Patent Application No. PA201670749, dated Jan. 30, 2017, 11 pages.
Office Action received for Danish Patent Application No. PA201670749, dated Oct. 3, 2017, 3 pages.
Office Action received for Danish Patent Application No. PA201670751, dated Jan. 13, 2017, 9 pages.
Office Action received for Danish Patent Application No. PA201670751, dated Nov. 13, 2017, 2 pages.
Office Action received for Danish Patent Application No. PA201770292, dated Apr. 24, 2018, 3 pages.
Office Action received for Danish Patent Application No. PA201770292, dated Jun. 6, 2017, 7 pages.
Office Action received for Danish Patent Application No. PA201770292, dated Sep. 6, 2017, 4 pages.
Office Action received for Danish Patent Application No. PA201770782, dated Jan. 26, 2018, 8 pages.
Office Action received for Danish Patent Application No. PA201770804, dated Feb. 1, 2018, 9 pages.
Office Action received for Danish Patent Application No. PA201770804, dated May 31, 2018, 6 pages.
Office Action received for European Patent Application No. 08834386.8, dated Aug. 23, 2010, 4 pages.
Office Action received for European Patent Application No. 12181538.5, dated Dec. 16, 2013, 4 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action received for European Patent Application No. 13171145.9, dated Apr. 28, 2016, 5 pages.
Office Action received for European Patent Application No. 13171145.9, dated May 3, 2018, 4 pages.
Office Action received for European Patent Application No. 13795330.3, dated Oct. 9, 2017, 8 pages.
Office Action received for European Patent Application No. 15168475.0, dated Dec. 19, 2016, 5 pages.
Office Action received for European Patent Application No. 15727291.5, dated Jan. 15, 2018, 8 pages.
Office Action received for European Patent Application No. 15728352.4, dated Jan. 25, 2018, 10 pages.
Office Action received for European Patent Application No. 16201195.1, dated Feb. 14, 2018, 12 pages.
Office Action received for European Patent Application No. 16201205.8, dated Feb. 16, 2018, 12 pages.
Office Action received for European Patent Application No. 18154163.2, dated Apr. 11, 2018, 6 pages.
Office Action received for German Patent Application No. 202015004267.8, dated Nov. 4, 2015, 4 pages (3 pages of English Translation and 1 pages of Official copy).
Office Action received for German Patent Application No. 202017005507.4, dated Feb. 5, 2018, 2 pages (1 page of English Translation and 1 page of Official copy).
Office Action received for Japanese Patent Application No. 2010-525891, dated Jun. 12, 2012, 11 pages (5 pages of English Translation and 6 pages of Official copy).
Office Action received for Japanese Patent Application No. 2013-098406, dated Dec. 9, 2013, 12 pages (6 pages of English Translation and 6 pages of Official copy).
Office Action received for Japanese Patent Application No. 2013-098406, dated Dec. 15, 2014, 12 pages (7 pages of English Translation and 5 pages of Official copy).
Office Action received for Japanese Patent Application No. 2013-098406, dated Jul. 19, 2016, 10 pages (5 pages of English Translation and 5 pages of Official copy).
Office Action received for Japanese Patent Application No. 2015-083696, dated Jun. 17, 2016, 12 pages (7 pages of English Translation and 5 pages of Official copy).
Office Action received for Japanese Patent Application No. 2016-131998, dated Aug. 10, 2018, 9 pages (5 pages of English Translation and 4 pages of Official copy).
Office Action received for Japanese Patent Application No. 2016-131998, dated Sep. 25, 2017, 10 pages (5 pages of English Translation and 5 pages of Official copy).
Office Action received for Japanese Patent Application No. 2016-224507, dated Dec. 1, 2017, 14 pages (7 pages of English Translation and 7 pages of Official copy).
Office Action received for Japanese Patent Application No. 2016-224507, dated Jun. 16, 2017, 16 pages (8 pages of English Translation and 8 pages of Official copy).
Office Action received for Japanese Patent Application No. 2016-527367, dated Feb. 26, 2018, 15 pages (8 pages of English Translation and 7 pages of Official copy).
Office Action received for Japanese Patent Application No. 2016-527367, dated Jul. 7, 2017, 16 pages (8 pages of English Translation and 8 pages of Official copy).

(56) References Cited

OTHER PUBLICATIONS

Office Action received for Japanese Patent Application No. 2016-540927, dated Jun. 20, 2017, 12 pages (7 pages of English Translation and 5 pages of Official copy).
Office Action received for Japanese Patent Application No. 2016-558332, dated Dec. 8, 2017, 12 pages (6 pages of English Translation and 6 pages of Official copy).
Office Action received for Japanese Patent Application No. 2016-558332, dated Jul. 27, 2018, 9 pages (4 pages of English Translation and 5 pages of Official Copy).
Office Action received for Japanese Patent Application No. 2016-569665, dated Jan. 19, 2018, 10 pages (5 pages of English Translation and 5 pages of Official copy).
Office Action received for Japanese Patent Application No. 2017-075031, dated Jul. 30, 2018, 16 pages (8 pages of English Translation and 8 pages of Official Copy).
Office Action received for Japanese Patent Application No. 2017-085582, dated Jul. 2, 2018, 11 pages (6 pages of English Translation and 5 pages of Official Copy).
Office Action received for Japanese Patent Application No. 2017-540616, dated Jan. 12, 2018, 24 pages (13 pages of English Translation and 11 pages of Official copy).
Office Action received for Japanese Patent Application No. 2017-540616, dated Jul. 27, 2018, 20 pages (11 pages of English Translation and 9 pages of Official copy).
Office Action received for Japanese Patent Application No. 2017-545733, dated Feb. 13, 2018, 7 pages (3 pages of English Translation and 4 pages of Official copy).
Office Action received for Korean Patent Application No. 10-2010-7008899, dated Aug. 17, 2014, 7 pages (3 pages of English Translation and 4 pages of Official copy).
Office Action received for Korean Patent Application No. 10-2010-7008899, dated Feb. 3, 2015, 7 pages (3 pages of English Translation and 4 pages of Official copy).
Office Action received for Korean Patent Application No. 10-2010-7008899, dated Jan. 28, 2013, 5 pages (2 pages of English Translation and 3 pages of Official copy).
Office Action received for Korean Patent Application No. 10-2010-7008899, dated Jun. 12, 2015, 4 pages (2 pages of English Translation and 2 pages of Official copy).
Office Action received for Korean Patent Application No. 10-2010-7008899, dated Mar. 29, 2012, 6 pages (2 pages of English Translation and 4 pages of Official copy).
Office Action received for Korean Patent Application No. 10-2010-7008899, dated May 30, 2011, 4 pages (2 pages of English Translation and 2 pages of Official copy).
Office Action received for Korean Patent Application No. 10-2011-7023152, dated Apr. 22, 2014, 6 pages (3 pages of English Translation and 3 pages of Official copy).
Office Action received for Korean Patent Application No. 10-2014-7004771, dated Apr. 22, 2014, 5 pages (2 pages of English Translation and 3 pages of Official copy).
Office Action received for Korean Patent Application No. 10-2014-7004771, dated Jun. 12, 2015, 6 pages (3 pages English Translation and 3 pages of Official copy).
Office Action received for Korean Patent Application No. 10-2014-7004771, dated Oct. 21, 2014, 7 pages (3 pages of English Translation and 4 pages of Official copy).
Office Action received for Korean Patent Application No. 10-2014-7004772, dated Apr. 22, 2014, 8 pages (3 pages of English Translation and 5 pages of Official copy).
Office Action received for Korean Patent Application No. 10-2014-7004773, dated Apr. 22, 2014, 9 pages (4 pages of English Translation and 5 pages of Office Action).
Office Action received for Korean Patent Application No. 10-2014-7004773, dated Oct. 21, 2014, 9 pages (4 pages of English Translation and 5 pages of Official copy).
Office Action received for Korean Patent Application No. 10-2014-7025441, dated Oct. 21, 2014, 5 pages (2 pages of English Translation and 3 pages of Official copy).
Office Action received for Korean Patent Application No. 10-2015-7010262, dated Mar. 8, 2017, 6 pages (3 pages of English Translation and 3 pages of Official copy).
Office Action received for Korean Patent Application No. 10-2015-7010262, dated May 24, 2016, 10 pages (3 pages of English Translation and 7 pages of Official copy).
Office Action received for Korean Patent Application No. 10-2016-0152210, dated May 14, 2018, 13 pages (6 pages of English Translation and 7 pages of Official copy).
Office Action received for Korean Patent Application No. 10-2016-7009347, dated Feb. 18, 2018, 9 pages (4 pages of English Translation and 5 pages of Official copy).
Office Action received for Korean Patent Application No. 10-2016-7009347, dated Mar. 9, 2017, 15 pages (7 pages of English Translation and 8 pages of Official copy).
Office Action received for Korean Patent Application No. 10-2016-7009632, dated Feb. 2, 2018, 11 pages (5 pages of English Translation and 6 pages of Official copy).
Office Action received for Korean Patent Application No. 10-2016-7014051, dated Apr. 30, 2018, 14 pages (7 pages of English Translation and 7 pages of Official copy).
Office Action received for Korean Patent Application No. 10-2016-7014051, dated Jun. 20, 2017, 16 pages (8 pages of English Translation and 8 pages of Official copy).
Office Action received for Korean Patent Application No. 10-2016-7035555, dated Dec. 26, 2017, 5 pages (2 pages of English Translation and 3 pages of Official copy).
Office Action received for Korean Patent Application No. 10-2017-0022365, dated Jun. 26, 2017, 10 pages (4 pages of English Translation and 6 pages of Official copy).
Office Action received for Korean Patent Application No. 10-2017-0022546, dated Jun. 21, 2017, 12 pages (5 pages of English Translation and 7 pages of Official copy).
Office Action received for Korean Patent Application No. 10-2017-7015582, dated Apr. 5, 2018, 8 pages (4 pages of English Translation and 4 pages of Official copy).
Office Action received for Korean Patent Application No. 10-2017-7015582, dated Jun. 12, 2017, 9 pages (4 pages of English Translation and 5 pages of Official copy).
Office Action received for Korean Patent Application No. 10-2018-7001854, dated Apr. 2, 2018, 13 pages (6 pages of English Translation and 7 pages of Official copy).
Office Action received for Korean Patent Application No. 10-2018-7022895, dated Aug. 17, 2018, 8 pages (3 pages of English Translation and 5 pages of Official Copy).
Office Action received for Taiwan Patent Application No. 103136545, dated Nov. 2, 2015, 39 pages (15 pages of English Translation and 24 pages of Official copy).
Office Action received for Taiwan Patent Application No. 101107082, dated Jul. 7, 2014, 21 pages (7 pages of English Translation and 14 pages of Official copy).
Office Action received for Taiwan Patent Application No. 103131074, dated Jul. 21, 2015, 16 pages (7 pages of English Translation and 9 pages of Official copy).
Office Action received for Taiwan Patent Application No. 103136545, dated May 25, 2016, 7 pages (3 pages of English Translation and 4 pages of Official copy).
Office Action received for Taiwanese Patent Application No. 104114953, dated Feb. 18, 2017, 9 pages (4 pages of English Translation and 5 pages of Official copy).
Office Action received for Taiwanese Patent Application No. 104114953, dated Jun. 8, 2016, 11 pages (5 pages of English Translation and 6 pages of Official copy).
Office Action received for Taiwanese Patent Application No. 104117508, dated Jul. 14, 2017, 9 pages (4 pages of English Translation and 5 pages of Official copy).
Office Action received for Taiwanese Patent Application No. 104117508, dated Jul. 20, 2016, 19 pages (8 pages of English Translation and 11 pages of Official copy).
Office Action received for Taiwanese Patent Application No. 104117508, dated Mar. 20, 2017, 22 pages (9 pages of English Translation and 13 pages of Official copy).

(56) References Cited

OTHER PUBLICATIONS

Office Action received for Taiwanese Patent Application No. 104128689, dated Aug. 21, 2017, 8 pages (3 pages of English Translation and 5 pages of Official copy).
Office Action received for Taiwanese Patent Application No. 104128689, dated Nov. 14, 2016, 12 pages (5 pages of English Translation and 7 pages of Official copy).
Office Action received for Taiwanese Patent Application No. 104128700, dated Aug. 31, 2016, 13 pages (6 pages of English Translation and 7 pages of Official copy).
Office Action received for Taiwanese Patent Application No. 104133756, dated May 17, 2017, 13 pages (6 pages of English Translation and 7 pages of Official copy).
Office Action received for Taiwanese Patent Application No. 104133757, dated Jul. 6, 2016, 22 pages (9 pages of English Translation and 13 pages of Official copy).
Office Action received from Japanese Patent Application No. 2013-098406, dated May 8, 2015, 14 pages (9 pages of English Translation and 5 pages of Official copy).
Onefacein, "[how It Works] Securing Your Smartphone with Onefacein", Biometric Password Manager, Available at <https://www.youtube.com/watch?v=h-JG5SPxBQ0>, Dec. 2, 2016, 1 page.
PHONE4U, "Iphone 4s Tips 'n' Tricks: Access the Camera from the Lock Screen—Phones 4u", Youtube, available at <https://www.youtube.com/watch?v=C8eDN4Vu2mg>, Dec. 9, 2011, 2 pages.
Plaisant et al., "Touchscreen Toggle Switches: Push or Slide? Design Issues and Usability Study", Technical Report CAR-TR-521, CS-TR-2557, Nov. 1990, pp. 1-10.
Riley et al., "Instruction, Feedback and Biometrics: the User Interface for Fingreprint Authentication System", Interact 2009, Part II, LNCS 5727, IFPI International Federation for Information Processing, 2009, pp. 293-305.
Sensory Trulysecure, "Applock Face/voice Recognition", Available at <https://www.youtube.com/watch?v=odax5O51aT0>, May 27, 2015, 1 page.
Summons to Attend Oral Proceedings received for European Patent Application No. 08834386.8, dated Aug. 24, 2012, 4 pages.
Summons to Attend Oral Proceedings received for European Patent Application No. 12770400.5, dated Mar. 19, 2018, 10 pages.
Summons to Attend Oral Proceedings received for European Patent Application No. 16201195.1, dated Sep. 4, 2018, 21 pages.
Supplemental Notice of Allowance received for U.S. Appl. No. 12/207,370, dated Aug. 8, 2013, 2 pages.
Supplemental Notice of Allowance received for U.S. Appl. No. 15/899,996, dated Jul. 25, 2018, 2 pages.
Tanaka et al., "Innovative Mobile Device of Apple Finally Appeared, Mobile Phone + Ipod + Internet Terminal, Iphone", Mac Fan, vol. 15, No. 9, Japan, Mainichi Communications Inc., Sep. 1, 2007, pp. 4-13 (Official copy only) (See Communication under 37 CFR § 1.98(a) (3)).
Thanakulmas, Thanit, "Mastercard Identity Check Facial Recognition Biometrics", Available at <https://www.youtube.com/watch?v=g4sMbrkt1gl>, Oct. 10, 2016, 1 page.
The Gadget Pill, "Sygic for Android Navigation with Hud", Available online at: —https://www.youtube.com/watch?v=fG-grycRevGU, Mar. 23, 2014, 1 page.
Third Party Observations received for European Patent Application No. 15168475.0, dated Jul. 19, 2016, 4 pages.
Videoreborn, "Motorola Atrix 4G: Wet Fingerprint Scanner Better Than Iphone 5s Finger Print Scanner!", Youtube, available at <https://www.youtube.com/watch?v=MSJIIG93MPg>, Mar. 16, 2011, 2 pages.
Walker, Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Final Office Action received for U.S. Appl. No. 14/869,877, dated Jun. 11, 2019, 35 pages.
Final Office Action received for U.S. Appl. No. 15/274,910, dated May 31, 2019, 31 pages.
Intention to Grant received for European Patent Application No. 12773460.6, dated Jun. 17, 2019, 4 pages.
Non-Final Office Action received for U.S. Appl. No. 13/243,045, dated Jun. 12, 2019, 11 pages.
Non-Final Office Action received for U.S. Appl. No. 15/782,068, dated Jun. 3, 2019, 17 Pages.
Notice of Acceptance received for Australian Patent Application No. 2019201101, dated May 6, 2019, 3 pages.
Notice of Allowance received for Korean Patent Application No. 10-2017-7034677, dated May 27, 2019, 5 pages (2 pages of English Translation and 3 pages of Official Copy).
Office Action received for Australian Patent Application No. 2016270323, dated May 29, 2019, 4 pages.
Office Action received for Australian Patent Application No. 2016270775, dated May 29, 2019, 3 pages.
Office Action received for Chinese Patent Application No. 201810338038.8, dated May 14, 2019, 26 pages (13 pages of English Translation and 13 pages of Official Copy).
Office Action received for European Patent Application No. 16201159.7, dated Jun. 12, 2019, 10 pages.
Office Action received for European Patent Application No. 18208881.5, dated Jun. 11, 2019, 5 pages.
Decision to Grant received for Japanese Patent Application No. 2017-075031, dated Jul. 1, 2019, 3 pages (1 pages of English Translation and 2 pages of Official Copy).
Decision to Refuse received for European Patent Application No. 16703893.4, dated Jul. 24, 2019, 22 pages.
European Search Report received for European Patent Application No. 19171661.2, dated Jul. 17, 2019, 6 pages.
Extended European Search Report received for European Patent Application No. 19160348.9, dated Jul. 19, 2019, 6 pages.
Final Office Action received for U.S. Appl. No. 15/713,551, dated Jul. 29, 2019, 21 pages.
Final Office Action received for U.S. Appl. No. 16/147,023, dated Jul. 23, 2019, 18 pages.
Minutes of Oral Proceeding received for European Patent Application No. 16703893.4, dated Jul. 22, 2019, 9 pages.
Notice of Allowance received for Chinese Patent Application No. 201480058054.1, dated Jul. 8, 2019, 2 pages (1 page of English Translation and 1 page of Official Copy).
Notice of Allowance received for U.S. Appl. No. 15/866,341, dated Jul. 26, 2019, 8 pages.
Office Action received for Chinese Patent Application No. 201510284715.9, dated Jun. 19, 2019, 26 pages (8 pages of English Translation and 18 pages of Official Copy).
Office Action received for Chinese Patent Application No. 201610371856.9, dated Jul. 10, 2019, 6 pages (3 pages of English Translation and 3 pages of Official Copy).
Office Action received for Chinese Patent Application No. 201780002648.4, dated Jun. 12, 2019, 11 pages (5 pages of English Translation and 6 pages of Official Copy).
Office Action received for Japanese Patent Application No. 2018-560107, dated Jun. 14, 2019, 26 pages (13 pages of English Translation and 13 pages of Official Copy).
Office Action received for Korean Patent Application No. 10-2018-7019643, dated Jul. 2, 2019, 12 pages (5 pages of English Translation and 7 pages of Official Copy).
Office Action received for Korean Patent Application No. 10-2019-7004734, dated Jul. 4, 2019, 7 pages (2 pages of English Translation and 5 pages of Official Copy).
Office Action received for Korean Patent Application No. 10-2019-7005925, dated Jul. 4, 2019, 24 pages (11 pages of English Translation and 13 pages of Official Copy).
Certificate of Examination received for Australian Patent Application No. 2018101014, dated Mar. 20, 2019, 2 pages.
Decision to Grant received for Danish Patent Application No. PA201870370, dated Mar. 29, 2019, 2 pages.
Decision to Grant received for Danish Patent Application No. PA201870371, dated Mar. 29, 2019, 2 pages.
Notice of Allowance received for Japanese Patent Application No. 2016-224507, dated Mar. 26, 2019, 3 pages (1 pages of English Translation and 2 pages of Official Copy).

(56) References Cited

OTHER PUBLICATIONS

Notice of Allowance received for U.S. Appl. No. 13/076,411, dated Apr. 8, 2019, 13 pages.
Notice of Allowance received for U.S. Appl. No. 15/894,221, dated Apr. 11, 2019, 5 pages.
Office Action received for Australian Patent Application No. 2018202559, dated Apr. 8, 2019, 4 pages.
Office Action received for Australian Patent Application No. 2018202712, dated Mar. 22, 2019, 5 pages.
Office Action received for Chinese Patent Application No. 201510284896.5, dated Mar. 6, 2019, 13 pages (4 pages of English Translation and 9 pages of Official Copy).
Office Action received for Chinese Patent Application No. 201610069731.0, dated Mar. 5, 2019, 10 pages (5 pages of English Translation and 5 pages of Official Copy).
Record of Oral Hearing received for U.S. Appl. No. 13/243,045, dated Apr. 1, 2019, 18 pages.
Search Report and Opinion received for Danish Patent Application No. PA201870855, dated Apr. 3, 2019, 12 pages.
Corrected Notice of Allowance received for U.S. Appl. No. 15/294,439, dated Mar. 13, 2019, 4 pages.
Corrected Notice of Allowance received for U.S. Appl. No. 15/845,794, dated Feb. 25, 2019, 2 pages.
Decision on Appeal received for U.S. Appl. No. 13/243,045, dated Mar. 18, 2019, 10 Pages.
Decision to Refuse received for European Patent Application No. 16201195.1, dated Mar. 4, 2019, 23 pages.
Intention to Grant received for European Patent Application No. 13171145.9, dated Feb. 21, 2019, 8 pages.
International Preliminary Report on Patentability received for PCT Patent Application No. PCT/US2017/058368, dated Feb. 19, 2019, 5 pages.
Nhdanh-Protocol Corp, "How to Enroll Face Enbioaccess T9 Nitgen Korea—Đăng Ký Khuôn Mặt Enbioaccess T9 Nitgen", Available online at <https://www.youtube.com/watch?v=mFn03PD4NIE>, Mar. 30, 2017, 1 page.
Notice of Acceptance received for Australian Patent Application No. 2017266867, dated Mar. 6, 2019, 3 pages.
Notice of Allowance received for Japanese Patent Application No. 2016-569665, dated Feb. 22, 2019, 4 pages (1 Page of English Translation and 3 Pages of Official Copy).
Notice of Allowance received for Korean Patent Application No. 10-2018-7022895, dated Feb. 22, 2019, 4 pages (1 page of English Translation and 3 pages of Official Copy).
Notice of Allowance received for Korean Patent Application No. 10-2018-7033301, dated Feb. 20, 2019, 5 pages (2 Pages of English Translation and 3 Pages of Official Copy).
Notice of Allowance received for Korean Patent Application No. 10-2014-7008348, dated Feb. 21, 2019, 5 pages (2 Pages of English Translation and 3 Pages of Official Copy).
Notice of Allowance received for U.S. Appl. No. 15/872,685, dated Mar. 8, 2019, 10 pages.
Notice of Allowance received for U.S. Appl. No. 15/894,221, dated Mar. 4, 2019, 2 pages.
Office Action received for Australian Patent Application No. 2017317605, dated Feb. 22, 2019, 4 pages.
Office Action received for Australian Patent Application No. 2018200485, dated Feb. 20, 2019, 6 pages.
Office Action received for Australian Patent Application No. 2018203732, dated Feb. 26, 2019, 5 pages.
Office Action received for Australian Patent Application No. 2018312629, dated Feb. 25, 2019, 4 pages.
Office Action received for Australian Patent Application No. 2019201101, dated Feb. 28, 2019, 3 pages.
Office Action received for Chinese Patent Application No. 201610459968.X, dated Feb. 22, 2019, 11 pages (5 Pages of English Translation and 6 pages of Official Copy).
Office Action received for Chinese Patent Application No. 201410407626.4, dated Feb. 12, 2019, 13 pages (3 Pages of English Translation and 10 pages of Official Copy).
Office Action received for Danish Patent Application No. PA201770712, dated Mar. 1, 2019, 3 pages.
Office Action received for Japanese Patent Application No. 2017-562050, dated Feb. 1, 2019, 15 pages (8 pages of English Translation and 7 pages of Official Copy).
Office Action received for Japanese Patent Application No. 2017-562330, dated Jan. 18, 2019, 11 pages (6 pages of English Translation and 5 pages of Official Copy).
Office Action received for Taiwanese Patent Application No. 104117508, dated Jan. 25, 2019, 24 pages (5 pages of English Translation and 19 pages of Official Copy).
PSP Security Ltd, "AccuFACE features", Available online at <https://www.youtube.com/watch?v=p3jvGoEbioY>, Oct. 14, 2009, 1 page.
PSP Security Ltd, "PSP Security—AccuFACE Step by Step Enrollment Process", Available online at <https://www.youtube.com/watch?v=0IIF5OOdya0>, Oct. 14, 2009, 1 page.
Supplemental Notice of Allowance received for U.S. Appl. No. 14/870,726, dated Mar. 6, 2019, 6 pages.
CV, Meerkat, "Extracting Face Orientation in Real-time", Available online at: <https://www.youtube.com/watch?v=Ugwfnjx6UYw>, Jul. 22, 2016, 3 pages.
Drareni, Jamil, "Face Tracking and Head Pose Estimation with Open CV", Available online at: <https://www.youtube.com/watch?v=EtjaktbnM>, Jun. 9, 2013, 3 pages.
Extended European Search Report received for European Patent Application No. 18190250.3, dated Nov. 9, 2018, 6 pages.
International Preliminary Report on Patentability received for PCT Patent Application No. PCT/US2017/032240, dated Nov. 29, 2018, 29 pages.
Notice of Allowance received for U.S. Appl. No. 15/033,551, dated Nov. 14, 2018, 10 pages.
Office Action received for Australian Patent Application No. 2016270323, dated Nov. 26, 2018, 4 pages.
Office Action received for Australian Patent Application No. 2016270775, dated Nov. 26, 2018, 5 pages.
Office Action received for Australian Patent Application No. 2018202712, dated Nov. 20, 2018, 12 pages.
Office Action received for Chinese Patent Application No. 201380080659.6, dated Oct. 26, 2018, 11 pages (3 pages of English Translation and 8 pages of Official Copy).
Office Action received for Chinese Patent Application No. 201810094316.X, dated Oct. 29, 2018, 12 pages (5 pages of Engiish Translation and 7 pages of Official Copy).
Office Action received for Danish Patent Application No. PA201770292, dated Nov. 9, 2018, 3 pages.
Office Action received for Danish Patent Application No. PA201770782, dated Nov. 22, 2018, 3 pages.
Office Action received for European Patent Application No. 16803996.4, dated Nov. 29, 2018, 12 pages.
Okazolab, "Kinect Based 3D Head Tracking in Behavioural Research", Available online at: <https://www.youtube.com/watch?v=nigRvT9beQw>, Aug. 8, 2012, 3 pages.
Summons to Attend Oral Proceedings received for European Patent Application No. 18154163.2, dated Nov. 29, 2018, 9 pages.
International Preliminary Report on Patentability received for PCT Patent Application No. PCT/US2017/031748, dated Dec. 20, 2018, 10 pages.
Office Action received for Korean Patent Application No. 10-2018-7033301, dated Dec. 14, 2018, 6 pages (2 pages of English Translation and 4 pages of Official Copy).
Office Action Received for Australian Patent Application No. 2018203732, dated Nov. 30, 2018, 3 Pages.
Office Action received for Australian Patent Application No. 2017266867, dated Dec. 6, 2018, 3 pages.
Notice of Allowance received for Japanese Patent Application No. 2016-131998, dated Nov. 30, 2018, 4 pages. (1 page of English Translation and 3 pages of Official copy).
Notice of Allowance received for Japanese Patent Application No. 2017-085582, dated Nov. 30, 2018, 4 pages (1 pages of English Translation and 3 pages of Official copy).
Notice of Allowance received for Korean Patent Application No. 10-2016-7014051, dated Nov. 27, 2018, 4 pages (1 page of English Translation and 3 pages of Official Copy).

(56) References Cited

OTHER PUBLICATIONS

Notice of Allowance received for U.S. Appl. No. 14/870,694, dated Dec. 11, 2018, 6 pages.
Notice of Allowance received for U.S. Appl. No. 15/900,047, dated Dec. 5, 2018, 10 pages.
Decision to Refuse received for European Patent Application No. 18154163.2, dated May 17, 2019, 22 pages.
Extended European Search Report received for European Patent Application No. 19150528.8, dated May 15, 2019, 9 pages.
Final Office Action received for U.S. Appl. No. 15/866,341, dated May 14, 2019, 10 pages.
Minutes of the Oral Proceedings received for European Patent Application No. 18154163.2, dated May 17, 2019, 7 pages.
Notice of Allowance received for U.S. Appl. No. 15/945,610, dated May 20, 2019, 7 pages.
Office Action received for Chinese Patent Application No. 201810094316.X, dated Apr. 28, 2019, 9 pages (3 pages of English Translation and 6 pages of Official Copy).
Office Action received for European Patent Application No. 16804040.0, dated May 13, 2019, 12 pages.
Office Action received for European Patent Application No. 18713408.5, dated May 20, 2019, 5 pages.
Office Action received for Japanese Patent Application No. 2018-113081, dated Apr. 9, 2019, 6 pages (3 pages of English Translation and 3 pages of Official Copy).
Office Action received for Korean Patent Application No. 10-2019-7005262, dated May 3, 2019, 5 pages (2 pages of English Translation and 3 pages of Official Copy).
Pre-Brief Appeal Conference decision received for U.S. Appl. No. 14/869,831, dated Jan. 18, 2019, 3 pages.
Preliminary Opinion before oral proceedings received for European Patent Application No. 18154163.2, dated Apr. 16, 2019, 12 pages.
Kurihara, Ryo, "Torisetsu of OS X that we want to know", Mac Fan, Japan, Mai Navi Co., Ltd., vol. 21, No. 6, 2013, 8 pages (Official copy only) 37 CFR § 1.98(a) (3).
Decision on Appeal received for Korean Patent Application No. 10-2015-7010262, dated Dec. 28, 2018, 16 pages (3 pages of English Translation and 13 pages of Official Copy).
Intention to Grant received for Danish Patent Application No. PA201870370, dated Jan. 2, 2019, 2 pages.
Intention to Grant received for Danish Patent Application No. PA201870371, dated Jan. 2, 2019, 2 pages.
Notice of Allowance received for U.S. Appl. No. 15/294,439, dated Jan. 8, 2019, 8 pages.
Office Action received for Chinese Patent Application No. 201780002648.4, dated Dec. 5, 2018, 13 pages (5 pages of English Translation and 8 pages of Official Copy).
Office Action received for Chinese Patent Application No. 201510284715.9, dated Dec. 21, 2018, 22 pages (5 pages of English Translation and 17 pages of Official Copy).
Supplemental Notice of Allowance received for U.S. Appl. No.14/870,694, dated Jan. 17, 2019, 3 pages.
Decision to Grant received for European Patent Application No. 12773460.6, dated Jun. 27, 2019, 2 pages.
Extended European Search Report received for European Patent Application No. 19160344.8, dated Jun. 14, 2019, 7 pages.
Final Office Action received for U.S. Appl. No. 16/147,115, dated Jun. 19, 2019, 14 pages.
Notice of Allowance received for Chinese Patent Application No. 201780002398.4, dated Jun. 17, 2019, 2 pages (1 pages of English Translation and 1 pages of Official Copy).
Office Action received for Australian Patent Application No. 2018203732, dated Jun. 6, 2019, 4 pages.
Office Action received for Danish Patent Application No. PA201770713, dated Jun. 7, 2019, 4 pages.
Office Action received for Japanese Patent Application No. 2016-224506, dated May 14, 2019, 22 pages (11 pages of English Translation and 11 pages of Official Copy).
Office Action received for Japanese Patent Application No. 2018-121118, dated May 14, 2019, 10 pages (5 pages of English Translation and 5 pages of Official Copy).
Office Action received for Korean Patent Application No. 10-2016-0152210, dated May 30, 2019, 8 pages (4 pages of English Translation and 4 pages of Official copy).
Office Action received for Korean Patent Application No. 10-2017-7034558, dated Jun. 4, 2019, 7 pages (3 pages of English Translation and 4 pages of Official Copy).
Office Action received for Korean Patent Application No. 10-2019-7003374, dated Jun. 10, 2019, 7 pages (2 pages of English Translation and 5 pages of official copy).
Office Action received for Korean Patent Application No. 10-2019-7014494, dated Jun. 14, 2019, 11 pages (5 pages of English Translation and 6 pages of Official Copy).
Kawai, Yasuhiro, "Resolving anxieties regarding card payment abuse by authentication—overcoming cumbersomeness by cooperation with mobile phones", Nikkei Internet Solutions No. 78, Japan, Nikkei BP, Dec. 22, 2003, pp. 28-31(Official Copy only) (See Communication under 37 CFR § 1.98(a) (3)).
Advisory Action received for U.S. Appl. No. 15/250,152, dated Mar. 25, 2019, 5 pages.
Extended European Search Report received for European Patent Application No. 17810682.9, dated Mar. 26, 2019, 7 pages.
International Preliminary Report on Patentability received for PCT Patent Application No. PCT/US2017/49500, dated Mar. 21, 2019, 14 pages.
Non-Final Office Action received for U.S. Appl. No. 15/713,551 dated Mar. 21, 2019, 18 pages.
Notice of Acceptance received for Australia Patent Application No. 2019200360, dated Mar. 15, 2019, 3 pages.
Notice of Allowance received for U.S. Appl. No. 15/899,966, dated Mar. 21, 2019, 7 pages.
Office Action received for Australian Patent Application No. 2018200485, dated Mar. 15, 2019, 4 pages.
Office Action received for Chinese Patent Application No. 201710093861.2, dated Mar. 5, 2019, 6 pages (3 pages of English Translation and 3 pages of Official Copy).
Office Action received for Chinese Patent Application No. 201780002398.4, dated Feb. 27, 2019, 6 pages (3 pages of English Translation and 3 pages of Official Copy).
Summons to Attend Oral Proceedings received for European Patent Application No. 16703893.4, dated Mar. 26, 2019, 14 pages.
International Search Report and Written Opinion received for PCT Patent Application No. PCT/US2018/015603, dated Jun. 22, 2018, 13 pages.
Intention to Grant received for Danish Patent Application No. PA201770714, dated Nov. 2, 2018, 2 pages.
Intention to Grant received for Danish Patent Application No. PA201770715, dated Nov. 13, 2018, 2 pages.
International Preliminary Report on Patentability received for PCT Patent Application No. PCT/US2017/031086, dated Dec. 27, 2018, 12 pages.
Non-Final Office Action received for U.S. Appl. No. 15/894,221, dated Jul. 25, 2018, 21 pages.
Non-Final Office Action received for U.S. Appl. No. 15/903,456, dated Sep. 6, 2018, 20 pages.
Non-Final Office Action received for U.S. Appl. No. 16/147,115, dated Dec. 13, 2018, 12 pages.
Non-Final Office Action received for U.S. Appl. No. 16/147,023, dated Dec. 26, 2018, 17 pages.
Office Action received for Chinese Patent Application No. 201710094150.7 dated Dec. 19, 2018, 12 Pages (5 pages of English translation and 7 pages of Official Copy).
Office Action received for Danish Patent Application No. PA201770712, dated Jul. 20, 2018, 4 pages.
Office Action received for Danish Patent Application No. PA201770713, dated Apr. 18, 2018, 4 pages.
Office Action received for Danish Patent Application No. PA201770713, dated Nov. 13, 2018, 3 pages.
Office Action received for Danish Patent Application No. PA201770714, dated Aug. 17, 2018, 6 pages.

(56) References Cited

OTHER PUBLICATIONS

Office Action received for Danish Patent Application No. PA201770714, dated Feb. 21, 2018, 3 pages.
Office Action received for Danish Patent Application No. PA201770714, dated Oct. 13, 2017, 9 pages.
Office Action received for Danish Patent Application No. PA201770715, dated Mar. 8, 2018, 4 pages.
Office Action received for Danish Patent Application No. PA201770715, dated Oct. 29, 2018, 4 pages.
Office Action received for Danish Patent Application No. PA201870370, dated Nov. 9, 2018, 4 pages.
Office Action received for Danish Patent Application No. PA201870371, dated Nov. 20, 2018, 3 pages.
Office Action received for Korean Patent Application No. 10-2018-7028845, dated Dec. 10, 2018, 8 pages (4 pages of English Translation and 4 pages of Official copy).
Search Report and Opinion received for Danish Patent Application No. PA201770712, dated Oct. 25, 2017, 10 pages.
Search Report and Opinion received for Danish Patent Application No. PA201770713, dated Oct. 31, 2017, 9 pages.
Search Report and Opinion received for Danish Patent Application No. PA201770715, dated Nov. 9, 2017, 10 pages.
Search Report and Opinion received for Danish Patent Application No. PA201870370, dated Sep. 7, 2018, 11 pages.
Search Report and Opinion received for Danish Patent Application No. PA201870371, dated Sep. 14, 2018, 14 pages.
Decision to Grant received for Danish Patent Application No. PA201770804, dated Jun. 28, 2019, 2 pages.
Decision to Grant received for European Patent Application No. 13171145.9, dated Jul. 11, 2019, 2 pages.
Notice of Acceptance received for Australian Patent Application No. 2018200628, dated Jun. 13, 2019, 3 pages.
Office Action received for Korean Patent Application No. 10-2018-7028845, dated Jun. 19, 2019, 7 pages (3 pages of English Translation and 4 pages of Official Copy).
Office Action received for Korean Patent Application No. 10-2019-7003836, dated Jun. 14, 2019, 7 pages (2 pages of English Translation and 5 pages of Official Copy).
Office Action received for Taiwanese Patent Application No. 104117508, dated May 22, 2019, 7 pages (3 pages of English Translation and 4 pages of Official Copy).
Result of Consultation received for European Patent Application No. 16703893.4, dated Jun. 7, 2019, 3 pages.
Advisory Action received for U.S. Appl. No. 15/274,910, dated Aug. 12, 2019, 3 pages.
Examiners Answer to Appeal Brief received for U.S. Appl. No. 14/869,831, dated Aug. 12, 2019, 16 pages.
Intention to Grant received for European Patent Application No. 13795330.3, dated Aug. 9, 2019, 13 pages.
Minutes of the Oral Proceedings received for European Patent Application No. 13795330.3, dated Aug. 2, 2019, 7 pages.
Notice of Allowance received for Chinese Patent Application No. 201380080659.6, dated Jul. 29, 2019, 2 pages (1 pages of English Translation and 1 pages of Official Copy).
Office Action received for Australian Patent Application No. 2018202559, dated Jul. 19, 2019, 5 pages.
Office Action received for Chinese Patent Application No. 201610371774.4, dated Jul. 8, 2019, 6 pages (3 pages of English Translation and 3 pages of Official copy).
Office Action received for Korean Patent Application No. 10-2016-7035555, dated Jul. 18, 2019, 9 pages (4 pages of English Translation and 5 pages of Official Copy).
Office Action received for Korean Patent Application No. 10-2017-7012145, dated Jul. 18, 2019, 5 pages (2 Pages of English Translation and 3 Pages of Official Copy).
Office Action received for Korean Patent Application No. 10-2019-7014988, dated Jul. 19, 2019, 9 pages (4 pages of English Translation and 5 pages of Official Copy).

Notice of Allowance received for Korean Patent Application No. 10-20177015582, dated Dec. 27, 2018, 5 pages (2 pages of English Translation and 3 pages of Official copy).
Office Action received for Australian Patent Application No. 2018101014, dated Jan. 18, 2019, 5 pages.
Office Action Received for Australian Patent Application No. 2018202559, dated Jan. 16, 2019, 6 pages.
Office Action received for Chinese Patent Application No. 201610371774.4, dated Dec. 19, 2018, 13 pages (5 pages of English Translation and 8 pages of Official copy).
Office Action received for Chinese Patent Application No. 201610371856.9, dated Dec. 19, 2018, 12 pages (5 pages of English Translation and 7 pages of Official Copy).
Notice of Allowance received for Japanese Patent Application No. 2016-558332, dated Jan. 11, 2019, 4 pages (1 pages of English Translation and 3 pages of Official Copy).
Search Report received for Germany Patent Application No. 202017005507.4, dated Jan. 2, 2019, 6 pages (1 pages of English Translation and 5 pages of Official Copy).
Extended European Search Report received for European Patent Application No. 18208881.5, dated Jan. 8, 2019, 7 pages.
Intention to Grant received for European Patent Application No. 12773460.6, dated Feb. 4, 2019, 8 pages.
International Search Report and Written Opinion received for PCT Patent Application No. PCT/US2018/049289, dated Feb. 19, 2019, 12 pages.
Notice of Allowance received for Danish Patent Application No. PA201770714, dated Feb. 15, 2019, 2 pages.
Notice of Allowance received for Danish Patent Application No. PA201770715, dated Feb. 15, 2019, 2 pages.
Notice of Allowance received for Korean Patent Application No. 10-2018-7032467, dated Jan. 28, 2019, 4 pages (1 pages of English Translation and 3 pages of Official Copy).
Notice of Allowance received for U.S. Appl. No. 15/470,752, dated Feb. 7, 2019, 11 pages.
Notice of Allowance received for U.S. Appl. No. 15/845,794, dated Feb. 14, 2019, 6 pages.
Notice of Allowance received for U.S. Appl. No. 15/894,221, dated Feb. 1, 2019, 5 pages.
Office Action received for Australian Patent Application No. 2018200628, dated Jan. 24, 2019, 3 pages.
Office Action received for Australian Patent Application No. 2018279788, dated Feb. 8, 2019, 4 pages.
Office Action received for Chinese Patent Application No. 201480058054.1, dated Jan. 22, 2019, 6 pages (2 pages of English Translation and 4 pages of Official Copy).
Office Action received for Korean Patent Application No. 10-2014-7008348, dated Jan. 22, 2019, 16 pages (1 pages of English Translation and 15 pages of Official Copy).
Office Action received for Korean Patent Application No. 10-2016-0152210, dated Jan. 29, 2019, 7 pages (3 pages of English Translation and 4 pages of Official Copy).
Office Action received for Korean Patent Application No. 10-2017-7034558, dated Dec. 15, 2018, 15 pages (7 pages of English Translation and 8 pages of Official Copy).
Notice of Allowance received for Chinese Patent Application No. 201710093861.2, dated Sep. 24, 2019, 4 pages (1 pages of English Translation and 3 pages of Official Copy).
Notice of Allowance received for Taiwanese Patent Application No. 104117508, dated Sep. 18, 2019, 5 pages (2 pages of English Translation and 3 pages of Official Copy).
Office Action received for Chinese Patent Application No. 201510284896.5, dated Sep. 3, 2019, 9 pages (2 pages of English Translation and 7 pages of Official Copy).
Summons to Attend Oral Proceedings received for European Patent Application No. 15728352.4, dated Nov. 18, 2019, 15 pages.
Office Action received for Chinese Patent Application No. 2017100941507, dated Jul. 31, 2019, 6 pages (2 pages of English Translation and 4 pages of Official Copy).
Office Action received for Chinese Patent Application No. 201810094316.X, dated Aug. 5, 2019, 9 pages (3 pages of English Translation and 6 pages of Official Copy).

(56) References Cited

OTHER PUBLICATIONS

Applicant Initiated Interview Summary received for U.S. Appl. No. 13/243,045, dated Oct. 22, 2019, 3 pages.
Applicant Initiated Interview Summary received for U.S. Appl. No. 15/351,230, dated Nov. 22, 2019, 5 pages.
Applicant Initiated Interview Summary received for U.S. Appl. No. 15/713,551, dated Nov. 5, 2019, 3 pages.
Applicant Initiated Interview Summary received for U.S. Appl. No. 16/147,023, dated Oct. 29, 2019, 3 pages.
Corrected Notice of Allowance received for U.S. Appl. No. 15/866,341, dated Aug. 26, 2019, 3 pages.
Decision on Appeal received for U.S. Appl. No. 14/612,214, dated Sep. 3, 2019, 10 pages.
Decision to Grant received for Danish Patent Application No. PA201770418, dated Oct. 25, 2019, 3 pages.
Decision to Grant received for Danish Patent Application No. PA201770419, dated Oct. 25, 2018, 2 pages.
Decision to Grant received for Danish Patent Application No. PA201770782, dated Oct. 25, 2019, 2 pages.
European Search Report received for European Patent Application No. 17865509.8, dated Oct. 2, 2019, 5 pages.
Extended European Search Report for European Application No. 17813737.8, dated Nov. 22, 2019, 9 pages.
Extended European Search Report received for European Patent Application No. 17853654.6, dated Jul. 8, 2019, 9 pages.
Extended European Search Report received for European Patent Application No. 19186538.5, dated Oct. 9, 2019, 10 pages.
Extended European Search Report received for European Patent Application No. 19194828.0, dated Dec. 19, 2019, 7 pages.
Final Office Action received for U.S. Appl. No. 13/243,045, dated Jan. 15, 2020, 12 pages.
Final Office Action received for U.S. Appl. No. 15/351,230, dated Nov. 4, 2019, 6 pages.
Final Office Action received for U.S. Appl. No. 15/433,320, dated Dec. 31, 2019, 30 pages.
Final Office Action received for U.S. Appl. No. 15/714,887, dated Nov. 15, 2019, 55 pages.
Giving Apple Pay a Try, The Consumer Credit Monthly, Kinzai Institute for Financial Affairs, Inc, vol. 33, No. 1, ISSN: 0288-8122, 2015, 7 pages (Official Copy only) {See Communication under 37 CFR § 1.98(a) (3)}.
Intention to Grant received for Danish Patent Application No. PA201770418, dated Aug. 22, 2019, 2 pages.
Intention to Grant received for Danish Patent Application No. PA201770418, dated Nov. 16, 2018, 3 pages.
Intention to Grant received for Danish Patent Application No. PA201770419, dated Mar. 28, 2018, 2 pages.
International Preliminary Report on Patentability received for PCT Patent Application No. PCT/US2018/014658, dated Nov. 28, 2019, 14 pages.
International Preliminary Report on Patentability received for PCT Patent Application No. PCT/US2017/049760, dated Apr. 4, 2019, 9 pages.
International Search Report and Written Opinion received for PCT Patent Application No. PCT/US17/49760, dated Jan. 19, 2018, 12 pages.
International Search Report and Written Opinion received for PCT Patent Application No. PCT/US2018/014658, dated Jun. 6, 2018, 20 pages.
Invitation to Pay Addition Fees received for PCT Patent Application No. PCT/US2018/014658, dated Apr. 11, 2018, 14 pages.
Invitation to Pay Additional Fee received for PCT Patent Application No. PCT/US2019/035092, dated Nov. 20, 2019, 6 pages.
Invitation to pay Additional fees received for PCT Patent Application No. PCT/US17/49760, dated Nov. 21, 2017, 2 pages.
Non-Final Office Action received for U.S. Appl. No. 14/612,214, dated Nov. 20, 2019, 11 pages.
Non-Final Office Action received for U.S. Appl. No. 15/714,887, dated May 30, 2019, 47 pages.
Non-Final Office Action received for U.S. Appl. No. 16/035,419, dated Jan. 30, 2019, 24 pages.
Non-Final Office Action received for U.S. Appl. No. 16/434,865, dated Jan. 16, 2020, 9 pages.
Non-Final Office Action received for U.S. Appl. No. 16/667,271, dated Dec. 13, 2019, 8 pages.
Notice of Acceptance received for Australian Patent Application No. 2017317605, dated Aug. 28, 2019, 3 Pages.
Notice of Acceptance received for Australian Patent Application No. 2017330208, dated Nov. 28, 2019, 3 pages.
Notice of Acceptance received for Australian Patent Application No. 2018279788, dated Nov. 6, 2019, 3 pages.
Notice of Acceptance received for Australian Patent Application No. 2018312629, dated Nov. 7, 2019, 4 pages.
Notice of Acceptance received for Australian Patent Application No. 2019203473, dated Nov. 7, 2019, 3 pages.
Notice of Allowance received for Chinese Patent Application No. 201610069731.0, dated Sep. 6, 2019, 2 pages (1 page of English Translation and 1 page of Official Copy).
Notice of Allowance received for Japanese Patent Application No. 2017-562330, dated Sep. 20, 2019, 4 pages (1 page of English Translation and 3 pages of Official Copy).
Notice of Allowance received for Japanese Patent Application No. 2018-241505, dated Oct. 4, 2019, 4 pages (1 page of English Translation and 3 pages of Official Copy).
Notice of Allowance received for Japanese Patent Application No. 2018-560107, dated Dec. 6, 2019, 4 pages (1 page of English Translation and 3 pages of Official Copy).
Notice of Allowance received for Japanese Patent Application No. 2019-096220, dated Nov. 25, 2019, 4 pages (1 page of English Translation and 3 pages of Official Copy).
Notice of Allowance received for Korean Patent Application No. 10-2016-7035555, dated Sep. 23, 2019, 3 pages (1 page of English Translation and 2 pages of Official Copy).
Notice of Allowance received for Korean Patent Application No. 10-2017-7012145, dated Oct. 30, 2019, 3 pages (1 page of English Translation and 2 pages of Official Copy).
Notice of Allowance received for Korean Patent Application No. 10-2019-7003374, dated Oct. 4, 2019, 9 pages (2 pages of English Translation and 7 pages of Official Copy).
Notice of Allowance received for Korean Patent Application No. 10-2019-7003836, dated Oct. 4, 2019, 4 pages (1 page of English Translation and 3 pages of Official Copy).
Notice of Allowance received for Korean Patent Application No. 10-2019-7004734, dated Oct. 24, 2019, 6 pages (2 pages of English Translation and 4 pages of Official Copy).
Notice of Allowance received for Korean Patent Application No. 10-2019-7025322, dated Nov. 20, 2019, 5 pages (2 pages of English Translation and 3 pages of Official Copy).
Notice of Allowance received for Taiwanese Patent Application No. 107138003, dated Aug. 30, 2019, 4 pages (1 page of English Translation and 3 pages of Official Copy).
Notice of Allowance received for U.S. Appl. No. 14/503,296, dated Aug. 28, 2019, 12 pages.
Notice of Allowance received for U.S. Appl. No. 14/871,635, dated Jan. 15, 2020, 3 pages.
Notice of Allowance Received for U.S. Appl. No. 14/871,635, dated Nov. 14, 2019, 14 pages.
Notice of Allowance received for U.S. Appl. No. 15/351,230, dated Dec. 11, 2019, 11 pages.
Notice of Allowance received for U.S. Appl. No. 15/782,068, dated Sep. 24, 2019, 7 pages.
Notice of Allowance received for U.S. Appl. No. 16/035,419, dated May 24, 2019, 14 pages.
Notice of Allowance received for U.S. Appl. No. 16/131,767, dated Sep. 6, 2019, 7 pages.
Notice of Allowance received for U.S. Appl. No. 16/147,115, dated Oct. 30, 2019, 10 pages.
Office Action received for Australian Patent Application No. 2016270775, dated Nov. 26, 2019, 3 pages.
Office Action received for Australian Patent Application No. 2017330208, dated Jul. 25, 2019, 5 pages.

(56) References Cited

OTHER PUBLICATIONS

Office Action received for Australian Patent Application No. 2018202712, dated Nov. 15, 2019, 5 pages.
Office Action received for Australian Patent Application No. 2018202712, dated Sep. 2, 2019, 4 pages.
Office Action received for Australian Patent Application No. 2019203473, dated Oct. 25, 2019, 2 pages.
Office Action received for Chinese Patent Application No. 201610371774.4, dated Dec. 2, 2019, 6 pages (3 pages of English Translation and 3 pages of Official Copy).
Office Action received for Chinese Patent Application No. 201610371856.9, dated Dec. 18, 2019, 6 pages (3 pages of English Translation and 3 pages of Official Copy).
Office Action received for Chinese Patent Application No. 201610459968.X, dated Aug. 23, 2019, 12 pages (5 pages of English Translation and 7 pages of Official Copy).
Office Action received for Chinese Patent Application No. 201710198190.6, dated Sep. 25, 2019, 27 pages (12 pages of English Translation and 15 pages of Official Copy).
Office Action received for Chinese Patent Application No. 201780002648.4, dated Nov. 26, 2019, 10 pages (4 pages of English Translation and 6 pages of Official Copy).
Office Action received for Chinese Patent Application No. 201810338826.7, dated Oct. 21, 2019, 19 pages (12 pages of English Translation and 7 pages of Official Copy).
Office Action received for Chinese Patent Application No. 201811330077.X, dated Nov. 13, 2019, 14 pages (6 pages of English Translation and 8 pages of Official Copy).
Office Action received for Chinese Patent Application No. 201910070375.8, dated Dec. 6, 2019, 23 pages (12 pages of English Translation and 11 pages of Official Copy).
Office Action received for Chinese Patent Application No. 201910109868.8, dated Sep. 19, 2019, 23 pages (11 pages of English Translation and 12 pages of Official Copy).
Office Action received for Chinese Patent Application No. 201910246439.5, dated Oct. 15, 2019, 17 pages (9 pages of English Translation and 8 pages of Official Copy).
Office Action received for Danish Patent Application No. PA201770418, dated May 8, 2018, 3 pages.
Office Action received for Danish Patent Application No. PA201770419, dated Jan. 10, 2018, 4 pages.
Office Action received for Danish Patent Application No. PA201870855, dated Nov. 7, 2019, 4 pages.
Office Action received for Danish Patent Application No. PA201970127, dated Dec. 20, 2019, 3 pages.
Office Action received for European Patent Application No. 17865509.8, dated Oct. 10, 2019, 6 pages.
Office Action received for European Patent Application No. 18704335.1, dated Sep. 23, 2019, 7 pages.
Office Action received for European Patent Application No. 18713408.5, dated Nov. 20, 2019, 4 pages.
Office Action received for European Patent Application No. 18830326.7, dated Aug. 27, 2019, 6 pages.
Office Action received for European Patent Application No. 18830326.7, dated Nov. 22, 2019, 8 pages.
Office Action received for European Patent Application No. 18830326.7, dated Sep. 16, 2019, 6 pages.
Office Action received for Indian Patent Application No. 201617006865, dated Dec. 11, 2019, 7 pages.
Office Action received for Japanese Patent Application No. 2017-562050, dated Sep. 30, 2019, 5 pages (2 pages of English Translation and 3 pages of Official Copy).
Office Action received for Japanese Patent Application No. 2018-121118, dated Nov. 18, 2019, 10 pages (5 pages of English Translation and 5 pages of Official Copy).
Office Action received for Japanese Patent Application No. 2018-551159, dated Sep. 30, 2019, 6 pages (3 pages of English Translation and 3 pages of Official Copy).
Office Action received for Japanese Patent Application No. 2019-053379, dated Oct. 18, 2019, 11 pages (6 pages of English Translation and 5 pages of Official Copy).
Office Action received for Japanese Patent Application No. 2019-096220, dated Sep. 9, 2019, 8 pages (4 pages of English Translation and 4 pages of Official Copy).
Office Action received for Japanese Patent Application No. 2019-107235, dated Oct. 18, 2019, 8 pages (4 pages of English Translation and 4 pages of Official Copy).
Office Action received for Japanese Patent Application No. 2019-510416, dated Oct. 18, 2019, 4 pages (2 pages of English translation and 2 pages of Official copy).
Office Action received for Korean Patent Application No. 10-2017-7034558, dated Sep. 25, 2019, 9 pages (4 pages of English Translation and 5 pages of Official Copy).
Search Report and Opinion received for Danish Patent Application No. PA201770418, dated Jun. 23, 2017, 8 pages
Search Report and Opinion received for Danish Patent Application No. PA201770419, dated Jun. 19, 2017, 6 pages.
Search Report and Opinion received for Danish Patent Application No. PA201970127, dated Oct. 4, 2019, 9 pages.
Summons to Attend Oral Proceedings received for European Patent Application No. 16803996.4, dated Oct. 2, 2019, 16 pages.
How to Smartphone, "Samsung Galaxy S7—screen rotation on / off", Available Online at <https://www.youtube.com/watch?v=np54sEEI11E >, see video from 1:10 to 1:30., Dec. 12, 2016, 3 pages.
Page, Sebastien, "Leaked iOS 11 GM details how you will set up Face ID on your iPhone 8", Online available at: https://www.idownloadblog.com/2017/09/08/leaked-ios-11-gm-details-how-you-will-set-up-face-id-on-your-iphone-8/,Sep. 8, 2017, 9 pages.
Smart Card Alliance, "Security of Proximity Mobile Payments", Online Available at: https://www.securetechalliance.org/resources/pdf/Security_of_Proximity_Mobile_Payments.pdf, May 2009, pp. 1-39.
Wikipedia, "QR code", Available online at: https://en.wikipedia.org/w/index.php?title=OR_code&oldid=452939488, Sep. 28, 2011, pp. 1-9.
Office Action received for Chinese Patent Application No. 201510284715.9, dated Dec. 18, 2019,24 pages (7 pages of English Translation and 17 pages of Official Copy).
Office Action received for Korean Patent Application No. 10-2018-7019643, dated Jan. 6, 2020, 7 pages (3 pages of English Translation and 4 pages of Official Copy).
Applicant Initiated Interview Summary received for U.S. Appl. No. 15/714,887, dated Mar. 17, 2020, 5 pages.
Non-Final Office Action received for U.S. Appl. No. 16/358,453, dated Mar. 19, 2020, 15 pages.
Notice of Acceptance received for Australian Patent Application No. 2020200795, dated Feb. 28, 2020, 3 pages.
Notice of Allowance received for Korean Patent Application No. 10-2017-0022582, dated Feb. 27, 2020, 5 pages (2 pages of English Translation and 3 pages of Official Copy).
Office Action received for Australian Patent Application No. 2017324176, dated Feb. 27, 2020, 3 pages.
Office Action received for Chinese Patent Application No. 201610459968.X, dated Feb. 18, 2020, 8 pages (3 pages of English Translation and 5 pages of Official Copy).
Office Action received for Chinese Patent Application No. 201910354714.5, dated Feb. 3, 2020, 12 pages (7 pages of English Translation and 5 pages of Official Copy).
Office Action received for Danish Patent Application No. PA201970127, dated Feb. 24, 2020, 2 pages.
Office Action received for Japanese Patent Application No. 2018-551159, dated Jan. 27, 2020, 8 pages (4 pages of English Translation and 4 pages of Official Copy).
Final Office Action received for U.S. Appl. No. 14/503,296, dated Apr. 24, 2019, 5 pages.
Final Office Action Received for U.S. Appl. No. 14/871,635, dated May 3, 2019, 32 pages.
Intention to Grant received for Danish Patent Application No. PA201770804, dated Apr. 10, 2019, 2 pages.

(56) References Cited

OTHER PUBLICATIONS

Non-Final Office Action received for U.S. Appl. No. 15/351,230, dated Apr. 18, 2019, 16 pages.
Non-Final Office Action received for U.S. Appl. No. 15/433,320, dated May 2, 2019, 27 pages.
Notice of Allowance received for Japanese Appl. No. 2017-540616, dated Apr. 23, 2019, 4 pages.
Notice of Allowance received for U.S. Appl. No. 15/250,152, dated May 1, 2019, 12 pages.
Notice of Allowance received for U.S. Appl. No. 15/903,456, dated May 1, 2019, 6 pages.
Office Action received for Australian Patent Application No. 2017317605, dated Apr. 11, 2019, 4 pages.
Office Action received for Chinese Patent Application No. 201380080659.6, dated Mar. 4, 2019, 9 pages (5 pages of English Translation and 4 pages of Official Copy).
Office Action received for Chinese Patent Application No. 201810338826.7, dated Apr. 3, 2019, 21 pages (13 pages of English Translation and 8 pages of Official.
Office Action received for Taiwanese Patent Application No. 107138003, dated Mar. 20, 2019, 6 pages (3 pages of English Translation and 3 pages of Official Copy).
Applicant Initiated Interview Summary received for U.S. Appl. No. 15/433,320, dated Feb. 11, 2020, 5 pages.
Applicant-Initiated Interview Summary received for U.S. Appl. No. 14/612,214, dated Feb. 18, 2020, 3 pages.
Intention to Grant received for European Patent Application No. 15168475.0, dated Feb. 4, 2020, 9 pages.
Notice of Allowance received for Japanese Patent Application No. 2016-224506, dated Jan. 24, 2020, 4 pages (1 pages of English Translation and 3 pages of Official Copy).
Notice of Allowance received for Korean Patent Application No. 10-2019-7005925, dated Jan. 21, 2020, 6 pages (2 pages of English Translation and 4 pages of Official Copy).
Notice of Allowance received for U.S. Appl. No. 14/871,635, dated Feb. 3, 2020, 3 pages.
Notice of Allowance received for U.S. Appl. No. 16/147,023, dated Jan. 31, 2020, 7 pages.
Office Action received for Australian Patent Application No. 2020200685, dated Feb. 10, 2020, 4 pages.
Office Action received for Chinese Patent Application No. 201810338038.8, dated Jan. 21, 2020, 26 pages (13 pages of English Translation and 13 pages of Official Copy).
Office Action received for Chinese Patent Application No. 201810338826.7, dated Jan. 16, 2020, 16 Pages (10 pages of English Translation and 6 pages of Official Copy).
Office Action received for Japanese Patent Application No. 2018-113081, dated Jan. 10, 2020, 8 pages (4 pages of English Translation and 4 pages of Official Copy).
Office Action received for Korean Patent Application No. 10-2019-7005136, dated Jan. 28, 2020, 5 pages (2 pages of English Translation and 3 pages of Official Copy).
Sawamura, Toru, "Emergency Proposal; personal information should be immediately unitarily managed", PC fan, Japan, Mainichi Communications Inc., 11th Edition, vol. 11, No. 240, Jun. 15, 2004, pp. 20-21 (Official Copy Only) See Communication under 37 CFR § 1.98(a) (3).
Summons to Attend Oral Proceedings received for European Patent Application No. 15727291.5, dated Jan. 28, 2020, 13 pages.
Summons to Attend Oral Proceedings received for European Patent Application No. 16201205.8, dated Jan. 28, 2020, 18 pages.
Corrected Notice of Allowance received for U.S. Appl. No. 15/866,341, dated Aug. 21, 2019, 3 pages.
Intention to Grant received for Danish Patent Application No. PA201770782, dated Aug. 8, 2019, 2 pages.
Notice of Allowance received for U.S. Appl. No. 15/894,221, dated Aug. 13, 2019, 2 pages.
Office Action received for European Patent Application No. 19171661.2, dated Aug. 7, 2019, 7 pages.

Office Action received for Korean Patent Application No. 10-2017-0022582, dated Jul. 31, 2019, 5 pages (2 pages of English Translation and 3 pages of Official Copy).
Notice of Acceptance received for Australian Patent Application No. 2018202559, dated Oct. 21, 2019, 3 pages.
Office Action received for Indian Patent Application No. 201617039493, dated Oct. 21, 2019, 6 pages.
Nomad, Studio, "Hajimete-no-Smartphone-no-Komatta-wo-Sakutto-Kaiketsu (Easy solution to troubles at your first smartphone)", Kazukuni Saito of Shuwa System Co. Ltd., 1st Ed, Jul. 1, 2016, 20 pages (Official Copy only) {See Communication under 37 CFR § 1.98(a) (3)}.
Notice of Allowance received for U.S. Appl. No. 16/147,023, dated Feb. 27, 2020, 2 pages.
Office Action received for Chinese Patent Application No. 201811460172.1, dated Jan. 21, 2020, 17 pages (8 pages of English Translation and 9 pages of Official Copy).
Office Action received for Japanese Patent Application No. 2018-158482, dated Jan. 10, 2020, 9 pages (5 pages of English Translation and 4 pages of Official Copy).
Result of Consultation received for European Patent Application No. 16803996.4, dated Feb. 17, 2020, 14 pages.
Decision to Grant received for European Patent Application No. 13795330.3, dated Jan. 16, 2020, 2 pages.
International Search Report and Written Opinion received for PCT Patent Application No. PCT/US2019/035092, dated Jan. 16, 2020, 16 pages.
Non-Final Office Action received for U.S. Appl. No. 16/542,084, dated Jan. 24, 2020, 21 pages.
Non-Final Office Action received for U.S. Appl. No. 16/581,614, dated Jan. 29, 2020, 13 pages.
Notice of Allowance received for Korean Patent Application No. 10-2019-7014988, dated Jan. 19, 2020, 4 pages (1 page of English Translation and 3 pages of Official Copy).
Office Action received for Chinese Patent Application No. 201910278273.5, dated Jan. 3, 2020, 17 pages (10 pages of English Translation and 7 pages of Official Copy).
Summons to Attend Oral Proceedings received for European Patent Application No. 16804040.0, dated Jan. 24, 2020, 11 pages.
Office Action received for Australian Patent Application No. 2020200685, dated Apr. 20, 2020, 3 pages.
International Preliminary Report on Patentability received for PCT Patent Application No. PCT/US2018/049289, dated Mar. 19, 2020, 9 pages.
International Preliminary Report on Patentability received for PCT Patent Application No. PCT/US2018/015603, dated Mar. 19, 2020, 8 pages.
Notice of Acceptance received for Australian Patent Application No. 2020201306, dated Mar. 12, 2020, 3 pages.
Notice of Allowance received for Korean Patent Application No. 10-2019-7014494, dated Mar. 19, 2020, 4 pages (1 page of English Translation and 3 pages of Official Copy).
Office Action received for Australian Patent Application No. 2017284013, dated Mar. 19, 2020, 3 pages.
Office Action received for European Patent Application No. 17853654.6, dated Mar. 23, 2020, 4 pages.
Office Action received for Korean Patent Application No. 10-2019-7038235, dated Mar. 9, 2020, 15 pages (7 pages of English Translation and 8 pages of Official Copy).
Notice of Allowance received for Korean Patent Application No. 10-2020-0048600, dated Apr. 30, 2020, 5 pages (2 pages of English Translation and 3 pages of Official Copy).
Summons to Attend Oral Proceedings received for European Patent Application No. 15728352.4, dated May 12, 2020, 25 pages.
Brief Communication regarding Oral Proceedings received for European Patent Application No. 16201205.8, dated May 29, 2020, 29 pages.
Decision to Refuse received for European Patent Application No. 15728352.4, dated May 28, 2020, 25 pages.
Office Action received for Chinese Patent Application No.

(56) References Cited

OTHER PUBLICATIONS 201510284715.9, dated Apr. 14, 2020, 19 pages (7 pages of English Translation and 12 pages of Official Copy).

\* cited by examiner

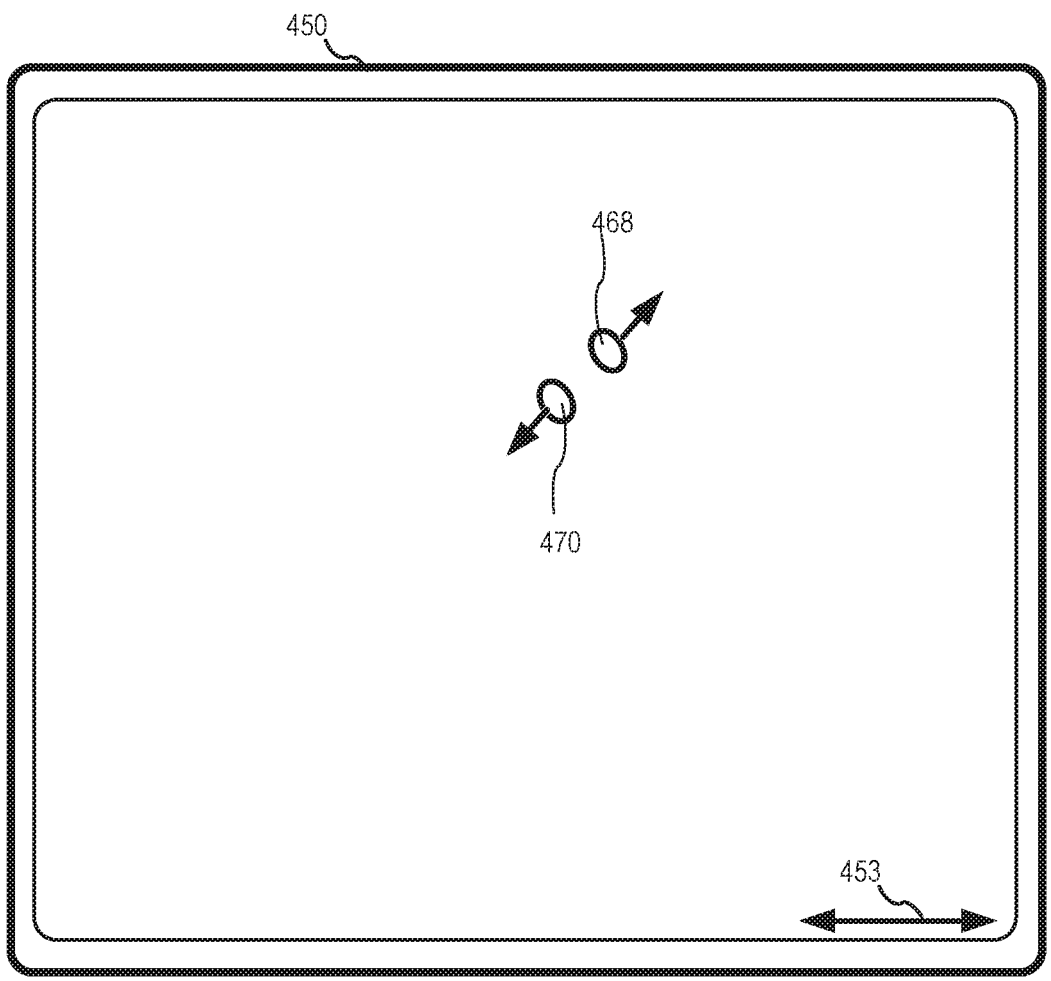
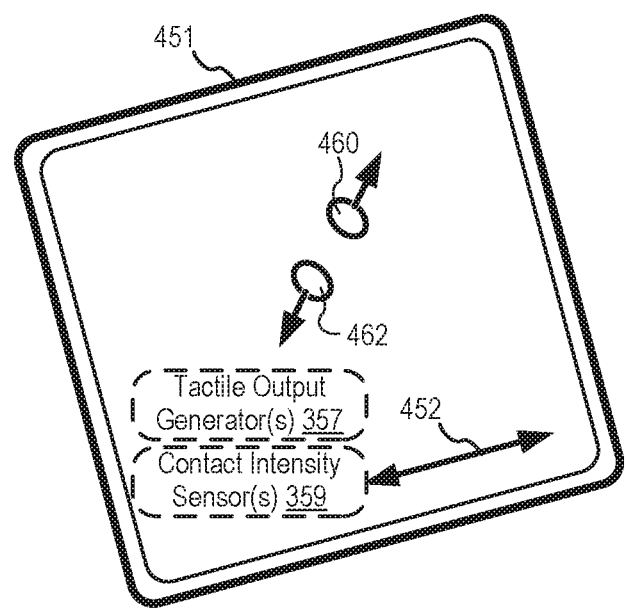
*FIG. 4B*

600

602 Receive a request to link a payment account associated with a credit card to a respective device. The request includes information about the credit card.

> 604 Receive a request to import credit card information.

> 606 Receive a request to manually enter credit card information.

608 In response to receiving the request:

610 Determine whether further verification is needed to link the payment account to the respective device.

612 In accordance with a determination that further verification is not needed to link the payment account to the respective device, link the payment account to the respective device and provide an indication that the payment account has been linked to the respective device.

606 In response to receiving the request:

614 In accordance with a determination that further verification is needed to link the payment account to the respective device, provide an indication that further verification is needed to link the payment account to the respective device.

616 Display a plurality of communication method affordances. Each communication method affordance is associated with a respective communication method for a verification communication. The plurality of communication method affordances is based on communication received from the financial institution.

618 Receive a selection of a communication method affordance of the plurality of communication method affordances. In response to receiving the selection of the communication method affordance, transmit, to the financial institution, an indication of the respective communication method of the selected communication method affordance. The verification communication is based on the communication method affordance.

620 Receive a verification communication from a financial institution associated with the payment account, the verification communication for verification to link the payment account to the respective device.

622 Receive a request from a user to initiate a verification communication with the financial institution. In response to receiving the request, initiate the verification communication with the financial institution associated with the payment account. The verification communication is for verification to link the payment account to the respective device.

FIG. 6B

624 Receive a notification at the electronic device. The notification comprises a verification code for linking the payment account to the respective device. In response to receiving the notification, link the payment account to the respective device.

626 Display a confirmation on the device indicating that the payment account has been linked to the respective device comprising displaying a notification on the device indicating that the payment account has been linked to the respective device.

628 Receive a primary account number from the financial institution for use in authorizing payments from the payment account using the respective device. The primary account number is different than the account number displayed on the credit card.

630 Assign the primary account number to the respective device, wherein the primary account number is different than the account number displayed on the credit card.

632 Determine whether the respective device is configured to require an unlock authorization for unlocking the respective device. In accordance with a determination that the respective device is not configured to require an unlock authorization, display, on the display, an unlock authorization configurator for configuring the respective device to require unlock authorization for unlocking the respective device.

634 Receive a second request to link a second payment account associated with a second credit card to the respective device. The second request includes information about the second credit card. Link the second payment account to the respective device and provide an indication that the second payment account has been linked to the respective device. Receive a selection from among at least the payment account and the second payment account. The selection specifies the default payment account to be used for payment transactions.

---
802 Receive authorization to proceed with a payment transaction for a predetermined period of time.

---

804 Detect, by the short-range communication radio, presence of a field generated by a contactless payment transaction terminal.

806 In response to detecting presence of the field generated by the contactless payment transaction terminal, determine whether authorization to proceed with a payment transaction is provided.

---
808 Detect a respective fingerprint on a fingerprint sensor of the electronic device. In response to detecting the respective fingerprint on the fingerprint sensor, determine whether the fingerprint is consistent with an enrolled fingerprint that is enabled to authorize payment transactions.

---
810 Display an electronic wallet.

---

812 In accordance with a determination that authorization to proceed with the payment transaction has been provided, proceed with the payment transaction with the contactless payment transaction terminal.

---
814 Determine whether the payment transaction is successfully completed. In response to determining the payment transaction is successfully completed, play, at the electronic device, a success audio alert indicating that the payment transaction is successfully completed. In response to determining the payment transaction is successfully completed, cause, at the electronic device, a success haptic alert indicating that the payment transaction is successfully completed.

816 In accordance with a determination that authorization to proceed with the payment transaction has not been provided:

818 Provide an indication requesting authorization to proceed with the payment transaction.

820 Detect, by the short-range communication radio, that the device is no longer in range of the field generated by the contactless payment transaction terminal. In response to detecting that the device is no longer in range of the field, display a plurality of payment card affordances associated with different payment accounts. Receive authorization to proceed with the payment transaction for a predetermined period of time with one of the payment accounts.

822 Provide an indication that a default payment card affordance of the plurality of payment card affordances is selected as a default payment account. The default primary account number associated with the default payment card affordance is selected for use in the payment transaction.

824 Receive a selection of an alternate payment card affordance of the plurality of payment card affordances. The alternate payment card affordance is associated with a respective alternate primary account number. In response to receiving the selection of the alternate payment card affordance, select the respective alternate primary account number for use in the payment transaction.

826 Receive authorization to proceed with a payment transaction for a predetermined period of time.

828 Receive the authorization by receiving a payment passcode.

830 Receive the authorization by detecting a fingerprint.

832 Display a graphical indication that authorization to proceed has been provided.

834 Proceed with the payment transaction.

1002 Display an electronic wallet comprising a respective representation of a payment account. The respective representation of the payment account includes first transaction information for a first payment transaction associated with the payment account.

1004 Detect a second payment transaction associated with the payment account using the electronic device.

1006 In response to detecting the second payment transaction, and prior to receiving information about the second payment transaction from the financial institution involved in the second transaction:

1008 Display second transaction information for the second payment transaction. The second transaction information is based on information locally available to the electronic device.

1010 Display the second transaction information for the second payment transaction comprises replacing display of the first transaction information with display of the second transaction information.

1012 Receive first additional information about the second payment transaction from an intermediary institution involved in the second transaction. In response to receiving the first additional information about the second payment transaction from the intermediary institution involved in the second transaction, update display of the second transaction information for the second payment transaction to include the first additional information about the second payment transaction.

FIG. 10A

1202 Display a user interface for a first application. The user interface for the first application includes a payment affordance associated with a payment transaction.

1204 The first application is a third-party application installed on the electronic device.

1206 The first application includes a website accessed through a web browser installed on the electronic device.

1208 Detect selection of the payment affordance.

1210 In response to detecting selection of the payment affordance:

1212 Transfer first transaction information about the payment transaction from the first application to a second application.

1214 The second application is the operating system of the electronic device. The second application has access to an electronic wallet that includes second transaction information.

1216 The second application is a first-party application provided by a provider of the operating system of the electronic device. The second application has access to an electronic wallet that includes second transaction information.

```
┌─────────────────────────────────────────────────────────────────────────┐
│  1210 In response to detecting selection of the payment affordance:     │
│  ┌───────────────────────────────────────────────────────────────────┐  │
│  │  1218 Display a user interface for the second application. The    │  │
│  │  user interface for the second application includes the first     │  │
│  │  transaction information received from the first application and  │  │
│  │  includes second transaction information provided by the second   │  │
│  │  application. The second transaction information is not available │  │
│  │  to the first application.                                        │  │
│  │  ┌─────────────────────────────────────────────────────────────┐  │  │
│  │  │ 1220 Display the user interface for the second application │  │  │
│  │  │ partially covers the user interface for the first           │  │  │
│  │  │ application, leaving at least part of the user interface    │  │  │
│  │  │ for the first application visible.                          │  │  │
│  │  └─────────────────────────────────────────────────────────────┘  │  │
│  │  ┌─────────────────────────────────────────────────────────────┐  │  │
│  │  │ 1222 Display the user interface for the second application │  │  │
│  │  │ comprises vertically sliding the user interface for the     │  │  │
│  │  │ second application onto the display from the bottom of the  │  │  │
│  │  │ display to partially cover the user interface for the first │  │  │
│  │  │ application and leaving at least part of the user interface │  │  │
│  │  │ for the first application visible.                          │  │  │
│  │  └─────────────────────────────────────────────────────────────┘  │  │
│  └───────────────────────────────────────────────────────────────────┘  │
└─────────────────────────────────────────────────────────────────────────┘
```

1224 Receive a selection of a first purchase detail affordance displayed on the user interface for the second application. In response to receiving selection, display one or more affordances for selecting alternate values. Receive selection of an alternate value. In response to receiving selection of the alternate value, update the second transaction information to include the alternate value as the first purchase detail.

1226 The first purchase detail of the payment transaction is part of the first transaction information from the first application.

1228 The first purchase detail is part of the second transaction information provided by the second application.

1402
Link a plurality of payment accounts are to the electronic device.

1404
Receive a payment transaction request of a payment transaction, wherein the first payment account and the second payment account are both available to provide payment for the payment transaction.

1406
In response to receiving the payment transaction request:

1408
Obtain payment account selection information.

1410
In accordance with a determination, based on the payment account selection information, that first payment transaction criteria are met, provide payment in the payment transaction using the first payment account.

1412
In accordance with a determination, based on the payment account selection information, that second payment transaction criteria are met, provide payment in the payment transaction using the second payment account.

1602
Authorize a payment transaction for a purchased item using a payment account linked to the electronic device, wherein the purchased item is selected from the set comprising: a physical good and a real-world service.

1604
After authorizing the payment transaction:

1606
Determine that the purchased item is associated with a digital item, wherein the digital item is different from the purchased item.

1608
Display an indication of the digital item that is associated with the purchased item.

1802
Display a user interface for a communication application that includes a user interface indicative of ongoing communication between a user of the device and one or more other participants, wherein the user interface for the communication application includes a payment affordance.

1804
While displaying the user interface indicative of the ongoing communication, detect activation of the payment affordance.

1806
In response to detecting activation of the payment affordance, initiate a payment transaction between the user and the one or more other participants in the ongoing communication.

2002
Display a user interface for a first application, wherein the user interface for the first application includes information identifying a plurality of retailers.

2004
Receive a request to initiate a payment transaction with a first retailer of the plurality of retailers.

2006
In response to receiving the request to initiate a payment transaction with the first retailer:

2008
In accordance with a determination that an application of the first retailer is available on the device, invoke the application of the first retailer, wherein the application of the first retailer enables the user to initiate a payment transaction with the first retailer.

2010
In accordance with a determination that an application of the first retailer is not available on the device, provide the user with an option for proceeding with the payment transaction without invoking the application of the first retailer.

2202
Obtain a history of payment transactions associated with one or more payment accounts linked to the device.

↓

2204
Determine a current location of the device.

↓

2206
Determine, based on at least a portion of the history of payment transactions and the current location of the device, a suggested product for purchase from a retailer.

↓

2208
Display an indication of the suggested product for purchase.

↓

2210
Display an affordance associated with a payment transaction of the suggested product.

↓

2212
While displaying the affordance associated with the payment transaction, detect activation of the affordance associated with the payment transaction.

↓

2214
In response to detecting activation of the affordance associated with the payment transaction, initiate a process for authorizing the payment transaction of the suggested product.

*FIG. 22*

USER INTERFACE FOR PAYMENTS

CROSS-REFERENCE TO RELATED APPLICATIONS

This application claims priority to U.S. patent application Ser. No. 15/992,722, entitled "USER INTERFACE FOR PAYMENTS," filed May 30, 2018, which claims priority to U.S. patent application Ser. No. 14/503,072, entitled "USER INTERFACE FOR PAYMENTS," filed Sep. 30, 2014, which claims priority to U.S. Provisional Application Ser. No. 62/004,886, entitled "USER INTERFACE FOR PAYMENTS," filed May 29, 2014, and U.S. Provisional Application Ser. No. 62/047,545, entitled "USER INTERFACE FOR PAYMENTS," filed Sep. 8, 2014. The contents of each of these applications are hereby incorporated by reference in their entireties.

This application relates to the following provisional applications: U.S. Patent Application Ser. No. 61/912,727, entitled "PROVISIONING AND AUTHENTICATING CREDENTIALS ON AN ELECTRONIC DEVICE", filed Dec. 6, 2013; U.S. Patent Application Ser. No. 61/909,717, entitled "PROVISIONING OF CREDENTIALS ON AN ELECTRONIC DEVICE USING PASSWORDS COMMUNICATED OVER VERIFIED CHANNELS", filed Nov. 27, 2013; U.S. Patent Application Ser. No. 62/004,182, entitled "ONLINE PAYMENTS USING A SECURE ELEMENT OF AN ELECTRONIC DEVICE", filed May 28, 2014; U.S. Patent Application Ser. No. 61/920,029, entitled "DELETION OF CREDENTIALS FROM AN ELECTRONIC DEVICE", filed Dec. 23, 2013; U.S. Patent Application Ser. No. 61/899,737, entitled "USING BIOAUTHENTICATION IN NEAR-FIELD-COMMUNICATION TRANSACTIONS", filed Nov. 4, 2013; U.S. Patent Application Ser. No. 61/905,035, entitled "GENERATING TRANSACTION IDENTIFIERS", filed Nov. 15, 2013; U.S. Patent Application Ser. No. 61/905,042, entitled "ELECTRONIC RECEIPTS FOR NFC-BASED FINANCIAL TRANSACTIONS", filed Nov. 15, 2013; U.S. Patent Application Ser. No. 62/004,798, entitled "FINANCIAL-TRANSACTION NOTIFICATIONS", filed May 29, 2014; U.S. Patent Application Ser. No. 62/004,837, entitled "METHODS FOR MANAGING PAYMENT APPLETS ON A SECURE ELEMENT TO CONDUCT MOBILE PAYMENT TRANSACTIONS", filed May 29, 2014; U.S. Patent Application Ser. No. 62/004,840, entitled "METHODS FOR OPERATING A PORTABLE ELECTRONIC DEVICE TO CONDUCT MOBILE PAYMENT TRANSACTIONS", filed May 29, 2014; U.S. Patent Application Ser. No. 62/004,835, entitled "METHODS FOR USING A PRIMARY USER DEVICE TO PROVISION CREDENTIALS ONTO A SECONDARY USER DEVICE", filed May 29, 2014; U.S. Patent Application Ser. No. 62/004,832, entitled "METHODS FOR USING A RANDOM AUTHORIZATION NUMBER TO PROVIDE ENHANCED SECURITY FOR A SECURE ELEMENT", filed May 29, 2014; U.S. Patent Application Ser. No. 62/004,338, entitled "USER DEVICE SECURE PARTICIPATION IN TRANSACTIONS VIA LOCAL SECURE ELEMENT DETECTION OF MECHANICAL INPUT", filed May 29, 2014; and U.S. Utility patent application Ser. No. 14/092,205, entitled "SECURE PROVISIONING OF CREDENTIALS ON AN ELECTRONIC DEVICE", filed Nov. 27, 2013; which are hereby incorporated by reference in their entirety.

TECHNICAL FIELD

This relates generally to electronic devices for making payment transactions, including but not limited to electronic devices for use with contactless payment systems and payments over the Internet.

BACKGROUND

The use of electronic devices for making payments at point-of-sale terminals and over the Internet has increased significantly in recent years. Exemplary point-of-sale terminals include Near Field Communication-enabled (NFC-enabled) terminals, bluetooth-enabled terminals, and bar-code scanner-enabled terminals. Electronic devices can be used in conjunction with these exemplary terminals to enable the user of the electronic device to make a payment for the purchase of, for example, a good or service. Similarly, electronic devices can be used in conjunction with Internet shopping carts to enable the user to make a payment by entering their credit card information.

SUMMARY

Some techniques for making payments using electronic devices, however, are generally cumbersome and inefficient. For example, making a purchase using an NFC-enabled device at a point-of-sale terminal frequently requires navigating a complex and time-consuming user interface. For another example, a user wanting to make a purchase through a website or mobile application of a retailer may need to manually enter a credit card number and shipping address information for making the purchase, an inefficient and cumbersome procedure. For another example, making a purchase using an NFC-enabled device at a point-of-sale terminal frequently requires navigating a complex and time-consuming user interface to select the payment account that should be charged. For another example, users who purchase a real-world good or service are frequently not notified of a digital item and/or do not have convenient access to a digital item, such as software, that corresponds to the purchased item. For another example, making a payment requires navigating a complex and time-consuming user interface to select the recipients of the payment. For another example, navigating a user interface to make a purchase from a retailer is using the retailer's application is inefficient. For another example, accessing various applications and navigating their complex user interface to make a repeat or related purchase of a product is inefficient. In addition, existing techniques take longer than necessary, thereby wasting energy. This latter consideration is particularly important in battery-operated devices.

Accordingly, there is a need for electronic devices with faster, more efficient methods and interfaces for making payment transactions. Such methods and interfaces optionally complement or replace conventional methods for making payments. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices for making payment transactions are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a short-range communication radio. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. Executable instructions for performing functions may be included in a computer readable storage medium or other computer program product configured for execution by one or more processors.

In accordance with some embodiments, a method is performed at an electronic device with a display. The method includes receiving a request to link a payment account associated with a credit card to a respective device, wherein the request includes information about the credit card. The method includes, in response to receiving the request, determining whether further verification is needed to link the payment account to the respective device. The method includes, in accordance with a determination that further verification is not needed to link the payment account to the respective device, linking the payment account to the respective device and providing an indication that the payment account has been linked to the respective device. The method also includes, in accordance with a determination that further verification is needed to link the payment account to the respective device, providing an indication that further verification is needed to link the payment account to the respective device.

In accordance with some embodiments, a method is performed at an electronic device with a display and a short-range communication radio. The method includes detecting, by the short-range communication radio, presence of a field generated by a contactless payment transaction terminal. The method includes, in response to detecting presence of the field generated by the contactless payment transaction terminal, determining whether authorization to proceed with a payment transaction is provided. The method includes, in accordance with a determination that authorization to proceed with the payment transaction has been provided, proceeding with the payment transaction with the contactless payment transaction terminal. The method also includes, in accordance with a determination that authorization to proceed with the payment transaction has not been provided, providing an indication requesting authorization to proceed with the payment transaction.

In accordance with some embodiments, a method is performed at an electronic device with a display. The method includes displaying, on the display, an electronic wallet comprising a respective representation of a payment account, wherein the respective representation of the payment account includes first transaction information for a first payment transaction associated with the payment account. The method includes detecting a second payment transaction associated with the payment account using the electronic device. The method also includes, in response to detecting the second payment transaction, and prior to receiving information about the second payment transaction from the financial institution involved in the second transaction, displaying second transaction information for the second payment transaction, the second transaction information based on information locally available to the electronic device.

In accordance with some embodiments, a method is performed at an electronic device with a display. The method includes displaying, on the display, a user interface for a first application, wherein the user interface for the first application includes a payment affordance associated with a payment transaction. The method includes detecting selection of the payment affordance. The method also includes, in response to detecting selection of the payment affordance, transferring first transaction information about the payment transaction from the first application to a second application; and displaying, on the display, a user interface for the second application, wherein the user interface for the second application includes the first transaction information received from the first application and includes second transaction information provided by the second application, wherein the second transaction information is not available to the first application.

In accordance with some embodiments, a method is performed at an electronic device with a processor and memory. The method includes: linking a plurality of payment accounts to the electronic device, wherein the plurality of payment accounts include a first payment account and a second payment account that is different from the first payment account; receiving a payment transaction request of a payment transaction, wherein the first payment account and the second payment account are both available to provide payment for the payment transaction; in response to receiving the payment transaction request: obtaining payment account selection information; in accordance with a determination, based on the payment account selection information, that first payment transaction criteria are met, providing payment in the payment transaction using the first payment account; and in accordance with a determination, based on the payment account selection information, that second payment transaction criteria are met, providing payment in the payment transaction using the second payment account.

In accordance with some embodiments, a method is performed at an electronic device with a display, a processor, and memory. The method includes: authorizing a payment transaction for a purchased item using a payment account linked to the electronic device, wherein the purchased item is selected from the set comprising: a physical good and a real-world service; and after authorizing the payment transaction: determining that the purchased item is associated with a digital item, wherein the digital item is different from the purchased item; and displaying, on a display of the device, an indication of the digital item that is associated with the purchased item.

In accordance with some embodiments, a method is performed at an electronic device with a display, a processor, and memory. The method includes: displaying a user interface for a communication application that includes a user interface indicative of ongoing communication between a user of the device and one or more other participants, wherein the user interface for the communication application includes a payment affordance; while displaying the user interface indicative of the ongoing communication, detecting activation of the payment affordance; and in response to detecting activation of the payment affordance, initiating a payment transaction between the user and the one or more other participants in the ongoing communication.

In accordance with some embodiments, a method is performed at an electronic device with a display, a processor, and memory. The method includes: displaying a user interface for a first application, wherein the user interface for the first application includes information identifying a plurality of retailers; receiving a request to initiate a payment transaction with a first retailer of the plurality of retailers; in response to receiving the request to initiate a payment transaction with the first retailer: in accordance with a determination that an application of the first retailer is available on the device, invoking the application of the first retailer, wherein the application of the first retailer enables the user to initiate a payment transaction with the first retailer; and in accordance with a determination that an application of the first retailer is not available on the device, providing the user with an option for proceeding with the payment transaction without invoking the application of the first retailer.

In accordance with some embodiments, a method is performed at an electronic device with a display, a processor, and memory. The method includes: obtaining a history of payment transactions associated with one or more payment accounts linked to the device; determining a current location of the device; determining, based on at least a portion of the history of payment transactions and the current location of the device, a suggested product for purchase from a retailer; displaying an indication of the suggested product for purchase; displaying an affordance associated with a payment transaction of the suggested product; while displaying the affordance associated with the payment transaction, detecting activation of the affordance associated with the payment transaction; and in response to detecting activation of the affordance associated with the payment transaction, initiating a process for authorizing the payment transaction of the suggested product.

Thus, multifunction devices are provided with faster, more efficient methods and interfaces for handling payment transactions, thereby increasing the effectiveness, efficiency, and user satisfaction with such devices. Such methods and interfaces may complement or replace conventional methods for handling payment transactions.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6C are flow diagrams illustrating a method for linking a payment account to a respective device in accordance with some embodiments.

FIGS. 8A-8B are flow diagrams illustrating a method for proceeding with a payment transaction using a short-range communication radio in accordance with some embodiments.

FIGS. 10A-10B are flow diagrams illustrating a method for displaying transaction information of a payment account in accordance with some embodiments.

FIGS. 12A-12C are flow diagrams illustrating a method for making a payment transaction in accordance with some embodiments.

FIG. 14 is a flow diagram illustrating a method for selecting a payment account from among available payment accounts in accordance with some embodiments.

FIG. 16 is a flow diagram illustrating a method for displaying an indication of a digital item associated with a purchased item in accordance with some embodiments.

FIG. 18 is a flow diagram illustrating a method for initiating a payment transaction with participants of an ongoing communication in accordance with some embodiments.

FIG. 20 is a flow diagram illustrating a method for invoking an application of a retailer based on the availability of the application in accordance with some embodiments.

FIG. 22 is a flow diagram illustrating a method for providing a purchase recommendation in accordance with some embodiments.

DESCRIPTION OF EMBODIMENTS

Figure 1A:
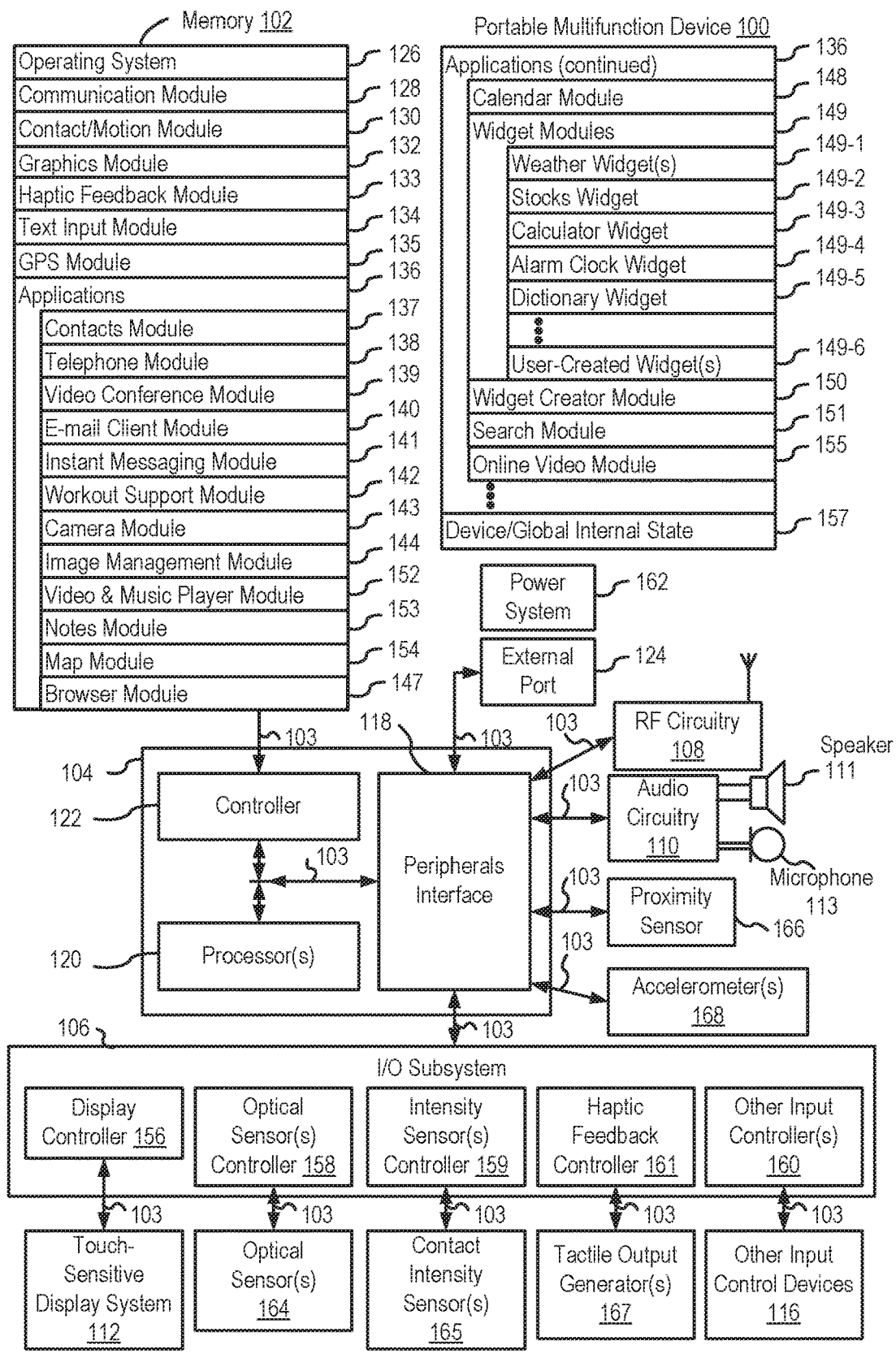
FIG. 1A is a block diagram illustrating a portable multifunction device with a display in accordance with some embodiments.

Below, FIGS. 1A-1B, 2, 3, and 4A-4B, and 23 provide a description of exemplary devices for performing techniques related to payments. FIGS. 5, 7, 9, 11, 13, 15, 17, 19, and 21 illustrate exemplary user interfaces for payments. The user interfaces in the figures are also used to illustrate the processes described below, including the processes in FIGS. 6, 8, 10, 12, 14, 16, 18, 20, and 22.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
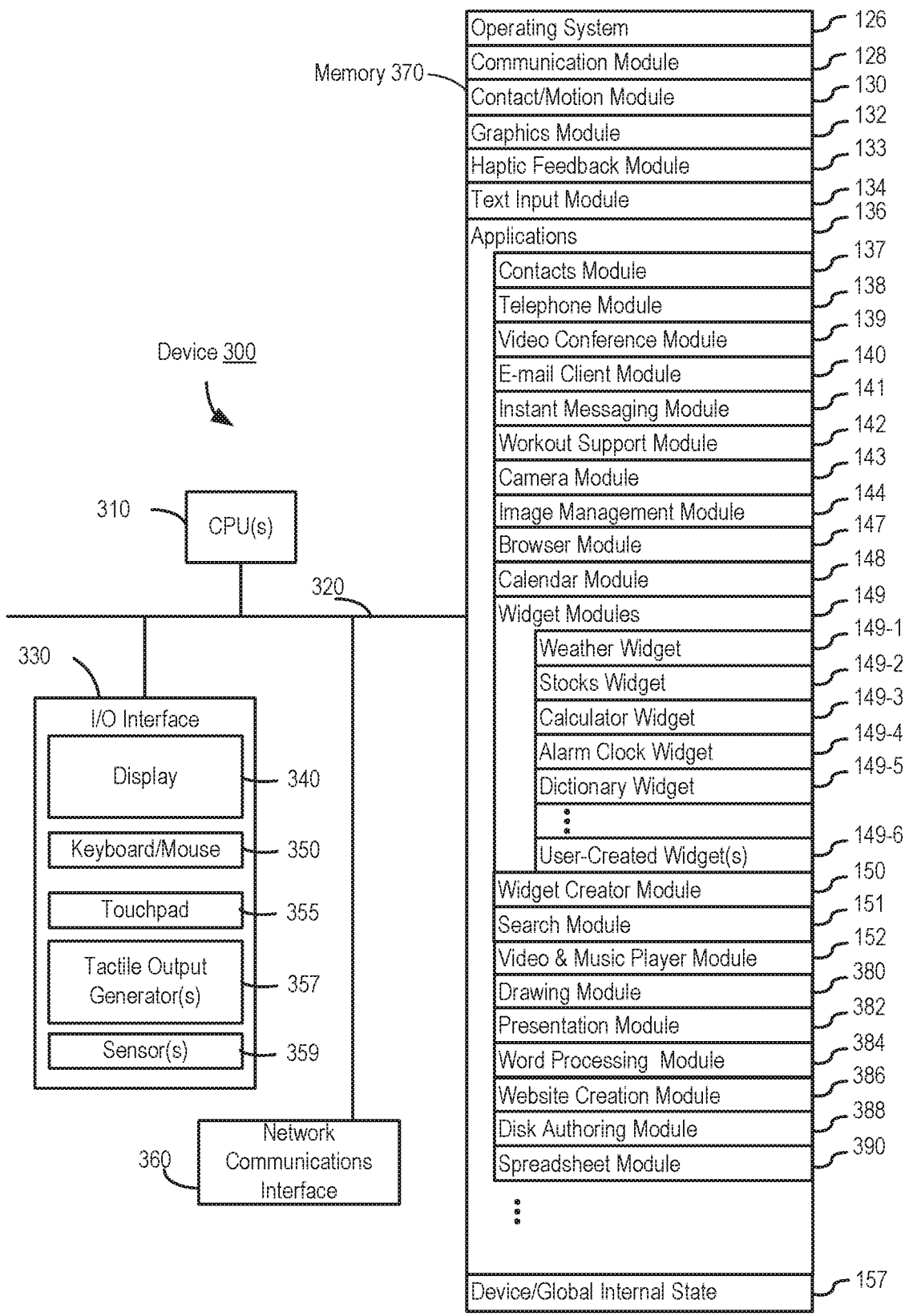
FIG. 3 is a block diagram of an exemplary multifunction device with a display in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
  Contacts module 137 (sometimes called an address book or contact list);
  Telephone module 138;
  Video conferencing module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
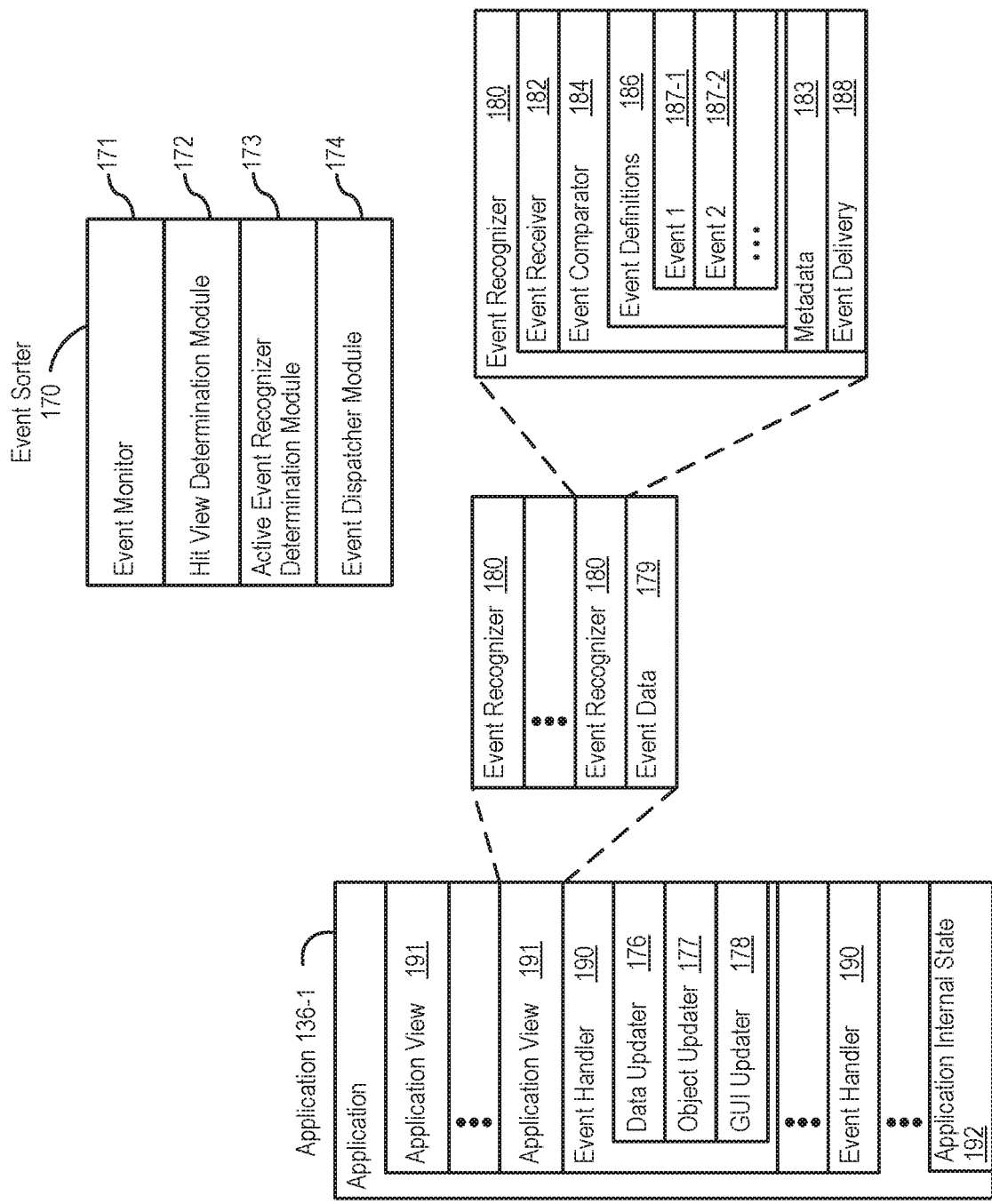
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
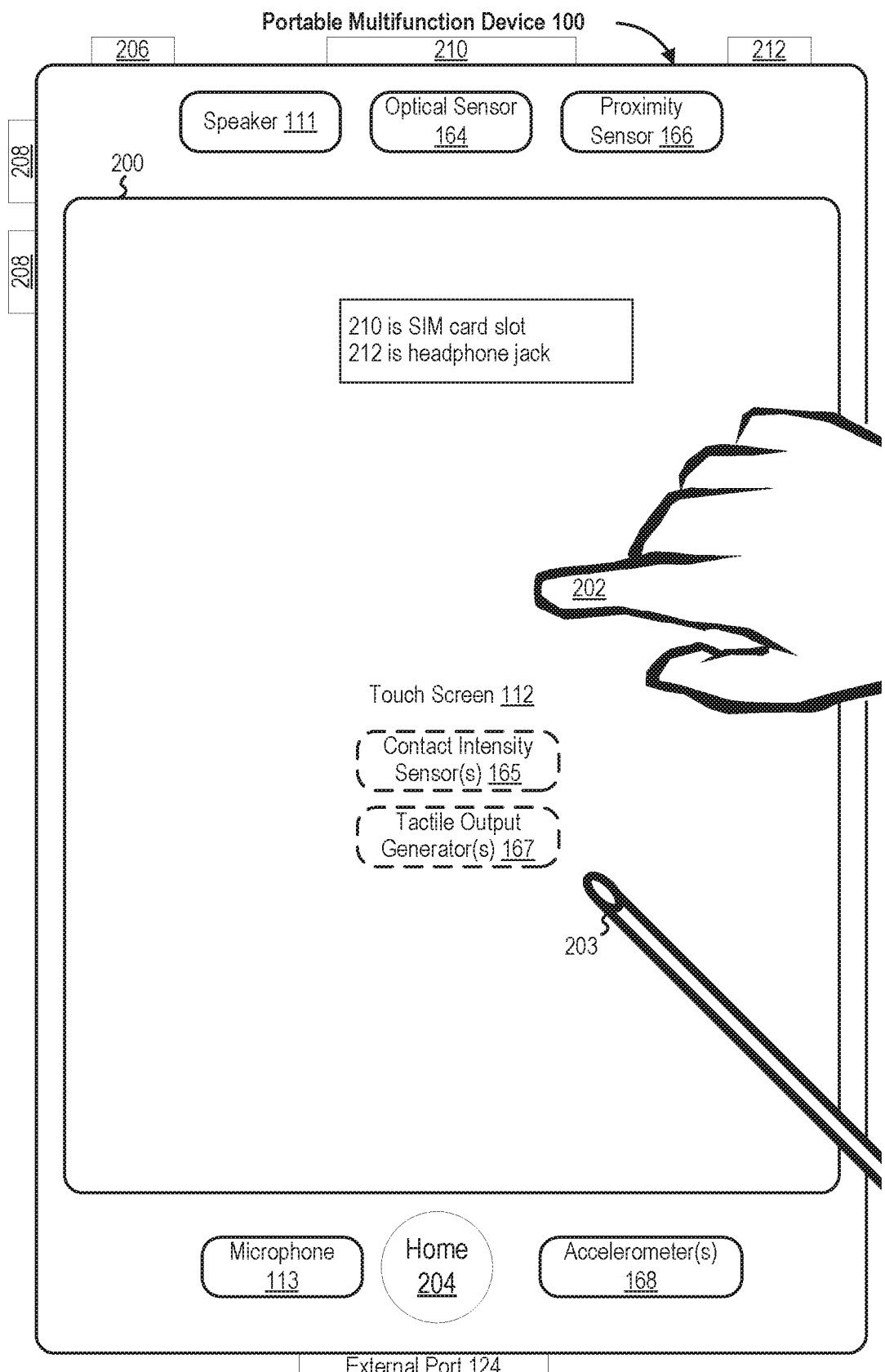
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
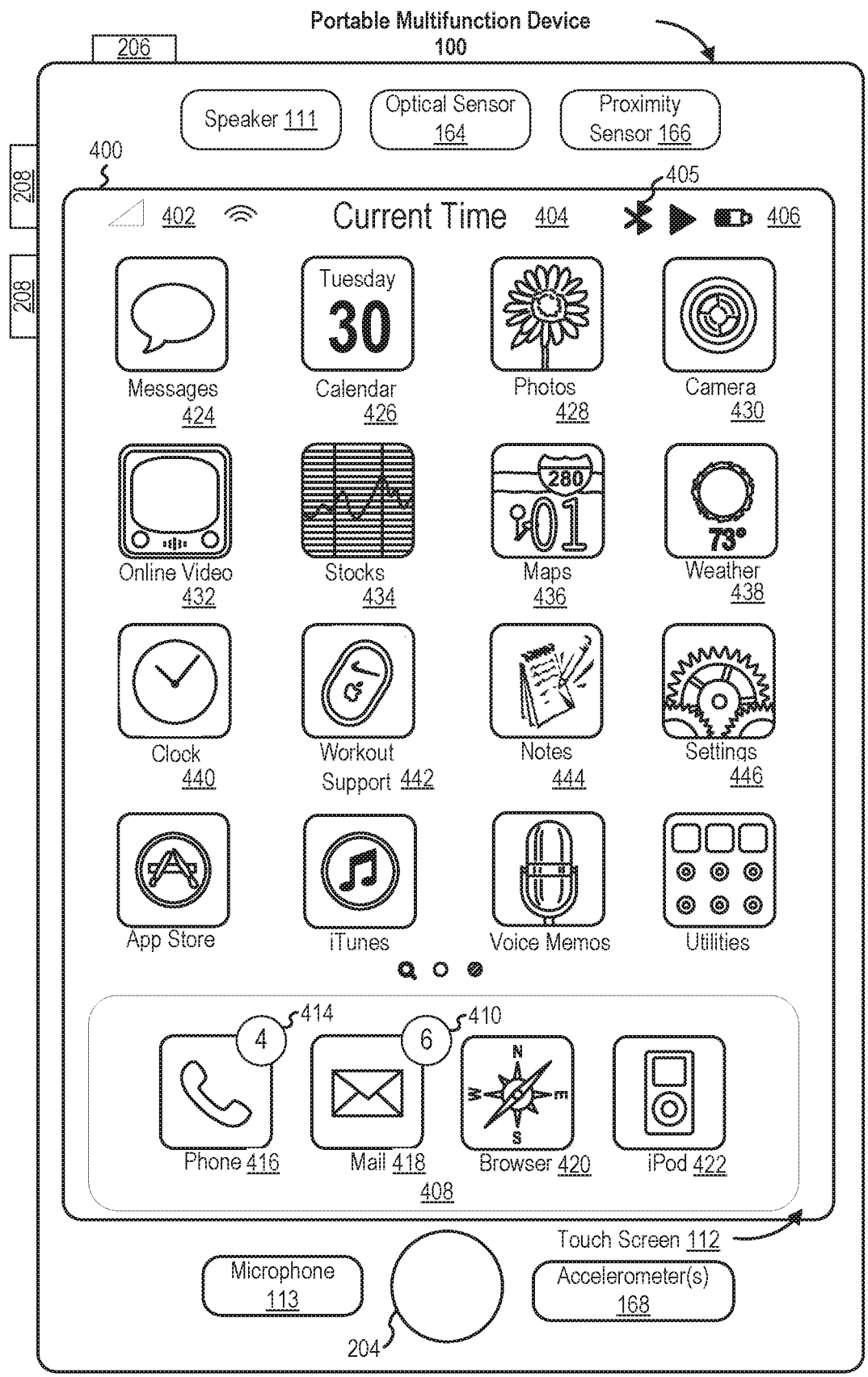
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

Attention is now directed towards embodiments of user interfaces ("UI") and associated processes that may be implemented on a multifunction device with a display, such as device 300 or portable multifunction device 100.

FIGS. 5A-5I illustrate exemplary user interfaces for linking a payment account to a respective device in accordance with some embodiments. The user interfaces in these figures are used to illustrate the processes described below, including the process in FIGS. 6A-6C.

FIGS. 5A-5E illustrate exemplary user interfaces for receiving a request to link a payment account, such as a bank account or revolving credit account, associated with a credit card (e.g., a physical credit card or debit card issued to a user) to a respective device (e.g., a cell phone, a laptop, a wearable electronic device) in accordance with some embodiments. For example, the request can be to import credit card details from a remote server or account, such as iTunes or an account associated with iTunes, or to manually entering card details. The request includes information about the credit card (e.g., credit card Primary Account Number (PAN) or security code).

Figure 5A:
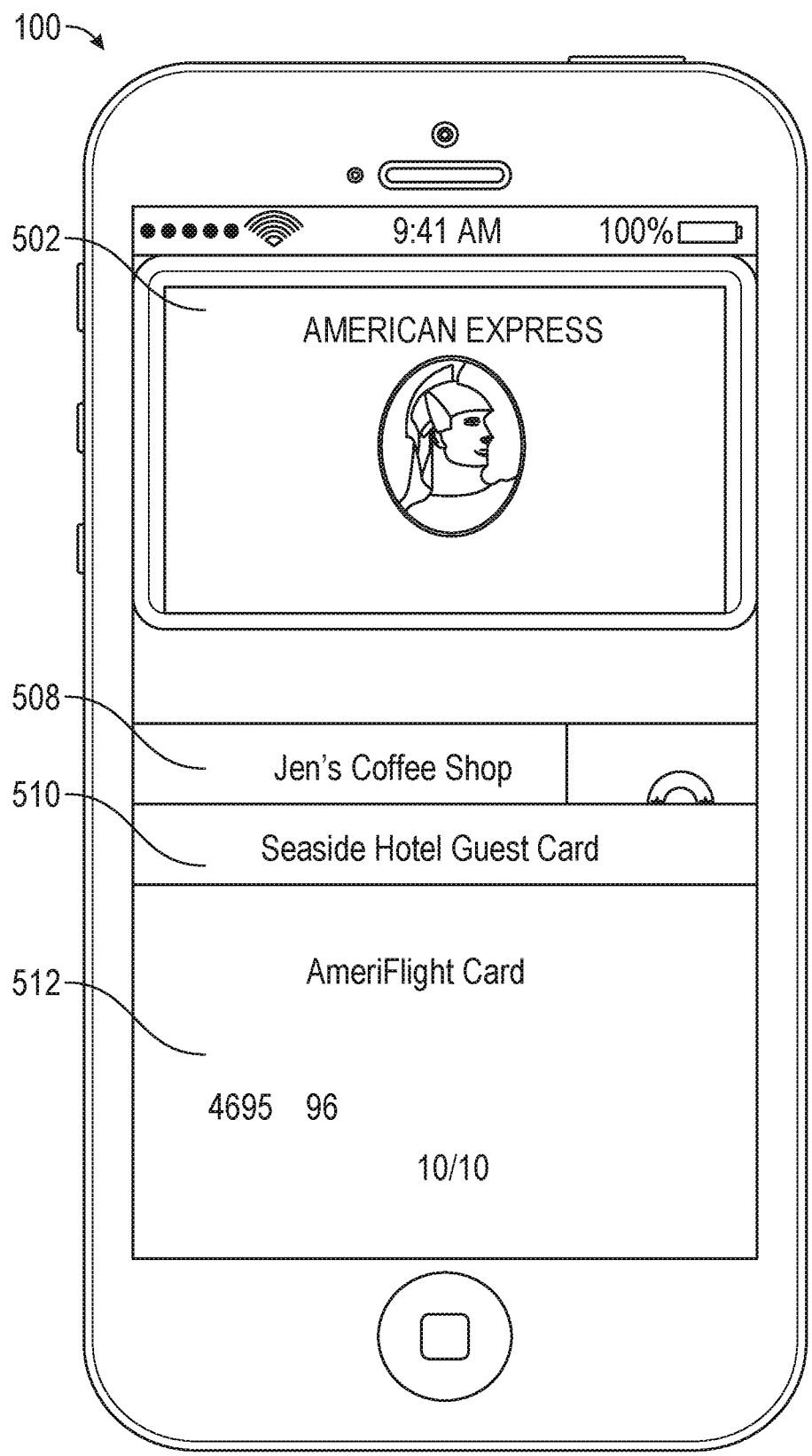
FIGS. 5A-5I illustrate exemplary user interfaces for linking a payment account to a respective device in accordance with some embodiments.
Figure 5B:
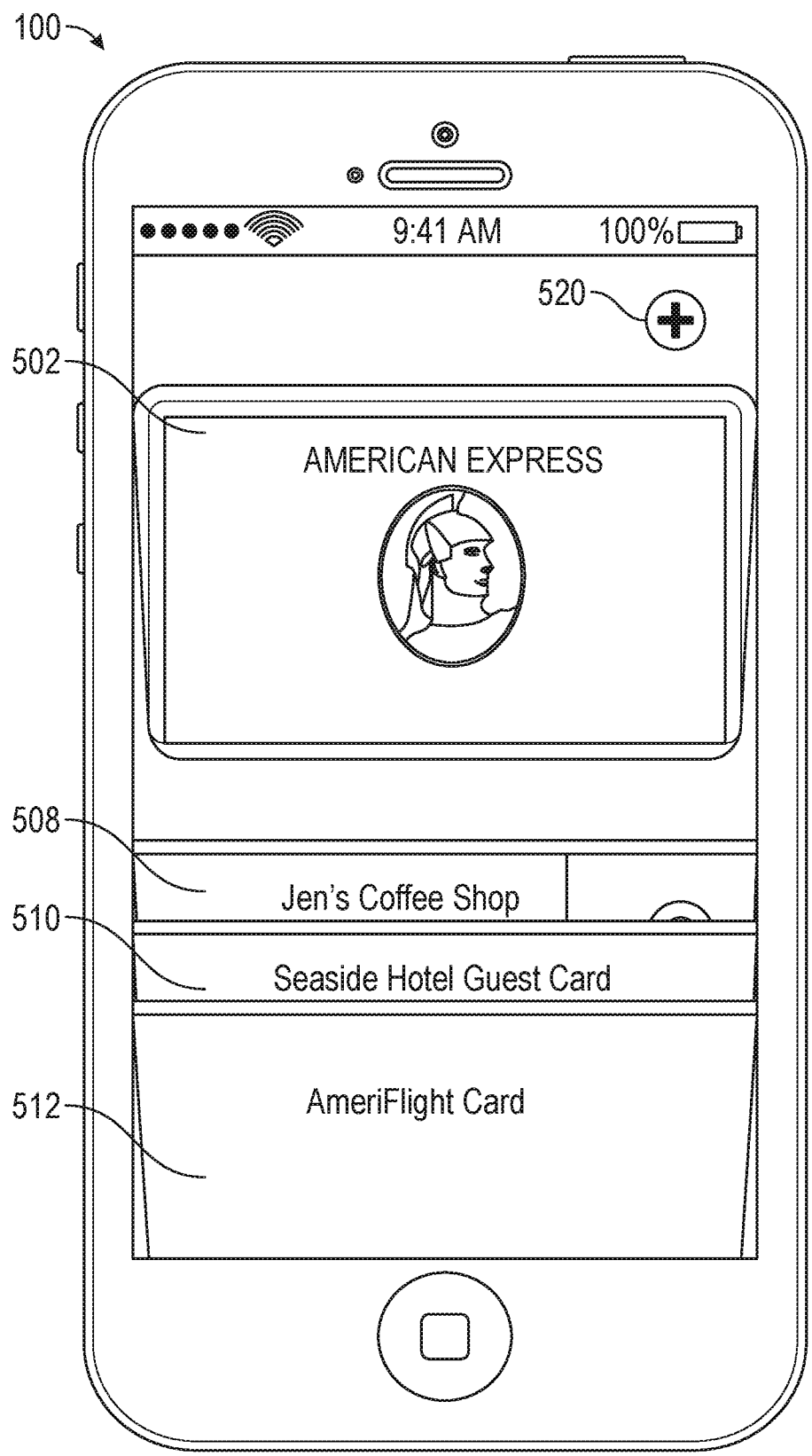

For example, in FIG. 5A, an electronic wallet is displayed. The electronic wallet comprises a first stack of card objects 502 and a second stack of card objects 508, 510, and 512. The first stack of card objects 502 is visually separated from the second stack of card objects 508, 510, and 512. In this example, one credit card (e.g., an American Express credit card) is already linked to the device and is displayed as part of the first stack of card objects 502. In FIG. 5B, the device receives user input which causes the device to reveal an add card affordance 520 for the request to link a payment account (e.g., a revolving credit account held with a financial institution) to the respective device. For example, a downward swipe on the display of device 100 is used to reveal the add card affordance 520. The device receives a selection of (e.g., a finger tap to activate) the add card affordance 520 and displays the user interface of FIG. 5C.

Figure 5C:
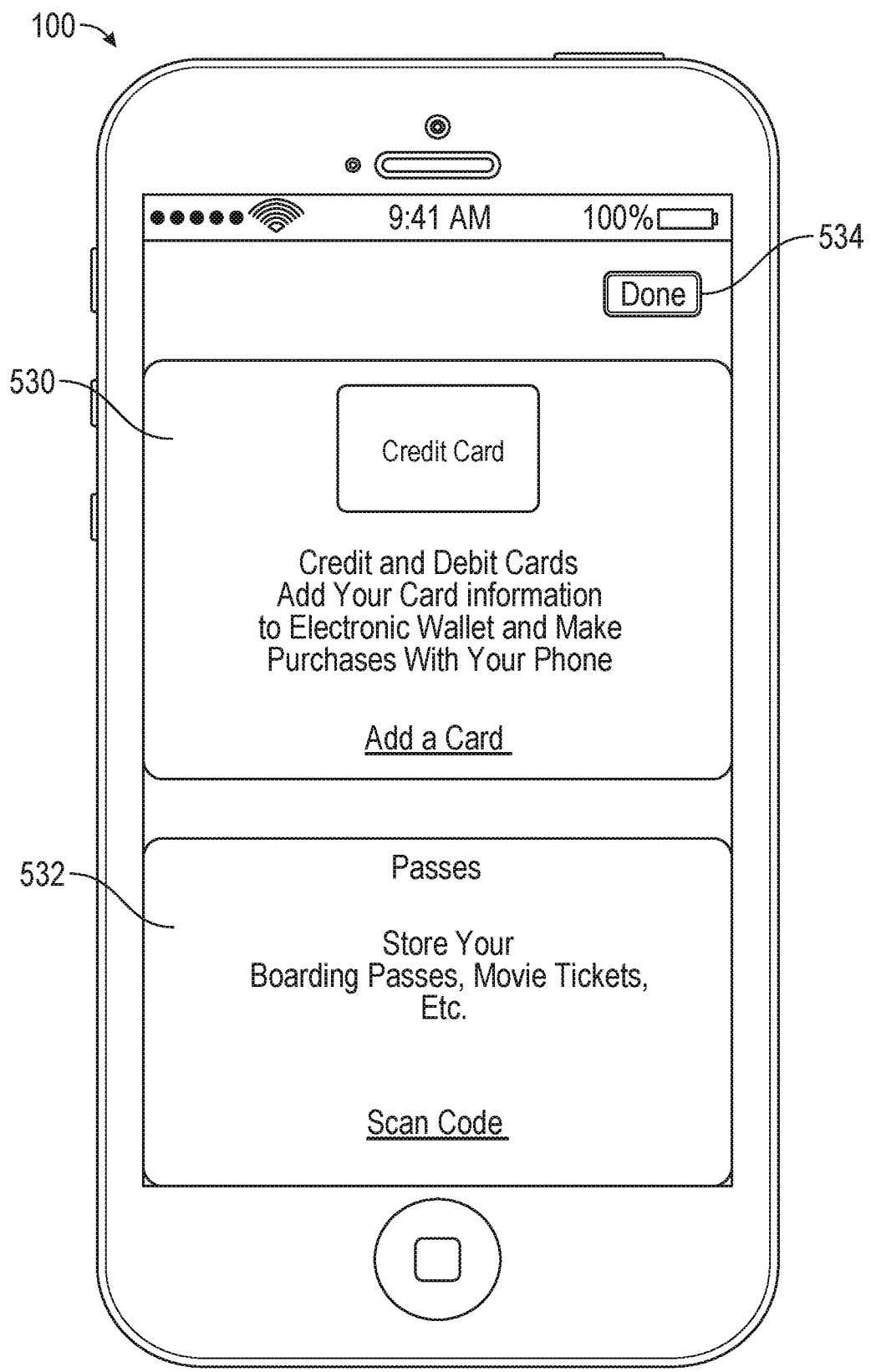

FIG. 5C illustrates a user interface for selecting from among an add payment card affordance 530 to link a payment account to the device (e.g., to make the payment account available in the electronic wallet) and a scan code affordance 532 to link a pass. If the device determines that selection of done affordance 534 is received, the device returns to displaying the electronic wallet of FIG. 5A. If the device determines that selection of add payment card affordance 530 is received, the device transitions to display of FIG. 5D.

Figure 5D:
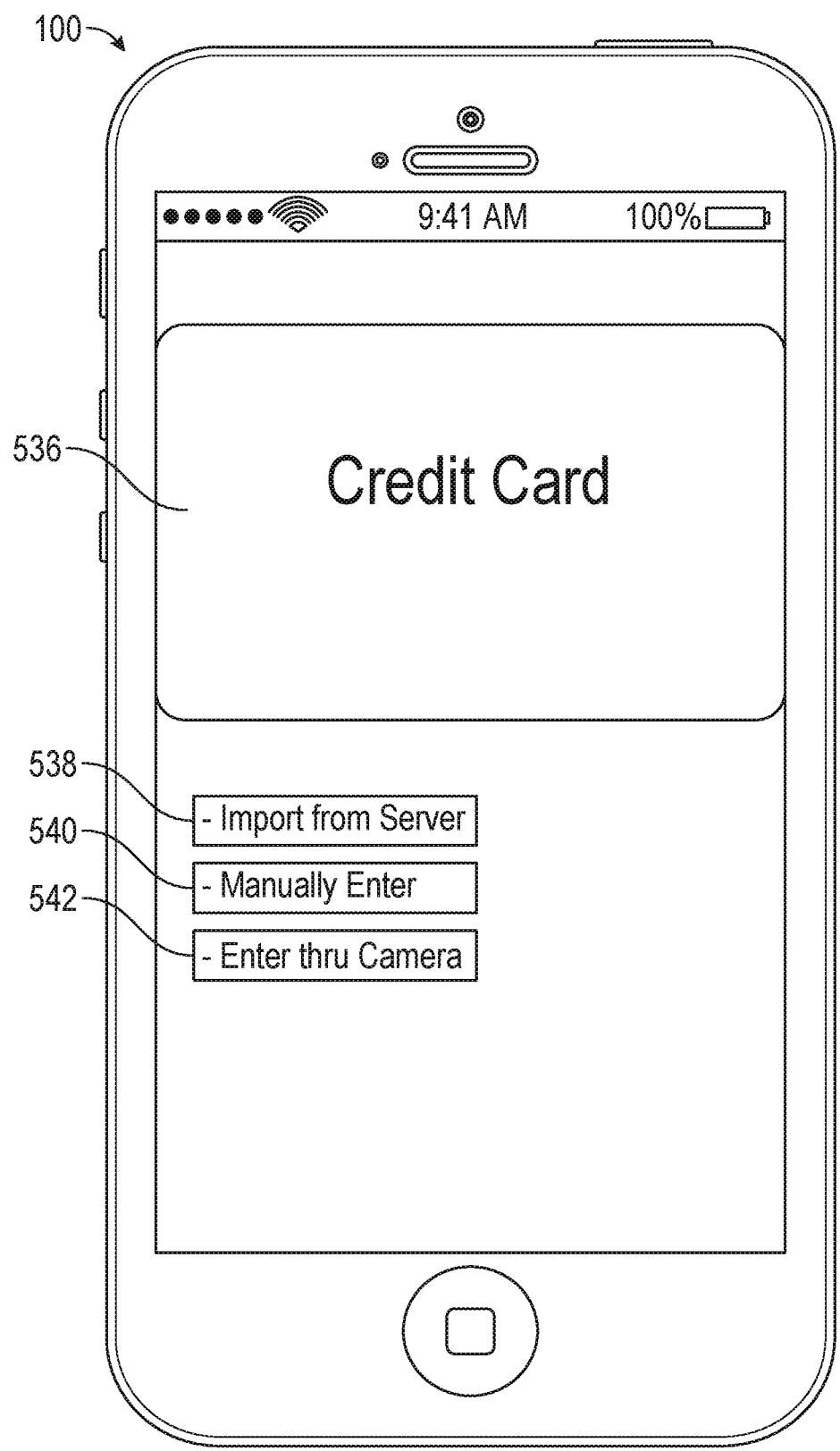

In FIG. 5D, the device displays a generic image of a debit or credit card 536 to indicate to the user that the user is attempting to request linking a payment account to the respective device. In one exemplary embodiment, the device displays, on the display, a credit card import affordance 538 for importing, from a remote server (e.g., iTunes or an account associated with iTunes), at least partial credit card information (e.g., information for a credit card that has been authorized for use by a current user account). The device receives user selection of the credit card import affordance 538 (e.g., a finger tap on the credit card import affordance 538). Alternatively, the user may manually enter credit card information (e.g., card number, card expiration date, name on card) by selecting manual entry affordance 540 or manually enter credit card information (e.g., card number, card expiration date, name on card) using a camera of the device by selecting camera entry affordance 542.

Figure 5E:
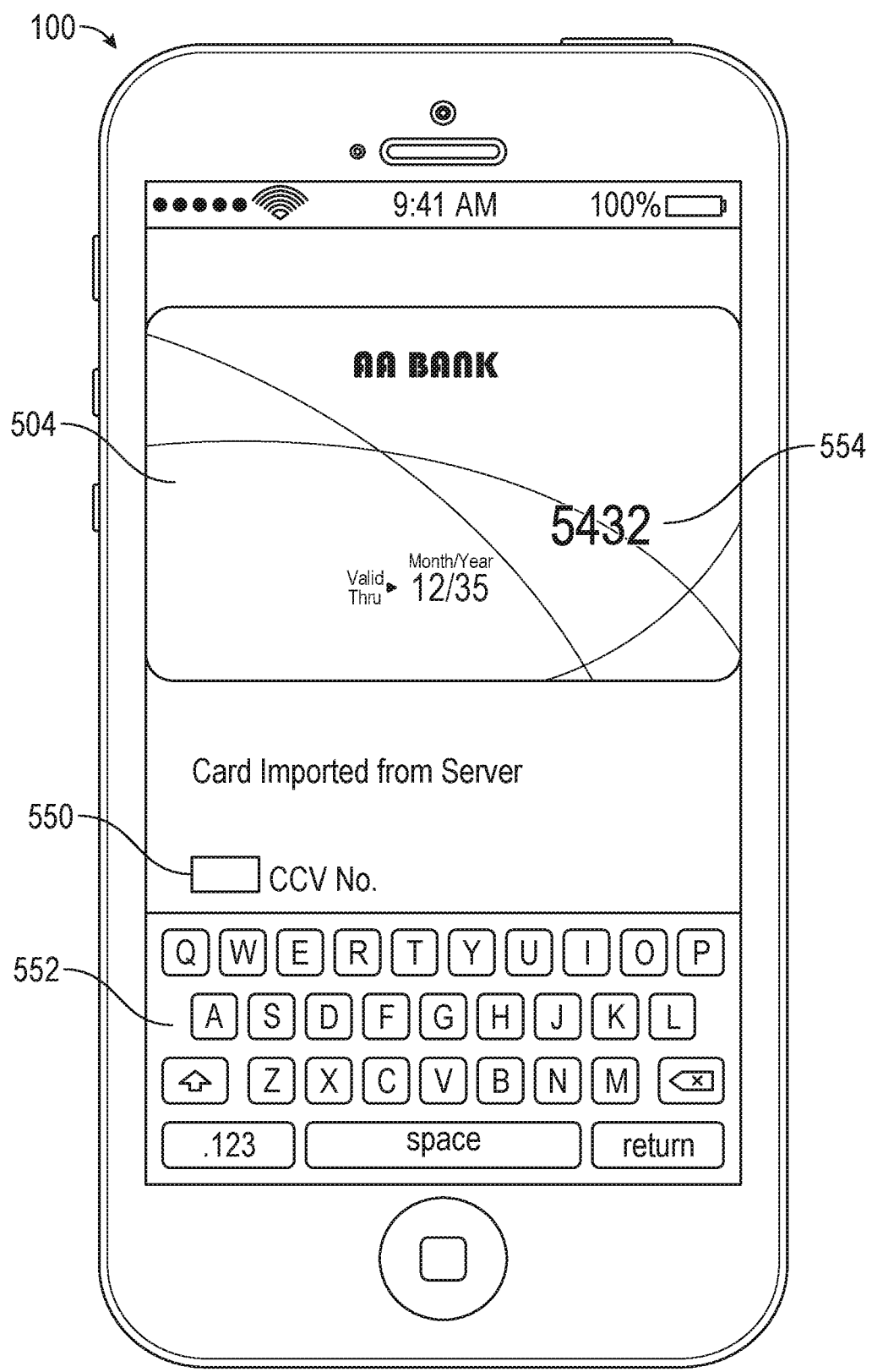

In response to receiving the user selection of the credit card import affordance 538 for importing credit card information (e.g., card number, card expiration date, name on card) from the remote server, the device displays a credit card details screen, as illustrated in FIG. 5E. The credit card details screen includes an indication 554 of a credit card number (e.g., credit card Primary Account Number (PAN) truncation displaying the last four digits of the credit card) of the credit card associated with the payment account and includes a security code input field 550 for receiving a security code (e.g., a numerical card security code such as CVD, CVV, CVC).

The device receives a respective security code at the security code input field 550 through user input (e.g., user input at displayed keypad 552 or through taking a picture of the credit card). The device determines validity of the credit card using verification based on the credit card number and the respective security code. In some embodiments, after determining that the credit card is valid, the payment account associated with the credit card is linked to the respective device.

In some embodiments, the user requests to manually input credit card information (e.g., card number, card expiration date, name on card), rather than import credit card information. At FIG. 5D, the user may manually enter credit card information by selecting manual entry affordance 540 or by selecting camera entry affordance 542. In response to receiving the user selection of the credit card input affordance for inputting credit card information, the device displays a credit card details screen for manual entry. The credit card details screen for manual entry includes an account input field for receiving a credit card number (e.g., credit card Primary Account Number) associated with the payment account and includes a security code input field for receiving a security code (e.g., a numerical card security code such as CVD, CVV, CVC). The device receives a respective credit card number at the account input field and a respective security code at the security code input field through user input (e.g., user input at a displayed keypad or through taking a picture of the credit card). The device determines validity of the credit card using verification based on the respective credit card number and the respective security code. In some embodiments, after determining that the credit card is valid, the payment account associated with the credit card is linked to the respective device.

Similarly, selecting camera entry affordance 542 of FIG. 5D allows the user to request to enter information using the camera by taking one or more images of the credit card (e.g., the user takes pictures of the front and/or back of a credit card using the device). The device determines the credit card number and corresponding security code CCV based on one or more images of the credit card for determining that the credit card is valid. In some embodiments, after determining that the credit card is valid, the payment account associated with the credit card is linked to the respective device.

In response to receiving the request (e.g., the user imports the credit card information), the device determines whether further verification is needed to link the payment account to the respective device (e.g., is the payment account already approved by the bank to be linked to a device or does the bank first need to confirm with the payment account owner). In accordance with a determination that further verification is not needed to link the payment account to the respective device, the device links the payment account to the respective device and provides an indication (e.g., 558 of FIG. 5H) that the payment account has been linked to the respective device. Once the payment account is linked to the respective device, the respective device may be used to facilitate payment transactions (e.g., making a purchase in a physical store or a purchase through the Internet using the respective device).

Figure 5F:
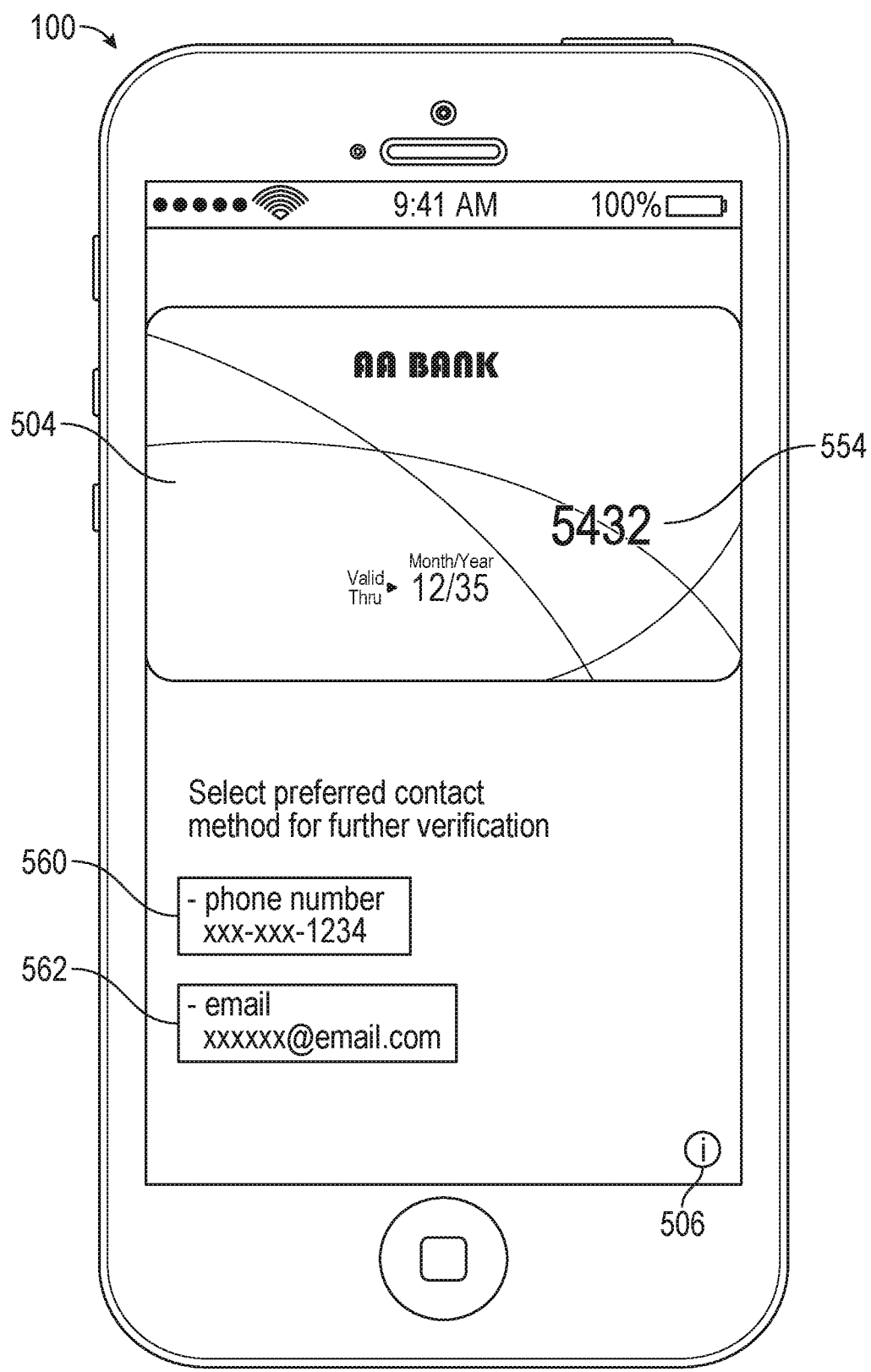
Figure 5G:
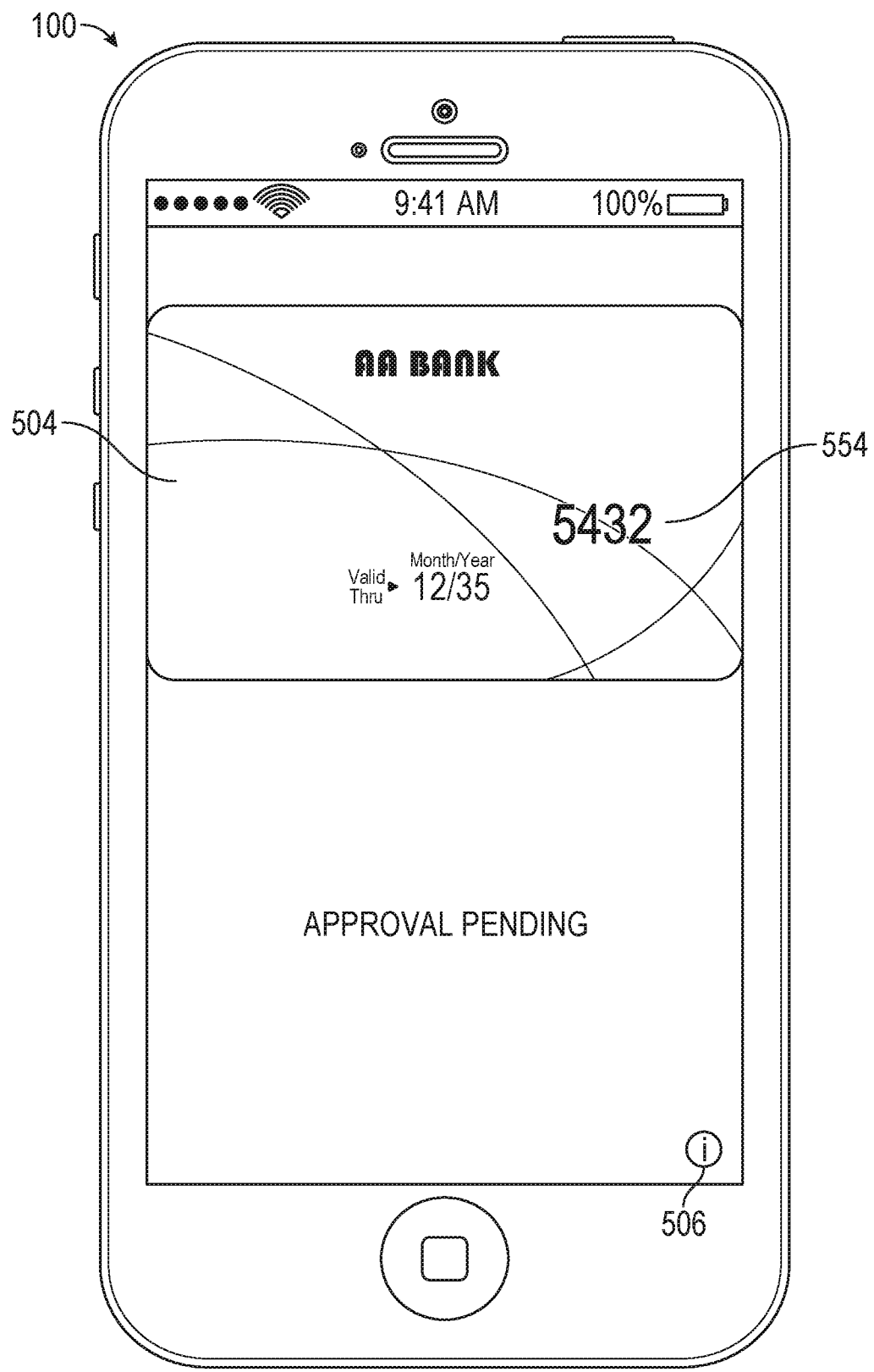

FIG. 5G illustrates an exemplary user interface including an indication 556 that further verification is needed. In accordance with a determination that further verification is needed to link the payment account to the respective device, the device provides an indication that further verification is needed to link the payment account to the respective device (e.g., displaying on the display that approval for linking the payment account is pending or requesting the user to call a phone number for verification). In some embodiments, the indication that further verification is needed to link the payment account to the respective device includes an alphanumeric visual indicator displayed on the display of the electronic device (e.g., the alphanumeric indicator comprising "approval pending" that indicates that further verification steps have been initiated without additional user input). An example visual indictor is illustrated as visual indication 556 "approval pending" of FIG. 5G. For example, a financial institution (e.g., a bank) associated with the payment account may need to confirm details of the payment account before the payment account is linked to the respective device. The verification may not require additional user interaction with the financial institution.

FIG. 5F illustrates an exemplary user interface that illustrates an indication that further verification is needed to link the payment account to the respective device. In some embodiments, the indication that further verification is needed to link the payment account to the respective device includes a visual indication of additional steps to be taken by a user to link the payment account to the respective device (e.g., instructions for the user to contact the financial institution associated with the payment account to confirm details of the payment account before the payment account is linked to the respective device).

In FIG. 5F, the device displays a plurality of communication method affordances 560 and 562. In some embodiments, in accordance with the determination that further verification is needed to link the payment account to the respective device, the device displays, on the display, the plurality of communication method affordances 560 and 562. Each communication method affordance is associated with a respective communication method (e.g., the phone number the bank should call, the phone number the user should call, the email address the bank should email, the telephone number the bank should text) for a verification communication (e.g., telephone call where the bank calls the user or the user calls the bank and keys in identification information, email that provides a code or a link to a website for entering verification information, or text message that includes information for verifying). For example, the device may display a communication method affordance 560 indicating the phone number that the financial institution should call for the further verification to link the payment account. For another example, the device may display a communication method affordance 562 indicating the email address that the financial institution should email for the further verification to link the payment account. The plurality of communication method affordances 560 and 562 may be based on communication received from the financial institution. For example, the financial institution may provide the communication methods for security purposes, rather than using communication methods from the device or communication methods that are input at the device by the user. The communication method affordances 560 and 562 indicating the communication methods display only part of the communication method contact information, such as the last 4 digits of phone number or the domain of the email address. This provides additional security in the event that a user attempts to link a payment account not belonging to the user.

In some embodiments, in accordance with the determination that further verification is needed to link the payment account to the respective device, the device displays, on the display, a plurality of communication method affordances 560 and 562, wherein each communication method affordance is associated with a respective communication method (e.g., the phone number the bank should call, the phone number the user should call, the email address the bank should email, the telephone number the bank should text) for a verification communication. The display of the plurality of communication method affordances 560 and 562 are based on locally-stored contact information. For example, the locally-stored contact information includes the respective communication methods. This allows the user to select a communication method for the verification that the financial institution may not be aware of (e.g., the user gets a new electronic device with a newly assigned phone number and prefers to use the newly assigned phone number for the verification communication). The locally-stored contact information may be a contact information card associated with the user (e.g., an entry in the phone book of the device identified as containing the user's contact information) of the electronic device.

In some embodiments, in accordance with the determination that further verification is needed to link the payment account to the respective device, the device receives a selection of a communication method affordance of the plurality of communication method affordances 560 and 562. In response to receiving the selection of the communication method affordance, the device transmits, to the financial institution, an indication of the respective communication method of the selected communication method affordance (e.g., tell the financial institution that the user prefers to be contacted at their desk phone and display on the device that the financial institution will contact the user at the selected phone number). The verification communication (e.g., telephone call where the bank calls the user or the user calls the bank and keys in identification information, email that provides a code or a link to a website for entering verification information, or text message that includes information for verifying) is based on the communication method affordance. Thus, the verification communication allows the financial institution to efficiently contact the user to provide identifying information or verification to link the payment account.

In some embodiments, in accordance with the determination that further verification is needed to link the payment account to the respective device, the device receives a verification communication (e.g., telephone call, email, or text message) from the financial institution associated with the payment account. The verification communication is for verification (e.g., confirming identify of requestor) to link the payment account to the respective device.

In some embodiments, in accordance with the determination that further verification is needed to link the payment account to the respective device, the device receives a request from a user to initiate a verification communication (e.g., telephone call where the bank calls the user or the user calls the bank and keys in identification information, email that provides a code or a link to a website for entering verification information, or text message that includes information for verifying) with the financial institution. In response to receiving the request to initiate the verification communication, the device initiates the verification communication with the financial institution associated with the payment account. If an application for the financial institution is installed on the device, the device may offer to start application to enter identification/authorization information. If the application is downloaded on a different device owned by the user, the device may prompt the user to download the application onto the device. The verification communication is for verification (e.g., confirming identify of requestor) to link the payment account to the respective device. In some embodiments, the request to initiate verification communication includes personally identifying information.

In some embodiments, the device receives a notification (e.g., the device intercepts a text message, email message, or push notification sent to the device that includes a confirmation code) at the electronic device. The notification comprises a verification code for linking the payment account to the respective device. In response to receiving the notification comprising the verification code at the electronic device, the device links the payment account to the respective device. In some embodiments, the notification is hidden from the user either by deleting the notification or by forgoing displaying a receipt of the notification. For example, a text message with a verification code is received at a phone and upon receiving the text message, the phone transmits the verification code to the financial institution to verify that the user is in possession of the phone and, optionally, deletes the text message or does not display a notification of the text message and, instead, removes the "approval pending" indicator and visually indicates that the payment account has been linked to the device.

Figure 5H:
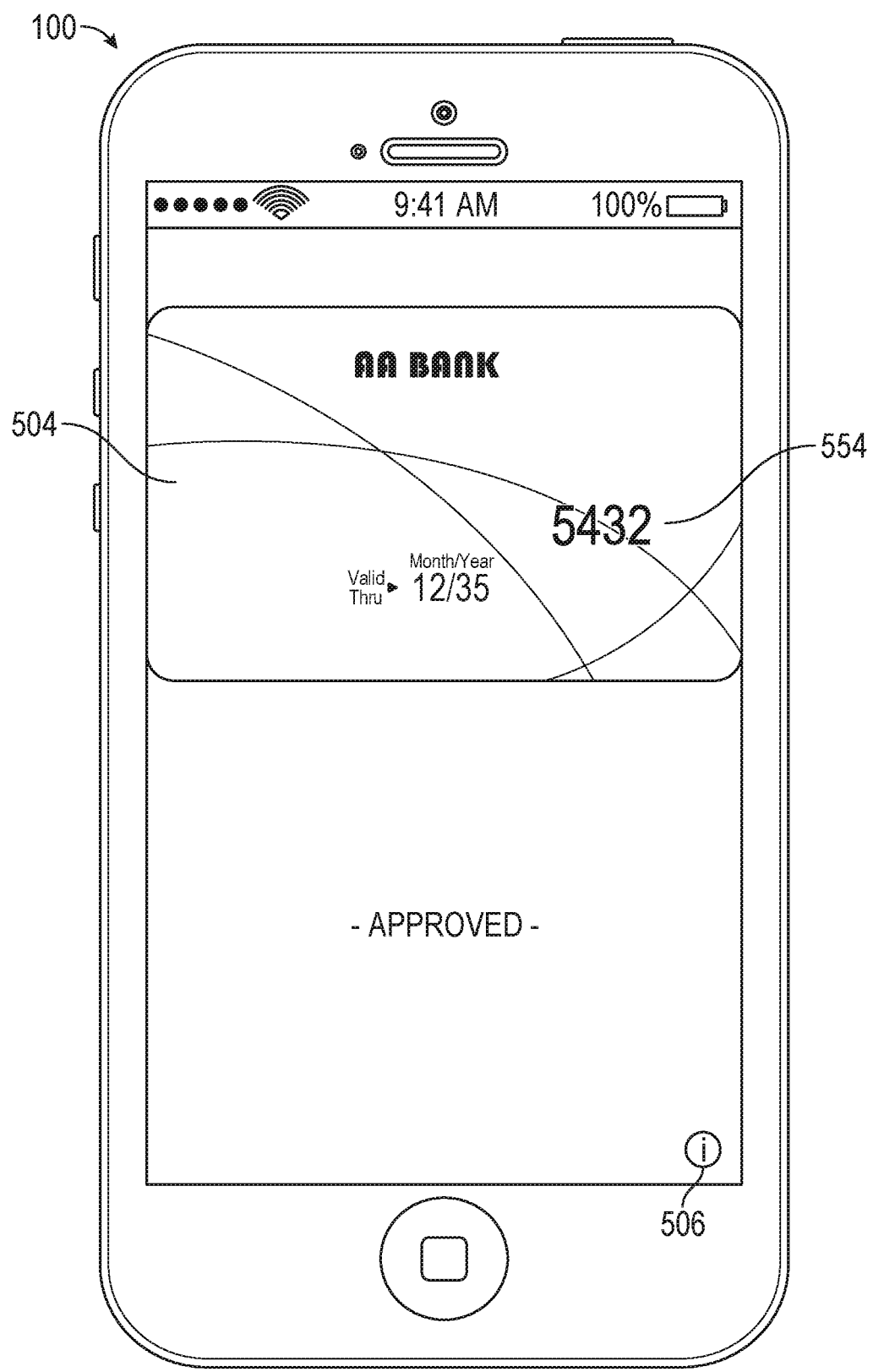

In some embodiments, the device displays a confirmation on the display indicating that the payment account has been linked to the respective device comprising displaying a notification (e.g., a pop-up or banner from the electronic wallet application) on the device indicating that the payment account has been linked to the respective device, such as "approved" confirmation 558 illustrated in FIG. 5H. The notification may be displayed while accessing the electronic wallet or while a different application (or no application) is being displayed.

In some embodiments, the device receives a user input requesting a secondary verification code (e.g., user activates an affordance to request verification again) for linking the payment account to the respective device. For example, the user can access the electronic wallet and select a "re-verify" affordance. In response to receiving the input requesting the secondary verification code, the device transmits a request to the financial institution to request the secondary verification code (e.g., in case the first verification code is not received or expires before verification is complete).

In some embodiments, the device receives a secondary notification (e.g., the device intercepts a text message, email message, or push notification that includes a confirmation code) at the electronic device. The secondary notification comprises the secondary verification code for linking the payment account to the respective device. In response to receiving the secondary notification comprising the secondary verification code at the electronic device, the device links the payment account to the respective device and displays a confirmation (e.g., "approved" 558 of FIG. 5H) on the device indicating that the payment account has been linked to the respective device.

In some embodiments, the device receives a primary account number (e.g., Digital PAN, DPAN, a 16-digit account number, or other account number, which, for example, cannot be used for completing a manual transaction over a voice call—only for completing a payment electronically through the device) from the financial institution for use in authorizing payments from the payment account using the respective device. The received primary account number is different than the account number displayed on the credit card (e.g., credit card PAN, 16-digit credit card number). In some embodiments, the device assigns the received primary account number (e.g., Digital PAN, DPAN, a 16-digit account number, or other account number) to the respective device to link the payment account to the respective device. This may, for example, allow the financial institution to differentiate between payment transactions conducted using the received primary account number, which is associated with the payment account, assigned to the respective device and payment transactions conducted using the credit card, which is also associated with the payment account.

In some embodiments, the credit card details screen of FIG. 5E includes a displayed visual graphical representation 504 of the credit card associated with the payment account. For example, the graphical representation comprises the background image of the physical credit card associated with the payment account when the user selects to import credit card information. Displaying the same background image as the physical credit card allows the user to easily recognize which credit card is being used for linking the payment account.

In some embodiments, the respective device is a second electronic device (e.g., a cell phone, a laptop, a wearable electronic device) that is separate from the electronic device. For example, the electronic device can be used to link the payment account to a separate cell phone. This may be done, for example, by transmitting provisioning information from the electronic device to the respective device (e.g., the separate device), wherein the provisioning information is used to link the payment account to the respective device (e.g., the separate device). In some embodiments, a similar process can be repeated to link the payment account to the electronic device (optionally with a different DPAN). In another embodiment, the respective device is the same as the electronic device, and the electronic device is a mobile telecommunications device (e.g., a cell phone, a laptop, a wearable electronic device).

In some embodiments, the device determines (e.g., prior to linking the payment account to the respective device) whether the respective device is configured to require an unlock authorization (e.g., passcode) for unlocking the respective device. In accordance with a determination that the respective device is not configured to require an unlock authorization, the device displays, on the display, an unlock authorization configurator for configuring the respective device to require unlock authorization for unlocking or accessing certain features of the respective device. This provides additional security by requiring that the respective device have a lock authorization to access the device under (at least some) circumstances. For example, the authorization configurator may be used to enroll a fingerprint or passcode that is enabled to authorize payment transactions.

Figure 5I:
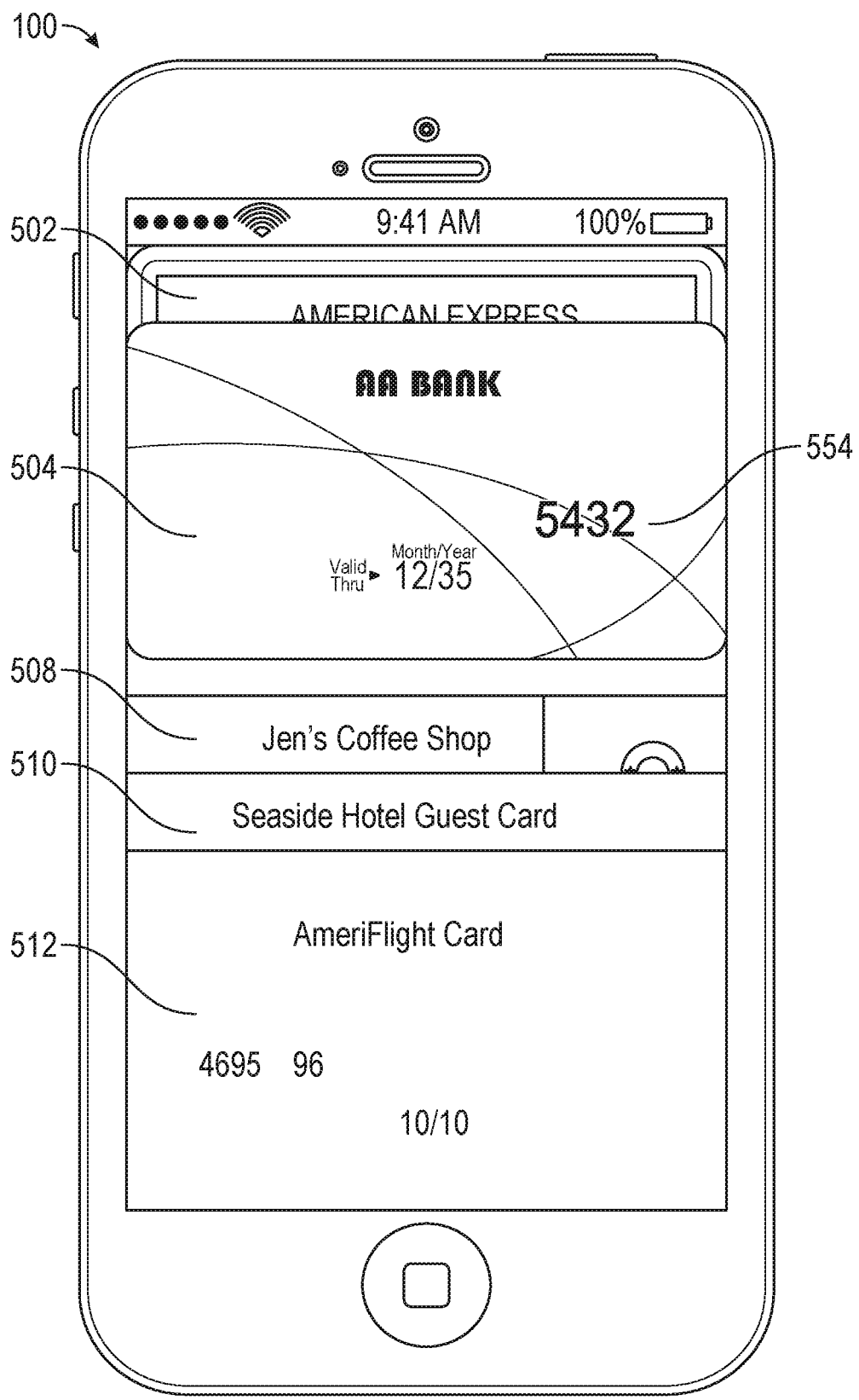

FIG. 5I illustrates an electronic wallet that includes representations of multiple payment accounts 502 and 504. In some embodiments, the device receives a second request to link a second payment account (e.g., a revolving credit account with a financial institution) associated with a second credit card to the respective device. The second request includes information about the second credit card (e.g., selecting the credit card for import and/or entering the card security code). For example, a similar technique, as discussed above, may be used for requesting to link the second payment account to the respective device. The device links the second payment account to the respective device and provides an indication that the second payment account has been linked to the respective device. The device receives a selection from among at least the payment account and the second payment account specifying the default payment account to be used for payment transactions.

FIGS. 6A-6C are flow diagrams illustrating method 600 for linking a payment account to a respective device in accordance with some embodiments. Method 600 is performed at a device (e.g., device 300, FIG. 3, or portable multifunction device 100, FIG. 1) with a display. Some operations in method 600 may be combined, the order of some operations may be changed, and some operations may be omitted.

As described below, method 600 provides an intuitive way to link a payment account to a respective device. The method reduces the cognitive burden on a user when linking the payment account, thereby creating a more efficient human-machine interface. For battery-operated computing devices, enabling a user to link a payment account to a respective device faster and more efficiently conserves power and increases the time between battery charges.

At block 602, the electronic device receives a request (e.g., request to import card details from iTunes or manually entering card details) to link a payment account (e.g., a revolving credit account held with a financial institution) associated with a credit card (e.g., a physical credit card or debit card issued to the user) to a respective device (e.g., a cell phone, a laptop, a wearable electronic device, device 300, FIG. 3, or portable multifunction device 100, FIG. 1), wherein the request includes information about the credit card (e.g., entering the card security code).

At block 604, in some embodiments, receiving the request to link the payment account comprises receiving a request to import credit card information. The device displays on the display, a credit card import affordance for importing, from a remote server, at least partial credit card information (e.g., information for a credit card that has been authorized for use by a current user account). The device receives user selection of the credit card import affordance. In response to receiving the user selection of the credit card import affordance for importing credit card information from the remote server: the device displays a credit card details screen, wherein the credit card details screen includes an indication of a credit card number (e.g., credit card Primary Account Number (PAN) truncation displaying the last four digits of the credit card) of the credit card associated with the payment account and includes a security code input field for receiving a security code (e.g., a numerical card security code such as CVD, CVV, CVC); the device receives a respective security code at the security code input field through user input (e.g., user input at a displayed keypad or through taking a picture of the credit card); and the device determines validity of the credit card using verification based on the credit card number and the respective security code. In some embodiments, after determining that the credit card is valid, the payment account associated with the credit card is linked to the respective device.

At block 606, in some embodiments, receiving the request to link the payment account comprises receiving a request to manually enter credit card information. The device displays, on the display, a credit card input affordance for receiving credit card information through user input at the electronic device. The device receives user selection of the credit card input affordance. In response to receiving the user selection of the credit card input affordance for inputting credit card information: the device displays a credit card details screen, wherein the credit card details screen includes an account input field for receiving a credit card number (e.g., credit card Primary Account Number) associated with the payment account and includes a security code input field for receiving a security code (e.g., a numerical card security code such as CVD, CVV, CVC); the device receives a respective credit card number at the account input field and a respective security code at the security code input field through user input (e.g., user input at a displayed keypad or through taking a picture of the credit card); and the device determines validity of the credit card using verification based on the respective credit card number and the respective security code. In some embodiments, after determining that the credit card is valid, the payment account associated with the credit card is linked to the respective device.

At block 608, in response to receiving the request to link the payment account, the device determines at block 610 whether further verification is needed to link the payment account to the respective device (e.g., is it already approved by the bank or does the bank need to confirm with the user). At block 612, in accordance with a determination that further verification is not needed to link the payment account to the respective device, the device links the payment account to the respective device and provides an indication that the payment account has been linked to the respective device.

At block 614, in accordance with a determination that further verification is needed to link the payment account to the respective device, the device provides an indication that further verification is needed to link the payment account to the respective device (e.g., displaying on the display that approval for linking the payment account is pending).

In some embodiments, the indication that further verification is needed to link the payment account to the respective device includes an alphanumeric visual indicator displayed on the display of the electronic device (e.g., the alphanumeric indicator comprising "approval pending" that indicates that further verification steps have been initiated without additional user input, visual indication 556 of FIG. 5G). For example, a financial institution associated with the payment account may need to confirm details of the payment account before the payment account is linked to the respective device. The verification may not require additional user interaction with the financial institution.

In some embodiments, the indication that further verification is needed to link the payment account to the respective device includes a visual indication of additional steps to be taken by a user to link the payment account to the respective device (e.g., instructions for the user to contact the financial institution associated with the payment account to confirm details of the payment account before the payment account is linked to the respective device).

At block 616, in some embodiments, in accordance with the determination that further verification is needed to link the payment account to the respective device, the device displays, on the display, the plurality of communication method affordances (e.g., 560 and 562 of FIG. 5F). Each communication method affordance is associated with a respective communication method (e.g., the phone number the bank should call, the phone number the user should call, the email address the bank should email, the telephone number the bank should text) for a verification communication (e.g., telephone call where the bank calls the user or the user calls the bank and keys in identification information, email that provides a code or a link to a website for entering verification information, or text message that includes information for verifying).

In some embodiments, in accordance with the determination that further verification is needed to link the payment account to the respective device, the device displays, on the display, a plurality of communication method affordances (e.g., 560 and 562 of FIG. 5F), wherein each communication method affordance is associated with a respective communication method (e.g., the phone number the bank should call, the phone number the user should call, the email address the bank should email, the telephone number the bank should text) for a verification communication. The display of the plurality of communication method affordances are based on locally-stored contact information. For example, the locally-stored contact information includes the respective communication methods. This allows the user to select a communication method for the verification that the financial institution may not be aware of (e.g., the user gets a new electronic device with a newly assigned phone number and prefers to use the newly assigned phone number for the verification communication). The locally-stored contact information may be a contact information card associated with the user (e.g., an entry in the phone book of the device identified as containing the user's contact information) of the electronic device.

At block 618, in some embodiments, in accordance with the determination that further verification is needed to link the payment account to the respective device, the device receives a selection of a communication method affordance of the plurality of communication method affordances (e.g., 560 and 562 of FIG. 5F). In response to receiving the selection of the communication method affordance, the device transmits, to the financial institution, an indication of the respective communication method of the selected communication method affordance (e.g., tell the financial institution that the user prefers to be contacted at their desk phone and display on the device that the financial institution will contact the user at the selected phone number). The verification communication (e.g., telephone call where the bank calls the user or the user calls the bank and keys in identification information, email that provides a code or a link to a website for entering verification information, or text message that includes information for verifying) is based on the communication method affordance. Thus, the verification communication allows the financial institution to efficiently contact the user to provide identifying information or verification to link the payment account.

At block 620, in some embodiments, in accordance with the determination that further verification is needed to link the payment account to the respective device, the device receives a verification communication (e.g., telephone call, email, or text message) from the financial institution associated with the payment account. The verification communication is for verification (e.g., confirming identify of requestor) to link the payment account to the respective device.

At block 622, in some embodiments, in accordance with the determination that further verification is needed to link the payment account to the respective device, the device receives a request from a user to initiate a verification communication (e.g., telephone call where the bank calls the user or the user calls the bank and keys in identification information, email that provides a code or a link to a website for entering verification information, or text message that includes information for verifying) with the financial institution. In response to receiving the request to initiate the verification communication, the device initiates the verification communication with the financial institution associated with the payment account. The verification communication is for verification (e.g., confirming identify of requestor) to link the payment account to the respective device. In some embodiments, the request to initiate verification communication includes personally identifying information.

At block 624, in some embodiments, the device receives a notification (e.g., the device intercepts a text message, email message, or push notification sent to the device that includes a confirmation code) at the electronic device. The notification comprises a verification code for linking the payment account to the respective device. In response to receiving the notification comprising the verification code at the electronic device, the device links the payment account to the respective device. In some embodiments, the notification is hidden from the user either by deleting the notification or by forgoing displaying a receipt of the notification. For example, a text message with a verification code is received at a phone and, upon receiving the text message, the phone transmits the verification code to the financial institution to verify that the user is in possession of the phone and, optionally, deletes the text message or does not display a notification of the text message and, instead, removes the "approval pending" indicator and visually indicates that the payment account has been linked to the device.

At block 626, in some embodiments, the device displays a confirmation (e.g., 558 of FIG. 5H) on the display indicating that the payment account has been linked to the respective device comprising displaying a notification (e.g., a pop-up or banner from the electronic wallet application) on the device indicating that the payment account has been linked to the respective device. The notification may be displayed while accessing the electronic wallet or while a different application (or no application) is being displayed.

In some embodiments, the device receives a user input requesting a secondary verification code (e.g., user activates an affordance to request verification again) for linking the payment account to the respective device. For example, the user can access the electronic wallet and select a "re-verify" affordance. In response to receiving the input requesting the secondary verification code, the device transmits a request to the financial institution to request the secondary verification code (e.g., in case the first verification code is not received or expires before verification is complete).

In some embodiments, the device receives a secondary notification (e.g., the device intercepts a text message, email message, or push notification that includes a confirmation code) at the electronic device. The secondary notification comprises the secondary verification code for linking the payment account to the respective device. In response to receiving the secondary notification comprising the secondary verification code at the electronic device, the device links the payment account to the respective device and displays a confirmation (e.g., 558 of FIG. 5H) on the device indicating that the payment account has been linked to the respective device.

At block 628, in some embodiments, the device receives a primary account number (e.g., Digital PAN, DPAN, a 16-digit account number, or other account number, which, for example cannot be used for completing a manual transaction over a voice call—only for completing a payment electronically through the device.) from the financial institution for use in authorizing payments from the payment account using the respective device. The received primary account number is different than the account number displayed on the credit card (e.g., credit card PAN, 16-digit credit card number). At block 630, in some embodiments, the device assigns the received primary account number (e.g., Digital PAN, DPAN, a 16-digit account number, or other account number) to the respective device to link the payment account to the respective device. This may, for example, allow the financial institution to differentiate between payment transactions conducted using the received primary account number, which is associated with the payment account, assigned to the respective device and payment transactions conducted using the credit card, which is also associated with the payment account.

In some embodiments, the credit card details screen (e.g., of FIG. 5E) includes a displayed visual graphical representation (e.g., 504 of FIG. 5E) of the credit card associated with the payment account. For example, the graphical representation comprises the background image of the physical credit card associated with the payment account when the user selects to import credit card information. Displaying the same background image as the physical credit card allows the user to easily recognize which credit card is being used for linking the payment account.

In some embodiments, the respective device is a second electronic device (e.g., a cell phone, a laptop, a wearable electronic device) that is separate from the electronic device. For example, the electronic device can be used to link the payment account to a separate cell phone. This may be done, for example, by transmitting provisioning information from the electronic device to the respective device (e.g., the separate device), wherein the provisioning information is used to link the payment account to the respective device (e.g., the separate device). In some embodiments, a similar process can be repeated to link the payment account to the electronic device (optionally with a different DPAN). In another embodiment, the respective device is the same as the electronic device, and the electronic device is a mobile telecommunications device (e.g., a cell phone, a laptop, a wearable electronic device).

At block 632, in some embodiments, the device determines (e.g., prior to linking the payment account to the respective device) whether the respective device is configured to require an unlock authorization (e.g., passcode) for unlocking the respective device. In accordance with a determination that the respective device is not configured to require an unlock authorization, the device displays, on the display, an unlock authorization configurator for configuring the respective device to require unlock authorization for unlocking or accessing certain features of the respective device. This provides additional security by requiring that the respective device have a lock authorization to access the device under (at least some) circumstances. For example, the authorization configurator may be used to enroll a fingerprint or passcode that is enabled to authorize payment transactions. In some embodiments, the device links the payment account to the respective device after completing the unlock authorization configurator process.

At block 634, in some embodiments, the device receives a second request to link a second payment account (e.g., a revolving credit account with a financial institution) associated with a second credit card to the respective device. The second request includes information about the second credit card (e.g., selecting the credit card for import and/or entering the card security code). For example, a similar technique as discussed above may be used for requesting to link the second payment account to the respective device. The device links the second payment account to the respective device and provides an indication that the second payment account has been linked to the respective device. The device receives a selection from among at least the payment account and the second payment account specifying the default payment account to be used for payment transactions.

Note that details of the processes described above with respect to method 600 (e.g., FIGS. 6A-6C and 5A-5I) are also applicable in an analogous manner to the methods described below. For example, methods 800, 1000, 1200, 1400, 1600, 1800, 2000, and 2200 may include one or more of the characteristics of the various methods described above with reference to method 600. For brevity, these details are not repeated below.

The operations described above with reference to the figures may be implemented by components depicted in FIGS. 1A-1B. For example, receive operations, display operations, and determination operations may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 7A:
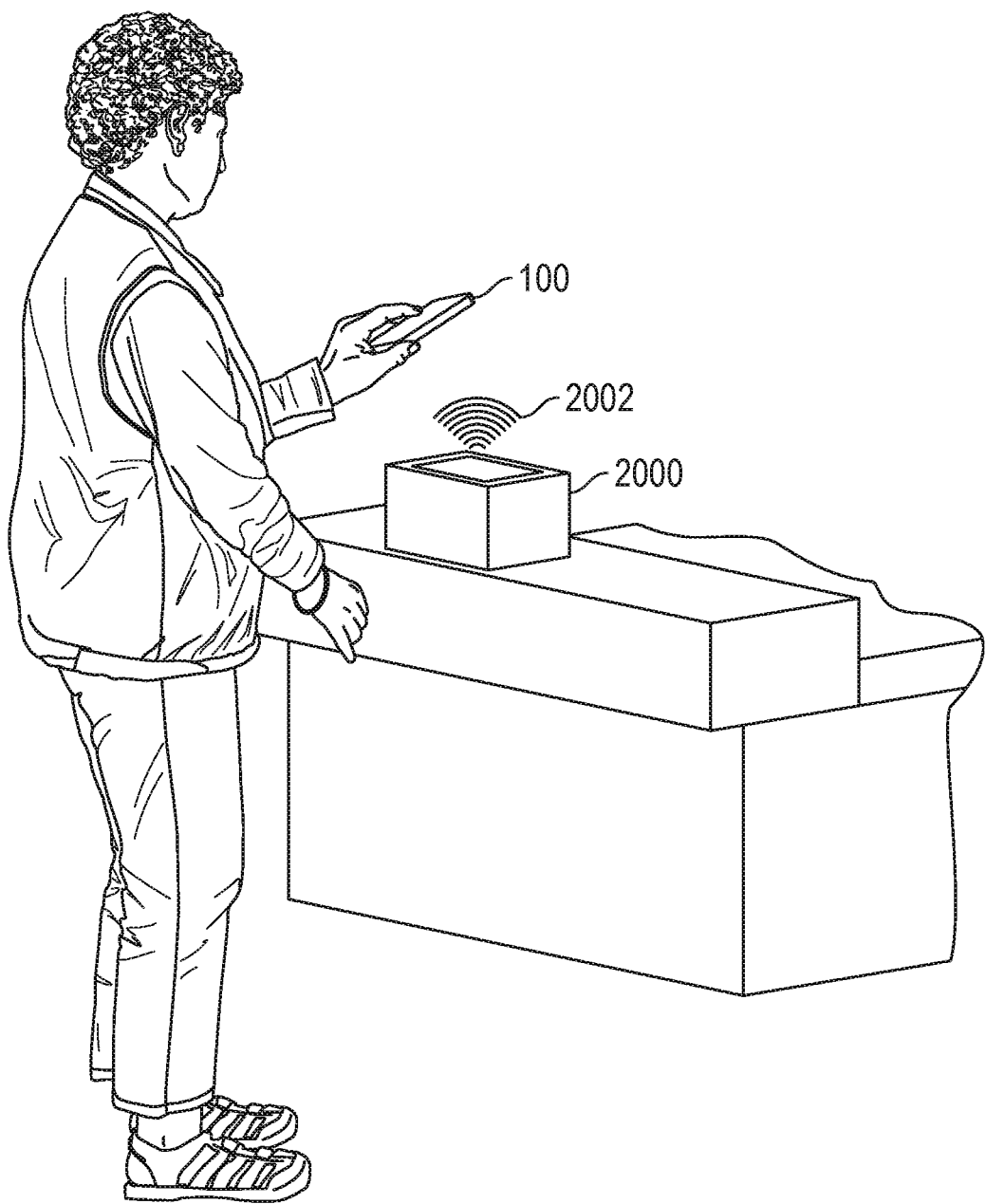
FIGS. 7A-7O illustrate exemplary user interfaces for proceeding with a payment transaction using a short-range communication radio in accordance with some embodiments.
Figure 7B:
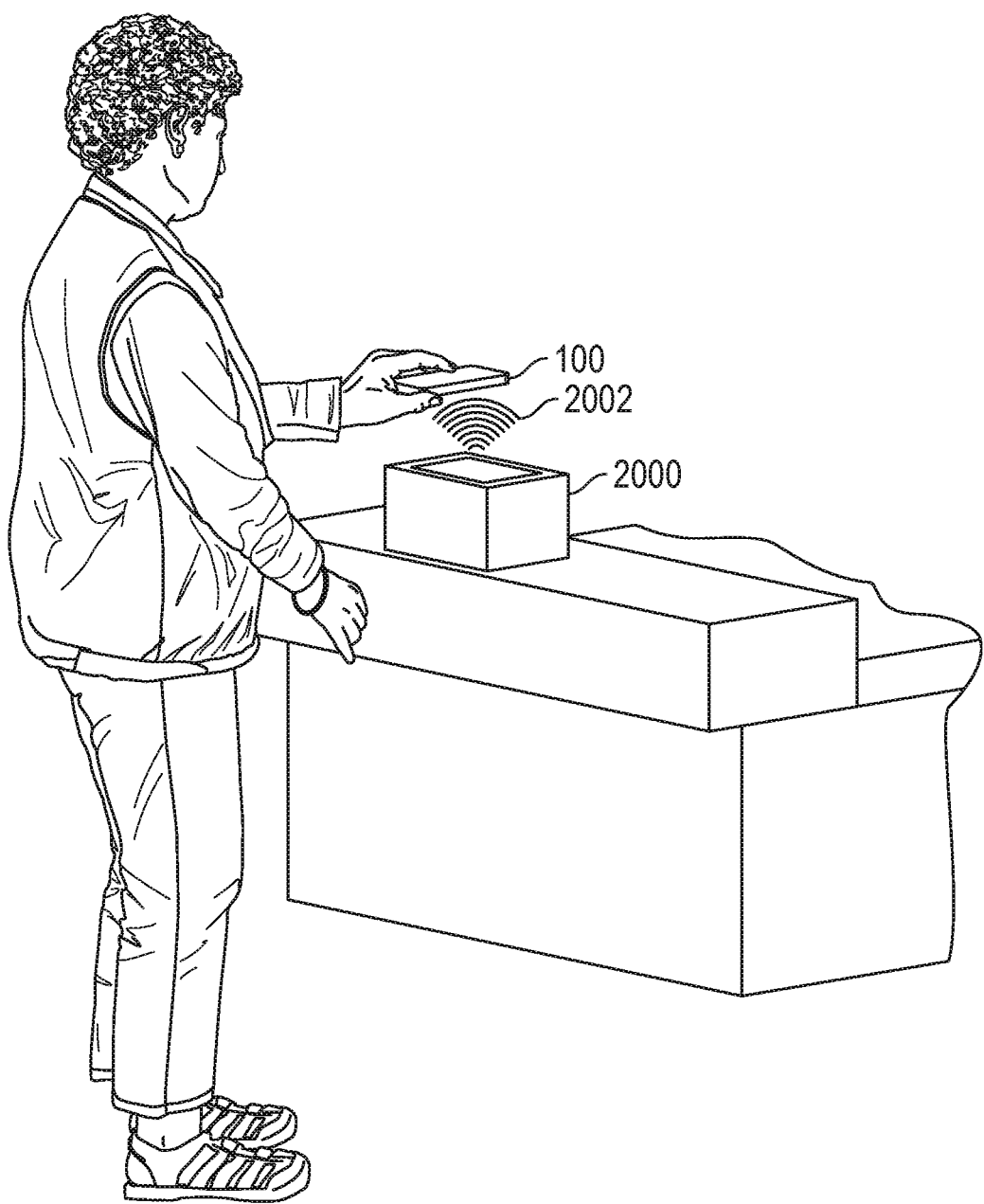
Figure 7C:
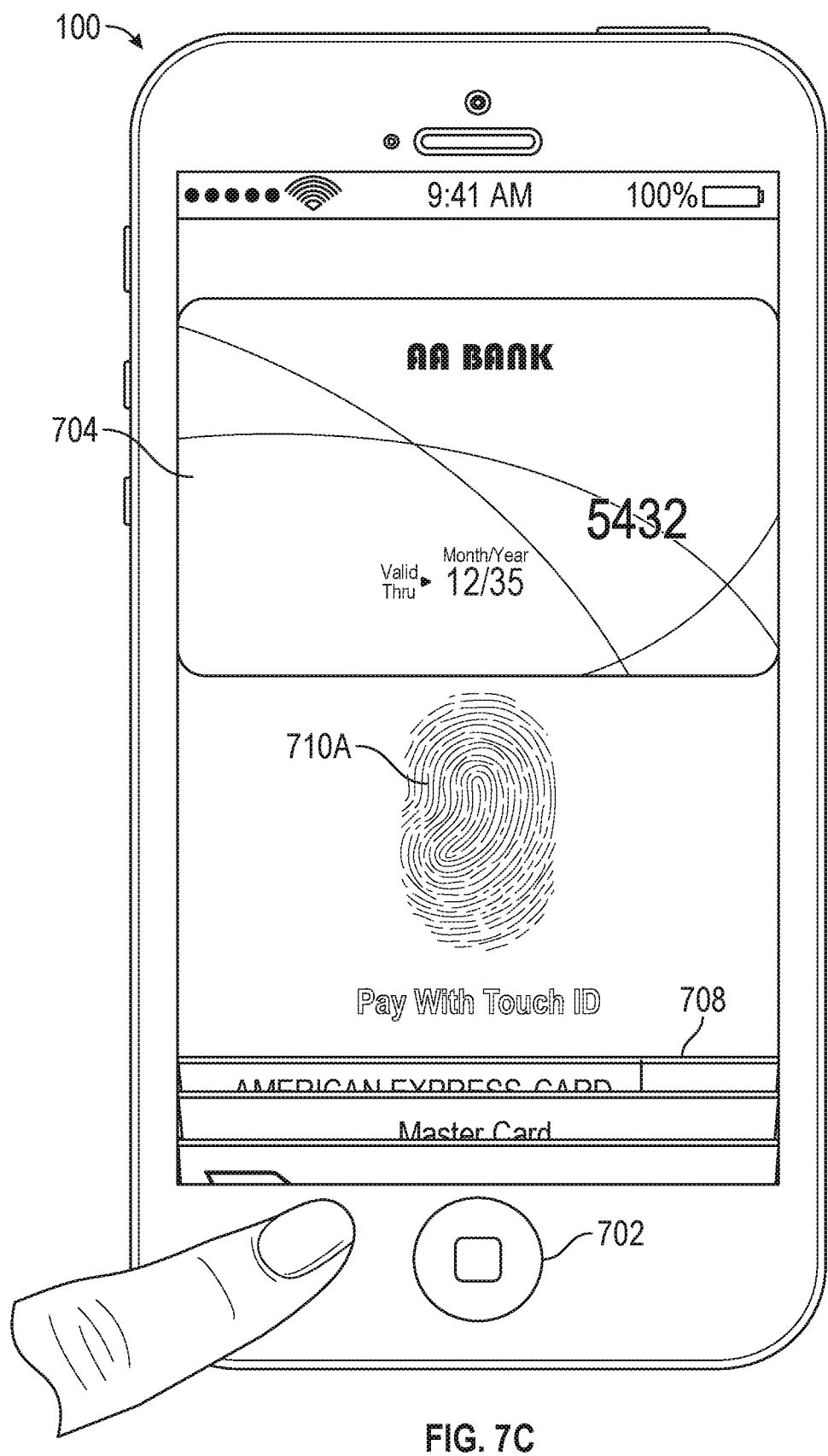
Figure 7D:
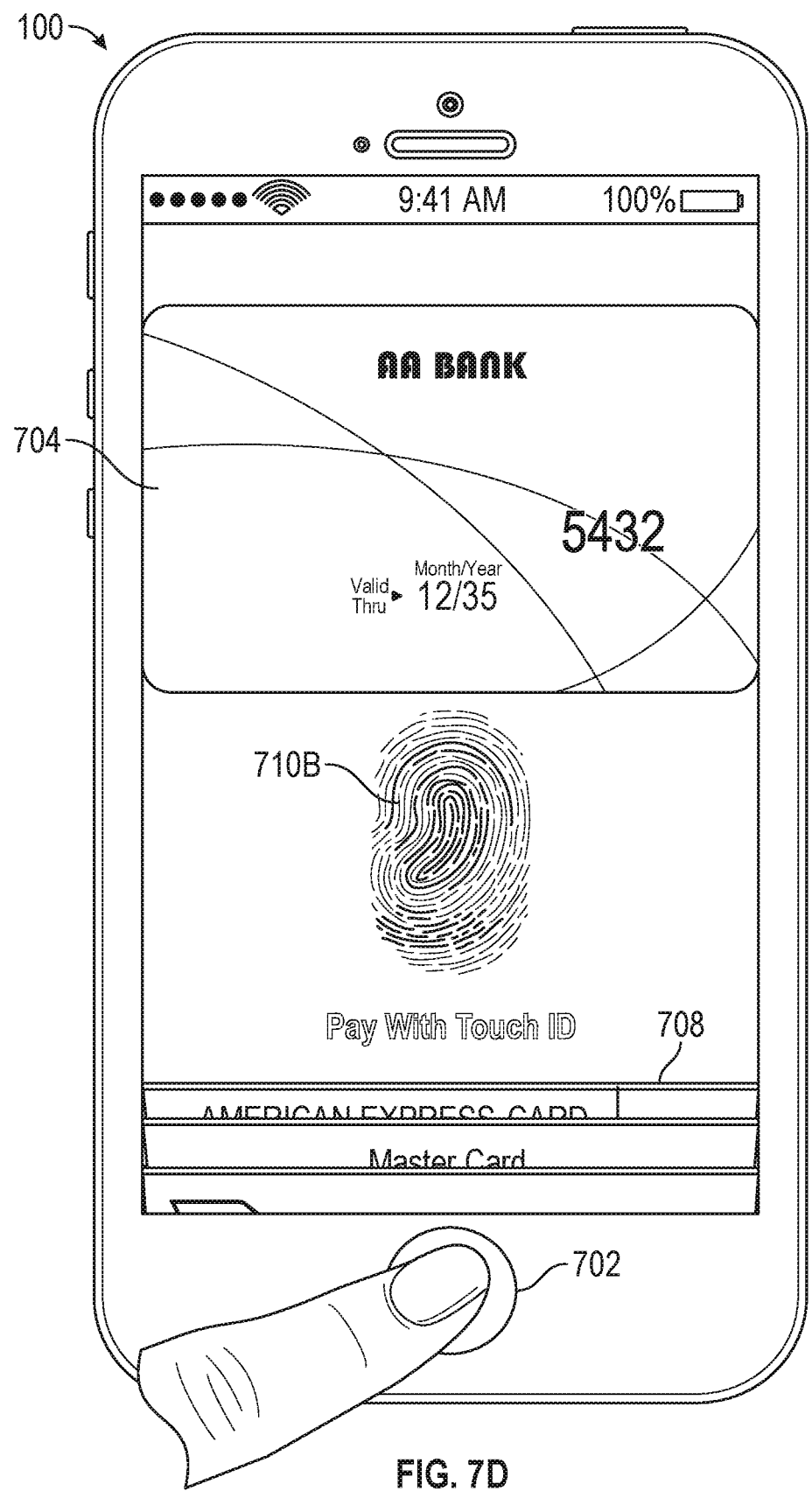
Figure 7E:
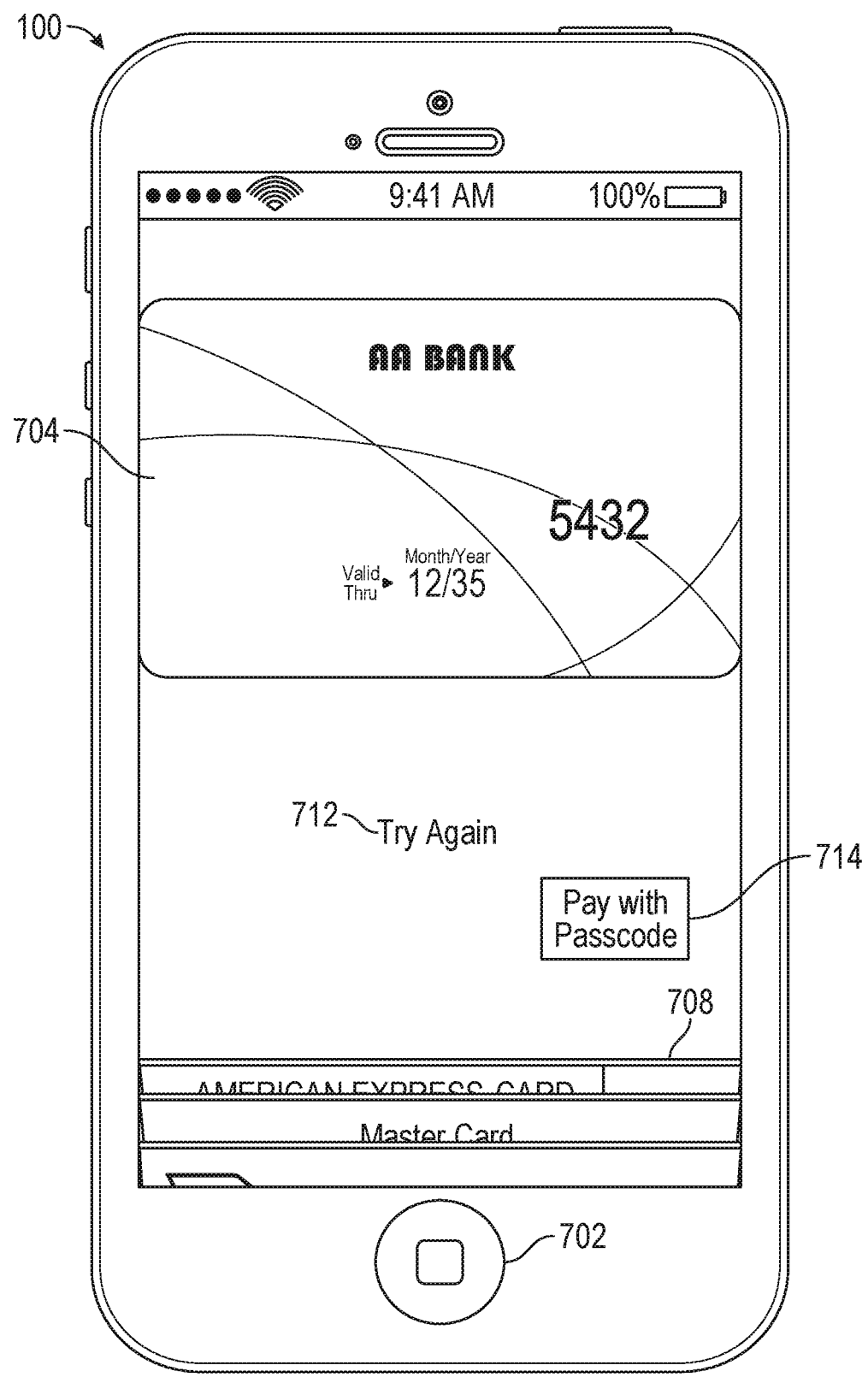
Figure 7F:
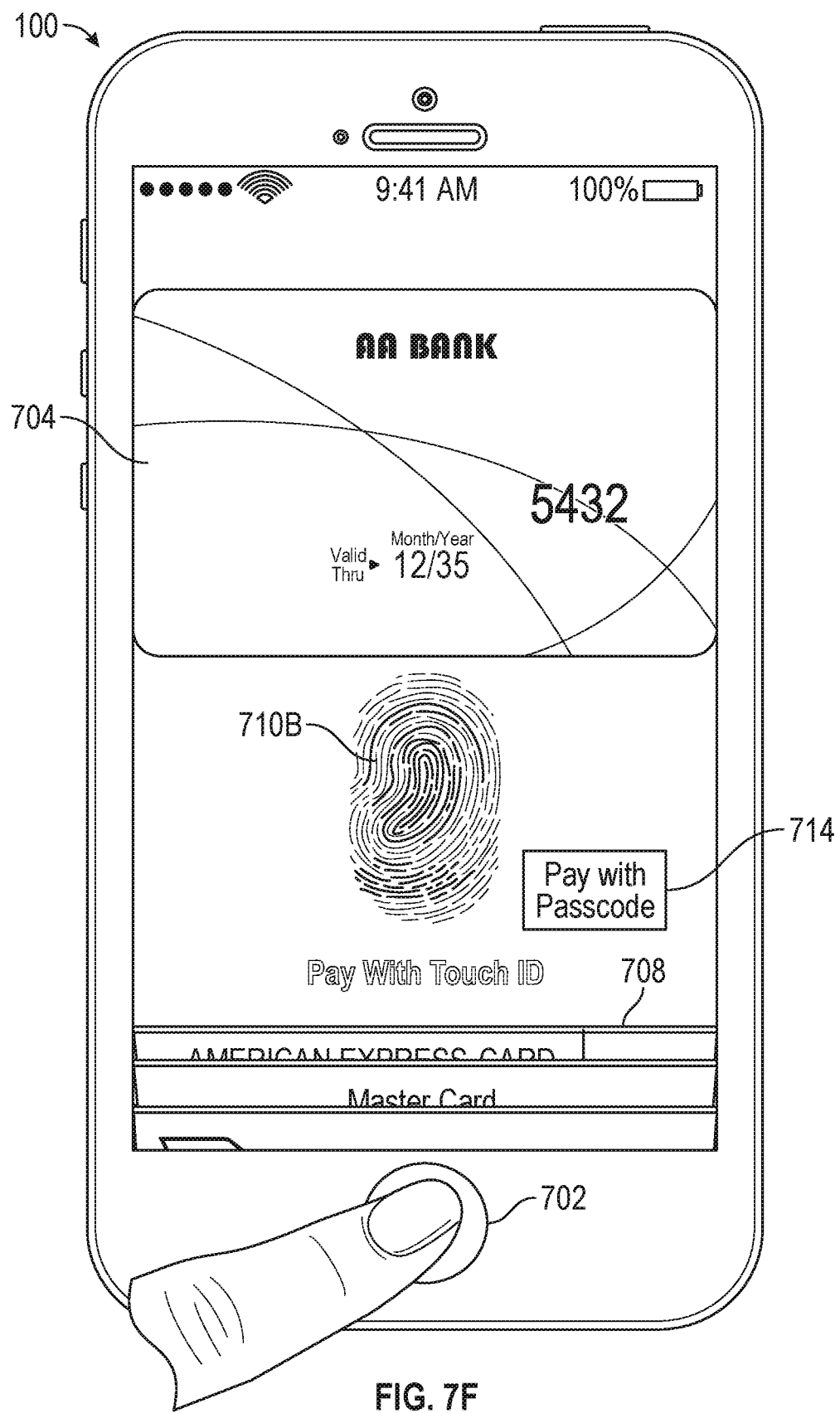
Figure 7G:
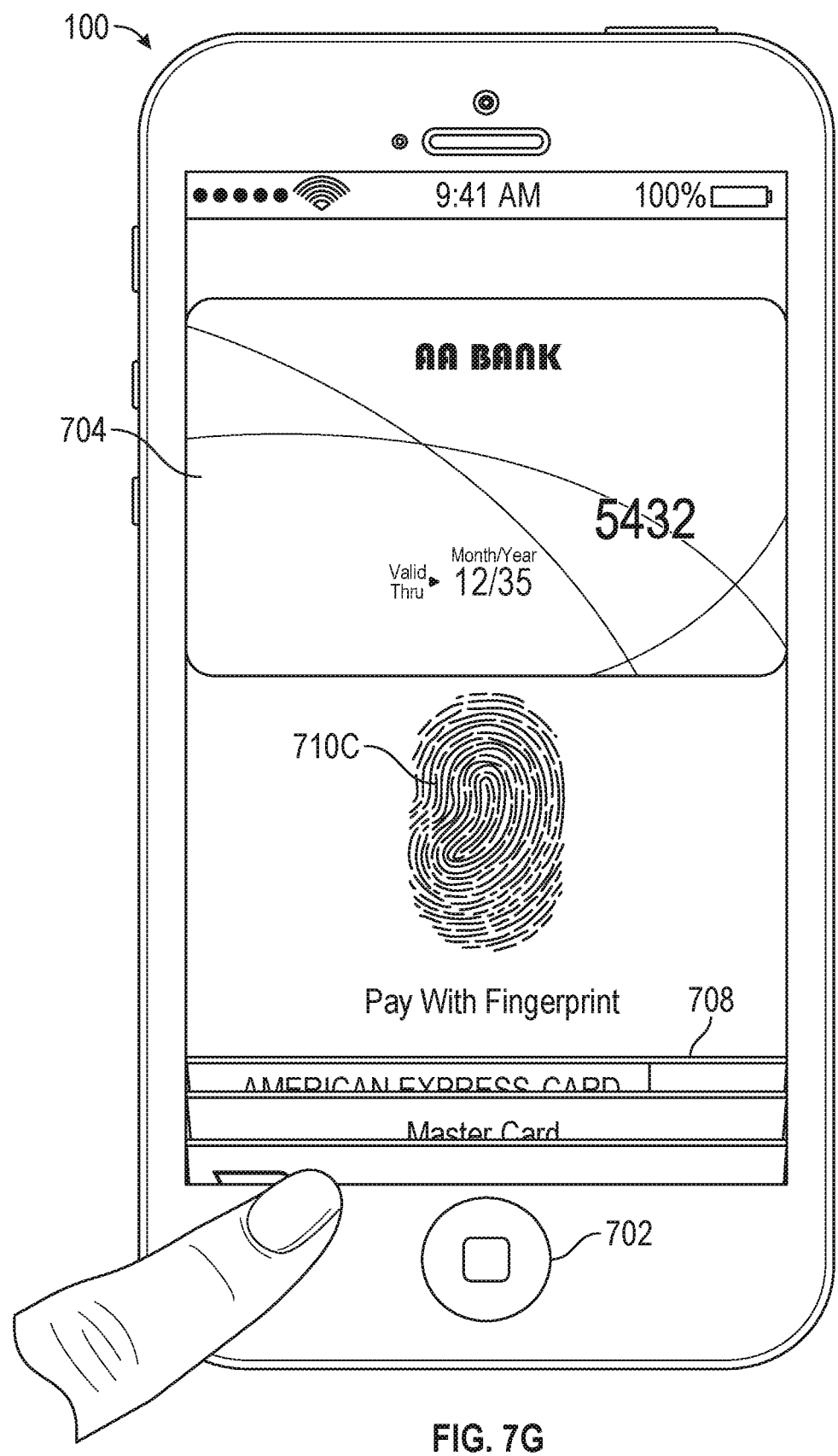
Figure 7H:
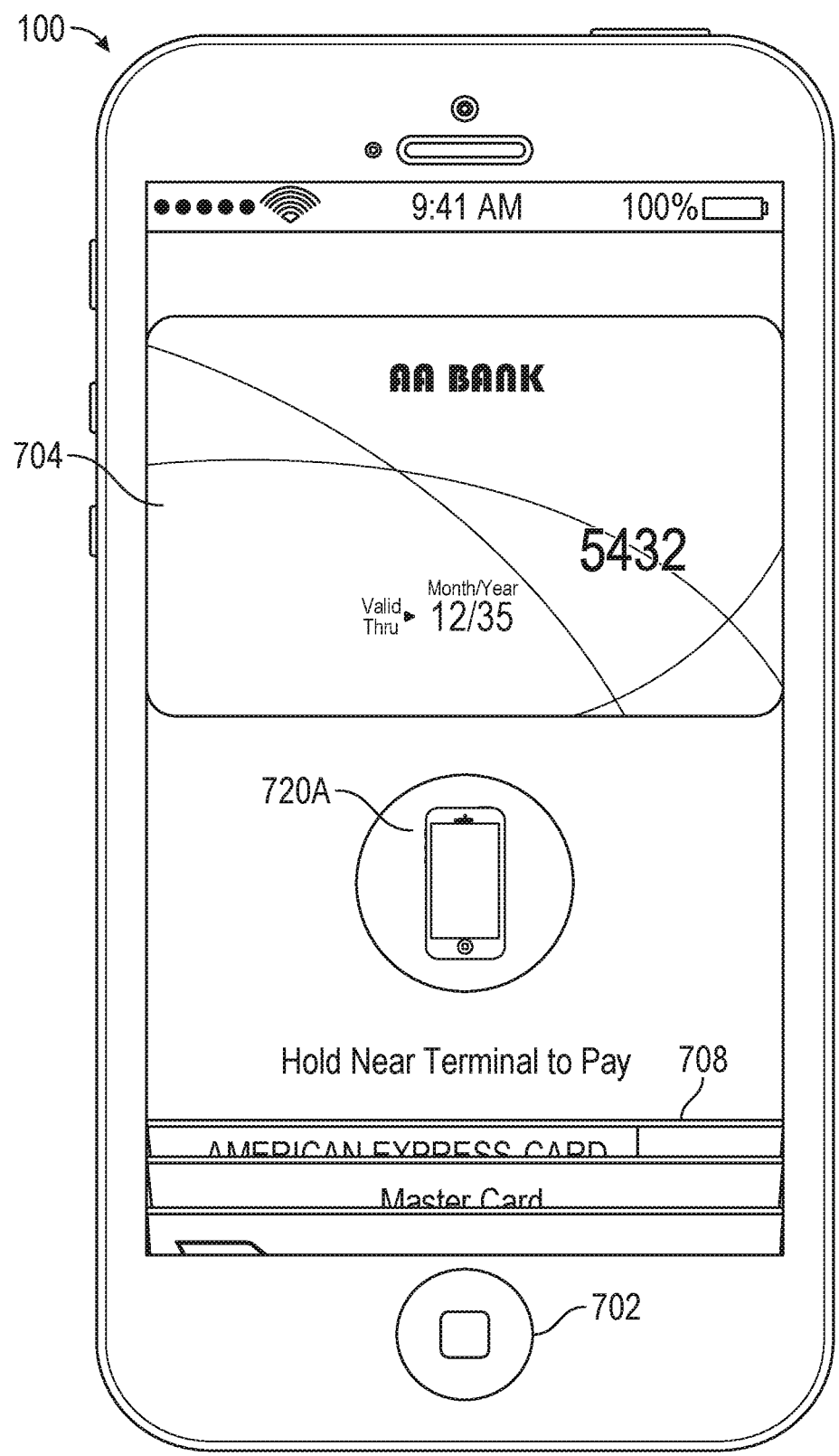
Figure 7I:
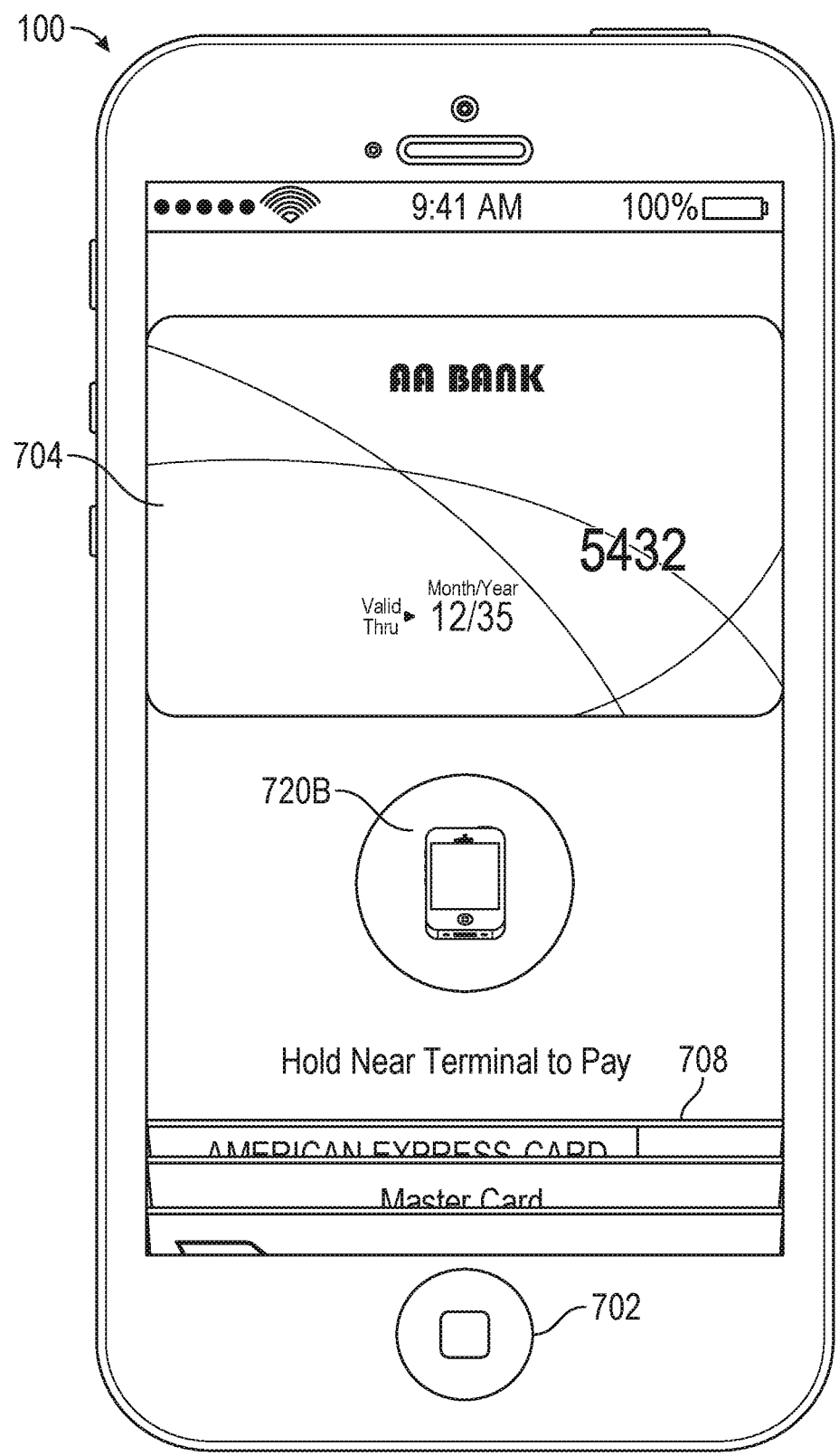
Figure 7J:
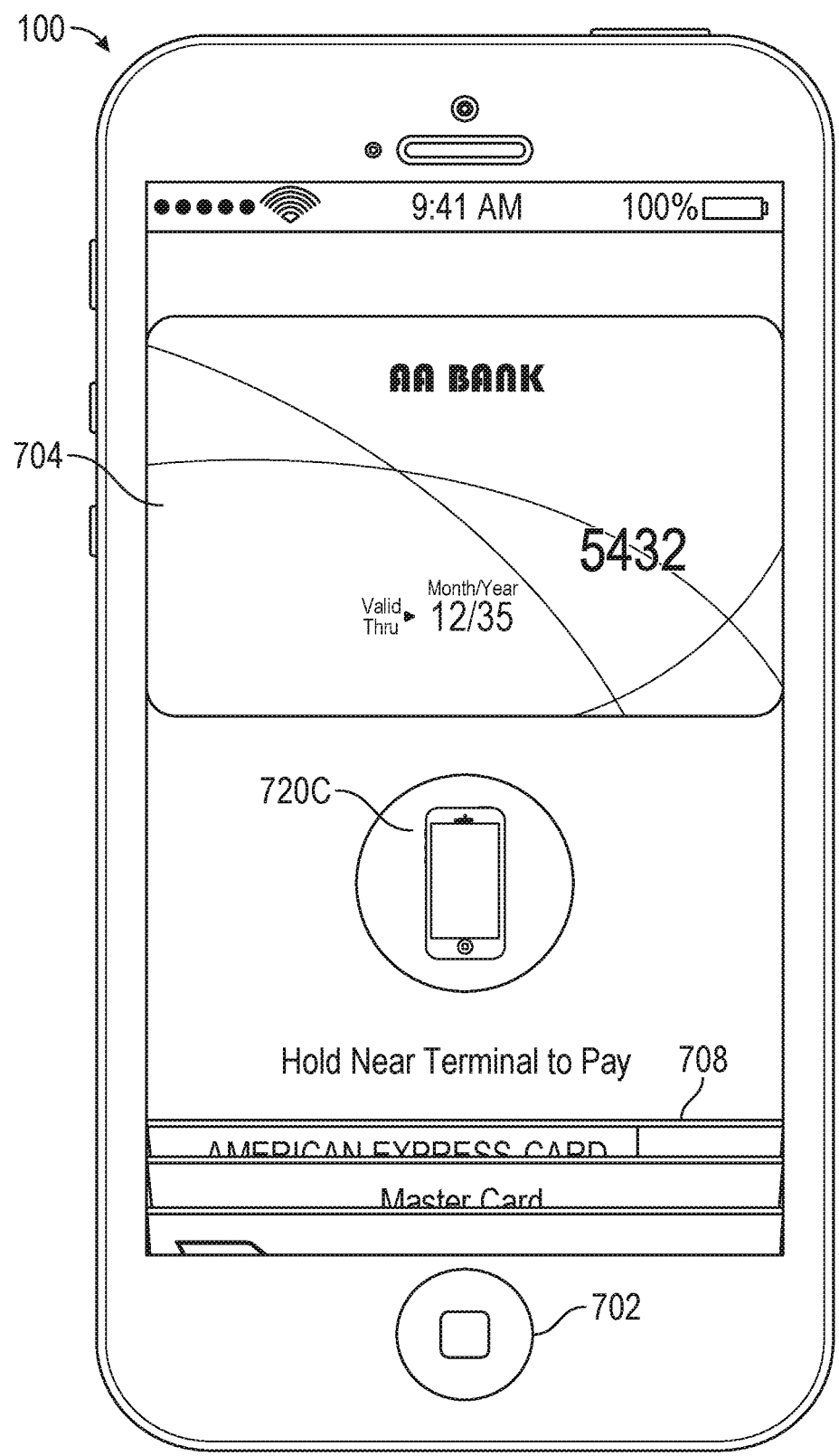
Figure 7K:
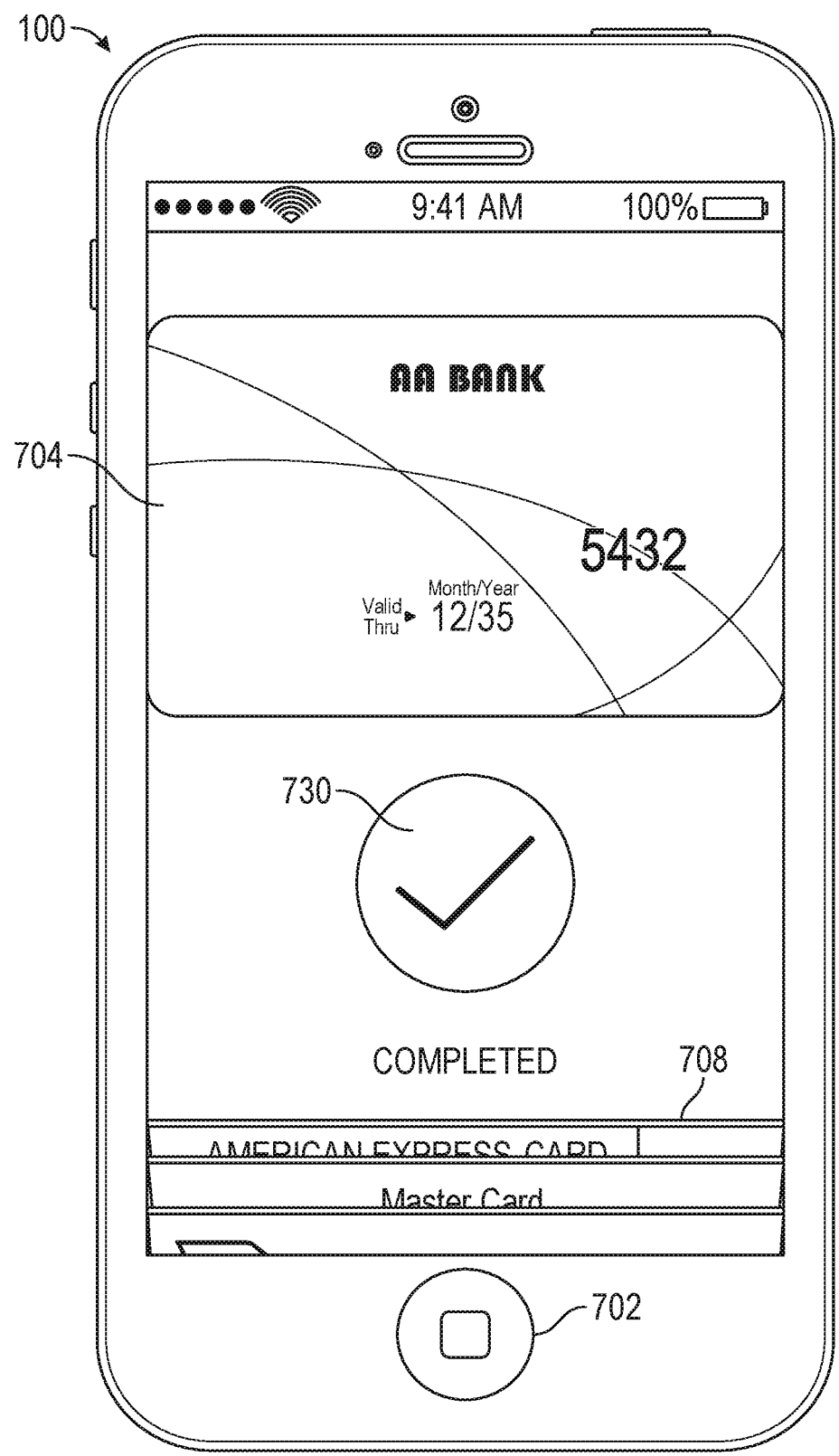
Figure 7L:
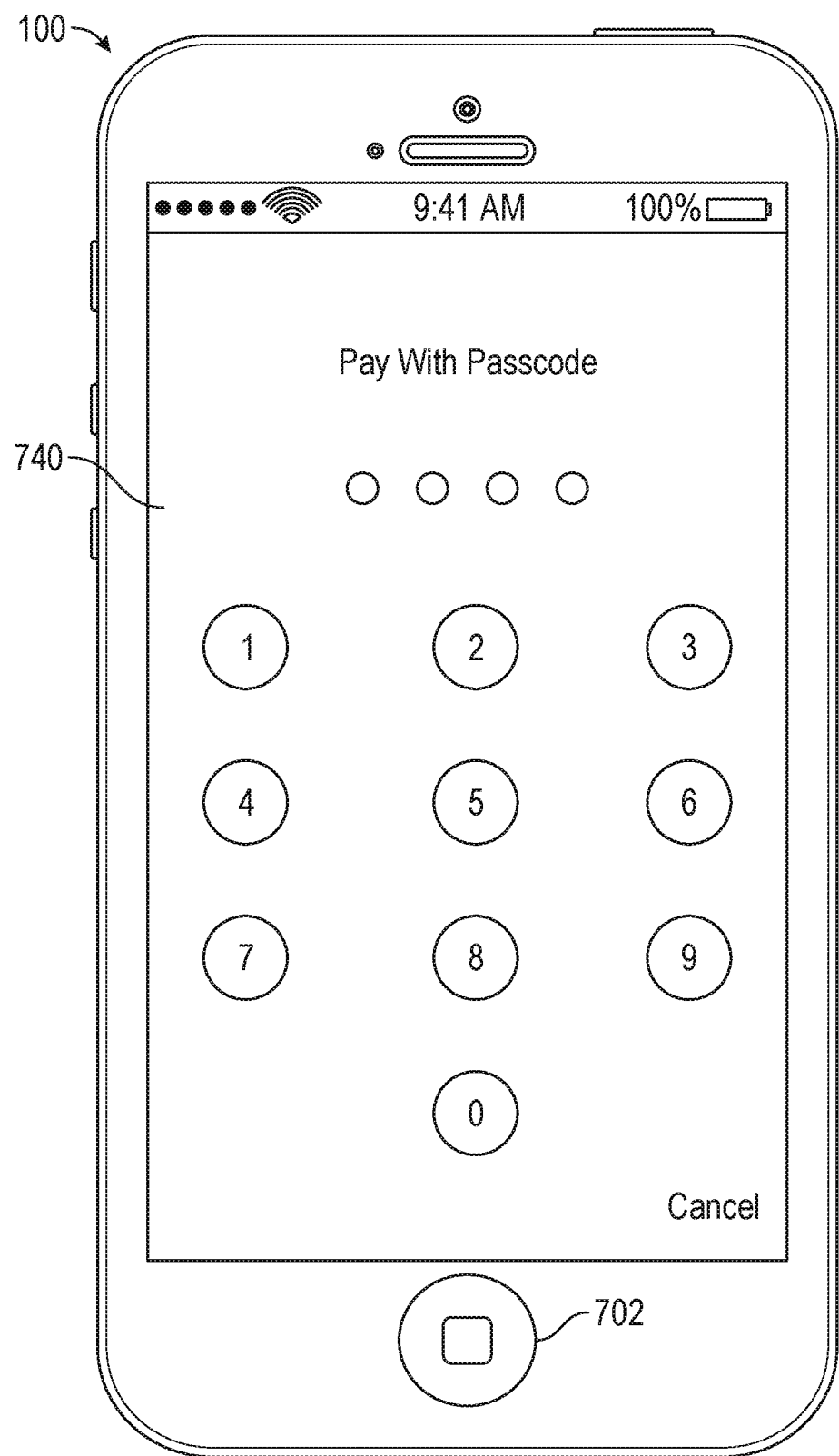
Figure 7M:
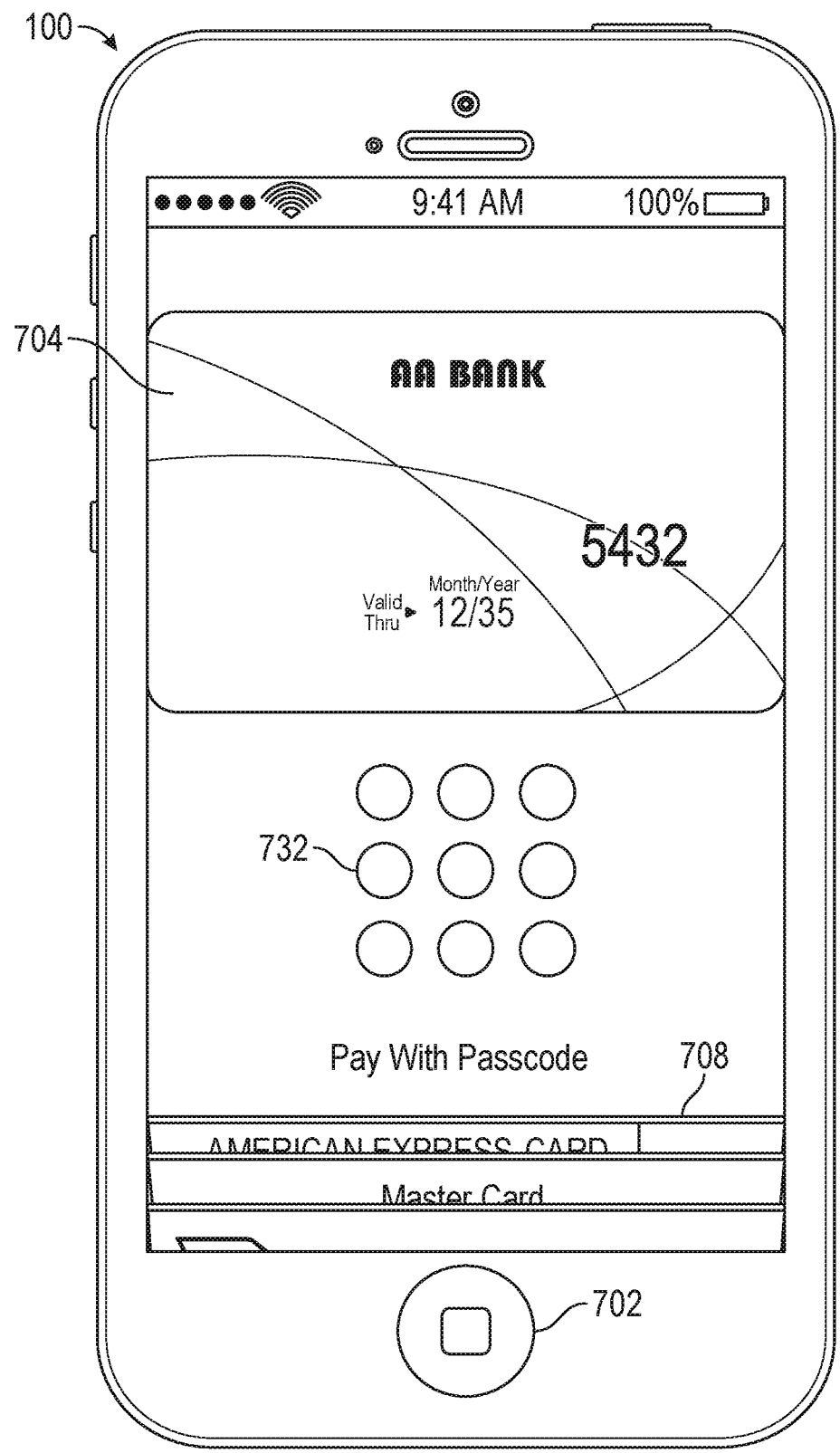
Figure 7N:
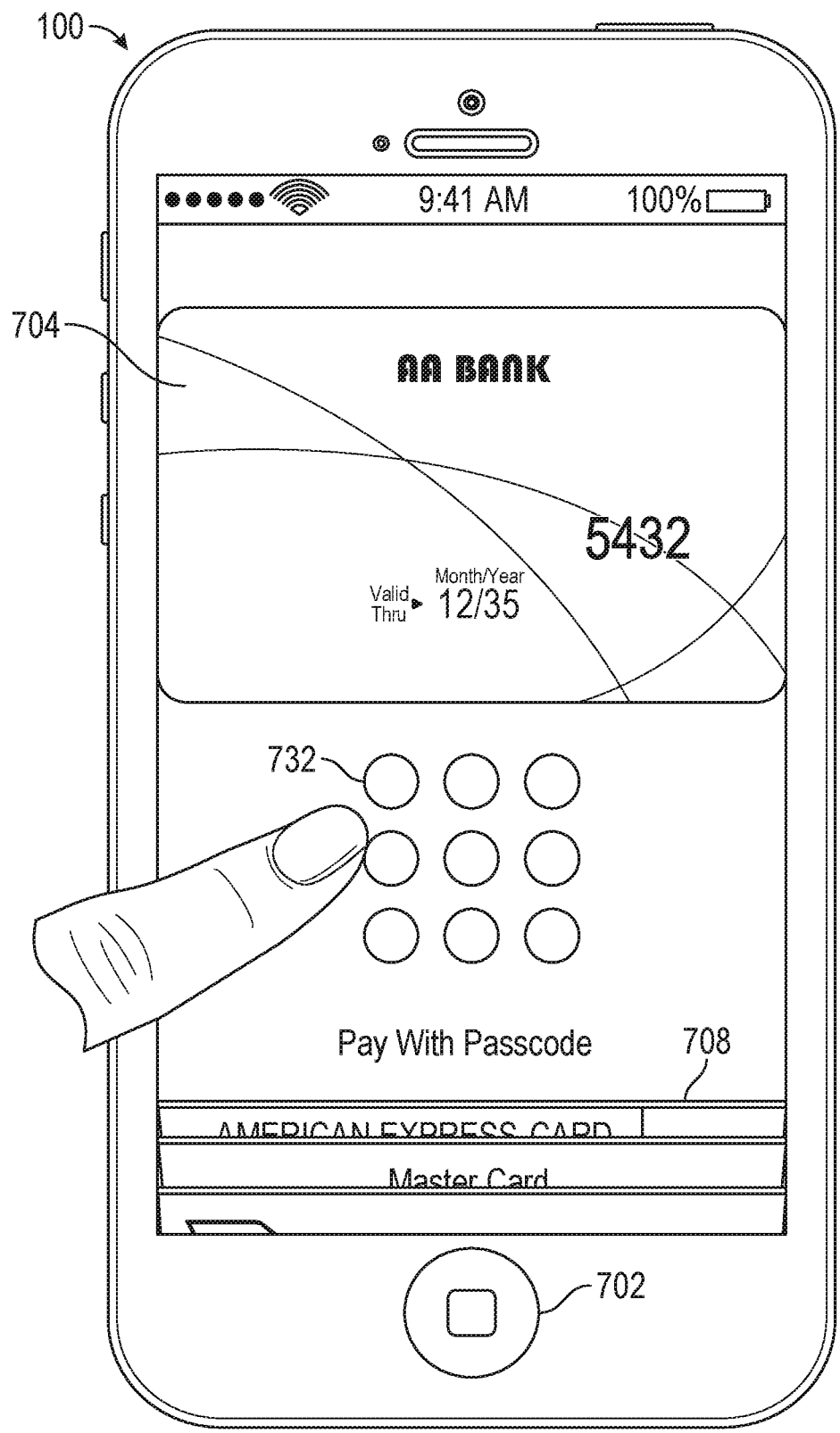
Figure 7O:
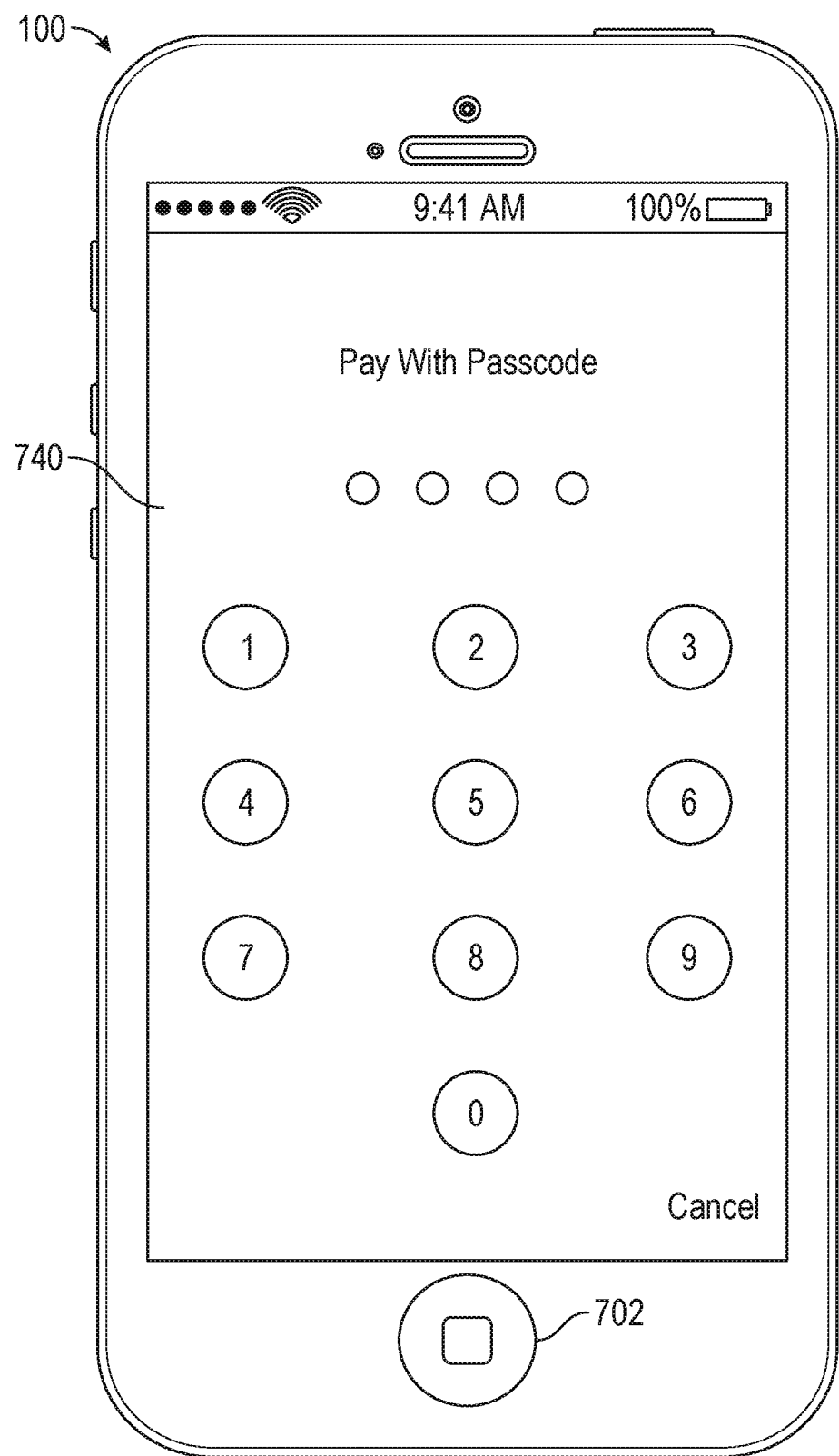

FIGS. 7A-7O illustrate exemplary techniques and user interfaces for proceeding with a payment transaction using a short-range communication radio, such as a near field communication (NFC) radio, in accordance with some embodiments. The techniques and user interfaces in these figures are used to illustrate the processes described below, including the process in FIGS. 8A-8B.

FIGS. 7A-7B illustrate an exemplary technique for proceeding with a payment transaction using a short-range communication radio, such as a NFC radio. The NFC standards, which are related to radio-frequency identification (RFID) standards, describe communication protocols for transferring information between two devices, such as for making payments. It should be appreciated, however, that other communications standards and techniques may also be used.

Multifunction device 100 (and device 300) may include near field communications circuitry, such as a short range communication radio. Accordingly, device 100 can wirelessly communicate with external equipment, such as NFC-enabled contactless payment transaction terminal 2000, using near field communications. For example, the near field communications circuitry in device 100 may include a near field transmitter and a near field receiver. Near field communications for device 100 may be supported using capacitive coupling near field communications structures and/or inductive coupling near field communications structures. In near field communications techniques, wireless signals are typically conveyed, for example, over distances of 1 m or less, 100 cm or less, 10 cm or less, or 1 cm or less, and are not conveyed over longer distances.

In FIG. 7A, the NFC-enabled contactless payment transaction terminal 2000 generates a field 2002. For example, an NFC-enabled device that enters the field 2002 can communicate with the contactless payment transaction terminal 2000 using NFC. In FIG. 7A, the electronic device 100 has not been placed in the field 2002. The contactless payment transaction terminal 2000 may be part of a payment system (e.g., check register) installed in a retail store for processing payment transactions, such as purchases of products and services.

In some embodiments, electronic device 100 receives authorization (e.g., from the user, as described in detail below) to proceed with a payment transaction prior to detecting presence of the field 2002 (e.g., an NFC compliant RF field) generated by the contactless payment transaction terminal 2000. The authorization is only valid for a predetermined period of time (e.g., up to 30 seconds). If the user places the device into field 2002 after receiving authorization and before the predetermined period of time has elapsed, the device will proceed with the payment transaction (e.g., a payment of funds being solicited by the contactless payment transaction terminal 2000). After the predetermined period of time has elapsed, the device will no longer have authorization to proceed with the payment transaction (unless the user authorizes the device again), and accordingly the device will not proceed with the payment transaction, even if placed within range of the field 2002. Thus, the device does not stay authorized indefinitely after receiving authorization to proceed with a payment transaction.

In FIG. 7B, the user places the electronic device 100 into the field 2002. The electronic device detects, by the short-range communication radio of the electronic device, presence of the field 2002 (e.g., the NFC compliant RF field) generated by the contactless payment transaction terminal 2000 (e.g., an NFC-compliant payment transaction terminal). In some embodiments, the electronic device detects the field and communication initiation signal from the contactless payment transaction terminal 2000. In response to detecting presence of the field 2002 generated by the contactless payment transaction terminal 2000, the device determines whether authorization to proceed with a payment transaction is provided. For example, the device determines whether the device has been pre-authorized by the user (e.g., prior to the device detecting the field 2002, as discussed above) for proceeding with payment transactions or whether the user is currently authorizing the device to proceed with the payment transaction (e.g., the user has placed a finger on a fingerprint sensor for authorization).

In some embodiments, while the device is within range of the field generated by the contactless payment transaction terminal, the device detects a respective fingerprint on a fingerprint sensor of the electronic device. In response to detecting the respective fingerprint on the fingerprint sensor, the device determines whether the fingerprint is consistent with an enrolled fingerprint that is enabled to authorize payment transactions. In accordance with a determination that a respective fingerprint is consistent with the enrolled fingerprint, the device authorizes the payment transaction. For example, a user places their finger on the fingerprint sensor of the device (e.g., without turning on the display of the device or opening any particular application) and then places the device into the field 2002. When the device detects the field 2002, the device reads the fingerprint and determines that the user has provided authorization to make a payment using the device. In accordance with a determination that the respective fingerprint is not consistent with the enrolled fingerprint, the device forgoes authorization of the payment transaction. In other words, the device is not authorized to proceed with the payment transaction, meaning authorization is still required to proceed with the payment transaction.

In some embodiments, the user interface of the electronic device is locked when presence of the field generated is detected and the display of the electronic device is off when presence of the field generated is detected. In response to detecting the presence of the field 2002 generated by the contactless payment transaction terminal 2002, the device turns the display on.

FIG. 7C illustrates an exemplary user interface for authorizing the device in order to proceed with the payment transaction. In some embodiments, in response to detecting presence of the field 2002 generated by the contactless payment transaction terminal 2000, the device displays an electronic wallet, as illustrated in FIG. 7C (e.g., if the device is placed in range of the field 2002 while the device is unlocked). The electronic wallet includes a plurality of payment card affordances (such as payment card affordances 704 and 708). For example, the user interface of FIG. 7C allows the user to easily determine which payment account will be used if the device proceeds with the payment transaction. In this example, the payment card affordance 704 is displayed at the top of the display, indicating that the payment account associated with the payment card affordance 704 will be used for payment.

In accordance with a determination that authorization to proceed with the payment transaction has been provided (e.g., the user provided authorization prior to entering the field 2002 or the user provides authorization while the device is in the field 2002), the device proceeds with the payment transaction with the contactless payment transaction terminal 2000 (e.g., transmitting an identifier such as a PAN to the contactless payment transaction terminal 2000 for use in completing the payment transaction).

In some embodiments, proceeding with the payment transaction with the contactless payment transaction terminal 2002 comprises using a linked payment account (e.g., a payment account linked to the electronic device and stored in an electronic wallet) to complete the payment transaction. In some embodiments, proceeding with the payment transaction with the contactless payment transaction terminal 2002 comprises using a primary account number for use in the payment transaction (e.g., using the credit account to make the purchase) to complete the payment transaction, where the primary account number is stored on the electronic device.

In some embodiments, in accordance with the determination that authorization to proceed with the payment transaction has been provided, the device determines whether the payment transaction is successfully completed. In response to determining the payment transaction is successfully completed, the device plays, at the electronic device, a success audio alert. The success audio alert indicates that the payment transaction is successfully completed. In some embodiments, the success audio alert is different than a failure audio alert.

Similarly, providing non-audio notifications to the user of the device is helpful for the user to understand whether additional input is required. In some embodiments, in accordance with the determination that authorization to proceed with the payment transaction has been provided (e.g., the device is armed), the device determines whether the payment transaction is successfully completed. In response to determining the payment transaction is successfully completed, the device causes a success haptic alert indicating that the payment transaction is successfully completed. In one example, the success haptic alert is different than a failure haptic alert. For example, the failure haptic alert is longer in duration and more intense than the success haptic alert.

FIG. 7C illustrates an exemplary user interface for authorizing the device in order to proceed with the payment transaction. In accordance with a determination that authorization to proceed with the payment transaction has not been provided (e.g., the device is not armed), the device provides an indication requesting authorization to proceed with the payment transaction. For example, the indication may be a display of a fingerprint visual indicator (e.g., 710A of FIG. 7C) on the display or the indication may be producing a haptic alert at the device (or both the visual indicator and the haptic alert). These indications requesting authorization to proceed with the payment transaction provide an intuitive user interface to let the user know that the contactless payment transaction terminal 2000 is capable of processing (or is attempting to process) a payment transaction using the device.

In some embodiments, the indication requesting authorization to proceed with the payment transaction includes detecting, by the short-range communication radio, whether the device continues to be in the presence of the field 2002. In response to detecting that the device does not continue to be in the presence of the field, the device displays, on the display, a visual indicator indicating that authentication has failed or has not been provided). The visual indicator is helpful because the user may be looking at the device while the device is not in the field 2002. In response to detecting that the device continues to be in the presence of the field, causing, at the electronic device, a non-visual alert (e.g., haptic or audio alert) indicating that authentication has failed (or has not been provided). The non-visual alert is helpful because the user may not be looking at the display when the device is in the field 2002. In some embodiments, a similar approach is used to indicate success of the authentication. When the device is out of the field, the user is likely able to easily look at the display, whereas when the device is in the field, the user is not likely to be able to easily look at the display, thus providing a non-visual alert when the device is in the field provides a more intuitive user interface for the device.

In some embodiments, providing an indication requesting authorization to proceed with the payment transaction includes displaying, on the display, instruction (e.g., prompt user to authenticate using fingerprint reader, 710A of FIG. 7C) for authorizing to proceed with the payment transaction. In some embodiments, providing an indication requesting authorization to proceed with the payment transaction comprises causing, at the electronic device, a haptic alert instead of, or in addition to, the instruction for authorizing to proceed with the payment transaction.

In some embodiments, providing the indication requesting authorization to proceed with the payment transaction comprises displaying an authorization request screen on the display of the electronic device, such as illustrated in FIG. 7C. The authorization request screen includes a graphical representation 704 of the credit card associated with the payment account, and the graphical representation 704 includes the background image of the credit card associated with the payment account. In some embodiments, the graphical representation 704 also includes other information identifying the credit card associated with the payment account, such as a name of the credit card holder, a credit card number from the physical credit card (even if the credit card number from the physical credit card is different from the account number linked to the device), and/or an expiration date.

In some embodiments, after detecting the presence of the field 2002 generated by the contactless payment transaction terminal when authorization to proceed with the payment transaction has not been provided (e.g., the user has not provided authorization to the device), the device detects, by the short-range communication radio, that the device is no longer in range of the field 2002 generated by the contactless payment transaction terminal 2000. In response to detecting that the device is no longer in range of the field 2002 (e.g., the user is not holding the device over the contactless payment transaction terminal 2000), the device displays a plurality of payment card affordances (e.g., payment card affordances 704 and 708 of FIG. 7C) associated with different payment accounts. The device receives authorization to proceed with the payment transaction for a predetermined period of time with one of the payment accounts (e.g., in response to detecting a user input selecting a "pay with this payment account" option in a displayed representation of a payment account).

At FIG. 7C, the device provides an indication that a default payment card affordance 704 of the plurality of payment card affordances 704 and 708 is selected as a default payment account. The default primary account number associated with the default payment card affordance is selected for use in the payment transaction (e.g., when the user does not select a different payment account for use in the payment transaction). In some embodiments, different payment accounts are assigned as the default payment account based on current environmental factors, such as the current day of month, time of day, and/or location. In some embodiments, different payment accounts are assigned as the default card based on the budget available on one or more payment accounts. For example, a payment account that has reached a maximum budget (or has reached a threshold based on the maximum budget) will not be used as the default payment account.

However, a user can select an alternate payment card affordance (such as one of the plurality of payment card affordances 704 and 708). The device receives the selection (e.g., a finger tap) of the alternate payment card affordance of the plurality of payment card affordances 704 and 708, where the alternate payment card affordance is associated with a respective alternate primary account number. In response to receiving the selection of the alternate payment card affordance, the device selects the respective alternate primary account number for use in the payment transaction (rather than the default primary account number).

In some embodiments, in accordance with the determination that authorization to proceed with the payment transaction has not been provided, the device receives authorization (e.g., receiving a passcode for payment or detecting a fingerprint for payment) to proceed with a payment transaction for a predetermined period of time (e.g., up to 30 seconds). For example, the user places the device into the field 2002 and is prompted to provide authorization, as discussed above. The user then removes the device from the field 2002 and provides authorization using the fingerprint sensor or a passcode. The authorization is valid for a predetermined period of time (e.g., 30 seconds). If the user places the device into field 2002 before the predetermined period of time has elapsed, the device will proceed with the payment transaction. After the predetermined period of time has elapsed, the device will no longer have authorization to proceed with the payment transaction (unless the user authorizes the device again), and accordingly the device will not proceed with the payment transaction. Thus, the device does not stay authorized indefinitely after receiving authorization to proceed with a payment transaction.

FIGS. 7D-7G illustrate various exemplary user interfaces and techniques for receiving authorization to proceed with the payment transaction. As discussed above, in some embodiments, authorization to proceed with the payment transaction can be provided through the fingerprint sensor 702. At FIG. 7D, the device detects a respective fingerprint on a fingerprint sensor 702 of the electronic device. In response to detecting the respective fingerprint on the fingerprint sensor, the device determines that the fingerprint is consistent with an enrolled fingerprint that is enabled to authorize payment transactions. The device displays progress of the determination of whether the respective fingerprint is consistent with an enrolled fingerprint by at least partially filling in the fingerprint visual indicator 710A, as shown in the partially filled fingerprint visual indicator 710B. In accordance with a determination that a respective fingerprint is consistent with the enrolled fingerprint, the device can authorize the payment transaction. The device may also display progress of the payment transaction process by further filling in the fingerprint visual indicator 710B. The device provides an indication (e.g., checkmark 730 of FIG. 7K) when the payment transaction is completed.

FIG. 7E illustrates an exemplary user interface where authentication using the fingerprint sensor has failed. In some embodiments, in accordance with a determination that the respective fingerprint is not consistent with the enrolled fingerprint, the device displays, on the display, a visual prompt (712 of FIG. 7E) instructing a user to place a finger on the fingerprint sensor 702.

FIGS. 7E-7F illustrate various exemplary user interfaces to authenticate using a passcode. In some embodiments, in accordance with a determination that the respective fingerprint is not consistent with the enrolled fingerprint, the device displays, on the display, an affordance 714 for receiving authorization to proceed with the payment transaction using a payment passcode (rather than the fingerprint sensor). The device also indicates to the user that authentication has failed by, for example, providing visual prompt 712. If the device receives selection of the affordance 714 for receiving authorization, the device displays a keypad 740 for receiving a payment passcode entry, such as illustrated in FIG. 7L. In FIG. 7F, the user attempts to authenticate again using the fingerprint sensor 702. The device displays progress of the determination of whether the respective fingerprint is consistent with an enrolled fingerprint by at least partially filling in the fingerprint visual indicator, as shown in the partially filled fingerprint visual indicator 710B of FIG. 7F. If the device determines that the respective fingerprint is consistent with an enrolled fingerprint, the device display the completely filled fingerprint visual indicator 710C of FIG. 7G.

In some embodiments, in accordance with a determination that the respective fingerprint is not consistent with the enrolled fingerprint, the device plays, at the electronic device, a failure audio alert through a speaker. The failure audio alert indicates that authorization to proceed with the payment transaction has not been provided. Providing an audio notification to the user of the device of the status (or state) of the technique is helpful for the user to understand whether additional input is required.

In some embodiments, in accordance with a determination that the respective fingerprint is not consistent with the enrolled fingerprint, the device causes a failure haptic alert indicating that authorization to proceed with the payment transaction has not been provided. The haptic feedback is particularly helpful to the user if the user has placed the device into the field 2002 and is not looking at the display.

FIG. 7F illustrates an exemplary user interface for authentication using the fingerprint sensor after one or more failed attempts at authenticating using the fingerprint sensor. In some embodiments, the electronic device determines whether a predetermined number of attempts to receive authorization to proceed with the payment transaction using the fingerprint sensor has been reached. In accordance with a determination that the predetermined number of attempts to receive authorization has been reached, the device requires authorization using a payment passcode to proceed with the payment transaction, such as in the user interface illustrated in FIG. 7L. For example, the predetermined number of attempts is three. Thus, after the third failed attempt to authorize using the fingerprint sensor, the device requires authorization using a payment passcode to proceed with the payment transaction.

FIGS. 7M-7O illustrate various exemplary user interfaces for receiving authorization to proceed with the payment transaction. As discussed above, authorization to proceed with the payment transaction can be provided through receiving a payment passcode. In some embodiments, the device receives a payment passcode at the electronic device. The device determines that the payment passcode is consistent with an enrolled passcode that is enabled to authorize payment transactions. In response to determining that the payment passcode is consistent with the enrolled passcode (e.g., a passcode programmed by the user for unlocking the device or for making payments), the device authorizes the payment transaction. For example, authorization can be received using a payment passcode when authorization using the fingerprint sensor 702 has failed. If the electronic device does not support authorization using the fingerprint sensor 702 (e.g., the feature has been disabled or the device does not have a fingerprint sensor 702), the user interface of FIG. 7M may be displayed instead of the user interface of FIG. 7C. At FIG. 7N, the device receives selection of the payment passcode affordance 732. In response, the device displays keypad 740 for receiving a payment passcode entry, such as illustrated in FIG. 7O.

In some embodiments, the predetermined period of time is based on a current location of the electronic device. For example, when the device determines that the current location is at a department store, the predetermined period of time may be set to 15 seconds. In another example, when the device determines that the current location is a concert or theater venue, the predetermined period of time may be set to 45 seconds. This may, for example, help to accommodate delays such as standing in line or making a purchase decision. Having a predetermined period of time that is based on the location may also help limit fraud.

In some embodiments, the predetermined period of time is based on a credit score associated with the payment account. For example, the predetermined period of time may be based on creditworthiness. In one example, the predetermined period of time may be set to 30 seconds when the credit score associated with the payment account is above a threshold, indicating good credit. In another example, the predetermined period of time may be set to 15 seconds when the credit score associated with the payment account is below a threshold, indicating not good credit (e.g., poor credit). For example, a predetermined period of time that is based on a credit score may help limit fraud.

In some embodiments, the predetermined period of time is user-configurable. For example, a user may decide that a longer predetermined period of time may be helpful in proceeding with payment transactions. Thus, the user can increase the predetermined period of time to value, such as 60 seconds, that is higher than the default value. For example, a predetermined period of time that is user configurable may help limit fraud.

FIGS. 7H-7J illustrate various exemplary user interfaces for indicating that authorization to proceed with a payment transaction has been provided. In some embodiments, in response to receiving authorization to proceed with the payment transaction, (e.g., through a passcode or the fingerprint sensor 702), the device displays a graphical indication 720A-720C that authorization to proceed has been provided. In some embodiments, the graphical indication includes an indication to place the device in the field (e.g., an animated icon that shows a device moving to indicate that the device needs to be moved to be placed in range of the field 2002). For example, graphical indication 720A-720C is an animation illustrating an electronic device, such as a cellular phone, starting at a substantially vertical position (720A, FIG. 7H), being bent down (backwards) from the substantially vertical position (720B, FIG. 7I), and returning to the substantially vertical position (720C, FIG. 7J). This indicates to the user that authorization to proceed with the payment transaction has been provided to the electronic device, and that the user should place the electronic device into the field 2002 to proceed with the payment transaction.

FIG. 7K illustrates an exemplary user interface for indicating that the payment transaction was completed. In some embodiments, in response to receiving authorization to proceed with the payment transaction, the device proceeds with the payment transaction (e.g., processes the payment transaction using the NFC-enabled contactless payment transaction terminal 2000 when the device is within range of the field 2002 and the authorization has not expired). In some examples, the device provides an indication (e.g., checkmark 730 of FIG. 7K) when the payment transaction is completed.

FIGS. 8A-8B are flow diagrams illustrating a method 800 for proceeding with a payment transaction using a short-range communication radio (e.g., an NFC radio) in accordance with some embodiments. It should be appreciated that other communications standards and techniques may be used. Method 800 is performed at a device (e.g., device 300, FIG. 3, or portable multifunction device 100, FIG. 1) with a display and a short-range communication radio. Some operations in method 800 may be combined, the order of some operations may be changed, and some operations may be omitted.

As described below, method 800 provides an intuitive way to proceed with a payment transaction using a short-range communication radio. The method reduces the cognitive burden on a user when making a payment transaction, thereby creating a more efficient human-machine interface. For battery-operated computing devices, enabling a user to make a payment transaction faster and more efficiently conserves power and increases the time between battery charges.

Multifunction device 100 (and device 300) may include near field communications circuitry. Accordingly, device 100 can wirelessly communicate with external equipment, such as NFC-enabled contactless payment transaction terminal 2000, using near field communications. The contactless payment transaction terminal 2000 may be part of a payment system (e.g., check register) installed in a retail store for processing payment transactions, such as purchases of products and services. For example, the near field communications circuitry in device 100 may include a near field transmitter and a near field receiver. Near field communications for device 100 may be supported using capacitive coupling near field communications structures and/or inductive coupling near field communications structures. In near field communications techniques, wireless signals are typically conveyed, for example, over distances of 1 m or less, 100 cm or less, 10 cm or less, or 1 cm or less, and are not conveyed over longer distances.

At block 802, in some embodiments, the electronic device receives authorization (e.g., from the user, as described in detail below) to proceed with a payment transaction prior to detecting presence of a field (e.g., an NFC compliant RF field 2002 of FIG. 7A) generated by the contactless payment transaction terminal (e.g., 2000 of FIG. 7A). The authorization is only valid for a predetermined period of time (e.g., up to 30 seconds). If the user places the device into the field after receiving authorization and before the predetermined period of time has elapsed, the device will proceed with the payment transaction (e.g., a payment of funds being solicited by the contactless payment transaction terminal 2000 of FIG. 7A). After the predetermined period of time has elapsed, the device will no longer have authorization to proceed with the payment transaction (unless the user authorizes the device again), and accordingly the device will not proceed with the payment transaction, even if placed within range of the field. Thus, the device does not stay authorized indefinitely after receiving authorization to proceed with a payment transaction. In some embodiments, the device may not receive authorization to proceed with the payment transaction prior to detecting presence of the field generated by the contactless payment transaction terminal.

At block 804, the electronic device detects, by the short-range communication radio of the electronic device presence of the field (e.g., the NFC compliant RF field 2002 of FIG. 7B) generated by the contactless payment transaction terminal (e.g., an NFC-compliant payment transaction terminal 2000 of FIG. 7B).

At block 806, in response to detecting presence of the field generated by the contactless payment transaction terminal, the device determines whether authorization to proceed with a payment transaction is provided. For example, the device determines whether the device has been pre-authorized by the user (e.g., prior to the device detecting the field) for proceeding with payment transactions or whether the user is currently authorizing the device to proceed with the payment transaction (e.g., the user has placed a finger on a fingerprint sensor for authorization).

At block 808, in some embodiments, while the device is within range of the field generated by the contactless payment transaction terminal, the device detects a respective fingerprint on a fingerprint sensor of the electronic device. In response to detecting the respective fingerprint on the fingerprint sensor, the device determines whether the fingerprint is consistent with an enrolled fingerprint that is enabled to authorize payment transactions. In accordance with a determination that a respective fingerprint is consistent with the enrolled fingerprint, the device authorizes the payment transaction. For example, a user places their finger on the fingerprint sensor of the device (e.g., without turning on the display of the device or opening any particular application) and then places the device into the field. When the device detects the field, the device reads the fingerprint and determines that the user has provided authorization to make a payment using the device. In accordance with a determination that the respective fingerprint is not consistent with the enrolled fingerprint, the device forgoes authorization of the payment transaction. In other words, the device is not authorized to proceed with the payment transaction, meaning authorization is still required to proceed with the payment transaction.

In some embodiments, the user interface of the electronic device is locked when presence of the field generated is detected and the display of the electronic device is off when presence of the field generated is detected. In response to detecting the presence of the field generated by the contactless payment transaction terminal, the device turns the display on.

At block 810, in some embodiments, in response to detecting presence of the field generated by the contactless payment transaction terminal, the device displays an electronic wallet (e.g., as illustrated in FIG. 7C and/or if the device is placed in range of the field while the device is unlocked). The electronic wallet includes a plurality of payment card affordances (such as payment card affordances 704 and 708 of FIG. 7C).

At block 812, in accordance with a determination that authorization to proceed with the payment transaction has been provided (e.g., the user provided authorization prior to entering the field or the user provides authorization while the device is in the field), the device proceeds with the payment transaction with the contactless payment transaction terminal (e.g., transmitting an identifier such as a PAN to the contactless payment transaction terminal for use in completing the payment transaction).

In some embodiments, proceeding with the payment transaction with the contactless payment transaction terminal 2002 comprises using a linked payment account (e.g., a payment account linked to the electronic device and stored in an electronic wallet) to complete the payment transaction. In some embodiments, proceeding with the payment transaction with the contactless payment transaction terminal comprises using a primary account number for use in the payment transaction (e.g., using the credit account to make the purchase) to complete the payment transaction, where the primary account number is stored on the electronic device.

At block 814, in some embodiments, in accordance with the determination that authorization to proceed with the payment transaction has been provided, the device determines whether the payment transaction is successfully completed. In response to determining the payment transaction is successfully completed, the device plays, at the electronic device, a success audio alert. The success audio alert indicates that the payment transaction is successfully completed. In some embodiments, the success audio alert is different than a failure audio alert.

Similarly, providing non-audio notifications to the user of the device is helpful for the user to understand whether additional input is required. At block 814, in some embodiments, in accordance with the determination that authorization to proceed with the payment transaction has been provided (e.g., the device is armed), the device determines whether the payment transaction is successfully completed. In response to determining the payment transaction is successfully completed, the device causes a success haptic alert indicating that the payment transaction is successfully completed. In one example, the success haptic alert is different than a failure haptic alert. For example, the failure haptic alert is longer in duration and more intense than the success haptic alert.

At block 816, in accordance with a determination that authorization to proceed with the payment transaction has not been provided (e.g., the device is not armed), and at block 818 the device provides an indication requesting authorization to proceed with the payment transaction. For example, the indication may be display of a fingerprint visual indicator (e.g., 710A of FIG. 7C) on the display or the indication may be producing a haptic alert at the device (or both the visual indicator and the haptic alert). These indications requesting authorization to proceed with the payment transaction provide an intuitive user interface to let the user know that the contactless payment transaction terminal 2000 is capable of processing (or is attempting to process) a payment transaction using the device.

In some embodiments, the indication requesting authorization to proceed with the payment transaction includes detecting, by the short-range communication radio, whether the device continues to be in the presence of the field 2002. In response to detecting that the device does not continue to be in the presence of the field, the device displays, on the display, a visual indicator indicating that authentication has failed or has not been provided). The visual indicator is helpful because the user may be looking at the device while the device is not in the field 2002. In response to detecting that the device continues to be in the presence of the field, causing, at the electronic device, a non-visual alert (e.g., haptic or audio alert) indicating that authentication has failed (or has not been provided). The non-visual alert is helpful because the user may not be looking at the display when the device is in the field 2002. In some embodiments, a similar approach is used to indicate success of the authentication. When the device is out of the field, the user is likely able to easily look at the display, whereas when the device is in the field, the user is not likely to be able to easily look at the display, thus providing a non-visual alert when the device is in the field provides a more intuitive user interface for the device.

In some embodiments, providing an indication requesting authorization to proceed with the payment transaction includes displaying, on the display, instruction (e.g., prompt user to authenticate using fingerprint reader, 710A of FIG. 7C) for authorizing to proceed with the payment transaction. In some embodiments, providing an indication requesting authorization to proceed with the payment transaction comprises causing, at the electronic device, a haptic alert instead of, or in addition to, the instruction for authorizing to proceed with the payment transaction.

In some embodiments, providing the indication requesting authorization to proceed with the payment transaction comprises displaying an authorization request screen on the display of the electronic device. The authorization request screen includes a graphical representation (e.g., 704 of FIG. 7C) of the credit card associated with the payment account, and the graphical representation (e.g., 704 of FIG. 7C) includes the background image of the credit card associated with the payment account. In some embodiments, the graphical representation (e.g., 704 of FIG. 7C) also includes other information identifying the credit card associated with the payment account, such as a name of the credit card holder, a credit card number from the physical credit card (even if the credit card number from the physical credit card is different from the account number linked to the device), and/or an expiration date.

At block 820, in some embodiments, after detecting the presence of the field generated by the contactless payment transaction terminal when authorization to proceed with the payment transaction has not been provided (e.g., the user has not provided authorization to the device), the device detects, by the short-range communication radio, that the device is no longer in range of the field generated by the contactless payment transaction terminal. In response to detecting that the device is no longer in range of the field (e.g., the user is not holding the device over the contactless payment transaction terminal), the device displays a plurality of payment card affordances (e.g., payment card affordances 704 and 708 of FIG. 7C) associated with different payment accounts. The device receives authorization to proceed with the payment transaction for a predetermined period of time with one of the payment accounts (e.g., in response to detecting a user input selecting a "pay with this payment account" option in a displayed representation of a payment account).

At block 822, in some embodiments, the device provides an indication that a default payment card affordance (e.g., 704 of FIG. 7C) of the plurality of payment card affordances (e.g., 704 and 708 of FIG. 7C) is selected as a default payment account. The default primary account number associated with the default payment card affordance is selected for use in the payment transaction (e.g., when the user does not select a different payment account for use in the payment transaction). In some embodiments, different payment accounts are assigned as the default payment account based on current environmental factors, such as the current day of month, time of day, and/or location. In some embodiments, different payment accounts are assigned as the default card based on the budget available on one or more payment accounts. For example, a payment account that has reached a maximum budget (or has reached a threshold based on the maximum budget) will not be used as the default payment account.

At block 824, in some embodiments, the device receives the selection (e.g., a finger tap) of the alternate payment card affordance of the plurality of payment card affordances (e.g., 704 and 708 of FIG. 7C), where the alternate payment card affordance is associated with a respective alternate primary account number. In response to receiving the selection of the alternate payment card affordance, the device selects the respective alternate primary account number for use in the payment transaction (rather than the default primary account number).

At block 826, in some embodiments, in accordance with the determination that authorization to proceed with the payment transaction has not been provided, the device receives authorization (e.g., receiving a passcode for payment or detecting a fingerprint for payment) to proceed with a payment transaction for a predetermined period of time (e.g., up to 30 seconds). For example, the user places the device into the field and is prompted to provide authorization, as discussed above. The user then removes the device from the field and provides authorization using the fingerprint sensor or a passcode. The authorization is valid for a predetermined period of time (e.g., 30 seconds). If the user places the device into the field before the predetermined period of time has elapsed, the device will proceed with the payment transaction. After the predetermined period of time has elapsed, the device will no longer have authorization to proceed with the payment transaction (unless the user authorizes the device again), and accordingly the device will not proceed with the payment transaction. Thus, the device does not stay authorized indefinitely after receiving authorization to proceed with a payment transaction.

As discussed above, in some embodiments, authorization to proceed with the payment transaction can be provided through a fingerprint sensor (e.g., 702 of FIG. 7D). At block 830, the device detects a respective fingerprint on a fingerprint sensor of the electronic device. In response to detecting the respective fingerprint on the fingerprint sensor, the device determines that the fingerprint is consistent with an enrolled fingerprint that is enabled to authorize payment transactions. In accordance with a determination that a respective fingerprint is consistent with the enrolled fingerprint, the device authorizes the payment transaction.

In some embodiments, in accordance with a determination that the respective fingerprint is not consistent with the enrolled fingerprint (e.g., authentication using the fingerprint sensor has failed), the device displays, on the display, a visual prompt (e.g., 712 of FIG. 7E) instructing a user to place a finger on the fingerprint sensor.

In some embodiments, in accordance with a determination that the respective fingerprint is not consistent with the enrolled fingerprint, the device displays, on the display, an affordance (e.g., 714 of FIG. 7E) for receiving authorization to proceed with the payment transaction using a payment passcode (rather than the fingerprint sensor). The device also indicates to the user that authentication has failed by, for example, providing visual prompt (e.g., 712 of FIG. 7E). If the device receives selection of the affordance for receiving authorization, the device displays a keypad (e.g., 740 of FIG. 7L) for receiving a payment passcode entry.

In some embodiments, in accordance with a determination that the respective fingerprint is not consistent with the enrolled fingerprint, the device plays, at the electronic device, a failure audio alert through a speaker. The failure audio alert indicates that authorization to proceed with the payment transaction has not been provided. Providing an audio notification to the user of the device of the status (or state) of the technique is helpful for the user to understand whether additional input is required.

In some embodiments, in accordance with a determination that the respective fingerprint is not consistent with the enrolled fingerprint, the device causes a failure haptic alert indicating that authorization to proceed with the payment transaction has not been provided. The haptic feedback is particularly helpful to the user if the user has placed the device into the field and is not looking at the display.

In some embodiments, the electronic device determines whether a predetermined number of attempts to receive authorization to proceed with the payment transaction using the fingerprint sensor has been reached. In accordance with a determination that the predetermined number of attempts to receive authorization has been reached, the device requires authorization using a payment passcode to proceed with the payment transaction (e.g., the user interface of FIG. 7L). For example, the predetermined number of attempts is three. Thus, after the third failed attempt to authorize using the fingerprint sensor, the device requires authorization using a payment passcode to proceed with the payment transaction.

As discussed above, authorization to proceed with the payment transaction can be provided through receiving a payment passcode. In some embodiments, the device receives a payment passcode at the electronic device. The device determines that the payment passcode is consistent with an enrolled passcode that is enabled to authorize payment transactions. In response to determining that the payment passcode is consistent with the enrolled passcode (e.g., a passcode programmed by the user for unlocking the device or for making payments), the device authorizes the payment transaction. For example, authorization can be received using a payment passcode when authorization using the fingerprint sensor has failed.

In some embodiments, the predetermined period of time is based on a current location of the electronic device. For example, when the device determines that the current location is at a department store, the predetermined period of time may be set to 15 seconds. In another example, when the device determines that the current location is a concert or theater venue, the predetermined period of time may be set to 45 seconds. This may, for example, help to accommodate delays such as standing in line or making a purchase decision. Having a predetermined period of time that is based on the location may also help limit fraud.

In some embodiments, the predetermined period of time is based on a credit score associated with the payment account. For example, the predetermined period of time may be based on creditworthiness. In one example, the predetermined period of time may be set to 30 seconds when the credit score associated with the payment account is above a threshold, indicating good credit. In another example, the predetermined period of time may be set to 15 seconds when the credit score associated with the payment account is below a threshold, indicating not good credit (e.g., poor credit). For example, a predetermined period of time that is based on a credit score may help limit fraud.

In some embodiments, the predetermined period of time is user-configurable. For example, a user may decide that a longer predetermined period of time may be helpful in proceeding with payment transactions. Thus, the user can increase the predetermined period of time to value, such as 60 seconds, that is higher than the default value. For example, a predetermined period of time that is user-configurable may help limit fraud.

At block 832, in some embodiments, in response to receiving authorization to proceed with the payment transaction, (e.g., through a passcode or a fingerprint sensor), the device displays a graphical indication (e.g., 720A-720C of FIGS. 7H-7J) that authorization to proceed has been provided. In some embodiments, the graphical indication includes an indication to place the device in the field (e.g., an animated icon that shows a device moving to indicate that the device needs to be moved to be placed in range of the field). This indicates to the user that authorization to proceed with the payment transaction has been provided to the electronic device, and that the user should place the electronic device into the field to proceed with the payment transaction.

At block 834, in some embodiments, in response to receiving authorization to proceed with the payment transaction, the device proceeds with the payment transaction (e.g., processes the payment transaction using the NFC-enabled contactless payment transaction terminal 2000 when the device is within range of the field 2002 and the authorization has not expired).

Note that details of the processes described above with respect to method 800 (e.g., FIGS. 8A-8B and 7A-7O) are also applicable in an analogous manner to the methods described below and above. For example, methods 600, 1000, 1200, 1400, 1600, 1800, 2000, and 2200 may include one or more of the characteristics of the various methods described above with reference to method 800. For brevity, these details are not repeated below.

The operations described above with reference to the figures may be implemented by components depicted in FIGS. 1A-1B. For example, display operations, detection operations, and determination operations may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9H illustrate exemplary user interfaces for displaying transaction information of a payment account in accordance with some embodiments. The user interfaces in these figures are used to illustrate the processes described below, including the process in FIGS. 10A-10B.

Figure 9A:
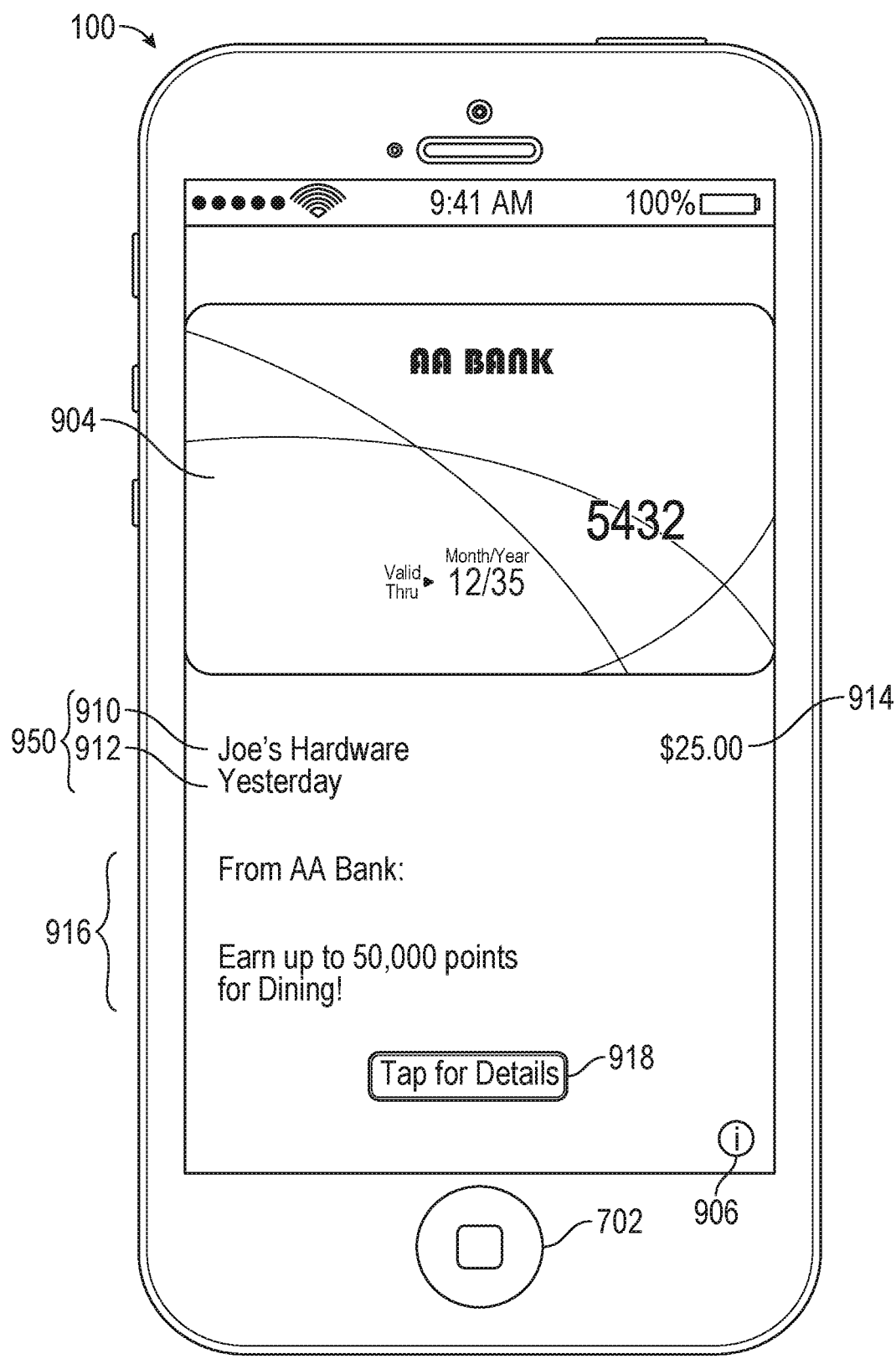
FIGS. 9A-9H illustrate exemplary user interfaces for displaying transaction information of a payment account in accordance with some embodiments.
Figure 9B:
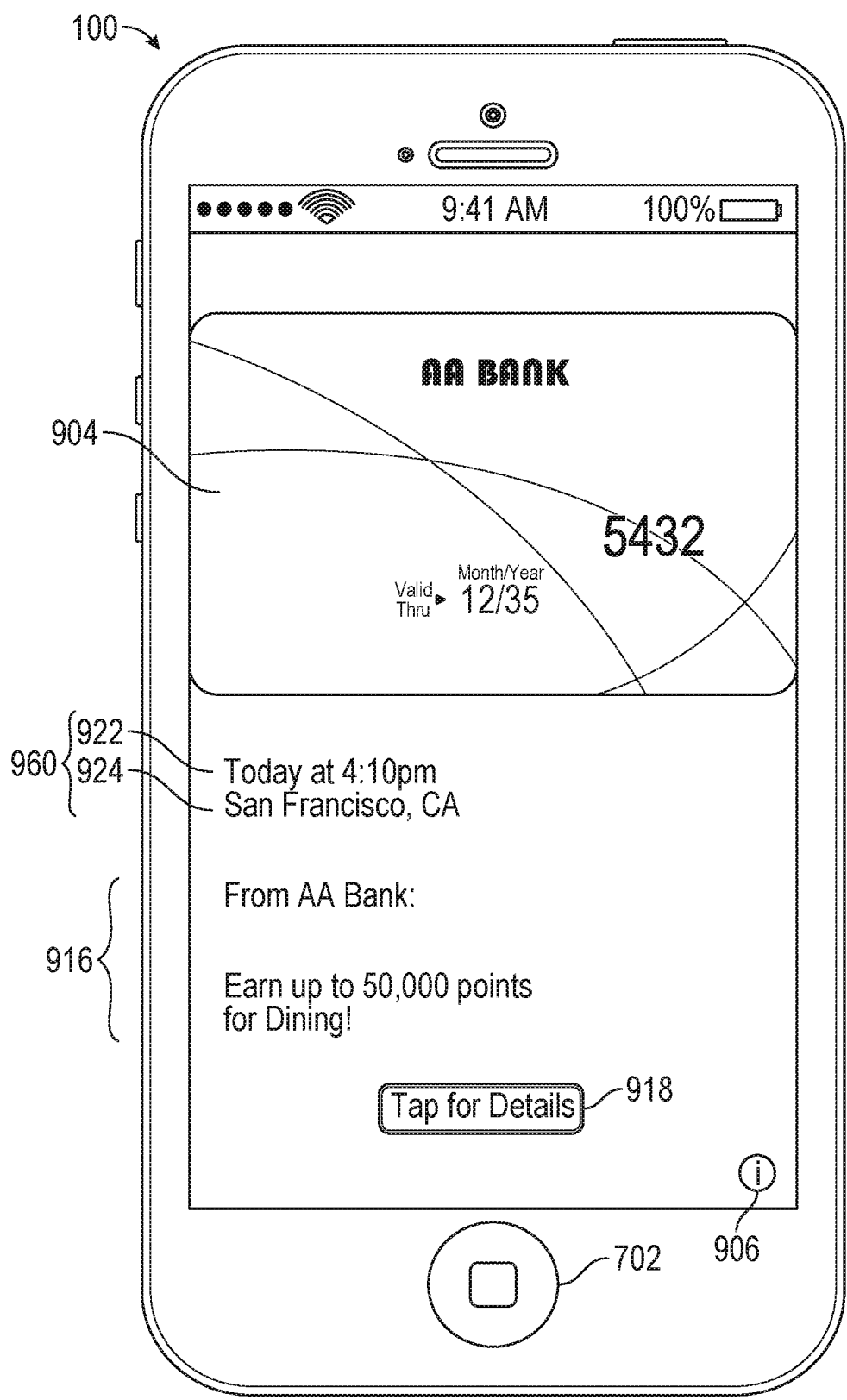
Figure 9C:
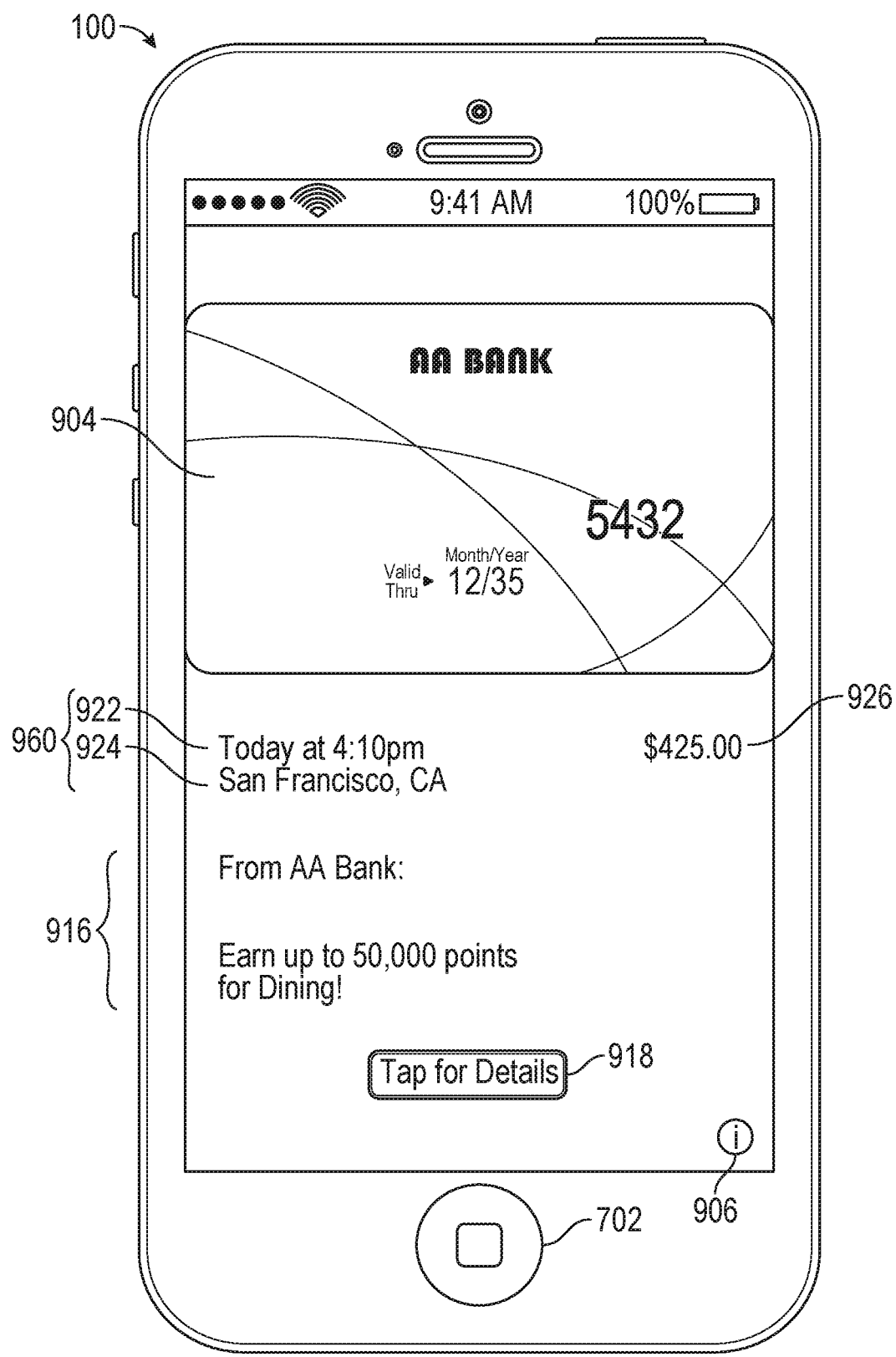

FIGS. 9A-9C illustrate exemplary user interfaces for displaying details of a most recent payment transaction in accordance with some embodiments. FIG. 9A illustrates an exemplary user interface of an electronic device 100, including an electronic wallet. The electronic wallet includes a respective representation of a payment account (e.g., a revolving credit account held with a financial institution). The respective representation of the payment account (e.g., a display showing the front of a credit card that is associated with the payment account) includes first transaction information 950 (e.g., date, time, location of the transaction, name of retailer, charge amount) for a first payment transaction associated with the payment account. For example, the first payment transaction may be the most recent transaction associated with the payment account. The first transaction information 950 includes, for example, the date 912, time, and/or location of the first payment transaction. The first transaction information 950 may also include the name of the retailer 910 associated with the first payment transaction and an amount charged 914 for the first payment transaction. In some embodiments, the first payment transaction was completed using the electronic device, such as through an NFC payment transaction using the electronic device (e.g., as illustrated and described in FIGS. 7A-7O and FIGS. 8A-8B) or a payment transaction using an application or website accessed on the electronic device (e.g., as illustrated and described in FIGS. 11A-11N and FIGS. 12A-12C). In some embodiments, the first payment transaction was completed using a physical credit card associated with the payment account (e.g., by swiping the credit card at a payment terminal at a retail store). By displaying the first transaction information 950, a viewer of the electronic wallet can quickly and efficiently appreciate the details of the most recent transaction associated with the payment account.

FIG. 9B illustrates an exemplary user interface for displaying information about a subsequent payment transaction. The electronic device detects a second payment transaction associated with the payment account using the electronic device. For example, the payment transaction may be an NFC payment transaction using the electronic device (e.g., as illustrated and described in FIGS. 7A-7O and FIGS. 8A-8B) or a payment transaction using an application or website accessed on the electronic device (e.g., as illustrated and described in FIGS. 11A-11N and FIGS. 12A-12C). In one example, the payment account is linked to the electronic device. At block 1006, in response to detecting the second payment transaction, and prior to receiving information about the second payment transaction from a financial institution involved in the second transaction (e.g., the merchant or financial institution that processed the payment transaction), the device displays at block 1008 second transaction information 960 (e.g., date, time, location of the second payment transaction) for the second payment transaction. The second transaction information 960 is based on information locally available to the electronic device. For example, information locally available to the electronic device comprises one or more of a date 922 of the second payment transaction, a time 922 of the second payment transaction, or a location 924 of the electronic device when the second payment transaction was detected. In one example, the second transaction information 960 is based exclusively on information locally available to the electronic device prior to receiving information about the second payment transaction from a financial institution involved in the second transaction.

In some embodiments, display of the second transaction information 960 (e.g., date, time, location of the second payment transaction) for the second payment transaction replaces the display of the first transaction information 950 (e.g., date, time, location of the transaction, name of retailer, charge amount of the first payment transaction). In other words, displaying the second transaction information 960 for the second payment transaction comprises replacing display of the first transaction information 950 with display of the second transaction information 960.

FIG. 9C illustrates updating the second transaction information 960. In some embodiments, the electronic device receives first additional information 926 (e.g., the amount of the second payment transaction) about the second payment transaction from an intermediary institution involved in the second transaction. The intermediary institution may be, for example, the institution that provides the operating system of the electronic device or provides the electronic wallet software application of the electronic device. In some embodiments, the first additional information 926 includes a monetary amount of the second payment transaction (e.g., $425.00). In response to receiving the first additional information 926 about the second payment transaction from the intermediary institution involved in the second transaction, the electronic device updates the second transaction information 960 for the second payment transaction to include the first additional information 926 about the second payment transaction. Thus, the user interface allows the user to easily and efficiently determine the date, time, location, and/or amount of the most recent detected payment transaction associated with the payment account (e.g., the second payment transaction).

Figure 9D:
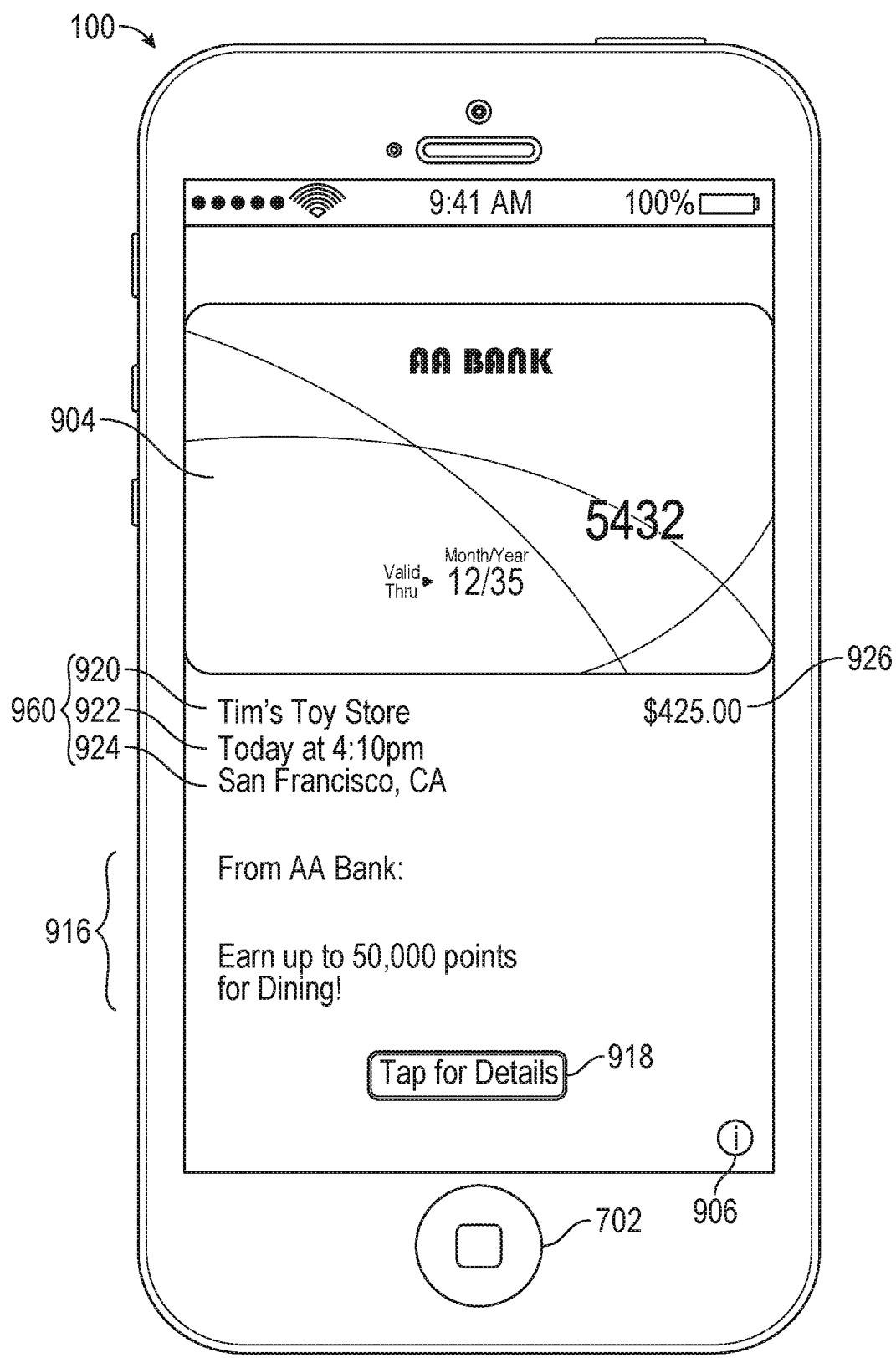

FIG. 9D illustrates further updating the second transaction information 960. In some embodiments, the electronic device receives second additional information (e.g., dollar amount, name of merchant 920) about the second payment transaction from the financial institution involved in the second transaction (e.g., the bank or the merchant). In response to receiving the second additional information 920 about the second payment transaction from the financial institution involved in the second transaction, the device updates display of the second transaction information 920 for the second payment transaction to include the second additional information 920 about the second payment transaction. In some embodiments, the second transaction information is updated when the electronic wallet is refreshed (e.g., by reloading the electronic wallet application or by reopening the electronic wallet application after it has been closed). In some embodiments, the second additional information 920 about the second payment transaction comprises the name of the retailer receiving payment as a result of the second payment transaction.

In some embodiments, the electronic device displays an available credit amount (e.g., how much more can be charged to the account before a credit limit for the account will be reached, or how much more can be charged to the account before a user-specified budget for the account is reached) on the respective representation of the payment account. For example, the available credit amount indicates the amount of credit available on the payment account based on a credit limit of the payment account. Displaying the available credit amount allows the user to efficiently determine how much more money can be spent using the payment account.

Figure 9E:
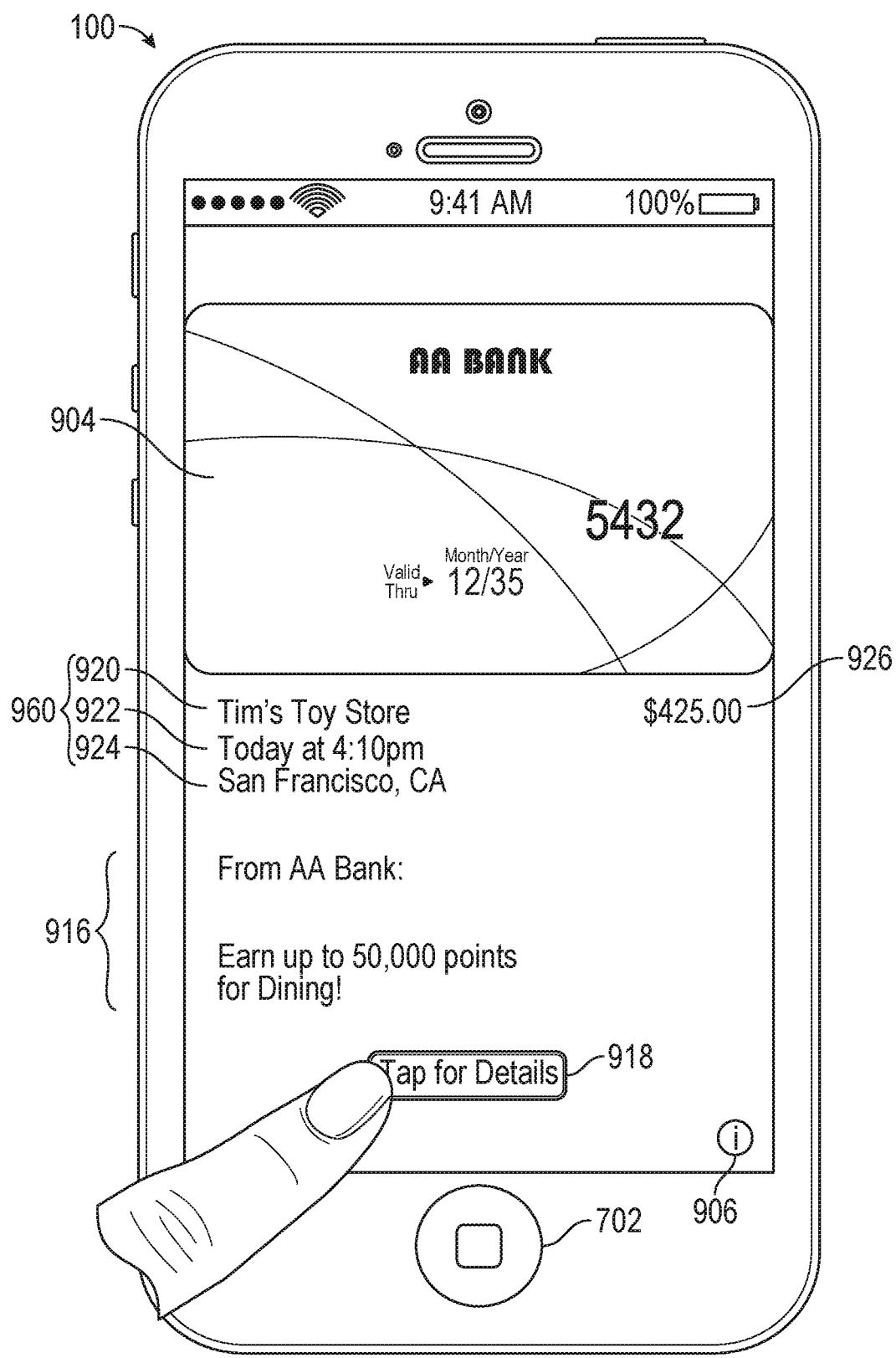

FIG. 9E illustrates an exemplary user interface for displaying a message from the financial institution. In some embodiments, the respective representation of the payment account includes a message from the financial institution. The electronic device receives a textual message 916 from the financial institution and displays the textual message from the financial institution on the respective representation of the payment account. For example, the message may be an offer for the user or a notification relating to the payment account. The electronic device receives selection of the displayed textual message (e.g., user activates the textual message by tapping on the message), and, in response to receiving selection of the displayed textual message, the device displays a particular application (e.g., the financial institution's banking application) associated with the financial institution. For example, the user taps on the textual message 916 and the electronic device displays the particular software application related to the financial institution.

Figure 9F:
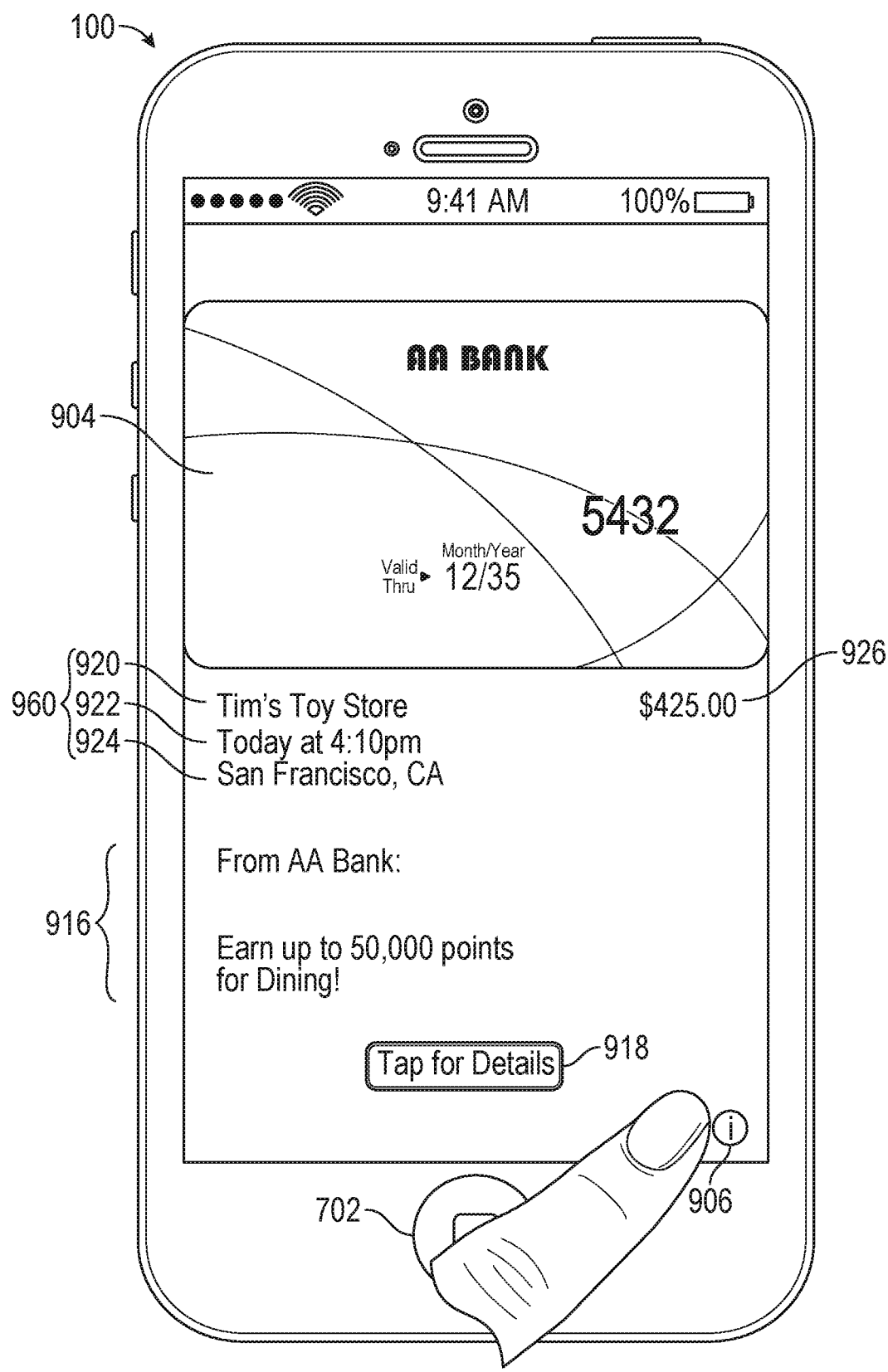
Figure 9G:
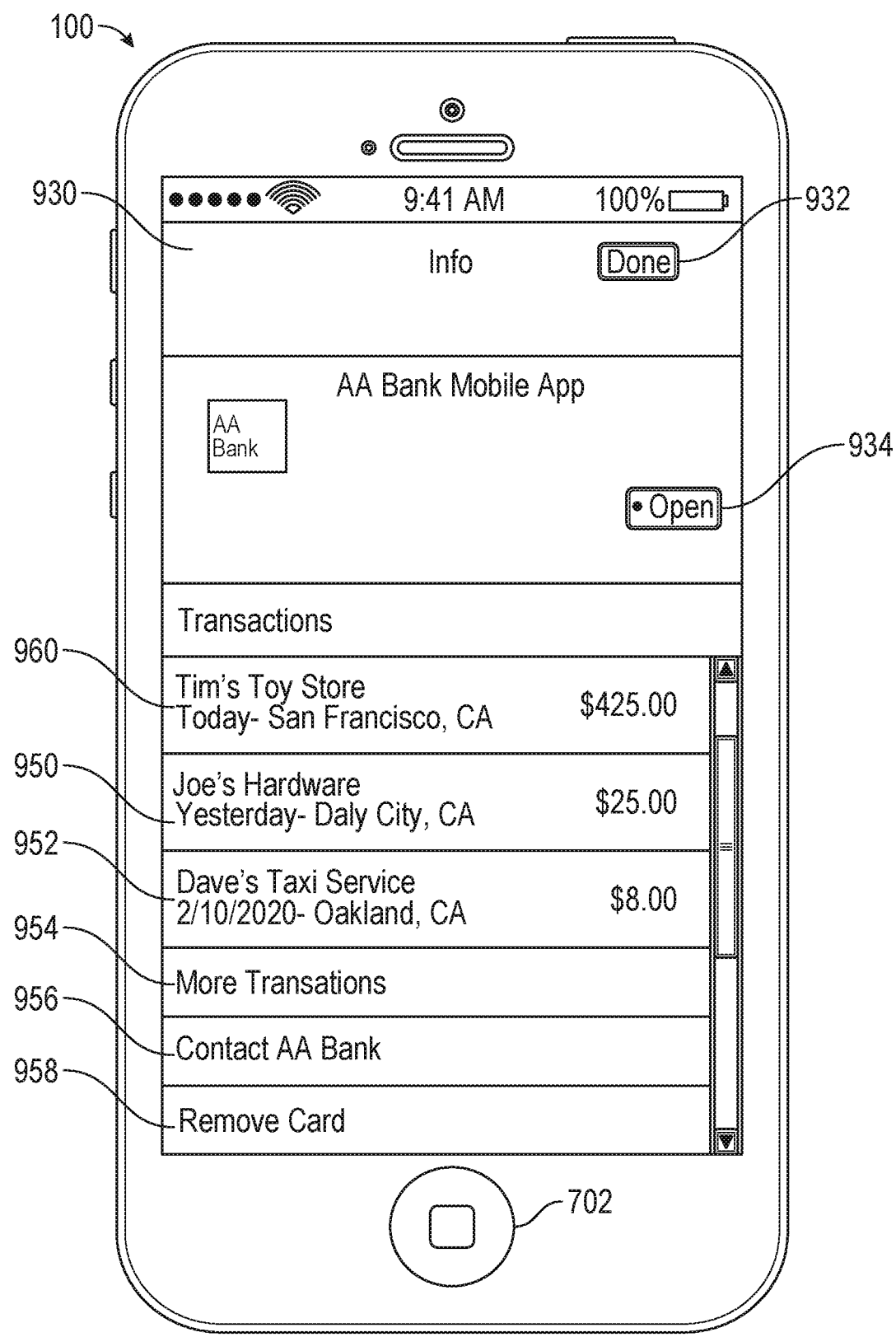

FIGS. 9F-9G illustrate exemplary user interfaces for displaying the details of transactions of a payment account. In one embodiment, the electronic device displays an account detail affordance 906 on the respective representation of the payment account. The electronic device receives selection of the account detail affordance 906 FIG. 9F, and, in response to receiving selection of the transactions detail affordance 906, the electronic device substitutes display of the respective representation of the payment account for display of transactions details 930 (e.g., the device displays the back of the representation of the payment account to reveal payment history and additional details) of the payment account, as illustrated in FIG. 9G. The transactions details 930 include the first transaction information 950 and the second transaction information 960. For example, the user taps on transactions detail affordance 906 and the electronic device displays a historical list of transactions for the payment account.

In some embodiments, the transactions details 930 includes a more-transactions affordance 954. The electronic device receives selection of the more-transactions affordance 954, and, in response to receiving selection of the more-transactions affordance, the device displays a third transaction information associated with a third payment transaction associated with the payment account as part of the displayed transactions details 930 (e.g., the device displays more (or older) transactions for the payment account).

In some embodiments, the transactions details 930 includes a remove-card affordance 958. The electronic device receives selection of the remove-card affordance, and, in response to receiving selection of the remove-card affordance 958, the electronic device displays a confirmation request for removing the respective representation of the payment account from the electronic wallet. The device receives a confirmation to remove the respective representation of the payment account from the electronic wallet (e.g., the user activates an affordance confirming that the payment account should be removed). The electronic device removes the respective representation of the payment account from the electronic wallet (e.g., after receiving the confirmation). Thus, a user can initiate the process to remove the link between the electronic device and a payment account by tapping on the remove-card affordance 958.

Figure 9H:
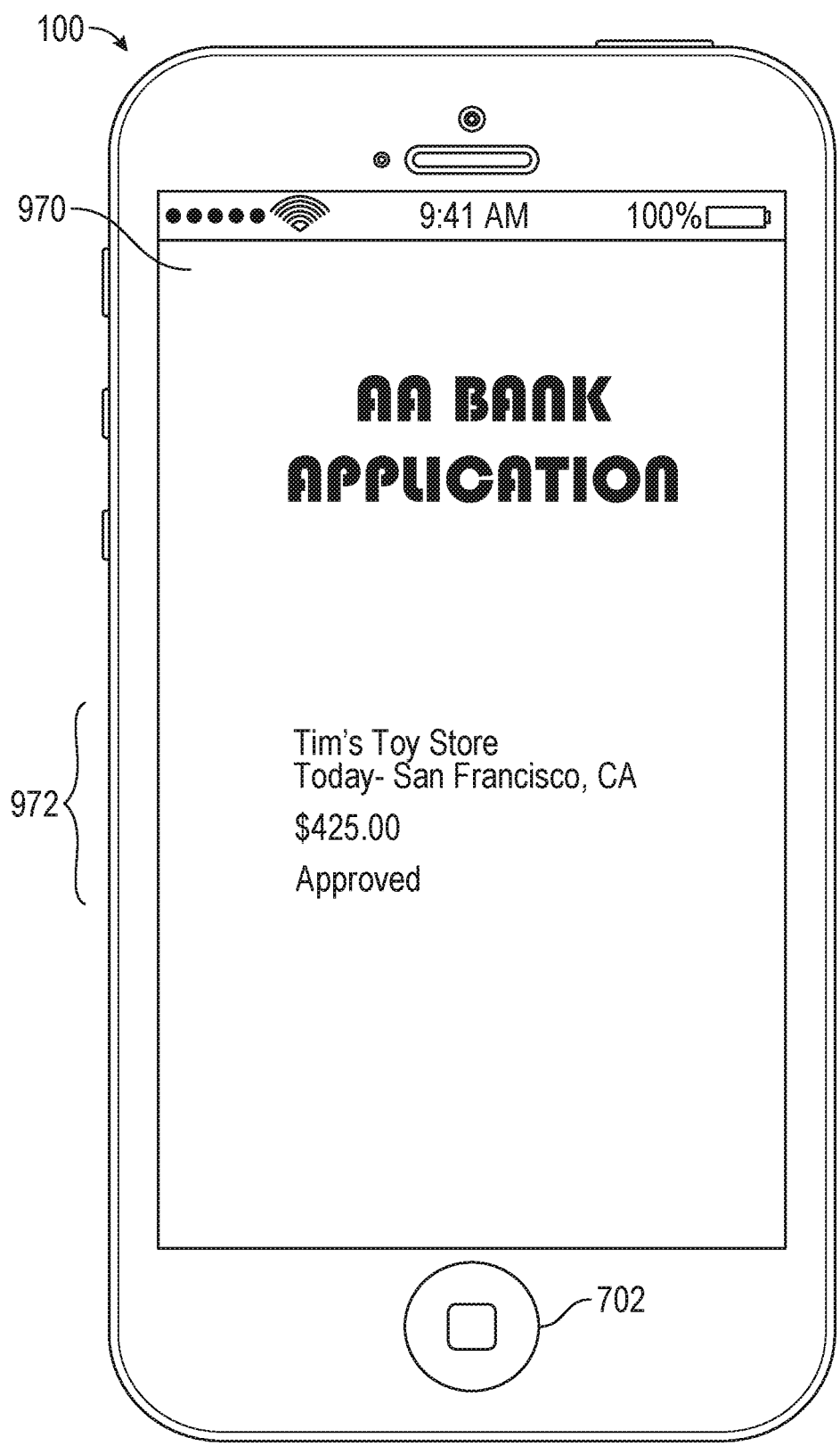

FIGS. 9G-9H illustrate exemplary user interfaces for accessing a particular application associated with the payment account. In some embodiments, transactions details 930 includes an open-application affordance 934 for accessing a particular application or a download-application affordance for downloading and installing the particular application. The electronic device determines whether a particular application (e.g., a software application associated with the payment account, such as a banking application) for accessing details of the associated payment account is installed on the electronic device. In accordance with a determination that the particular application is installed, the electronic device displays open-application affordance 934 for accessing (such as starting or displaying) the particular application. In some embodiments, in accordance with a determination that the particular application is not installed, the electronic device displays a download-application affordance (e.g. in place of the open-application affordance 934) for downloading and installing the particular application on the electronic device. In some embodiments, the electronic device receives a selection of the open-application affordance 934 (e.g., a finger tap on the open-application affordance 934), and, in response to receiving selection of the open-application affordance 934, the electronic device completely replaces display of the transactions details 930 with display of the particular application, as illustrated in FIG. 9H. For example, if a user taps the open-application affordance 934, the particular application is displayed. If a user taps the download-application affordance, the particular application is downloaded or a user interface for downloading the particular application is displayed.

FIGS. 9G-9H also illustrate exemplary user interfaces for accessing a particular application associated with the payment account for viewing details of a particular payment transaction. In one embodiment, the electronic device receives selection of the first transaction information 950 of the displayed transactions details 930, and, in response to receiving selection of the first transaction information 950, the electronic device completely replaces display of the transactions details 930 with display of the particular application 970, as shown in FIG. 9H. The display of the particular application 970 includes details 972 about the first payment transaction associated with the payment account.

In some embodiments, the displayed electronic wallet includes display of a first stack of card objects and a second stack of card objects, the first stack of card objects visually separated from the second stack of card objects. The first stack of card objects comprises the respective representation of the payment account and a second respective representation of a second payment account. The second stack of card objects comprises a membership card object associated with a non-financial institution (e.g., grocery store membership cards, gym membership cards, coffee store discount cards).

Figure 10B:
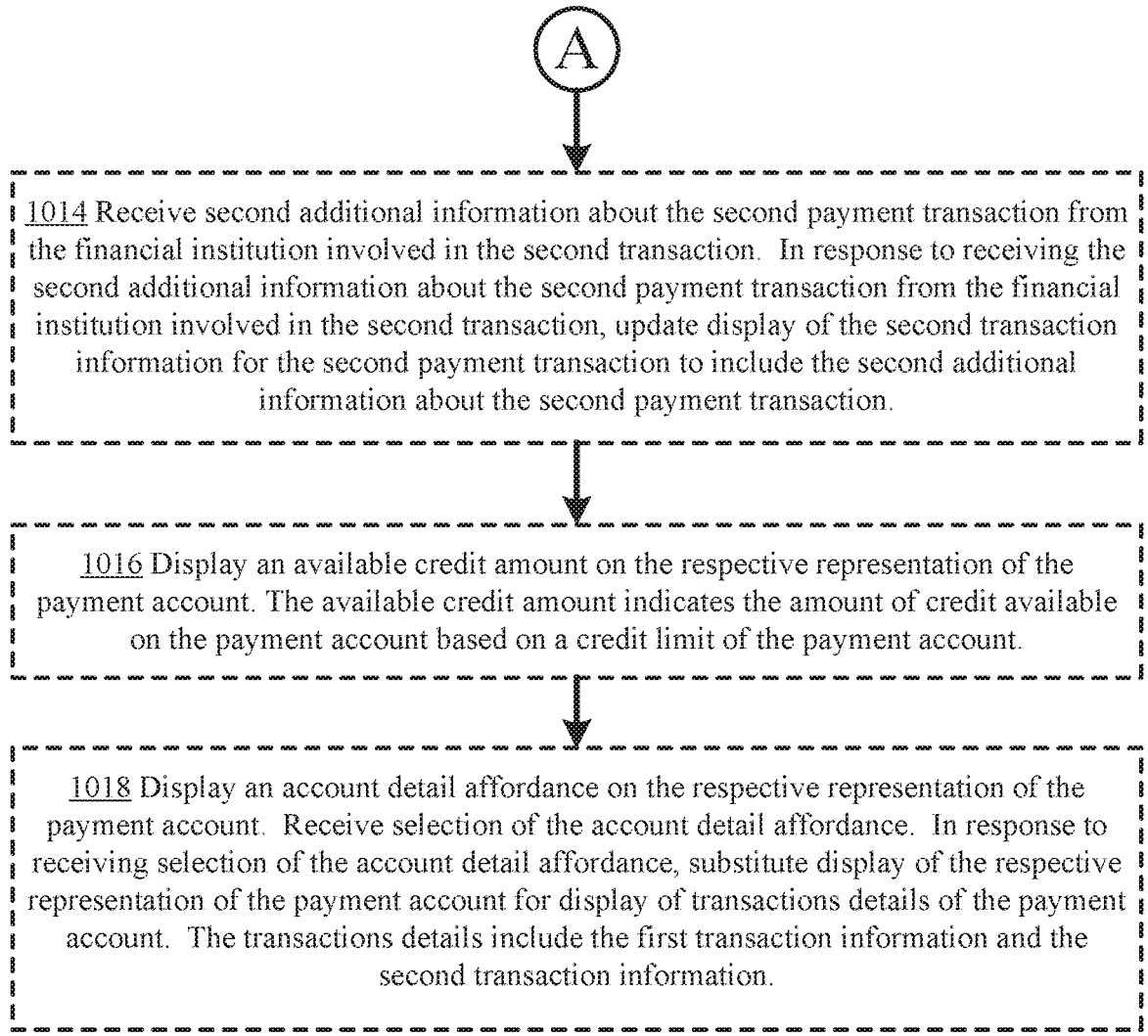

FIGS. 10A-10B are flow diagrams illustrating method 1000 for displaying transaction information of a payment account in accordance with some embodiments. Method 1000 is performed at a device (e.g., device 300, FIG. 3, or portable multifunction device 100, FIG. 1) with a display. Some operations in method 1000 may be combined, the order of some operations may be changed, and some operations may be omitted.

As described below, method 1000 provides an intuitive way for displaying transaction information of a payment account. The method reduces the cognitive burden on a user when accessing the transaction information, thereby creating a more efficient human-machine interface. For battery-operated computing devices, enabling a user access transaction information faster and more efficiently conserves power and increases the time between battery charges.

At block 1002, the electronic device displays an electronic wallet comprising a respective representation of a payment account (e.g., a revolving credit account held with a financial institution). The respective representation of the payment account (e.g., a display showing the front of a credit card that is associated with the payment account) includes first transaction information (e.g., 950 of FIG. 9A; a date, time, location of the transaction, name of retailer, charge amount) for a first payment transaction associated with the payment account. For example, the first payment transaction may be the most recent transaction associated with the payment account. The first transaction information (e.g., 950 of FIG. 9A) includes, for example, the date (e.g., 912 of FIG. 9A), time, and/or location of the first payment transaction. The first transaction information may also include the name of the retailer (e.g., 910 of FIG. 9A) associated with the first payment transaction and an amount charged (e.g., 914 of FIG. 9A) for the first payment transaction. In some embodiments, the first payment transaction was completed using the electronic device, such as through an NFC payment transaction using the electronic device (e.g., as illustrated and described in FIGS. 7A-7O and FIGS. 8A-8B) or a payment transaction using an application or website accessed on the electronic device (e.g., as illustrated and described in FIGS. 11A-11N and FIGS. 12A-12C). In some embodiments, the first payment transaction was completed using a physical credit card associated with the payment account (e.g., by swiping the credit card at a payment terminal at a retail store). By displaying the first transaction information, a viewer of the electronic wallet can quickly and efficiently appreciate the details of the most recent transaction associated with the payment account.

At block 1004, the electronic device detects a second payment transaction associated with the payment account using the electronic device. For example, the payment transaction may be an NFC payment transaction using the electronic device (e.g., as illustrated and described in FIGS. 7A-7O and FIGS. 8A-8B) or a payment transaction using an application or website accessed on the electronic device (e.g., as illustrated and described in FIGS. 11A-11N and FIGS. 12A-12C). In one example, the payment account is linked to the electronic device.

At block 1006, in response to detecting the second payment transaction, and prior to receiving information about the second payment transaction from a financial institution involved in the second transaction (e.g., the merchant or financial institution that processed the payment transaction), the device displays second transaction information (e.g., 960 of FIG. 9B; a date, time, location of the second payment transaction) for the second payment transaction. The second transaction information is based on information locally available to the electronic device. For example, information locally available to the electronic device comprises one or more of a date of the second payment transaction, a time of the second payment transaction, or a location of the electronic device when the second payment transaction was detected. In one example, the second transaction information is based exclusively on information locally available to the electronic device prior to receiving information about the second payment transaction from a financial institution involved in the second transaction.

At block 1010, in some embodiments, display of the second transaction information (e.g., date, time, location of the second payment transaction) for the second payment transaction replaces the display of the first transaction information (e.g., date, time, location of the transaction, name of retailer, charge amount of the first payment transaction). In other words, displaying the second transaction information (e.g., 960 of FIG. 9B) for the second payment transaction comprises replacing display of the first transaction information (e.g., 950 of FIG. 9A) with display of the second transaction information.

At block 1012, in some embodiments, the electronic device receives first additional information (e.g., 926 of FIG. 9C) the amount of the second payment transaction) about the second payment transaction from an intermediary institution involved in the second transaction. The intermediary institution may be, for example, the institution that provides the operating system of the electronic device or provides the electronic wallet software application of the electronic device. In some embodiments, the first additional information (e.g., 926 of FIG. 9C) includes a monetary amount of the second payment transaction (e.g., $425.00). In response to receiving the first additional information about the second payment transaction from the intermediary institution involved in the second transaction, the electronic device updates the second transaction information (e.g., 960 of FIG. 9C) for the second payment transaction to include the first additional information about the second payment transaction. Thus, the user interface allows the user to easily and efficiently determine the date, time, location, and/or amount of the most recent detected payment transaction associated with the payment account (e.g., the second payment transaction).

At block 1014, in some embodiments, the electronic device receives second additional information (e.g., dollar amount, name of merchant 920 of FIG. 9D) about the second payment transaction from the financial institution involved in the second transaction (e.g., the bank or the merchant). In response to receiving the second additional information (e.g., 920 of FIG. 9D) about the second payment transaction from the financial institution involved in the second transaction, the device updates display of the second transaction information for the second payment transaction to include the second additional information about the second payment transaction. In some embodiments, the second transaction information is updated when the electronic wallet is refreshed (e.g., by reloading the electronic wallet application or by reopening the electronic wallet application after it has been closed). In some embodiments, the second additional information (e.g., 920 of FIG. 9D) about the second payment transaction comprises the name of the retailer receiving payment as a result of the second payment transaction.

At block 1016, in some embodiments, the electronic device displays an available credit amount (e.g., how much more can be charged to the account before a credit limit for the account will be reached, or how much more can be charged to the account before a user-specified budget for the account is reached) on the respective representation of the payment account. For example, the available credit amount indicates the amount of credit available on the payment account based on a credit limit of the payment account. Displaying the available credit amount allows the user to efficiently determine how much more money can be spent using the payment account.

In some embodiments, the respective representation of the payment account includes a message from the financial institution. The electronic device receives a textual message (e.g., 916 of FIG. 9E) from the financial institution and displays the textual message from the financial institution on the respective representation of the payment account. For example, the message may be an offer for the user or a notification relating to the payment account. The electronic device receives selection of the displayed textual message (e.g., user activates the textual message by tapping on the message), and, in response to receiving selection of the displayed textual message, the device displays a particular application (e.g., the financial institution's banking application) associated with the financial institution. For example, the user taps on the textual message (e.g., 916 of FIG. 9E) and the electronic device displays the particular software application related to the financial institution.

In one embodiment, at block 1018, the electronic device displays an account detail affordance (e.g., 906 of FIG. 9F) on the respective representation of the payment account. The electronic device receives selection of the account detail affordance (e.g., 906 of FIG. 9F), and, in response to receiving selection of the transactions detail affordance (e.g., 906 of FIG. 9F), the electronic device substitutes display of the respective representation of the payment account for display of transactions details (e.g., 930 of FIG. 9G; the device displays the back of the representation of the payment account to reveal payment history and additional details) of the payment account, as illustrated in exemplary FIG. 9G. The transactions details (e.g., 930 of FIG. 9G) include the first transaction information (e.g., 950 of FIG. 9G) and the second transaction information (e.g., 960 of FIG. 9G). For example, the user taps on transactions detail affordance 906 and the electronic device displays a historical list of transactions for the payment account.

In some embodiments, the transactions details (e.g., 930 of FIG. 9G) comprises a more-transactions affordance (e.g., 954 of FIG. 9G). The electronic device receives selection of the more-transactions affordance (e.g., 954 of FIG. 9G), and, in response to receiving selection of the more-transactions affordance, the device displays a third transaction information associated with a third payment transaction associated with the payment account as part of the displayed transactions details (e.g., the device displays more (or older) transactions for the payment account).

In some embodiments, the transactions details (e.g., 930 of FIG. 9G) comprises a remove-card affordance (e.g., 958 of FIG. 9G). The electronic device receives selection of the remove-card affordance, and, in response to receiving selection of the remove-card affordance, the electronic device displays a confirmation request for removing the respective representation of the payment account from the electronic wallet. The device receives a confirmation to remove the respective representation of the payment account from the electronic wallet (e.g., the user activates an affordance confirming that the payment account should be removed). The electronic device removes the respective representation of the payment account from the electronic wallet (e.g., after receiving the confirmation). Thus, a user can initiate the process to remove the link between the electronic device and a payment account by tapping on the remove-card affordance.

In some embodiments, transactions details (e.g., 930 of FIG. 9G) comprises an open-application affordance (e.g., 934 of FIG. 9G) for accessing a particular application or a download-application affordance for downloading and installing the particular application. The electronic device determines whether a particular application (e.g., a software application associated with the payment account, such as a banking application) for accessing details of the associated payment account is installed on the electronic device. In accordance with a determination that the particular application is installed, the electronic device displays open-application affordance for accessing (such as starting or displaying) the particular application. In some embodiments, in accordance with a determination that the particular application is not installed, the electronic device displays a download-application affordance (e.g. in place of the open-application affordance) for downloading and installing the particular application on the electronic device. In some embodiments, the electronic device receives a selection of the open-application affordance (e.g., a finger tap on the open-application affordance), and, in response to receiving selection of the open-application affordance, the electronic device completely replaces display of the transactions details with display of the particular application, as illustrated in FIG. 9H. For example, if a user taps the open-application affordance (e.g., 934 of FIG. 9G), the particular application is displayed. If a user taps the download-application affordance, the particular application is downloaded or a user interface for downloading the particular application is displayed.

In one embodiment, the electronic device receives selection of the first transaction information (e.g., 950 of FIG. 9G) of the displayed transactions details (e.g., 930 of FIG. 9G), and, in response to receiving selection of the first transaction information (e.g., 950 of FIG. 9G), the electronic device completely replaces display of the transactions details (e.g., 930 of FIG. 9G) with display of the particular application (e.g., 970 of FIG. 9H), as shown in FIG. 9H. The display of the particular application (e.g., 970 of FIG. 9H) includes details (e.g., 972 of FIG. 9H) about the first payment transaction associated with the payment account.

In some embodiments, the displayed electronic wallet comprises display of a first stack of card objects and a second stack of card objects, the first stack of card objects visually separated from the second stack of card objects. The first stack of card objects comprises the respective representation of the payment account and a second respective representation of a second payment account. The second stack of card objects comprises a membership card object associated with a non-financial institution (e.g., grocery store membership cards, gym membership cards, coffee store discount cards).

Note that details of the processes described above with respect to method 1000 (e.g., FIGS. 10A-10B and 9A-9H) are also applicable in an analogous manner to the methods described below and above. For example, methods 600, 800, 1200, 1400, 1600, 1800, 2000, and 2200 may include one or more of the characteristics of the various methods described above with reference to method 1000. For brevity, these details are not repeated below.

The operations described above with reference to the figures may be implemented by components depicted in FIGS. 1A-1B. For example, display operations, detection operations, and receive operations may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 11A:
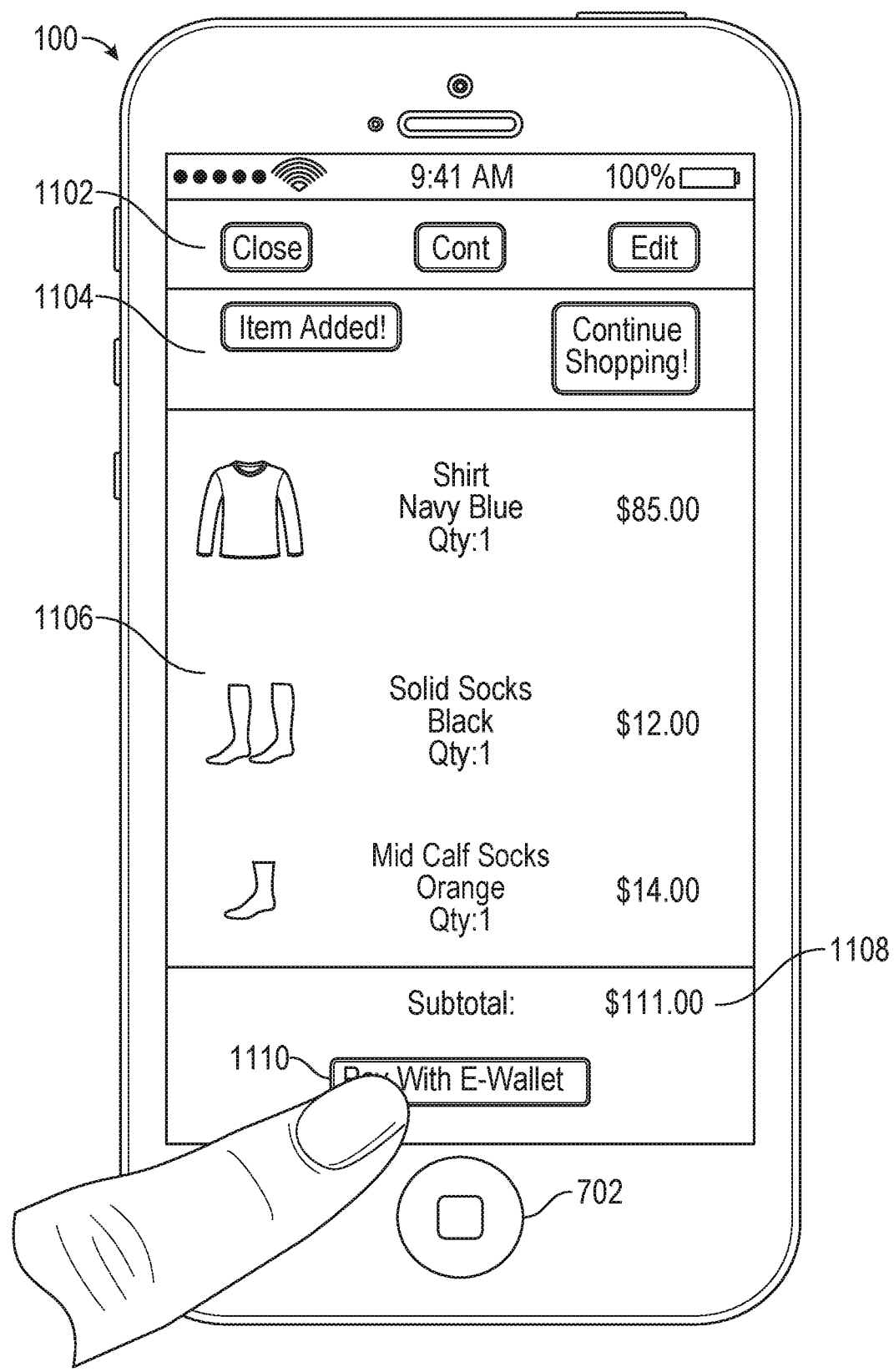
FIGS. 11A-11N illustrate exemplary user interfaces for making a payment transaction in accordance with some embodiments.
Figure 11B:
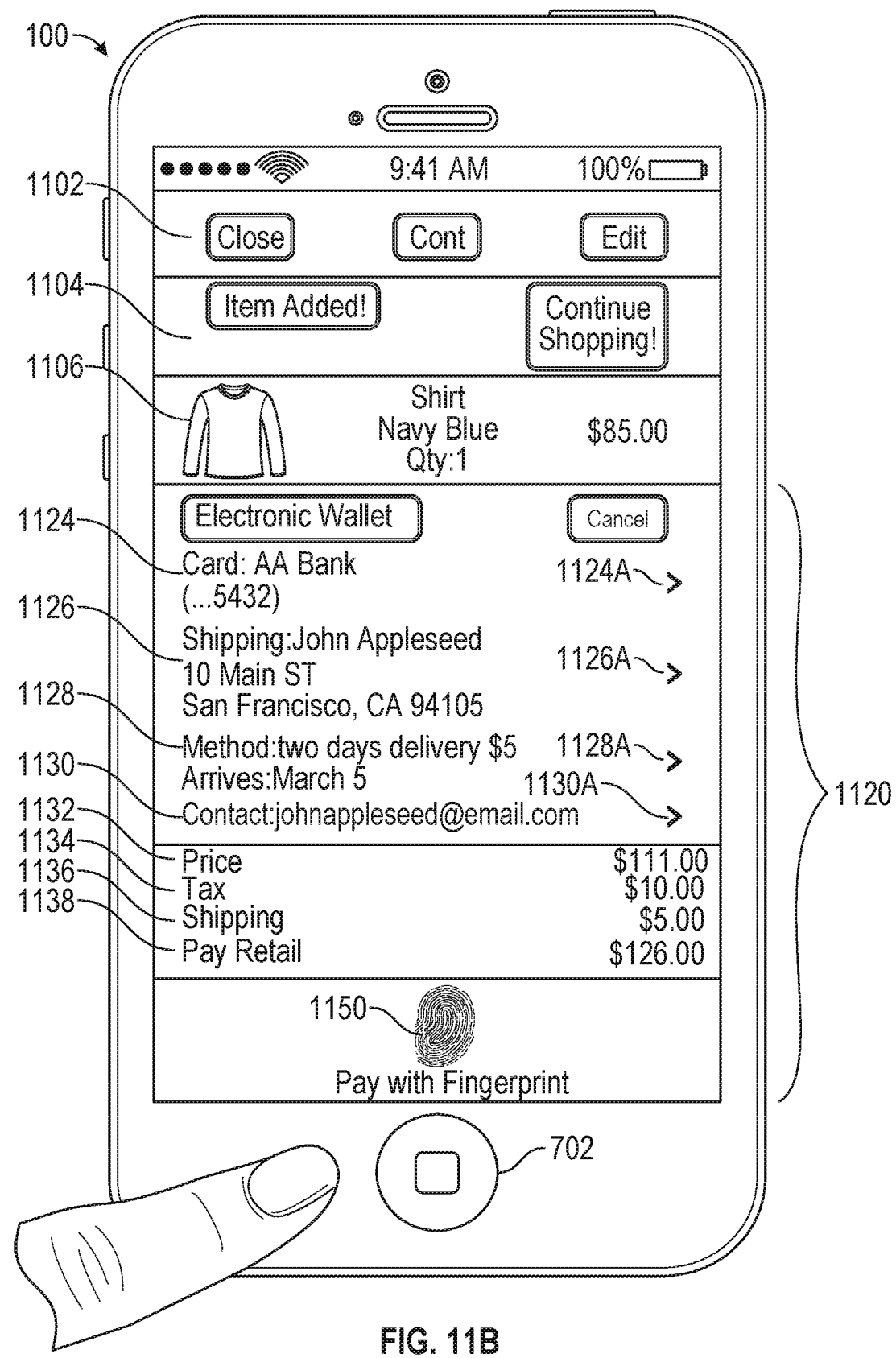
Figure 11C:
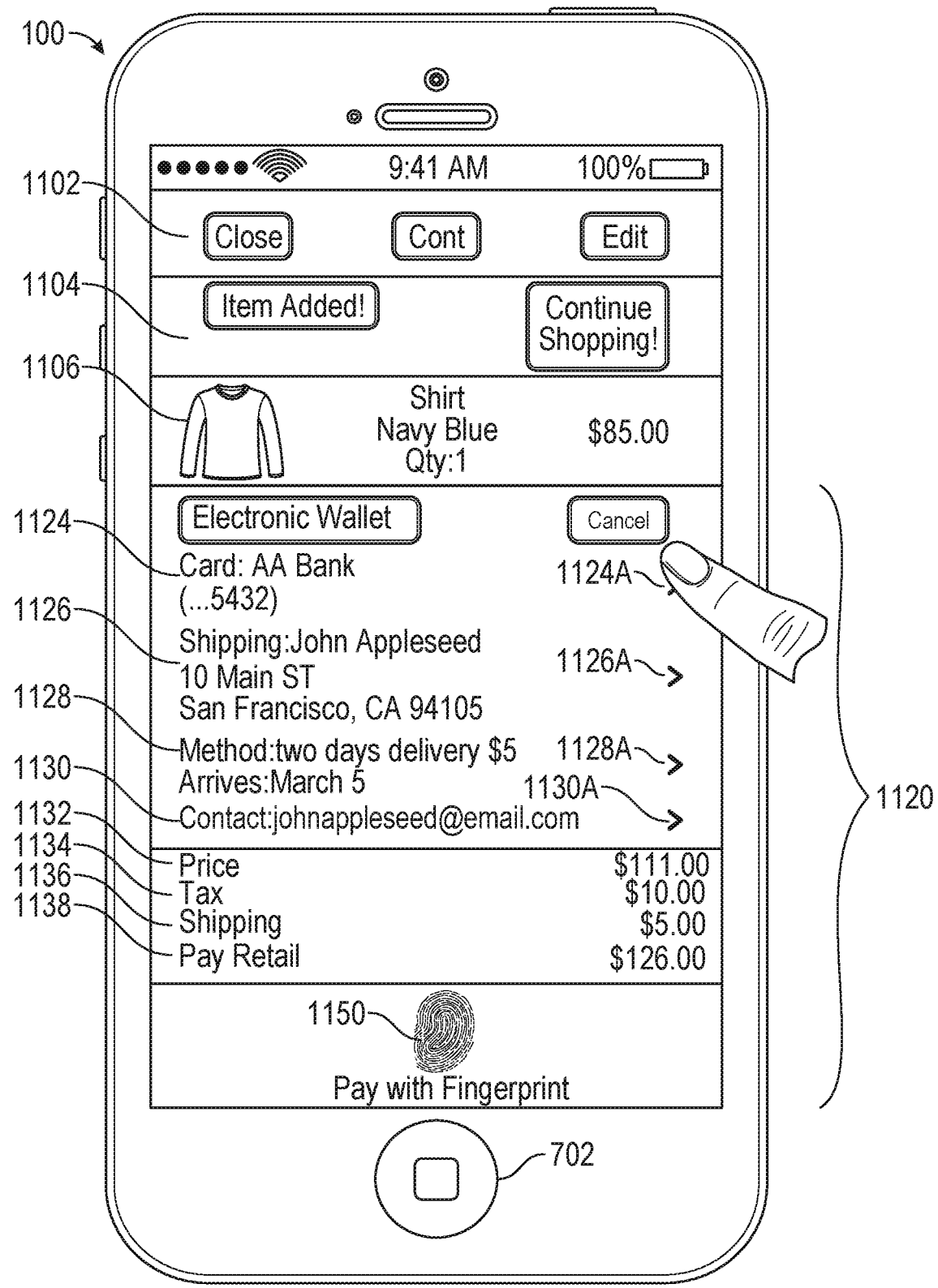
Figure 11D:
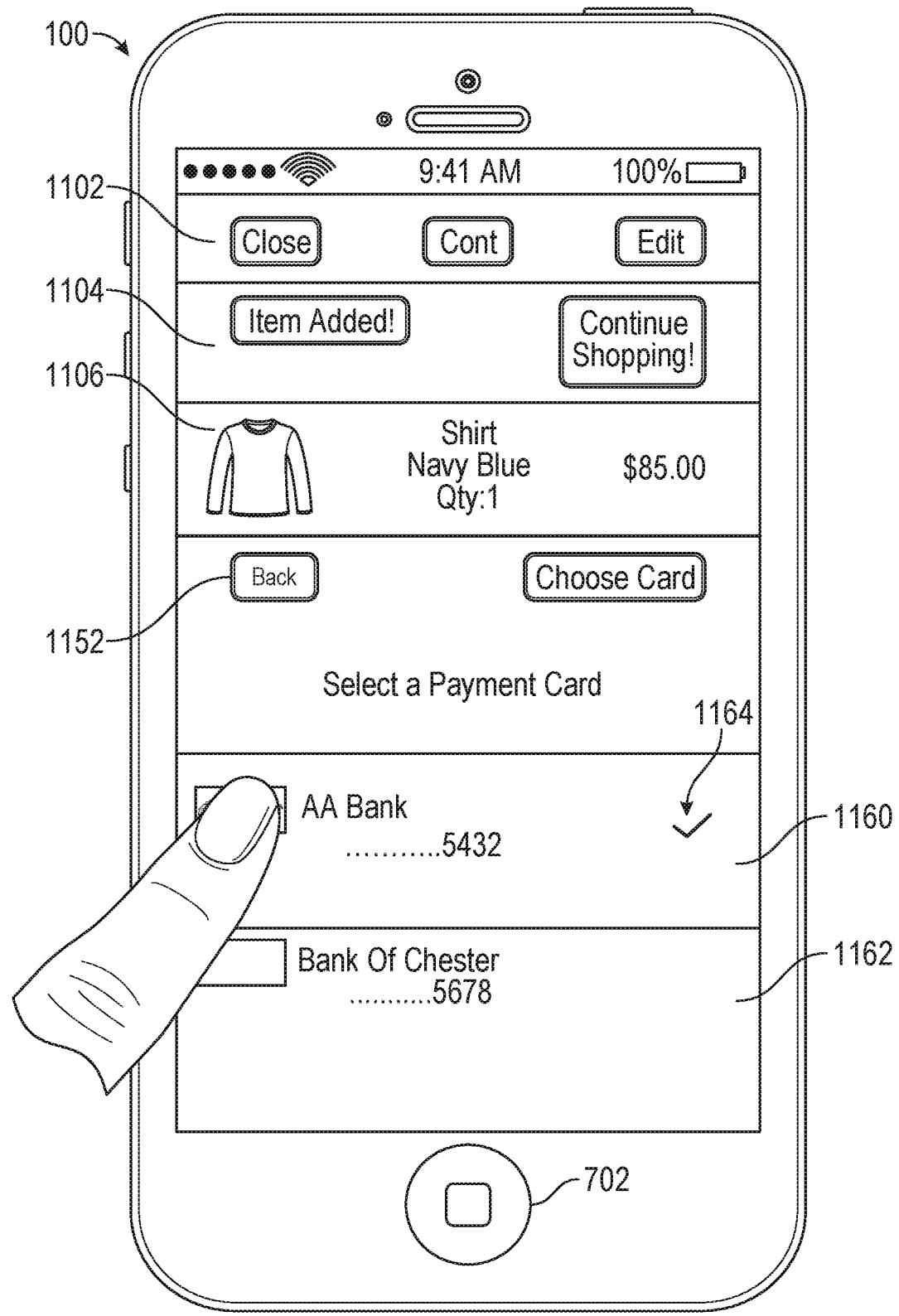
Figure 11E:
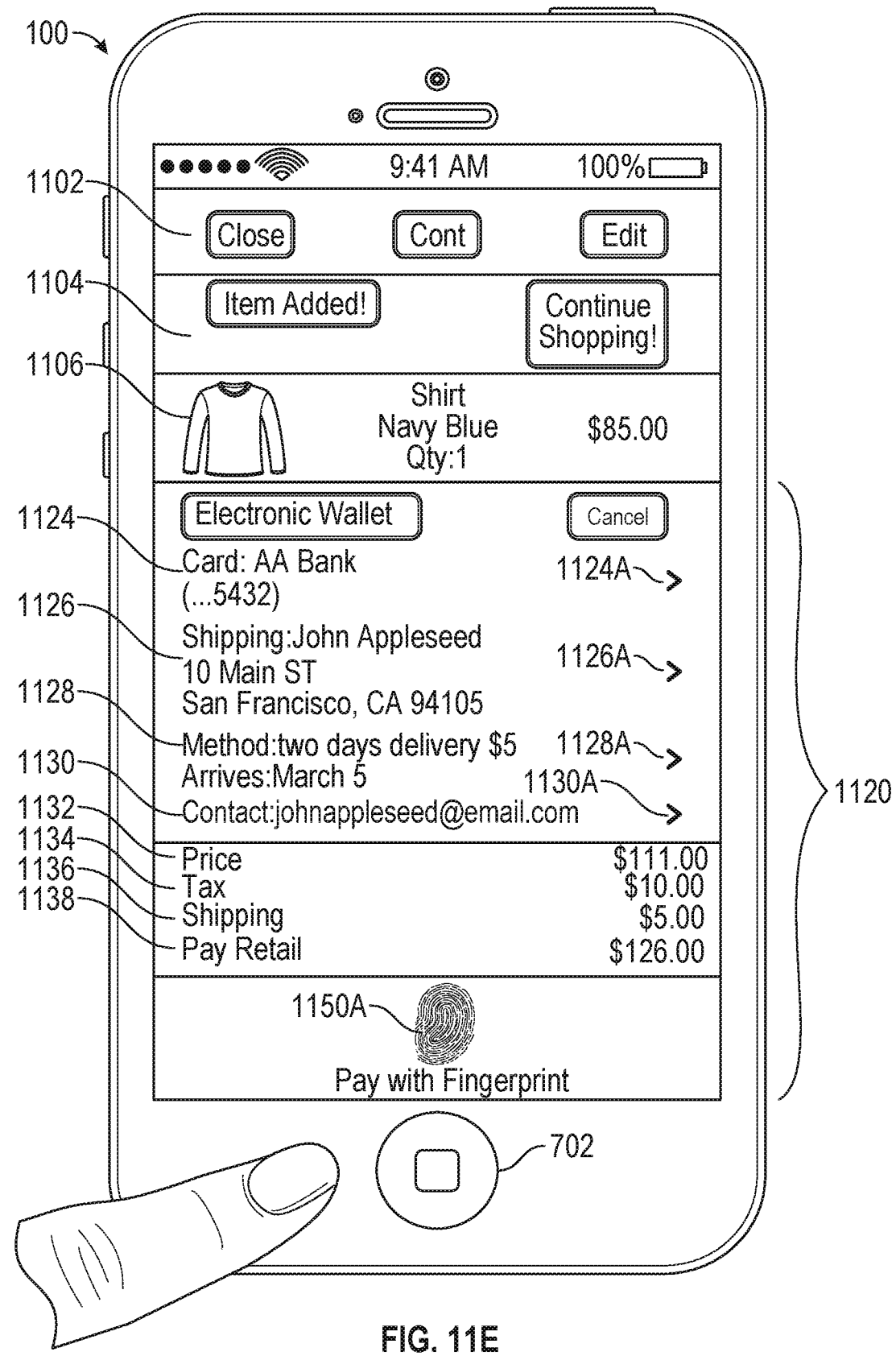
Figure 11F:
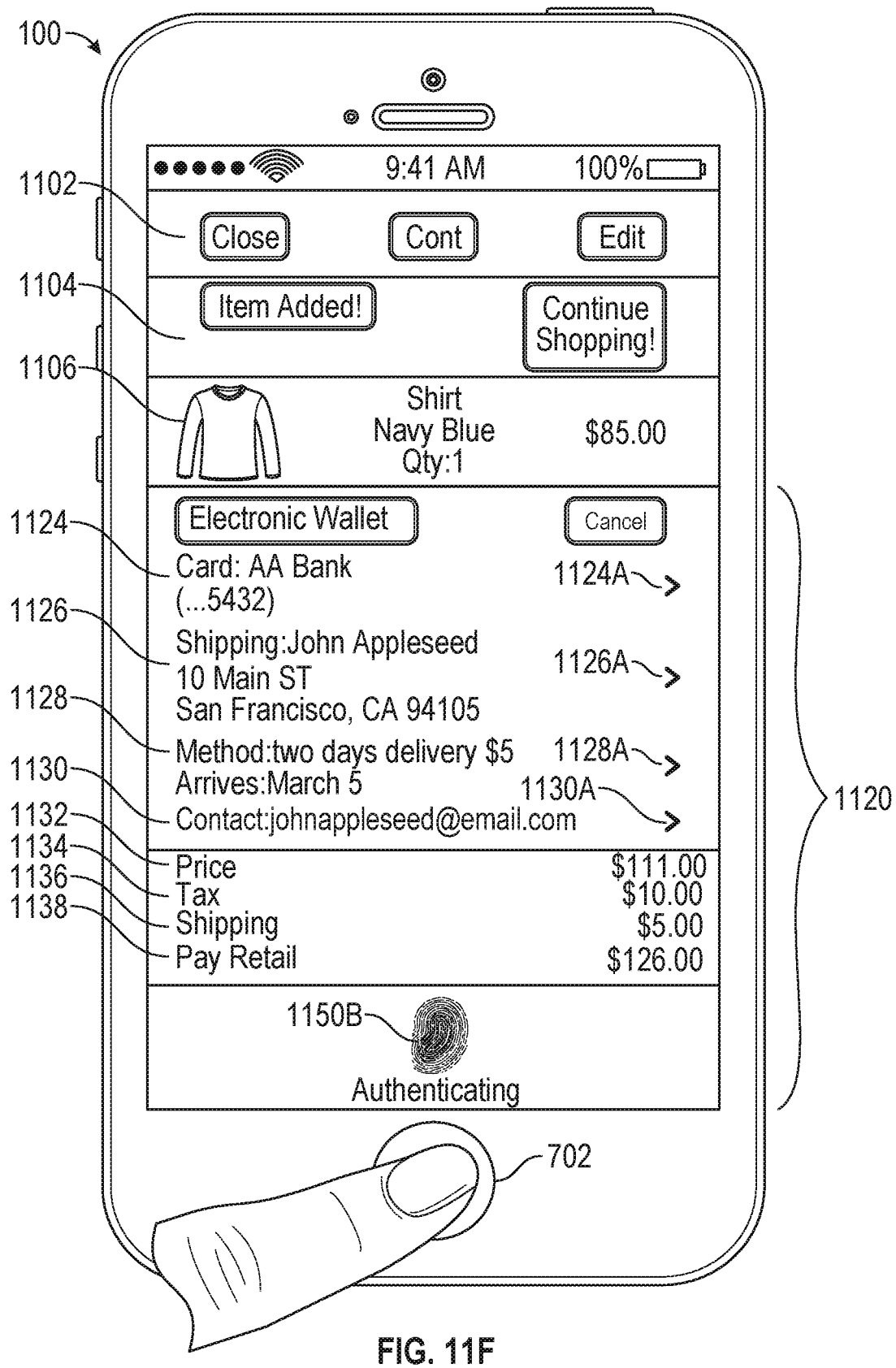
Figure 11G:
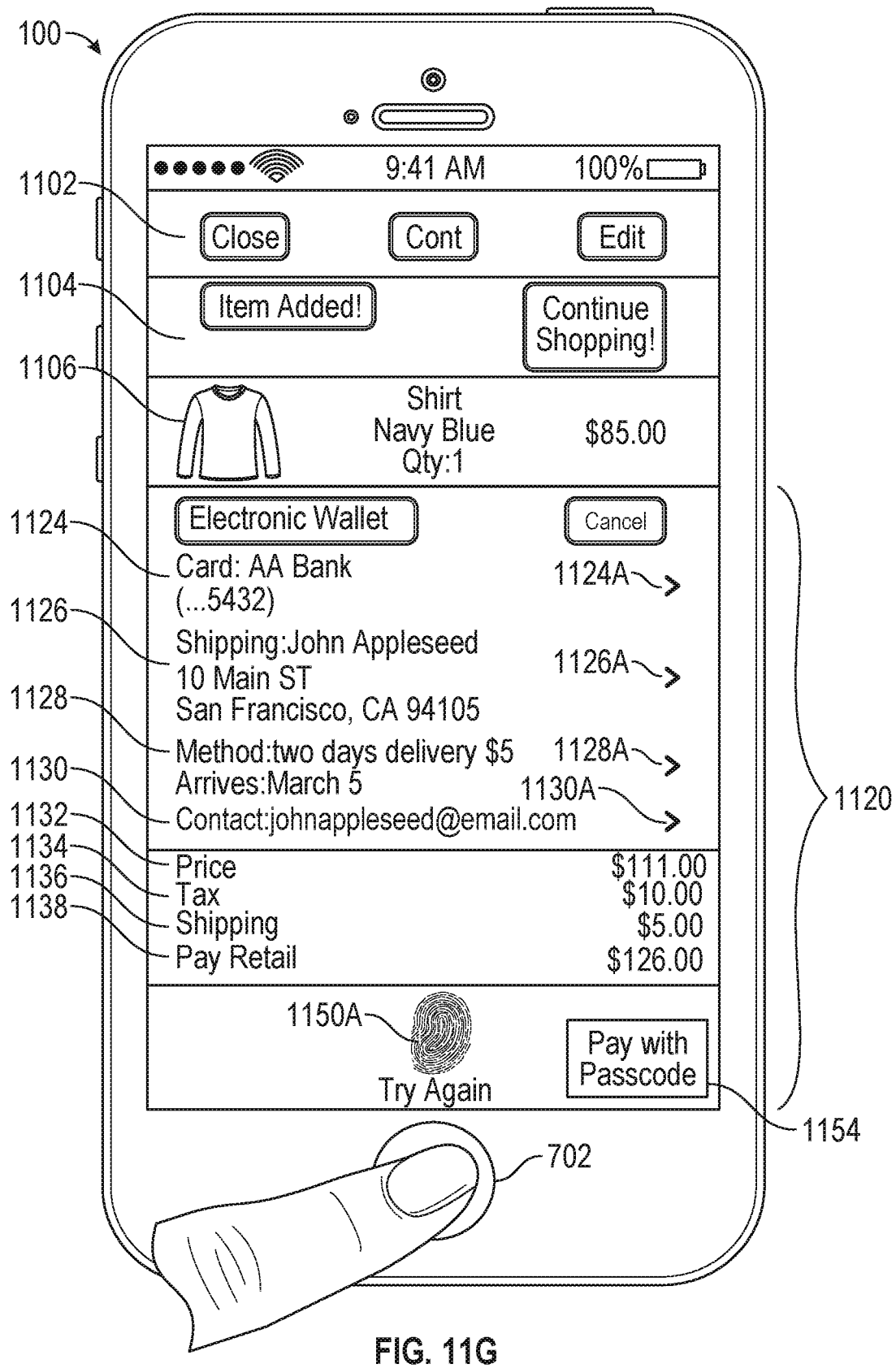
Figure 11H:
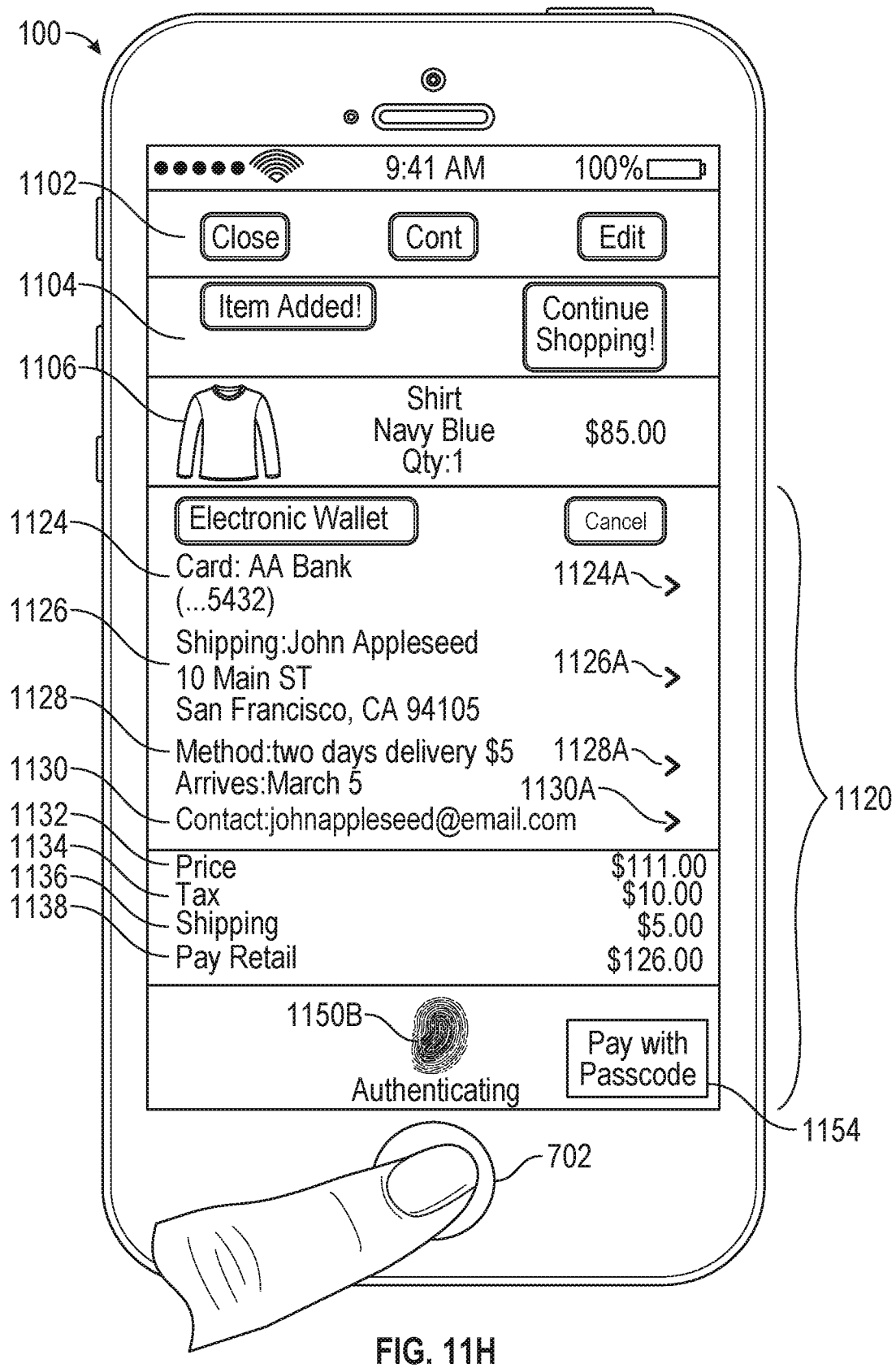
Figure 11I:
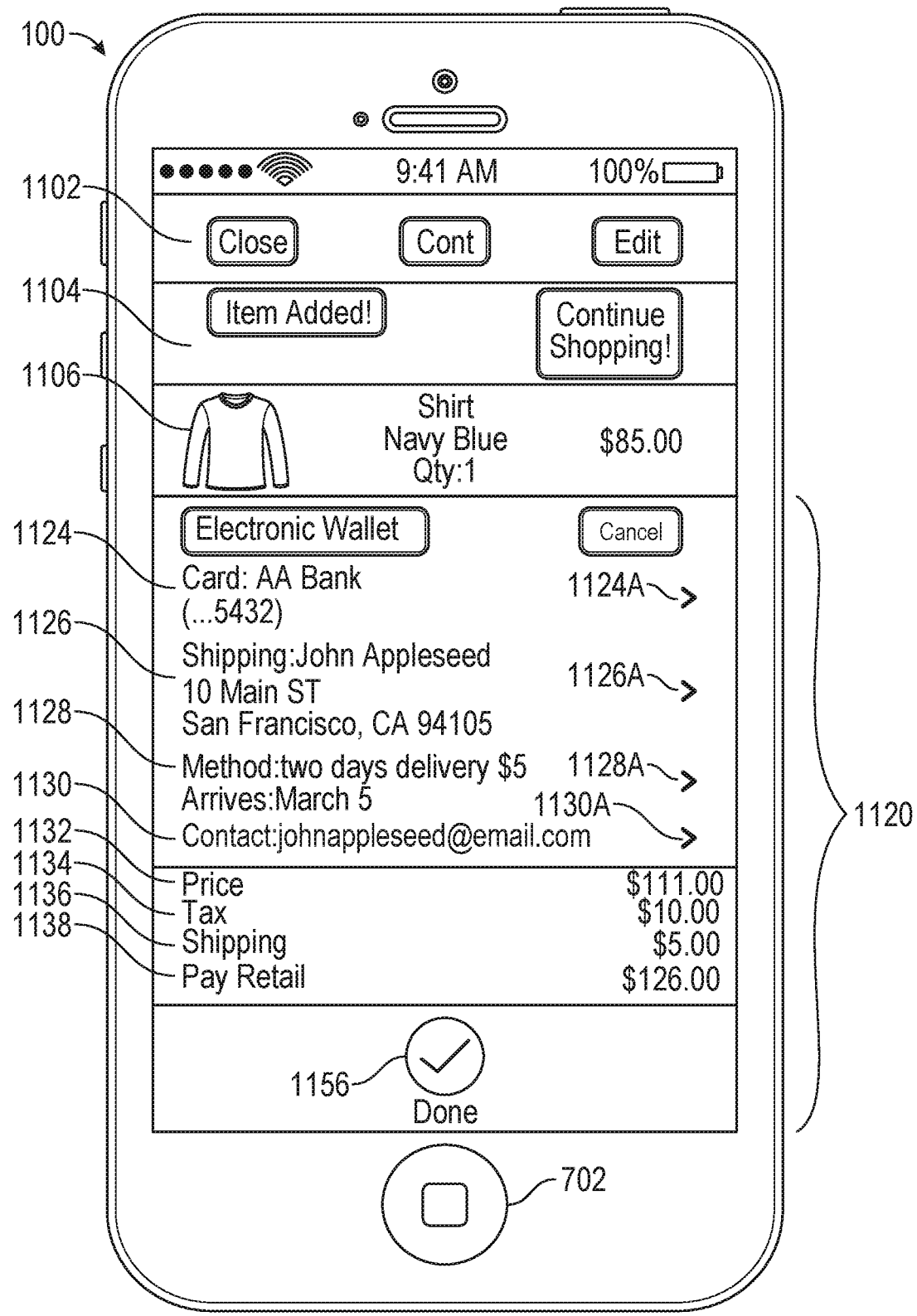
Figure 11J:
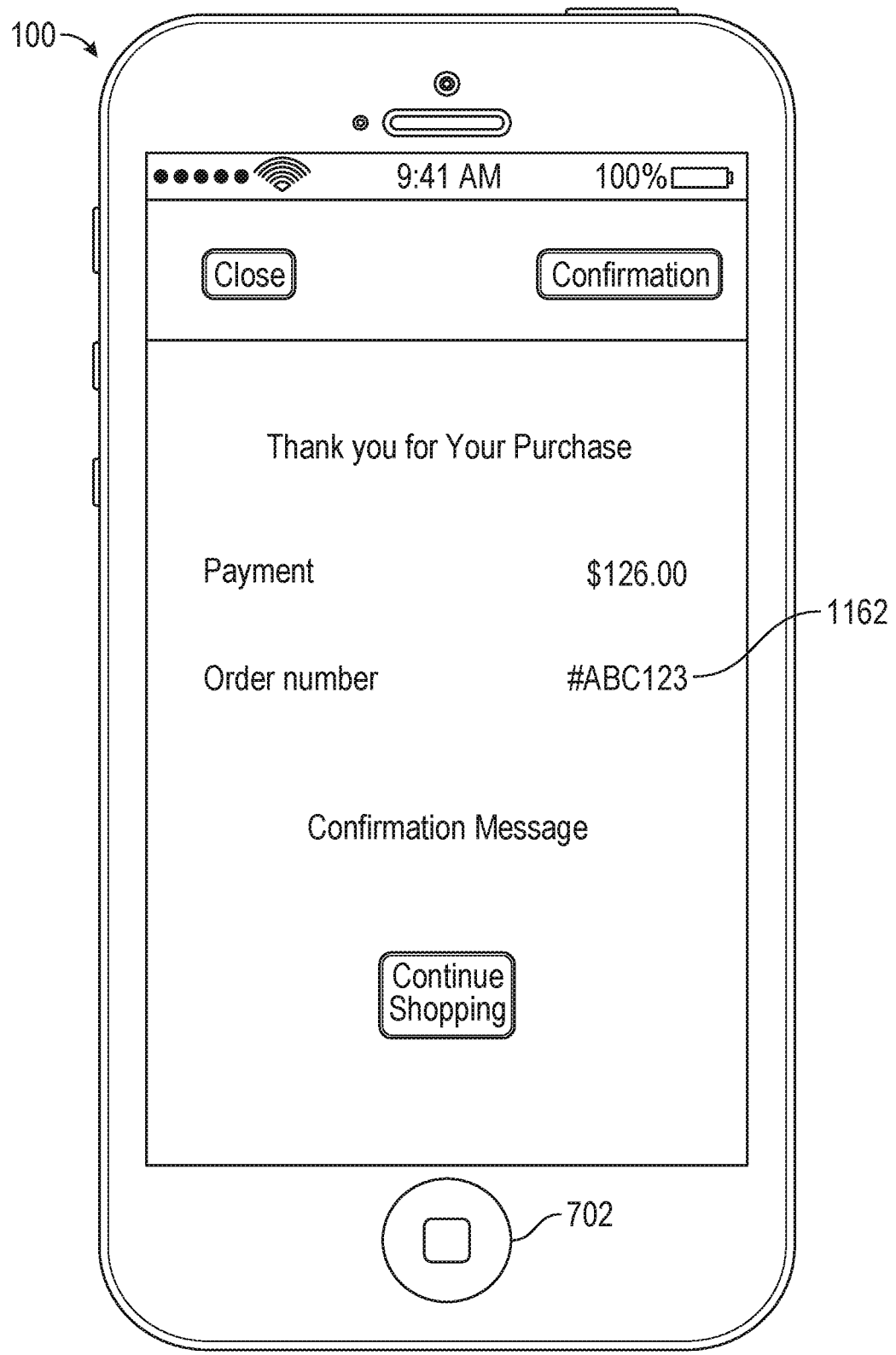
Figure 11K:
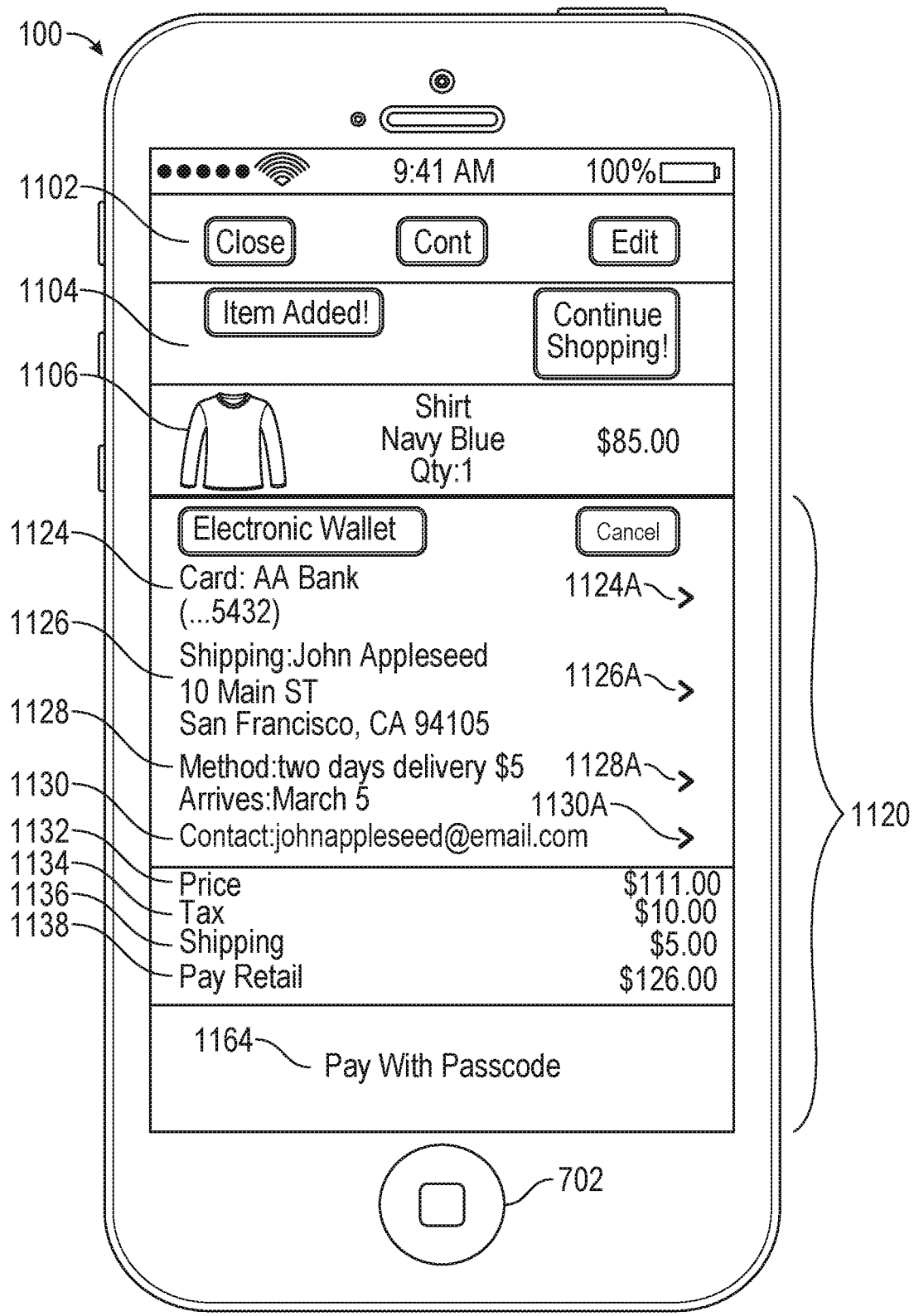
Figure 11L:
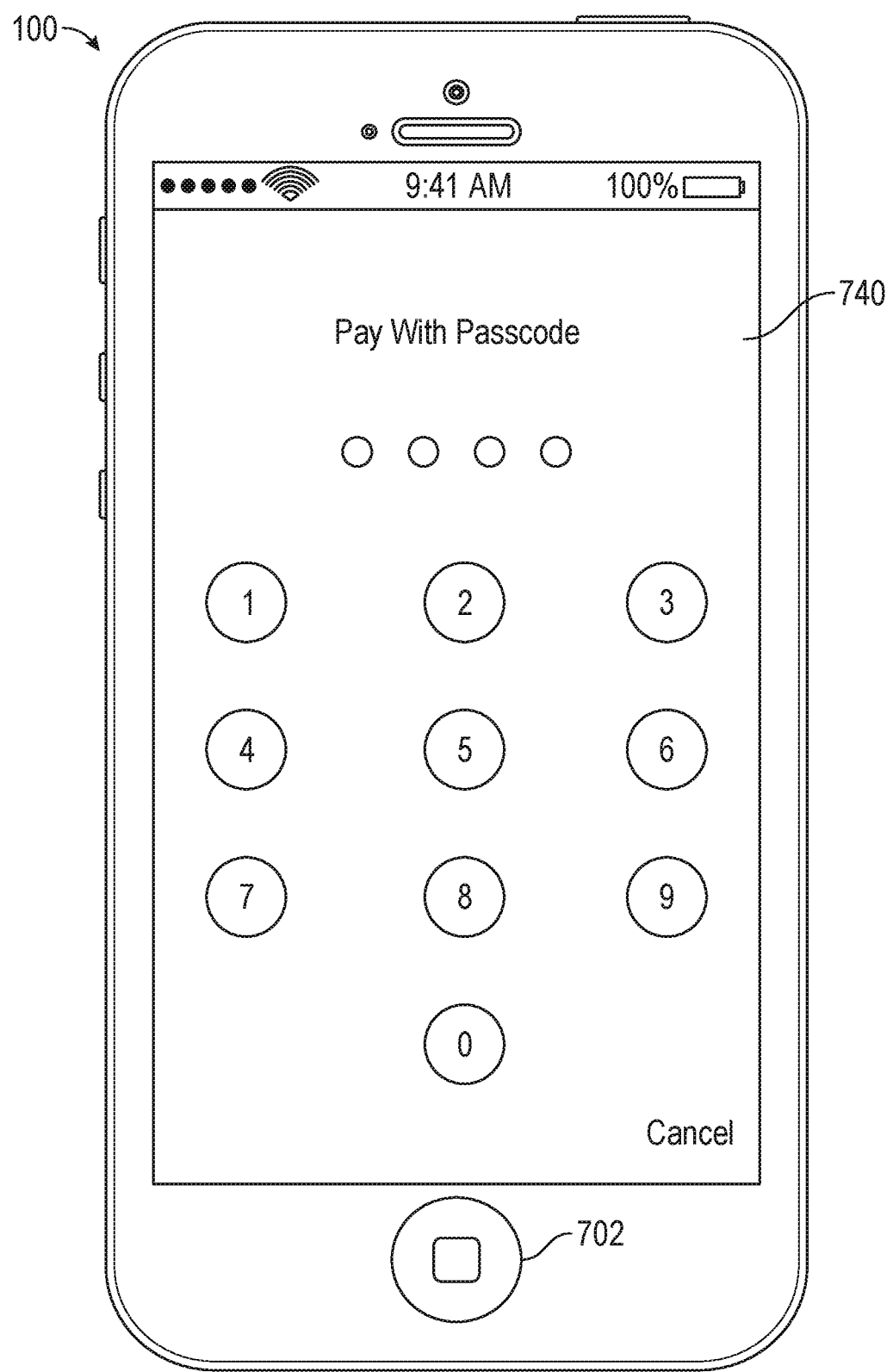
Figure 11M:
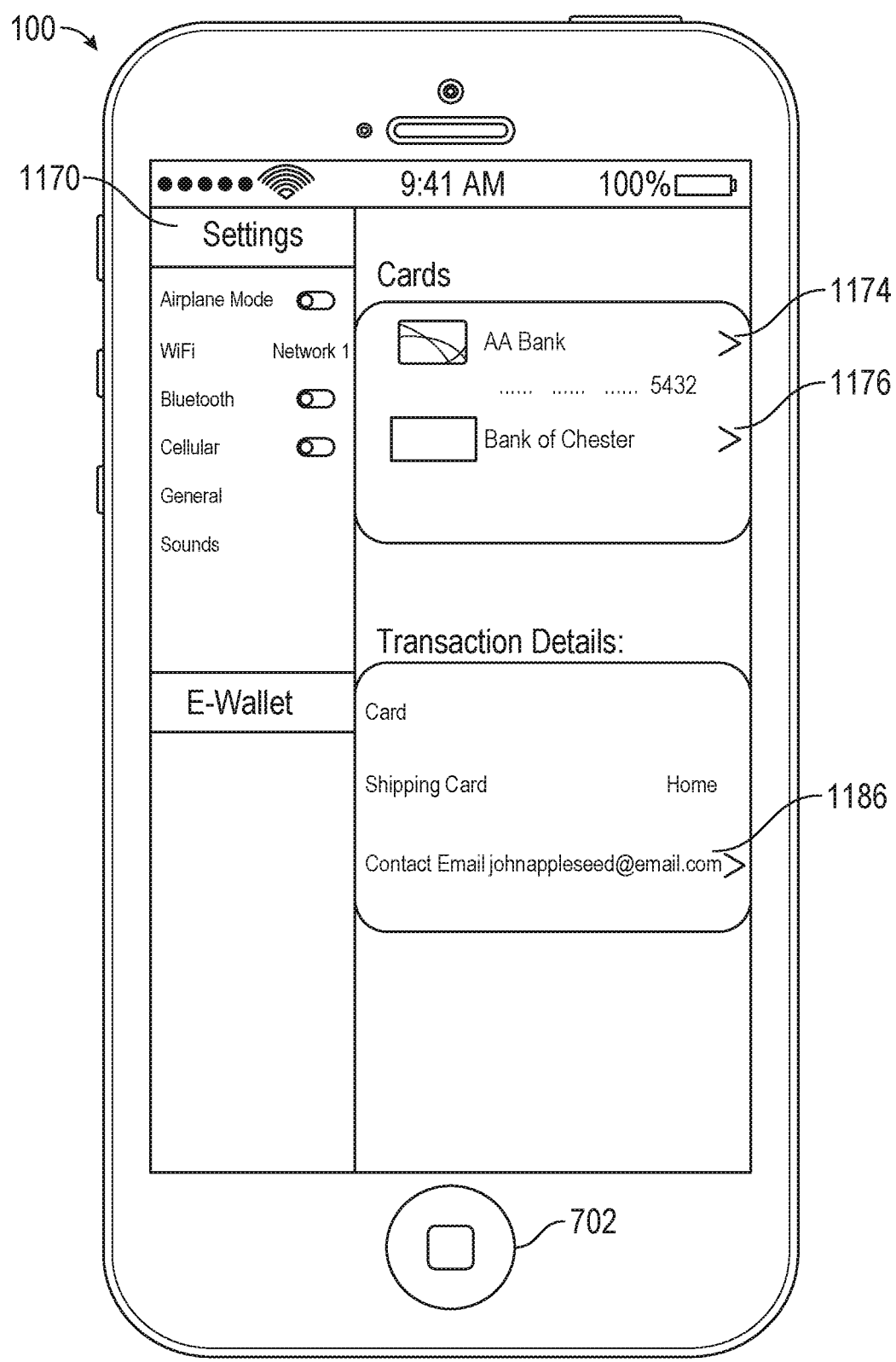
Figure 11N:
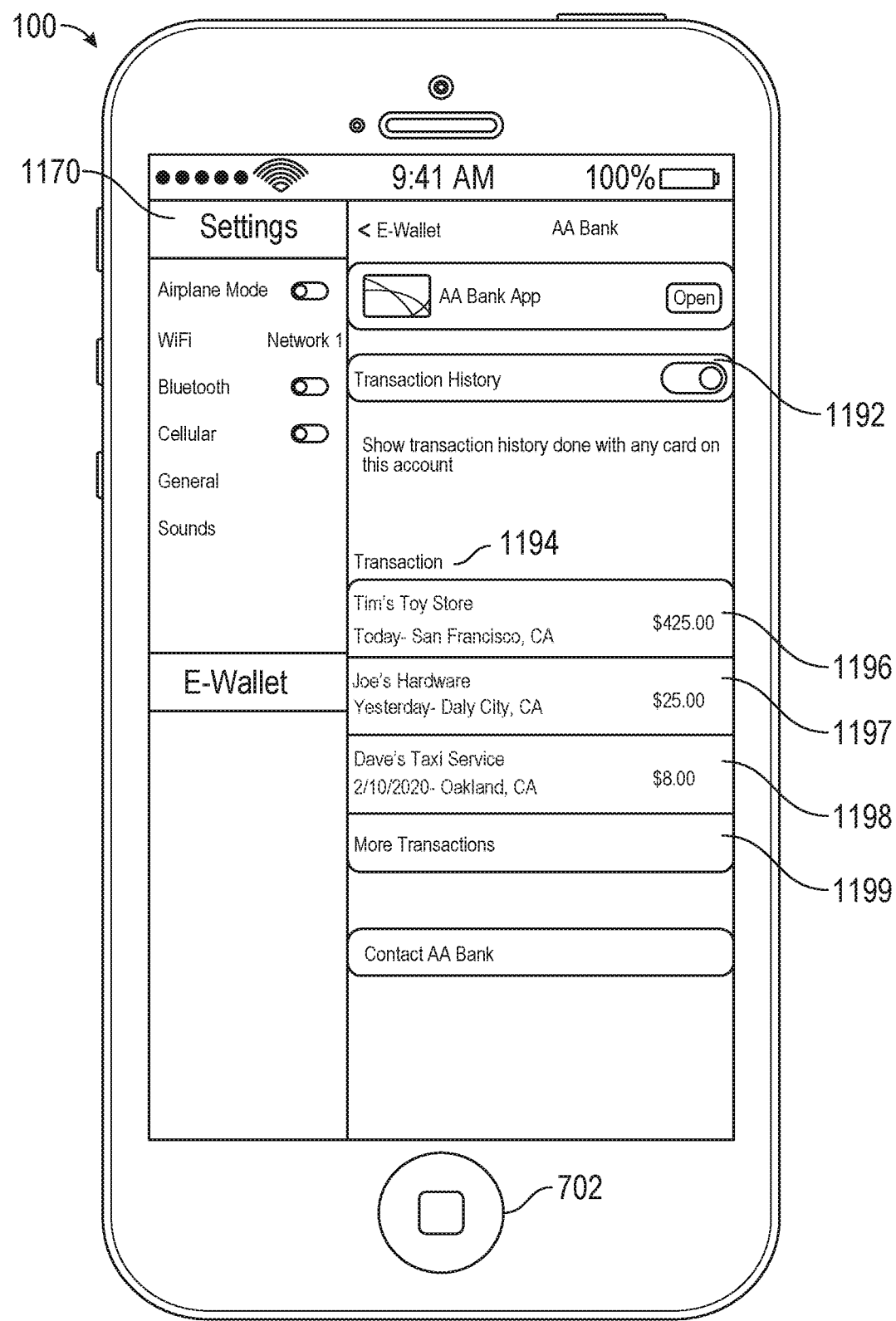

FIGS. 11A-11N illustrate exemplary user interfaces for making a payment transaction in accordance with some embodiments. The user interfaces in these figures are used to illustrate the processes described below, including the process in FIGS. 12A-12C.

FIGS. 11A-11B illustrate exemplary user interfaces for initiating a payment transaction in accordance with some embodiments. At FIG. 11A, an electronic device 100 displays a user interface for a first application 1102 (e.g., a third-party merchant application or a web browser-accessed website). The user interface for the first application 1102 includes a payment affordance 1110 (e.g., a submit button to buy contents of a shopping cart) associated with a payment transaction (e.g., a purchase to be made). For example, the payment affordance 1110 may be a submit button to initiate the purchase of the contents of an electronic shopping cart 1104. In this example, the electronic shopping cart 1104 includes multiple clothing items 1106. In some embodiments, the first application is a third-party application installed on the electronic device. In some embodiments, the first application includes a website accessed through a web browser installed on the electronic device.

The electronic device detects selection of the payment affordance 1110 (e.g., a user taps the payment affordance 1110). In response to detecting selection of the payment affordance 1110, the electronic device transfers first transaction information (e.g., descriptions of items in the shopping cart, item prices, tax, subtotal, shipping method details) about the payment transaction from the first application 1102 (e.g., a third-party merchant application or a web browser-accessed website) to a second application (e.g., operating system or electronic wallet application).

In some embodiments, the second application is the operating system of the electronic device, and the second application has access to an electronic wallet (e.g., the electronic wallet illustrated and described above with respect to FIGS. 5A-5I, FIGS. 6A-6C, FIGS. 9A-9H, and FIGS. 10A-10B) including second transaction information. In some embodiments, the second application is a first-party application provided by a provider of the operating system of the electronic device, and the second application has access to an electronic wallet (e.g., the electronic wallet illustrated and described above with respect to FIGS. 5A-5I, FIGS. 6A-6C, FIGS. 9A-9H, and FIGS. 10A-10B) including second transaction information.

At FIG. 11B, in response to detecting selection of the payment affordance 1110, the electronic device displays a user interface for the second application 1120. The user interface for the second application 1120 includes the first transaction information (e.g., descriptions of items in the shopping cart, item prices, tax, subtotal 1132, shipping method details) received from the first application and includes second transaction information (e.g., indication of payment account 1124, name associated with the payment account, billing address, ship-to address 1126, and contact information 1130) provided by the second application (e.g., operating system or electronic wallet application). The second transaction information is not available to the first application (e.g., the user has not provided the third-party application with credit card, billing address, shipping address, or contact information).

In some embodiments, displaying the user interface for the second application 1120 (e.g., operating system or electronic wallet application) partially covers the user interface for the first application 1102 (e.g., a third-party merchant application or a web browser-accessed website), leaving at least part of the user interface for the first application 1102 visible. The second application only partially covers the user interface for the first application so as to help the user to maintain context for the transaction. For example, in FIG. 11B, the user interface for the second application 1120 (which, for example, includes displayed items 1124, 1126, 1128, 1130, 1124A, 1126A, 1128A, 1130A, 1132, 1134, 1136, 1138, and 1150) covers the bottom portion of the display of device 100, leaving the top portion of the user interface for the first application 1102 visible, including part of the electronic shopping cart 1104 and one of the clothing items 1106 (e.g., the navy blue shirt for $85.00).

In some embodiments, displaying the user interface for the second application 1120 (e.g., operating system or electronic wallet application) comprises vertically sliding the user interface for the second application 1120 (e.g., operating system or electronic wallet application) onto the display from the bottom of the display to partially cover the user interface for the first application 1102 (e.g., a third-party merchant application or a web browser-accessed website) and leaving at least part of the user interface for the first application 1102 visible. The second application only partially covers the user interface for the first application so as to help the user to maintain context for the transaction. For example, in the transition between FIGS. 11A and 11B, the user interface for the second application 1120 (which, for example, includes displayed items 1124, 1126, 1128, 1130, 1124A, 1126A, 1128A, 1130A, 1132, 1134, 1136, 1138, and 1150) slides up from the bottom of the display of the device to cover the bottom portion of the display of device 100, leaving the top portion of the user interface for the first application 1102 visible, including part of the electronic shopping cart 1104 and one of the clothing items 1106 (e.g., the navy blue shirt for $85.00).

In some embodiments, the first transaction information includes an amount 1108 (e.g., a subtotal for the shopping cart or the total amount to be paid) and a default shipping method 1128 (e.g., a shipping method such as two-day express mail, first class, ground shipping selected by the first application). In some embodiments, the second transaction information includes a primary account number 1124 (e.g., account number stored in an electronic wallet) associated with a payment account. For example, the payment account may be a payment account linked to the electronic device, as described above. In some embodiments, the second transaction information includes a ship-to address 1126 (e.g., the user's home mailing address) accessed from user contact information, wherein the user contact information is stored on the electronic device.

FIGS. 11C-11D illustrate exemplary user interfaces for changing an option of the payment transaction in accordance with some embodiments. In some embodiments, the electronic device receives a selection of (e.g., user taps on) a first purchase detail affordance (e.g., caret associated with payment account 1124A, shipping address, shipping method, contact information) displayed on the user interface for the second application 1120. The first purchase detail affordance 1124A is associated with a first purchase detail (e.g., the selected payment account, shipping address, shipping method, contact information) of the payment transaction. In response to receiving selection of the first purchase detail affordance 1124A, the device displays one or more affordances (e.g., displays different options for payment accounts) for selecting an alternate value for the first purchase detail of the payment transaction. For example, when a user selects caret 1124A in FIG. 11C, which relates to a payment account for the first purchase detail, the device displays, as illustrated in FIG. 11D, several payment account options 1160 and 1162 for the first purchase detail. The currently selected payment account option 1160 is identified, such as by checkmark 1164. The device receives a selection of an alternate value (e.g., the user selects payment account option 1162) for the first purchase detail of the payment transaction, and, in response to receiving selection of the alternate value, the device updates the second transaction information to include the alternate value as the first purchase detail. Thus, the user can change the default payment account 1124 that will be used for the payment transaction.

Similarly, the user can use caret 1126A associated with shipping address, caret 1128A associated with shipping method, or caret 1130A associated with contact info to change a corresponding purchase detail. For example, a user may change the default shipping address 1126 to that of a work location, rather than the default shipping address of a home location. In another example, the user may change the default shipping method 1128 to a different shipping method offered by the first application. In another example, the user may change the default contact info 1130 to a different email address.

In some embodiments, the first purchase detail (e.g., price, default shipping option) of the payment transaction is part of the first transaction information from the first application. In some embodiments, the first purchase detail (e.g., payment account, shipping address, shipping method, contact information) is part of the second transaction information. In some embodiments, the first purchase detail is a shipping address. In another embodiment, the first purchase detail is a payment account.

In some embodiments, the electronic device transfers zip code information from the second application to the first application. In some embodiments, the zip code information is transferred before the transaction has been authorized, so as to enable the device to provide more accurate shipping cost information to the user before the user decides to authorize the transaction. The first transaction information includes an initial shipping cost based on the zip code information. The device (or the second application) receives updated first transaction information, wherein the updated first transaction information includes a shipping cost based on the second transaction information (e.g., the shipping cost is updated based on the user's actual selected shipping address).

FIGS. 11E-11L illustrate exemplary user interfaces for receiving authentication to proceed with a payment transaction in accordance with some embodiments. In some embodiments, the electronic device receives authorization (e.g., receiving a passcode for payment or detecting a fingerprint for payment) to proceed with the payment transaction.

FIGS. 11E-F illustrate exemplary user interfaces for receiving authentication to proceed with a payment transaction using a fingerprint sensor 702 of the electronic device in accordance with some embodiments. At FIG. 11E, the device displays a visual indicator 1150A instructing the user to provide authentication using fingerprint sensor 702. In some embodiments, receiving authorization to proceed with the payment transaction uses the fingerprint sensor 702. The device detects a respective fingerprint on a fingerprint sensor 702 of the electronic device. In response to detecting the respective fingerprint on the fingerprint sensor 702, the device determines whether the fingerprint is consistent with an enrolled fingerprint that is enabled to authorize payment transactions. In accordance with a determination that a respective fingerprint is consistent with the enrolled fingerprint, the device authorizes the payment transaction. In accordance with a determination that the respective fingerprint is not consistent with the enrolled fingerprint, the devices forgoes authorization of the payment transaction. In other words, the device does not authorize the payment transaction, meaning authorization is still required to proceed with the payment transaction.

FIG. 11F illustrates display of a partially filled visual indicator 1150B, showing the progress of determining whether the fingerprint is consistent with the enrolled fingerprint. FIG. 11G illustrates an exemplary user interface when fingerprint authentication fails. In some embodiments, in accordance with a determination that the respective fingerprint is not consistent with the enrolled fingerprint, the device displays, on the display, an affordance 1154 for receiving authorization to proceed with the payment transaction using a payment passcode (rather than the fingerprint sensor). In some embodiments, in accordance with a determination that the respective fingerprint is not consistent with the enrolled fingerprint, displaying, on the display, a visual prompt 1150A instructing a user to place a finger on the fingerprint sensor.

FIG. 11H illustrates an exemplary user interface for authentication using the fingerprint sensor after one or more failed attempts at authenticating using the fingerprint sensor. In some embodiments, in accordance with a determination that the respective fingerprint is not consistent with the enrolled fingerprint, the device determines whether a predetermined number of attempts to receive authorization to proceed with the payment transaction using the fingerprint sensor has been reached. In accordance with a determination that the predetermined number of attempts to receive authorization has been reached, the device requires authorization using a payment passcode to proceed with the payment transaction, such as illustrated in FIG. 11L. In some embodiments, the predetermined number of attempts is three.

FIGS. 11K-L illustrate various exemplary user interfaces for entry of a payment passcode in accordance with some embodiments. In some embodiments, receiving authorization to proceed with the payment transaction comprises receiving authorization using a payment passcode. The device receives a payment passcode at the electronic device (e.g., using keypad 740 of FIG. 11L). The device determines whether the payment passcode is consistent with an enrolled passcode that is enabled to authorize payment transactions. In response to determining that the payment passcode is consistent with the enrolled passcode (e.g., a passcode programmed by the user for unlocking the device or for making payments), the device authorizes the payment transaction. For example, at FIG. 11K, pay with passcode affordance 1164 is displayed. A user selects the pay with passcode affordance 1164 in order to provide authorization using a payment passcode. After receiving selection of the pay with passcode affordance 1164, the device displays a (e.g., keypad 740 of FIG. 11L) for receiving the payment passcode. The user enters the payment passcode to provide authorization.

FIG. 11I illustrates an exemplary user interface for indicating authorization has been received. The device displays a done affordance 1156, indicating that authorization to proceed with the payment transaction has been received. In some embodiments, in response to receiving authorization to proceed with the payment transaction, the electronic device transfers the second transaction information to the first application. In some embodiments, the second transaction information is provided to the first application without providing the first application with access to other similar information that is accessible to the second application, such as the user's contacts, payment account information, or shipping information. For example, only the specific payment account information or shipping information that the user selected to provide to the first application for use in processing the current payment transaction is provided to the first application.

In some embodiments, the electronic device receives authorization (e.g., receiving a passcode for payment or detecting a fingerprint for payment) to proceed with the payment transaction. In response to receiving authorization to proceed with the payment transaction, the electronic device transfers the first transaction information and the second transaction information to the first application.

In some embodiments, the electronic device receives the authorization (e.g., receiving a passcode for payment or detecting a fingerprint for payment) to proceed with the payment transaction prior to transferring the second transaction information to the first application. The second transaction information is not provided to the first application before the authorization to proceed with the application has been received, so as to protect the privacy of the user. The privacy of the user is protected because the first application (e.g., the third-party application) cannot access the sensitive information in the second transaction information without the user's consent (e.g., through authorizing to proceed with the payment transaction).

FIG. 11J illustrates an exemplary user interface for a completed payment transaction. In some embodiments, in response to transferring the first transaction information and the second transaction information from the second application to the first application, the device completes the payment transaction. The first application displays, for example, a confirmation that the transaction has been completed, such as illustrated in FIG. 11J. The confirmation that the transaction has been completed may include, for example, the total amount paid and a confirmation number 1162.

In some embodiments, a financial institution associated with processing the payment transaction treats the payment transaction as a card-present transaction. The financial institution treats the payment transaction as a card-present transaction, as compared to a card-not-present transaction, even though there is no physical credit card being swiped at the time of purchase. The financial institution treats the payment transaction as a card-present transaction because the payment transaction was completed securely. For example, the payment transaction is completed securely because the payment account has been linked to the respective device and completing the payment transaction requires user authorization (such as through the fingerprint sensor or passcode entry). As a result of these extra layers of security, the financial institution has confidence that the primary account number used in the payment transaction was provided by the device linked to the payment account.

In some embodiments, a third application can be used to commence a second payment transaction using the electronic wallet. The device displays a user interface for the third application (e.g., a third-party merchant application or a different web browser-accessed website). The third application is different from the first application and the second application. The user interface for the third application includes a second payment affordance (e.g., a submit button to buy contents of a shopping cart in the third-party merchant application or the web-browser accessed website). The second payment affordance is associated with a second payment transaction (e.g., another purchase to be made using the second application). The electronic device detects selection of (e.g., the user taps on) the second payment affordance, and, in response to detecting selection of the second payment affordance, the electronic device transfers third transaction information (e.g., description of items in cart, item prices, tax, subtotal, shipping method details) about the second payment transaction from the third application to the second application. The electronic device displays a second user interface for the second application, wherein the second user interface for the second application includes the third transaction information received from the third application and includes fourth transaction information (e.g., payment account information, name on the payment account, billing address, ship-to address, and/or contact information) provided by the second application (e.g., operating system or electronic wallet application). The fourth transaction information is not available to the third application. For example, the fourth transaction information is not available to the third application because the user has not previously provided the third application with the payment account information, name on the payment account, billing address, ship-to address, and/or contact information.

FIGS. 11M-11N illustrate exemplary user interfaces for configuring the settings of an electronic wallet in accordance with some embodiments. In some embodiments, the electronic device displays a settings menu 1170. The electronic device receives selection of a default shipping address to be used as a default for the second transaction information. For example, the user selects caret 1184, which relates to a ship-to address. The user can then enter (and thus the electronic device receives) an entry for a default ship-to address (e.g., default shipping address) for use with payment transactions.

In some embodiments, the electronic device receives selection from among at least the payment account 1174 and a second payment account 1176 displayed in the settings menu 1170. The selection specifies the default payment account to be used for payment transactions. The selection determines the default payment account that will be used for payment transactions.

In some embodiments, the electronic device receives input for default contact information. The input specifies the default contact information to be used for payment transactions. For example, the user selects caret 1186, which relates to contact information. The user can then enter (and thus the electronic device receives) a preferred contact information. The entry determines the default contact information that will be used for payment transactions.

FIG. 11N illustrates an exemplary user interface for configuring the settings of an electronic wallet in accordance with some embodiments. In some embodiments, the electronic device receives selection of a transaction history display preference (e.g., the transaction history preference switch 1192) displayed in a settings menu 1170. The electronic device determines whether the transaction history display preference is enabled, and, in accordance with a determination that the transaction history display preference is enabled, the device displays a history of payment transactions 1194. For example, the history of payment transactions 1194 may include multiple previously completed payment transactions 1196, 1197, and 1198. In another embodiment, when the electronic device receives selection of the more-transaction affordance 1199, the device displays additional previously completed payment transactions.

In some embodiments, the electronic device receives selection of a transaction history type preference. The transaction history type preference is displayed in the settings menu. The electronic device determines whether the transaction history type preference is a first type, a second type, or a third type. In accordance with a determination that the transaction history type preference is the first type, the electronic device does not display a history of payment transactions for a payment account. In accordance with a determination that the transaction history type preference is the second type, the electronic device displays a history of payment transactions for the payment account completed using only the electronic device. Thus, for example, payment transactions associated with the same payment account, but which were completed using another device or a physical credit card are not displayed when the transaction history type preference is the second type. In accordance with a determination that the transaction history type preference is the third type, the electronic device displays a history of payment transactions for the payment account completed using the electronic device and a physical credit card.

Figure 12C:
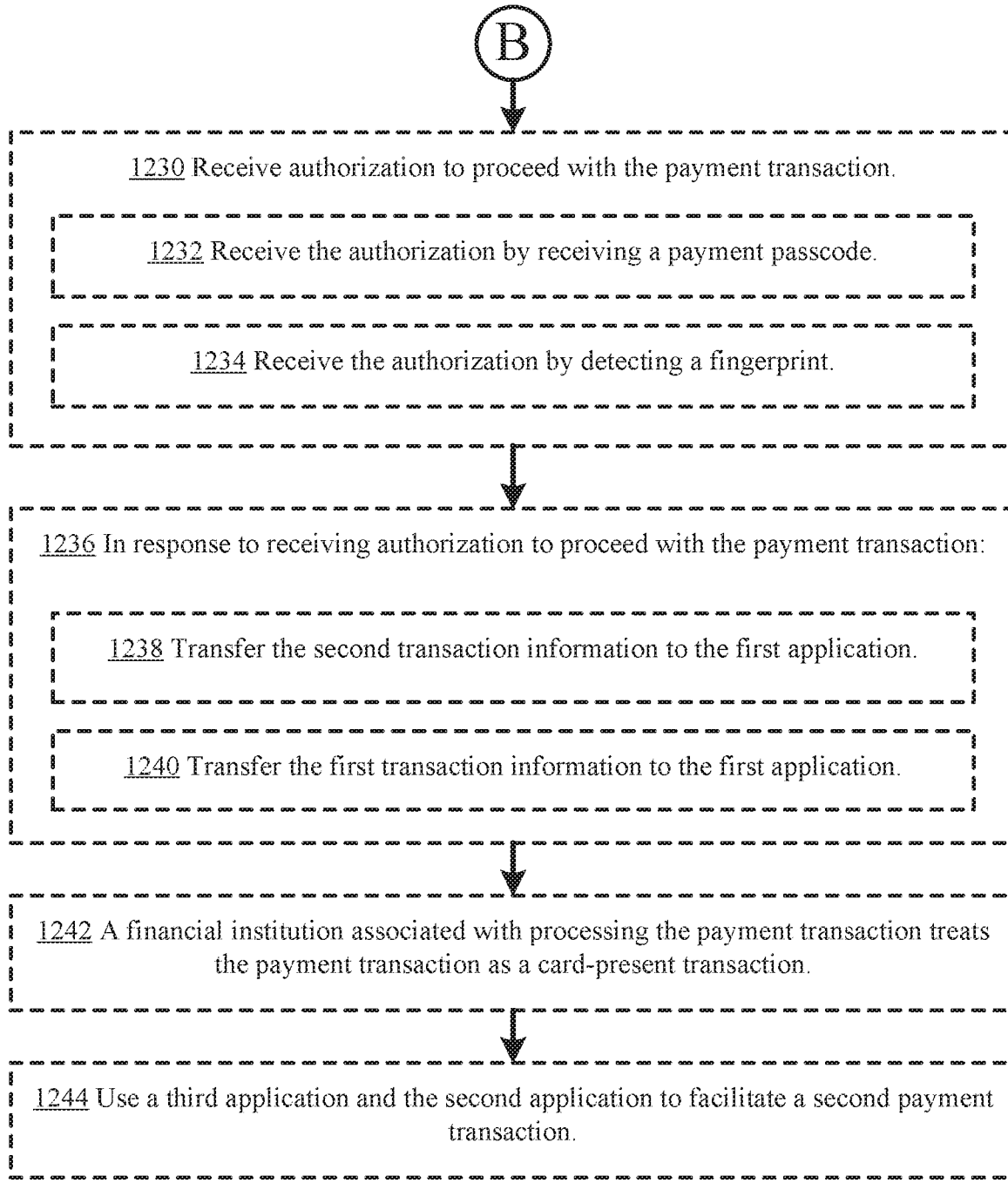

FIGS. 12A-12C are flow diagrams illustrating a method for making a payment transaction in accordance with some embodiments. Method 1200 is performed at a device (e.g., device 300, FIG. 3, or portable multifunction device 100, FIG. 1) with a display. Some operations in method 1200 may be combined, the order of some operations may be changed, and some operations may be omitted.

As described below, method 1200 provides an intuitive way for making a payment account. The method reduces the cognitive burden on a user when making the payment transaction, thereby creating a more efficient human-machine interface. For battery-operated computing devices, enabling a user to make a payment transaction faster and more efficiently conserves power and increases the time between battery charges.

At block 1202, an electronic device displays a user interface for a first application (e.g., a third-party merchant application or a web browser-accessed website, 1102 of FIG. 11A). The user interface for the first application (e.g., 1102 of FIG. 11A) includes a payment affordance (e.g., a submit button to buy contents of a shopping cart, 1110 of FIG. 11A) associated with a payment transaction (e.g., a purchase to be made). For example, the payment affordance (e.g., 1110 of FIG. 11A) may be a submit button to initiate the purchase of the contents of an electronic shopping cart (e.g., 1104 of FIG. 11A).

At block 1204, in some embodiments, the first application is a third-party application installed on the electronic device. At block 1206, in some embodiments, the first application includes a website accessed through a web browser installed on the electronic device.

At block 1208, the electronic device detects selection of the payment affordance (e.g., a user taps the payment affordance 1110 of FIG. 11A).

At block 1210, the device performs operations in response to detecting selection of the payment affordance (e.g., 1110 of FIG. 11A). At block 1212, the electronic device transfers first transaction information (e.g., descriptions of items in the shopping cart, item prices, tax, subtotal, shipping method details) about the payment transaction from the first application (e.g., a third-party merchant application or a web browser-accessed website, 1102 of FIG. 11A) to a second application (e.g., operating system or electronic wallet application).

At block 1214, in some embodiments, the second application is the operating system of the electronic device, and the second application has access to an electronic wallet (e.g., the electronic wallet illustrated and described above with respect to FIGS. 5A-5I, FIGS. 6A-6C, FIGS. 9A-9H, and FIGS. 10A-10B) including second transaction information.

At block 1216, in some embodiments, the second application is a first-party application provided by a provider of the operating system of the electronic device, and the second application has access to an electronic wallet (e.g., the electronic wallet illustrated and described above with respect to FIGS. 5A-5I, FIGS. 6A-6C, FIGS. 9A-9H, and FIGS. 10A-10B) including second transaction information.

At block 1218, in response to detecting selection of the payment affordance (e.g., 1110 of FIG. 11A), the electronic device displays a user interface for the second application (e.g., 1120 of FIG. 11B). The user interface for the second application (e.g., 1120 of FIG. 11B) includes the first transaction information (e.g., descriptions of items in the shopping cart, item prices, tax, subtotal, shipping method details) received from the first application and includes second transaction information (e.g., indication of payment account, name associated with the payment account, billing address, ship-to address, and contact information) provided by the second application (e.g., operating system or electronic wallet application). The second transaction information is not available to the first application (e.g., the user has not provided the third-party application with credit card, billing address, shipping address, or contact information).

At block 1220, in some embodiments, displaying the user interface for the second application (e.g., operating system or electronic wallet application, 1120 of FIG. 11B) partially covers the user interface for the first application (e.g., a third-party merchant application or a web browser-accessed website, 1102 of FIG. 11B), leaving at least part of the user interface for the first application visible. The second application only partially covers the user interface for the first application so as to help the user to maintain context for the transaction.

At block 1222, in some embodiments, displaying the user interface for the second application (e.g., operating system or electronic wallet application, 1120 of FIG. 11B) comprises vertically sliding the user interface for the second application (e.g., operating system or electronic wallet application, 1120 of FIG. 11B) onto the display from the bottom of the display to partially cover the user interface for the first application (e.g., a third-party merchant application or a web browser-accessed website, 1102 of FIG. 11B) and leaving at least part of the user interface for the first application visible. The user interface for the second application only partially covers the user interface for the first application so as to help the user to maintain context for the transaction.

In some embodiments, the first transaction information includes an amount (e.g., a subtotal for the shopping cart or the total amount to be paid) and a default shipping method (e.g., a shipping method such as two-day express mail, first class, ground shipping selected by the first application). In some embodiments, the second transaction information includes a primary account number (e.g., account number stored in an electronic wallet) associated with a payment account. For example, the payment account may be a payment account linked to the electronic device, as described above. In some embodiments, the second transaction information includes a ship-to address (e.g., the user's home mailing address) accessed from user contact information, wherein the user contact information is stored on the electronic device.

At block 1224, in some embodiments, the electronic device receives a selection of (e.g., user taps on) a first purchase detail affordance (e.g., caret associated with payment account, shipping address, shipping method, contact information) displayed on the user interface for the second application (1120 of FIG. 11C). The first purchase detail affordance (1124A of FIG. 11C) is associated with a first purchase detail (e.g., the selected payment account, shipping address, shipping method, contact information) of the payment transaction. In response to receiving selection of the first purchase detail affordance (1124A of FIG. 11C), the device displays one or more affordances (e.g., displays different options for payment accounts) for selecting an alternate value for the first purchase detail of the payment transaction. The device receives a selection of an alternate value (e.g., the user selects payment account option 1162) for the first purchase detail of the payment transaction, and, in response to receiving selection of the alternate value, the device updates the second transaction information to include the alternate value as the first purchase detail. Thus, the user can change the default payment account that will be used for the payment transaction.

At block 1226, in some embodiments, the first purchase detail (e.g., price, default shipping option) of the payment transaction is part of the first transaction information from the first application.

At block 1228, in some embodiments, the first purchase detail (e.g., payment account, shipping address, shipping method, contact information) is part of the second transaction information. In some embodiments, the first purchase detail is a shipping address. In some embodiments, the first purchase detail is a payment account.

In some embodiments, the electronic device transfers zip code information from the second application to the first application. In some embodiments, the zip code information is transferred before the transaction has been authorized, so as to enable the device to provide more accurate shipping cost information to the user before the user decides to authorize the transaction. The first transaction information includes an initial shipping cost based on the zip code information. The device (or the second application) receives updated first transaction information, wherein the updated first transaction information includes a shipping cost based on the second transaction information (e.g., the shipping cost is updated based on the user's actual selected shipping address).

At block 1230, in some embodiments, the electronic device receives authorization (e.g., receiving a passcode for payment or detecting a fingerprint for payment) to proceed with the payment transaction.

At block 1232, in some embodiments, receiving authorization to proceed with the payment transaction uses the fingerprint sensor. The device detects a respective fingerprint on a fingerprint sensor of the electronic device. In response to detecting the respective fingerprint on the fingerprint sensor, the device determines whether the fingerprint is consistent with an enrolled fingerprint that is enabled to authorize payment transactions. In accordance with a determination that a respective fingerprint is consistent with the enrolled fingerprint, the device authorizes the payment transaction. In accordance with a determination that the respective fingerprint is not consistent with the enrolled fingerprint, the device forgoes authorization of the payment transaction. In other words, the device does not authorize the payment transaction, meaning authorization is still required to proceed with the payment transaction.

In some embodiments, in accordance with a determination that the respective fingerprint is not consistent with the enrolled fingerprint, the device displays, on the display, an affordance (e.g., 1154 of FIG. 11G) for receiving authorization to proceed with the payment transaction using a payment passcode (rather than the fingerprint sensor). In some embodiments, in accordance with a determination that the respective fingerprint is not consistent with the enrolled fingerprint, displaying, on the display, a visual prompt (e.g., 1150A of FIG. 11G) instructing a user to place a finger on the fingerprint sensor.

In some embodiments, in accordance with a determination that the respective fingerprint is not consistent with the enrolled fingerprint, the device determines whether a predetermined number of attempts to receive authorization to proceed with the payment transaction using the fingerprint sensor has been reached. In accordance with a determination that the predetermined number of attempts to receive authorization has been reached, the device requires authorization using a payment passcode to proceed with the payment transaction. In some embodiments, the predetermined number of attempts is three.

At block 1234, in some embodiments, receiving authorization to proceed with the payment transaction comprises receiving authorization using a payment passcode. The device receives a payment passcode at the electronic device (e.g., using keypad 740 of FIG. 11L). The device determines whether the payment passcode is consistent with an enrolled passcode that is enabled to authorize payment transactions. In response to determining that the payment passcode is consistent with the enrolled passcode (e.g., a passcode programmed by the user for unlocking the device or for making payments), the device authorizes the payment transaction.

At block 1236, in some embodiments, the device performs a series of operations in response to receiving authorization to proceed with the payment transaction. At block 1238, in some embodiments, the electronic device transfers the second transaction information to the first application. In some embodiments, the second transaction information is provided to the first application without providing the first application with access to other similar information that is accessible to the second application, such as the user's contacts, payment account information, or shipping information. For example, only the specific payment account information or shipping information that the user selected to provide to the first application for use in processing the current payment transaction is provided to the first application.

At block 1240, in some embodiments, in response to receiving authorization to proceed with the payment transaction, the electronic device transfers the first transaction information and the second transaction information to the first application.

In some embodiments, the electronic device receives the authorization (e.g., receiving a passcode for payment or detecting a fingerprint for payment) to proceed with the payment transaction prior to transferring the second transaction information to the first application. The second transaction information is not provided to the first application before the authorization to proceed with the application has been received so as to protect the privacy of the user. The privacy of the user is protected because the first application (e.g., the third-party application) cannot access the sensitive information in the second transaction information without the user's consent (e.g., through authorizing to proceed with the payment transaction).

In some embodiments, in response to transferring the first transaction information and the second transaction information from the second application to the first application, the device completes the payment transaction.

At block 1242, in some embodiments, a financial institution associated with processing the payment transaction treats the payment transaction as a card-present transaction. The financial institution treats the payment transaction as a card-present transaction, as compared to a card-not-present transaction, even though there is no physical credit card being swiped at the time of purchase. The financial institution treats the payment transaction as a card-present transaction because the payment transaction was completed securely. For example, the payment transaction is completed securely because the payment account has been linked to the respective device and completing the payment transaction requires user authorization (such as through the fingerprint sensor or passcode entry). As a result of these extra layers of security, the financial institution has confidence that the primary account number used in the payment transaction was provided by the device linked to the payment account.

At block 1244, in some embodiments, a third application can be used to commence a second payment transaction using the electronic wallet. The device displays a user interface for the third application (e.g., a third-party merchant application or a different web browser-accessed website). The third application is different from the first application and the second application. The user interface for the third application includes a second payment affordance (e.g., a submit button to buy contents of a shopping cart in the third-party merchant application or the web-browser accessed website). The second payment affordance is associated with a second payment transaction (e.g., another purchase to be made using the second application). The electronic device detects selection of (e.g., the user taps on) the second payment affordance, and, in response to detecting selection of the second payment affordance, the electronic device transfers third transaction information (e.g., description of items in cart, item prices, tax, subtotal, shipping method details) about the second payment transaction from the third application to the second application. The electronic device displays a second user interface for the second application, wherein the second user interface for the second application includes the third transaction information received from the third application and includes fourth transaction information (e.g., payment account information, name on the payment account, billing address, ship-to address, and/or contact information) provided by the second application (e.g., operating system or electronic wallet application). The fourth transaction information is not available to the third application. For example, the fourth transaction information is not available to the third application because the user has not previously provided the third application with the payment account information, name on the payment account, billing address, ship-to address, and/or contact information.

In some embodiments, the electronic device displays a settings menu (e.g., 1170 of FIG. 11M). The electronic device receives selection of a default shipping address to be used as a default for the second transaction information.

In some embodiments, the electronic device receives selection from among at least the payment account (e.g., 1174 of FIG. 11M) and a second payment account (e.g., 1176 of FIG. 11M) displayed in the settings menu (e.g., 1170 of FIG. 11M). The selection specifies the default payment account to be used for payment transactions. The selection determines the default payment account that will be used for payment transactions.

In some embodiments, the electronic device receives input for default contact information. The input specifies the default contact information to be used for payment transactions.

In some embodiments, the electronic device receives selection of a transaction history display preference (e.g., the transaction history preference switch 1192 of FIG. 11N) displayed in a settings menu (e.g., 1170 of FIG. 11N). The electronic device determines whether the transaction history display preference is enabled, and, in accordance with a determination that the transaction history display preference is enabled, the device displays a history of payment transactions (e.g., 1194 of FIG. 11N). For example, the history of payment transactions (e.g., 1194 of FIG. 11N) may include multiple previously completed payment transactions (e.g., 1196, 1197, and 1198 of FIG. 11N). In another embodiment, when the electronic device receives selection of the more-transaction affordance (e.g., 1199 of FIG. 11N), the device displays additional previously completed payment transactions.

In some embodiments, the electronic device receives selection of a transaction history type preference. The transaction history type preference is displayed in the settings menu. The electronic device determines whether the transaction history type preference is a first type, a second type, or a third type. In accordance with a determination that the transaction history type preference is the first type, the electronic device does not display a history of payment transactions for a payment account. In accordance with a determination that the transaction history type preference is the second type, the electronic device displays a history of payment transactions for the payment account completed using only the electronic device. Thus, for example, payment transactions associated with the same payment account, but which were completed using another device or a physical credit card are not displayed when the transaction history type preference is the second type. In accordance with a determination that the transaction history type preference is the third type, the electronic device displays a history of payment transactions for the payment account completed using the electronic device and a physical credit card.

Note that details of the processes described above with respect to method 1200 (e.g., FIGS. 12A-12C and 11A-11N) are also applicable in an analogous manner to the methods described above. For example, methods 600, 800, 1000, 1400, 1600, 1800, 2000, and 2200 may include one or more of the characteristics of the various methods described above with reference to method 1200. For brevity, these details are not repeated below.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to the figures may be implemented by components depicted in FIGS. 1A-1B. For example, detection operations, display operations, and determination operations may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 13A-13D illustrate exemplary user interfaces for selecting a payment account from among available payment accounts using an electronic device in accordance with some embodiments. The user interfaces in these figures are used to illustrate the processes described below, including the process in FIG. 14.

Figure 13A:
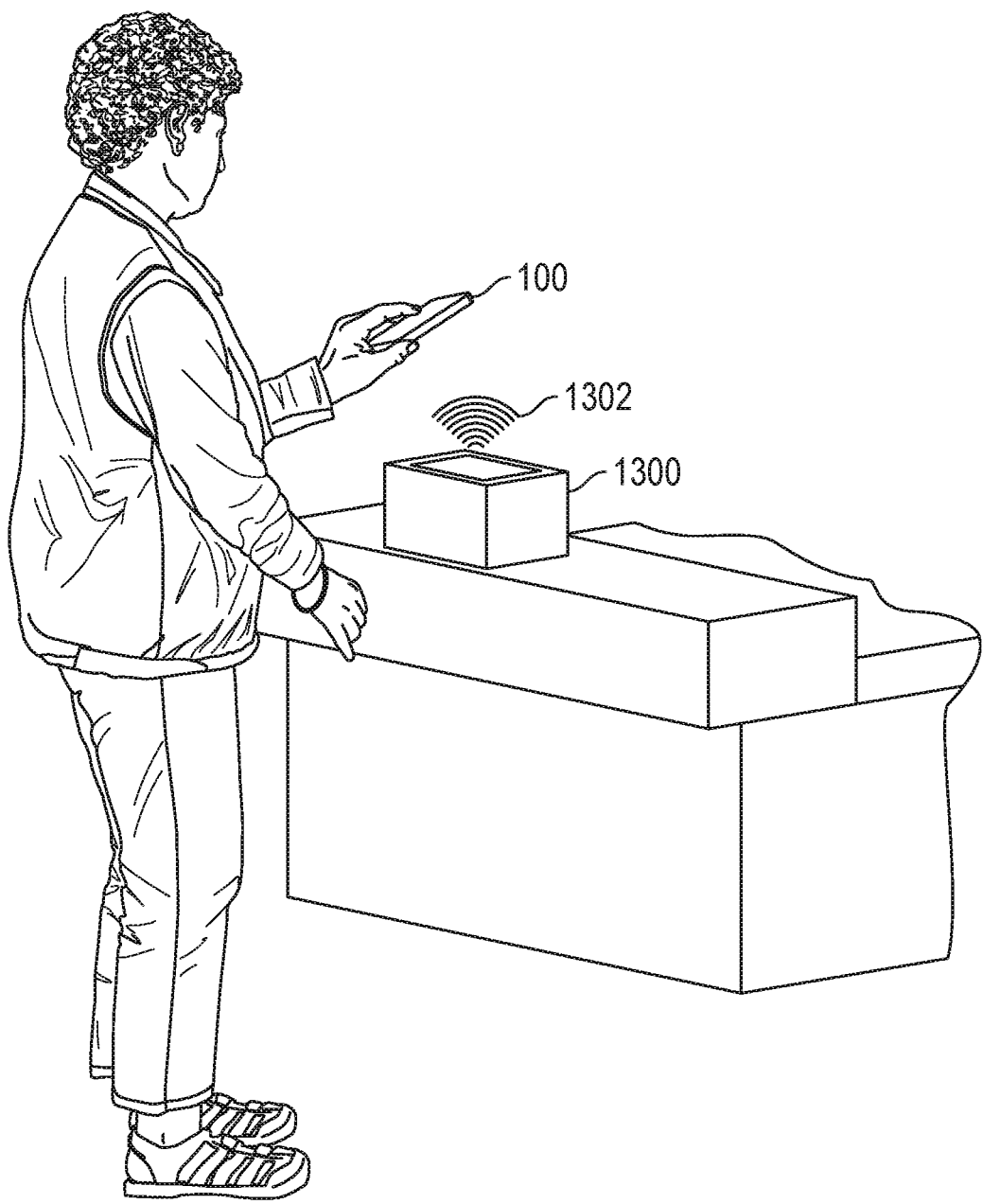
FIGS. 13A-13D illustrate exemplary user interfaces for selecting a payment account from among available payment accounts in accordance with some embodiments.
Figure 13B:
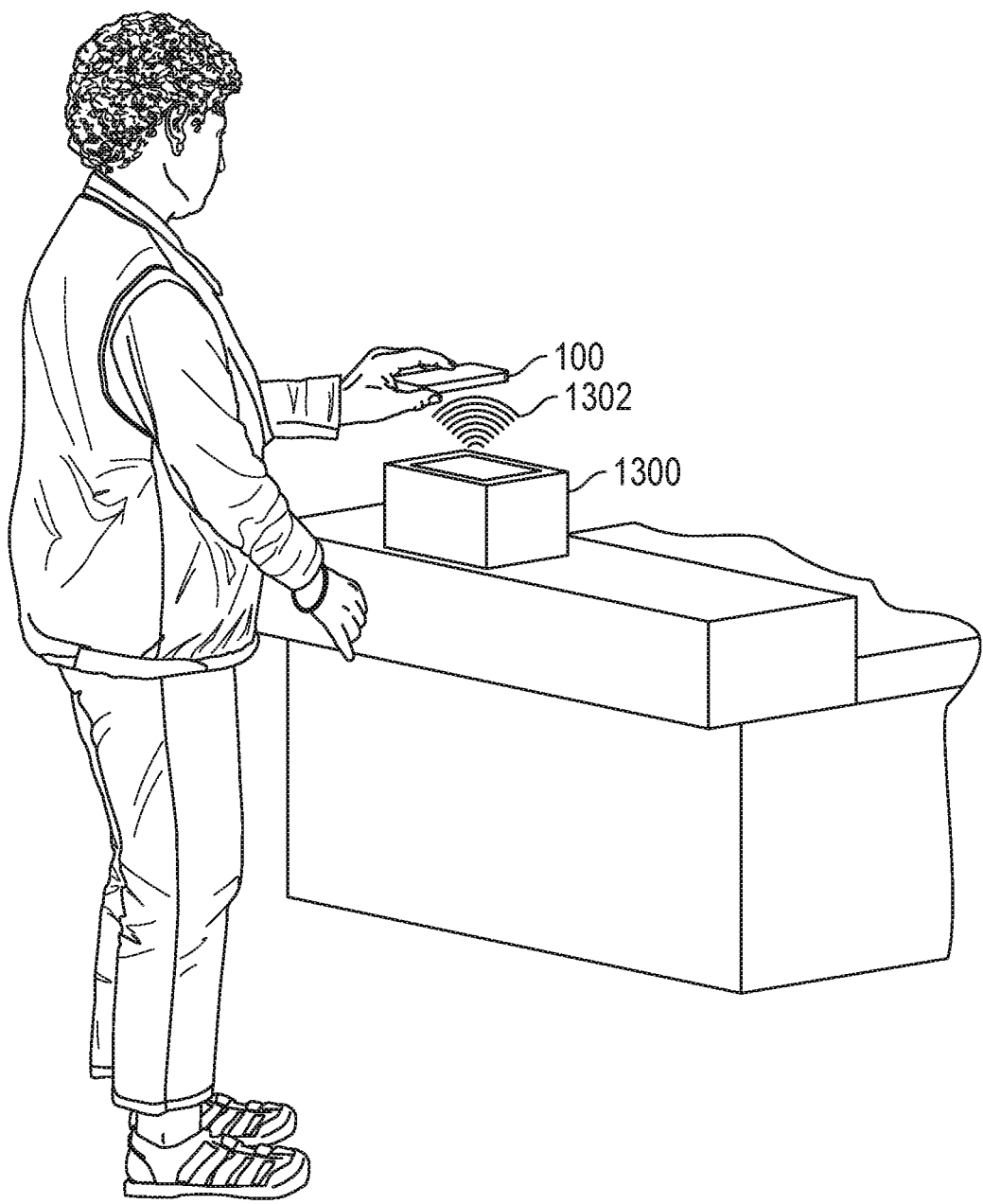

FIGS. 13A-13B illustrate an exemplary technique for providing payment for a payment transaction. In these examples, the payment is providing using a short-range communication radio, such as a NFC radio. The NFC standards, which are related to radio-frequency identification (RFID) standards, describe communication protocols for transferring information between two devices, such as for making payments. It should be appreciated, however, that other communications standards and techniques may also be used.

Device 100 (and device 300) may include near field communications circuitry, such as a short range communication radio. Accordingly, device 100 can wirelessly communicate with external equipment, such as NFC-enabled contactless payment transaction terminal 1300, using near field communications.

In FIG. 13A, the NFC-enabled contactless payment transaction terminal 1300 generates a field 1302. For example, an NFC-enabled device that enters the field 1302 can communicate with the contactless payment transaction terminal 1300 using NFC. In FIG. 13A, the electronic device 100 has not been placed in the field 1302. The contactless payment transaction terminal 1300 may be part of a payment system (e.g., check register) installed in a retail store for processing payment transactions, such as purchases of products and services.

In FIG. 13B, the user places the electronic device 100 into the field 1302. The electronic device detects, by the short-range communication radio of the electronic device, presence of the field 1302 (e.g., the NFC compliant RF field) generated by the contactless payment transaction terminal 1300 (e.g., an NFC-compliant payment transaction terminal). In some embodiments, the electronic device detects the field and communication initiation signal from the contactless payment transaction terminal 1300. The device communicates with the contactless payment transaction terminal 1300 to authorize the payment transaction.

In some embodiments, a user can make a purchase from any location where access to a network, such as the Internet, is available. For example, a user can access a software application at electronic device 100 with an Internet connection to initiate communication with a remote payment processing terminal to make a payment in a payment transaction.

In some embodiments, the electronic device is device 100. In some embodiments, the electronic device is device 300. The device has a display (e.g., 112, 340), a processor (e.g., 120, 310), and memory (e.g., 102, 370) storing one or more programs for execution by the processor.

Figure 13C:
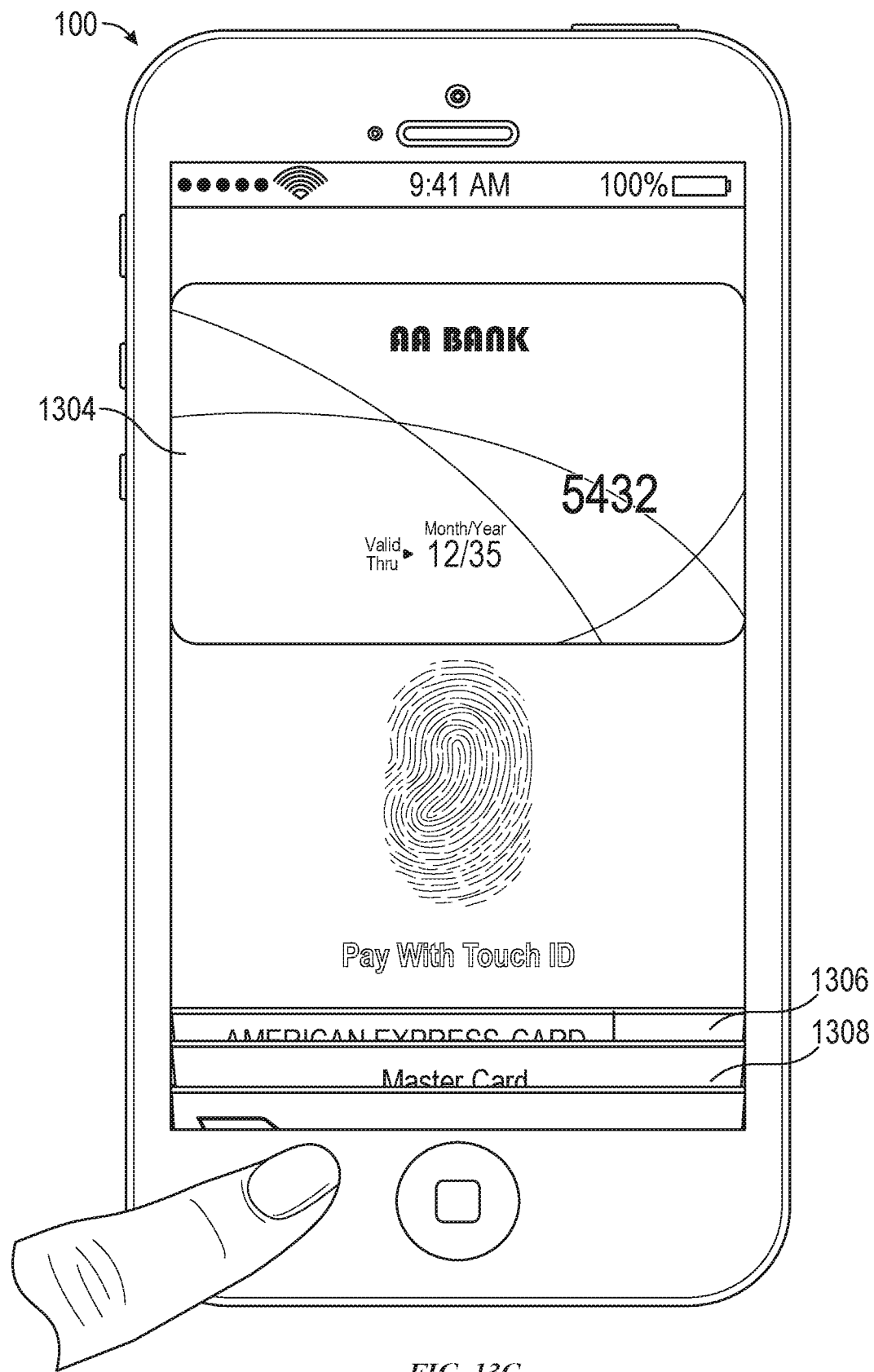

FIG. 13C illustrates an exemplary user interface that includes representations of a plurality of payment accounts that are linked to the electronic device (e.g., 100). The plurality of payment accounts includes a first payment account (e.g., 1304) and a second payment account (e.g., 1306) that is different from the first payment account (e.g., 1304).

The device receives a payment transaction request of a payment transaction, wherein the first payment account (e.g., 1304) and the second payment account (e.g., 1306) are both available to provide payment for the payment transaction. For example, the detection of the field 1302 and/or the communication initiation signal may be a payment transaction request. For another example, the payment transaction request is the user authorizing a payment. For another example, the payment transaction request is a user activating an affordance for reviewing a purchase summary (e.g., listing of items to be purchased and how payment will be made) prior to authorizing the payment.

In response to receiving the payment transaction request, the device obtains payment account selection information (e.g., current location information, current time, currently schedule calendar event). In accordance with a determination, based on the payment account selection information, that first payment transaction criteria are met, the device provides payment in the payment transaction using the first payment account (e.g., 1304). For example, the device transmits the primary account number of a first credit card to a contactless payment transaction terminal or to an online payment processor. In accordance with a determination, based on the payment account selection information, that second payment transaction criteria are met, the device provides payment in the payment transaction using the second payment account (e.g., 1306). For example, the device transmits the primary account number of a second credit card to a contactless payment transaction terminal or to an online payment processor.

Figure 13D:
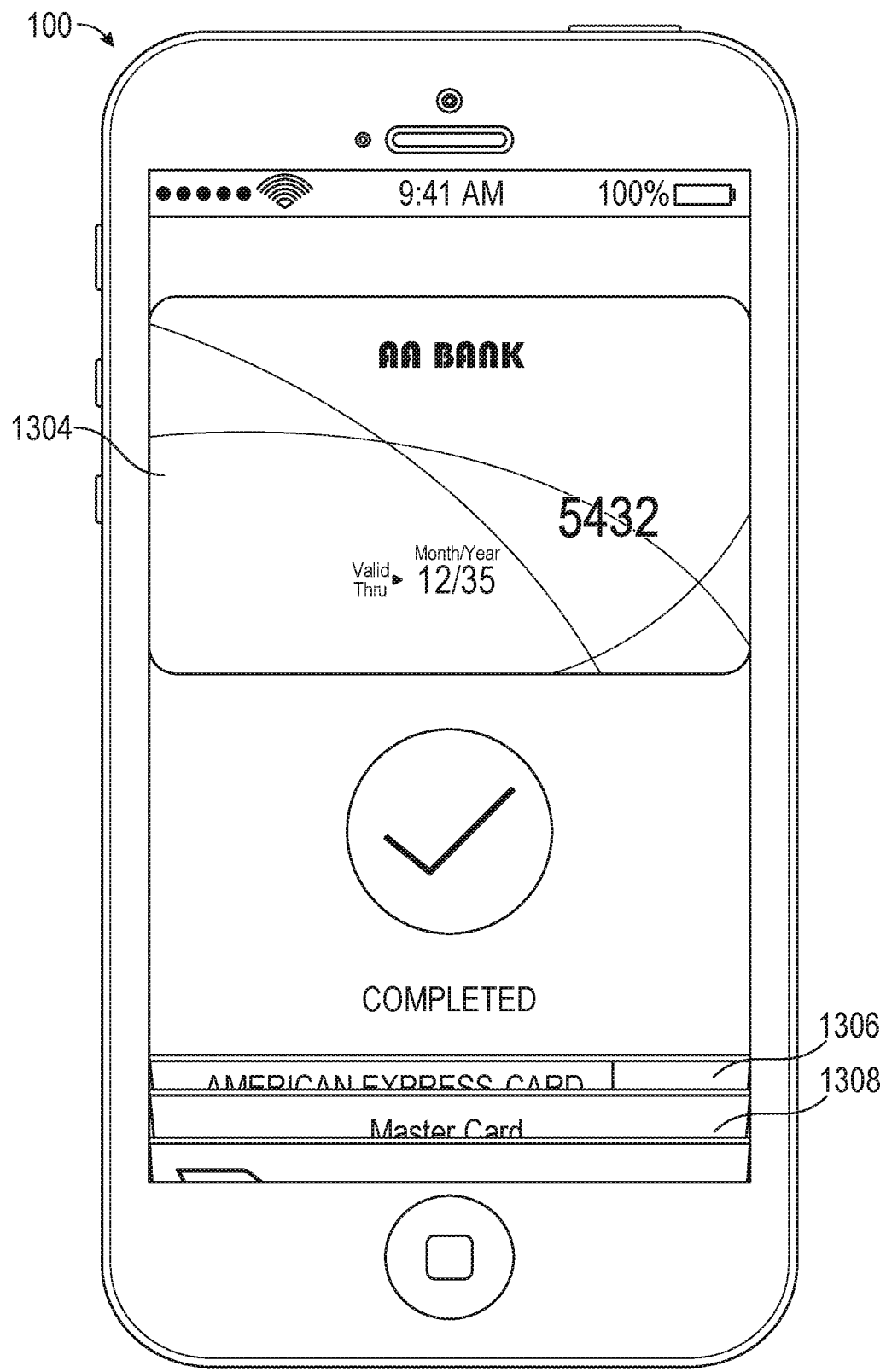

FIG. 13D illustrates an exemplary user interface displayed after payment has been provided. In this example, the first payment transaction criteria were met. Accordingly, the device provided payment in the payment transaction using the first payment account (e.g., 1304).

In accordance with some embodiments, different payment accounts have different primary account numbers. In accordance with some embodiments, the first payment account is associated with a first primary account number and the second payment account is associated with a second primary account number that is different than the first primary account number. Providing payment in the payment transaction comprises using a respective primary account number to authorize payment. For example, if the first payment account (e.g., 1304) is used, the device transmits the first primary account number to the contactless payment transaction terminal (1300) or to the online payment processor. For another example, if the second payment account (e.g., 1306) is used, the device transmits the second primary account number to the contactless payment transaction terminal (1300) or to the online payment processor.

In accordance with some embodiments, the payment account selection information comprises current location information of the electronic device. For example, the device provides the first payment account (e.g., 1304) when the user of the device is in their home country, and the device provides the second payment account (e.g., 1306) when the user of the device is traveling through a second country. In some examples, this allows the device to automatically select the appropriate payment account based on the location of the device, thereby reducing the need for the user to navigate a complex user interface to select from among various payment accounts.

In accordance with some embodiments, the payment account selection information comprises types of acceptable payment accounts. For example, the device provides a primary American Express account when American Express cards are accepted. If American Express cards are not accepted, then the device selects a primary Mastercard if Mastercard is accepted. If both American Express and Mastercard are not accepted, the device selects a primary Visa account if Visa cards are accepted.

In accordance with some embodiments, the payment account selection information comprises a time of day or day of week. For example, this allows the device to use a personal credit card account for work expenses during the daytime of the work week and use a personal credit card account for personal expenses in the evenings and on weekends.

In accordance with some embodiments, the payment account selection information comprises a currently scheduled electronic calendar event. For example, the device uses a corporate credit card account during scheduled work events such as work lunches and business trips and uses a personal credit card account at other times.

In accordance with some embodiments, the payment account selection information comprises identification of other devices within a defined proximity to the electronic device. For example, when the user is at a restaurant and the user's spouse's phone is detected within the defined proximity, the device uses a credit card or payment account associated with a joint account. When the user is at a restaurant with a co-worker, supervisor, or subordinate, the device uses a corporate credit card or payment account. When the user is at a restaurant without any known contacts nearby, the device uses a personal credit card or payment account.

In accordance with some embodiments, the payment account selection information comprises identification of a retailer (or type of retailer) requesting the payment transaction. For example, the device uses a first payment account (e.g., 1304) at a first retailer and a second payment account (e.g., 1306) at a different retailer. For another example, the device uses a credit card or payment account that is associated with automobile maintenance at a gas station or auto repair shop and use a credit card or payment account that is associated with grocery purchases at a grocery store.

In accordance with some embodiments, the payment account selection information comprises one or more items being purchased as part of the payment transaction. For example, the device identifies the items being purchased and uses a first payment account (e.g., 1304) for a purchase of gas at a gas station, and uses a second payment account (e.g., 1306) for purchase of food at a different purchase transaction at the same gas station.

In accordance with some embodiments, the payment account selection information comprises one or more promotions associated with one or more of the payment accounts. For example, a primary American Express account is selected when the device has received information indicating that a promotional discount will be applied to purchases made with an American Express card for certain types of purchases or for purchases made at certain retailers.

In accordance with some embodiments, the device provides a notification at the electronic device (e.g., audio, haptic, or both) based on a met payment transaction criteria. The notification indicates a respective payment account to be used for providing payment in the payment transaction. For example, the device provides a custom haptic or audio alert for each different payment account to alert the user as to which payment account has been selected. In some embodiments, the device provides a same haptic and/or audio alert whenever the device selects a payment account that is different from a default payment account. This notifies the user that a payment account other than the default payment account will be used for the payment transaction.

In accordance with some embodiments, the first payment account is a default payment account and the second payment account is different than the default payment account. For example, the first payment transaction criteria include one or more criteria that are met when there are no conditions that override the default payment account, and the second payment transaction criteria include one or more criteria that are met when a condition overrides the default payment account in favor of the second payment account.

In accordance with some embodiments, the device receives identification of the first payment account as a default payment account from an electronic wallet, wherein the electronic wallet comprises representations of the plurality of payment accounts (e.g., 1304, 1306, 1308). For example, the device includes an electronic wallet application, which includes information regarding the plurality of payment accounts and indicates which payment account of the plurality of payment accounts is a default payment account.

In accordance with some embodiments, the first payment account (e.g., 1304) is associated with a first credit card and the second payment account (e.g., 1306) is associated with a second credit card. For example, the first payment account (e.g., 1304) has been linked with a first credit card from AA Bank such that payments made using the first payment account appear on the same revolving credit bill as the first credit card from AA Bank.

FIG. 14 is a flow diagram illustrating method 1400 for selecting a payment account from among available payment accounts in accordance with some embodiments. Method 1400 is performed at a device (e.g., 100, 300). The device has a display (e.g., 112, 340), a processor (e.g., 120, 310), and memory (e.g., 102, 370) storing one or more programs for execution by the processor. Some operations in method 1400 may be combined, the order of some operations may be changed, and some operations may be omitted.

As described below, method 1400 provides an intuitive way to select a payment account from among available payment accounts when making a payment. The method reduces the cognitive burden on a user when making a payment, thereby creating a more efficient human-machine interface. For battery-operated computing devices, enabling make a payment faster and more efficiently conserves power and increases the time between battery charges.

At block 1402, a plurality of payment accounts are linked to the electronic device. The plurality of payment accounts include a first payment account (e.g., 1304) and a second payment account (e.g., 1306) that is different from the first payment account.

At block 1404, a payment transaction request of a payment transaction is received. The first payment account (e.g., 1305) and the second payment account (e.g., 1306) are both available to provide payment for the payment transaction.

At block 1406, in response to receiving the payment transaction request, payment account selection information is obtained at block 1408 (e.g., current location information, current time, currently schedule calendar event).

At block 1410, in accordance with a determination, based on the payment account selection information, that first payment transaction criteria are met, payment in the payment transaction is provided using the first payment account (e.g., the device transmits the primary account number of a first credit card to a contactless payment transaction terminal or to an online payment processor).

At block 1412, in accordance with a determination, based on the payment account selection information, that second payment transaction criteria are met, payment in the payment transaction is provided using the second payment account (e.g., the device transmits the primary account number of a second credit card to a contactless payment transaction terminal or to an online payment processor).

Note that details of the processes described above with respect to method 1400 (e.g., FIGS. 14 and 13A-13D) are also applicable in an analogous manner to the methods described below and above. For example, methods 600, 800, 1000, 1200, 1600, 1800, 2000, and 2200 may include one or more of the characteristics of the various methods described above with reference to method 1400. For brevity, these details are not repeated below.

Figure 15:
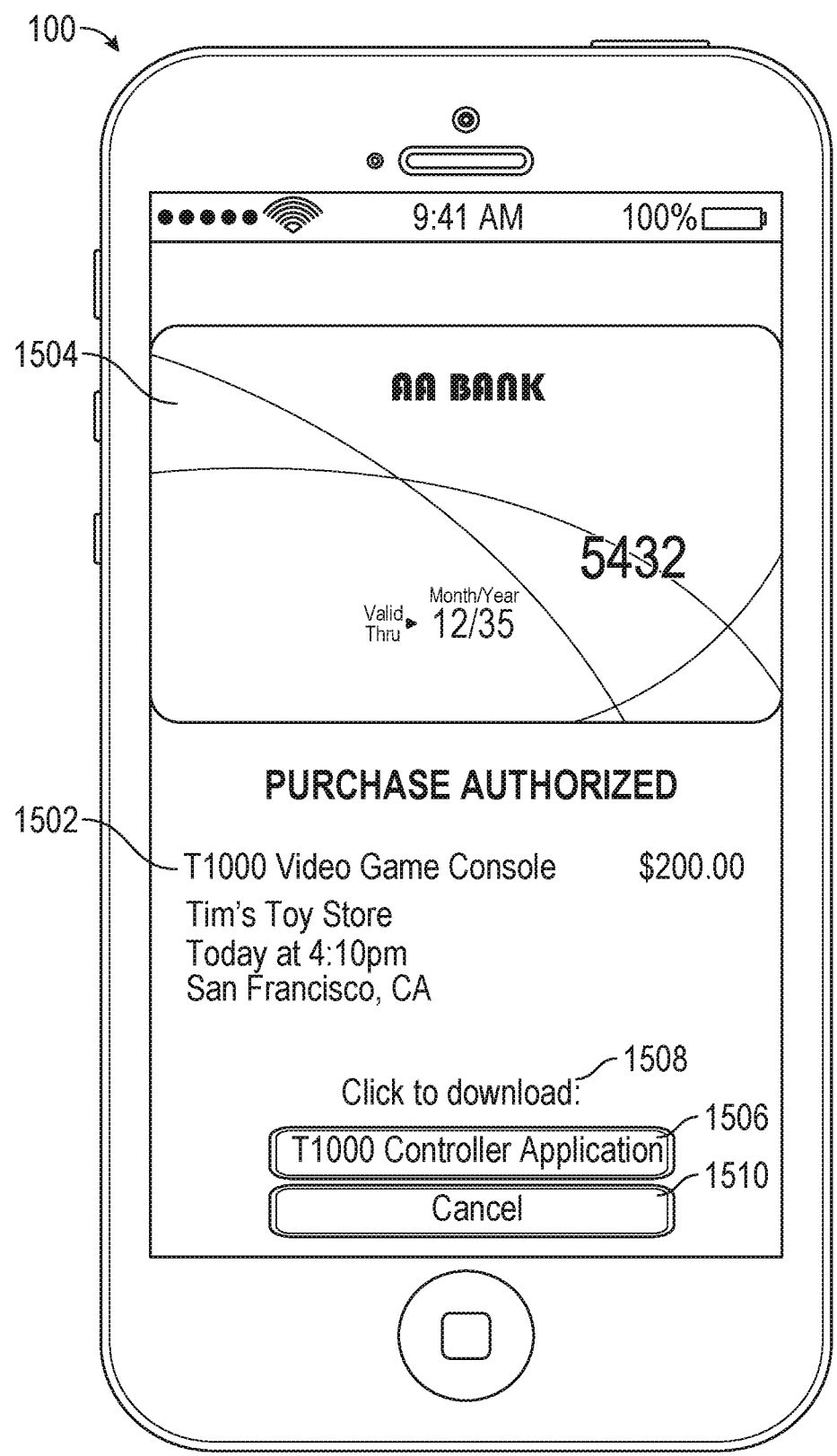
FIG. 15 illustrates an exemplary user interface for displaying an indication of a digital item associated with a purchased item in accordance with some embodiments.

FIG. 15 illustrates an exemplary user interface for displaying an indication of a digital item associated with a purchased item using an electronic device (e.g., 100, 300) in accordance with some embodiments. The techniques and user interfaces in these figures are used to illustrate the processes described below, including the process in FIG. 16.

FIG. 15 illustrates an exemplary user interface indicating that a payment transaction has been authorized for a purchased item (e.g., T1000 Video Game Console 1502). The device (e.g., 100) authorizes a payment transaction for the purchased item (e.g., a good or a real-world service) using a payment account (e.g., 1504) linked to the electronic device. The purchased item is selected from the set comprising: a physical good and a real-world service. For example, the user purchases a product (e.g., T1000 Video Game Console) at a retail store (e.g., Tim's Toy Store) using near field communications. After authorizing the payment transaction, the device determines that the purchased item is associated with a digital item (e.g., a digital good or service; a controller software application for the T1000 Video Game Console), wherein the digital item is different from the purchased item, and the device displays an indication of the digital item (e.g., affordance 1506) that is associated with the purchased item. For example, the processes described in relation to FIGS. 14 and 13A-13D can be used to determine the payment account used to purchase of the product.

In accordance with some embodiments, the digital item (the controller software application) was not a part of the payment transaction (e.g., it was not purchased or licensed as part of the payment transaction).

In accordance with some embodiments, the payment transaction is authorized based on communication (e.g., via NFC technology) with a payment terminal in a physical retail location, such as a brick and mortar store, a concert venue, or other physical business.

In accordance with some embodiments, displaying the indication of the digital item includes displaying a prompt to download the digital item (e.g., prompt 1508). For example, the device prompts the user to download an application for controlling a media playback device that was purchased by the user. For another example, the device prompts the user to install a concert venue application or to download to a document reader a map of a concert venue when a concert ticket is purchased.

In accordance with some embodiments, while displaying the prompt (e.g., 1508) to download the digital item, the device detects selection of a confirmation affordance (e.g., affordance 1506). In response to detecting selection of the confirmation affordance (e.g., 1506), the device downloads the digital item to the device. Optionally, the device also installs the digital item on the device. For example, the device prompts the user to download an application for controlling a media playback device that was purchased by the user. For another example, the device prompts the user to install a concert venue application or to download to a document reader a map of a concert venue if a concert ticket was purchased.

In accordance with some embodiments, while displaying the prompt, the device detects selection of a cancellation affordance (e.g., 1510). In response to detecting selection of the cancellation affordance (e.g., 1510), the device forgoes downloading of the digital item to the device. For example, the user indicates a preference to not download the digital item.

In accordance with some embodiments, displaying the indication of the digital item comprises downloading the digital item to the device. For example, the device downloads an application for controlling a media playback device that was purchased by the user using the electronic device, or the device downloads to a document reader a map of a concert venue if a concert ticket was purchased using the electronic device.

In accordance with some embodiments, the digital item is an advertisement or coupon that is displayed on the display of the electronic device.

In accordance with some embodiments, the indication of the digital item is displayed in response to the authorization of the payment transaction that was completed by the device (e.g., not in response to receiving a confirmatory communication from a retailer). For example, the digital item is not a confirmation email or text message from the retailer. In response to authorizing the payment transaction, the device generates a notification at the device based on the payment transaction. For example, the notification is generated even where the retailer does not have the capability to send a communication to the device, such as the retailer not having an email address or phone number that is associated with the device.

In accordance with some embodiments, the determination of the digital item that is associated with the purchased item is based on information from a manufacturer of the purchased item, and the manufacturer of the purchased item is different from a seller of the purchased item.

In accordance with some embodiments, the purchased item is a physical good and the digital item is an application. For example, the application is configured to communicate with the physical good, such as to electronically control the physical good.

In accordance with some embodiments, the purchased item is an admission ticket to an event at a venue and the digital item includes additional information about the venue (e.g., a map, schedule, etc.).

FIG. 16 is a flow diagram illustrating a method 1600 for displaying an indication of a digital item associated with a purchased item in accordance with some embodiments. Method 1600 is performed at a device (e.g., 100, 300). The device has a display (e.g., 112, 340), a processor (e.g., 120, 310), and memory (e.g., 102, 370) storing one or more programs for execution by the processor. Some operations in method 1600 may be combined, the order of some operations may be changed, and some operations may be omitted.

As described below, method 1600 provides an intuitive way to display an indication of a digital item associated with a purchased item. The method reduces the cognitive burden on a user when making a purchase of an item that has an associated digital item, thereby creating a more efficient human-machine interface. For battery-operated computing devices, enabling a user to view an indication of a digital item associated with a purchased item faster and more efficiently conserves power and increases the time between battery charges.

At block 1602, a payment transaction is authorized for a purchased item (e.g., a good or a real-world service) using a payment account linked to the electronic device. The purchased item is selected from the set comprising: a physical good and a real-world service (e.g., the user purchases a product at a retail store using near field communications).

After authorizing the payment transaction, at block 1604, it is determined that the purchased item is associated with a digital item (e.g., a digital good or service). The digital item is different from the purchased item.

After authorizing the payment transaction, at block 1606, an indication of the digital item (e.g., 1506) that is associated with the purchased item is displayed.

Note that details of the processes described above with respect to method 1600 (e.g., FIGS. 15 and 16) are also applicable in an analogous manner to the methods described below and above. For example, methods 600, 800, 1000, 1200, 1400, 1800, 2000, and 2200 may include one or more of the characteristics of the various methods described above with reference to method 1600. For brevity, these details are not repeated below.

Figure 17A:
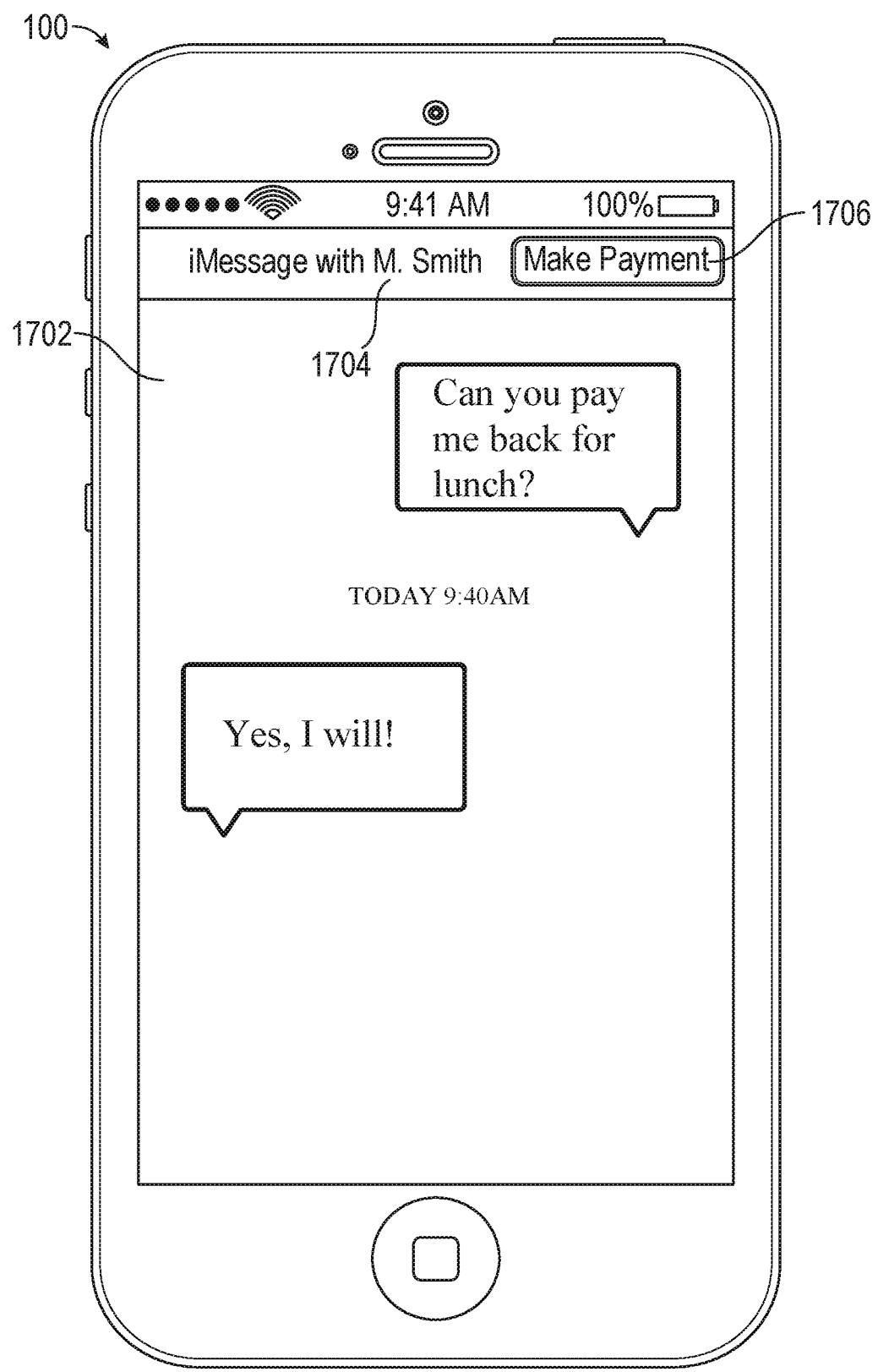
FIGS. 17A-17B illustrate exemplary user interfaces for initiating a payment transaction with participants of an ongoing communication in accordance with some embodiments.
Figure 17B:
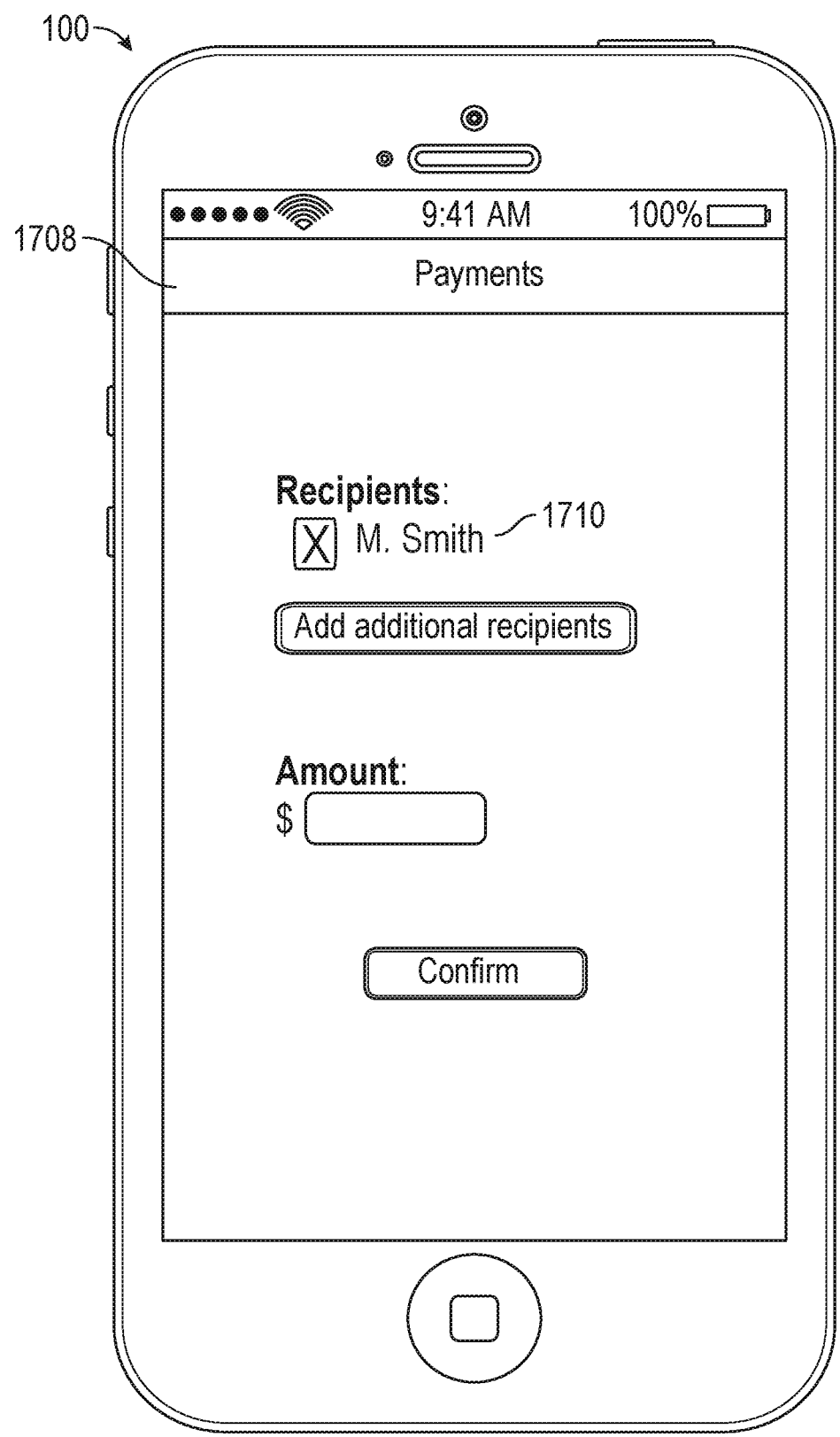

FIGS. 17A-17B illustrate exemplary user interfaces for initiating a payment transaction with participants of an ongoing communication using an electronic device (e.g., 100, 300) in accordance with some embodiments. The user interfaces in these figures are used to illustrate the processes described below, including the process in FIG. 18.

In FIG. 17A, the device displays a user interface for a communication application that includes a user interface indicative of ongoing communication (e.g., a phone call, a text or multimedia messaging conversation 1702, an email thread) between a user of the device and one or more other participants (e.g., 1704). For example, the one or more other participants may be participants of a conversation in a messaging application, participants of an email in a mail application, or participants of an event in a calendar application. The user interface for the communication application includes a payment affordance (e.g., 1706). For example, the payment affordance may indicate "Make Payment".

While displaying the user interface indicative of the ongoing communication, the device detects activation of the payment affordance (e.g., 1706). In response to detecting activation of the payment affordance (e.g., 1706), the device initiates a payment transaction between the user and the one or more other participants in the ongoing communication. In the example of FIG. 17A, the only other participant in the ongoing message communication is M. Smith. For example, the processes described in relation to FIGS. 14 and 13A-13D can be used to determine the payment account used to initiate the payment transaction between the user and the one or more other participants.

In accordance with some embodiments, initiating the payment transaction comprises transferring recipient information from the communication application to a second application, wherein the recipient information identifies the one or more other participants in the ongoing communication.

As illustrated in FIG. 17B, in accordance with some embodiments, the device displays a user interface for the second application (e.g., a payment processing application), wherein the user interface for the second application (e.g., 1708) indicates the one or more other participants (e.g., 1710) in the ongoing communication. The device proceeds with the payment transaction using the second application (e.g., the payment processing application) and a payment account linked to the electronic device.

In accordance with some embodiments, the communication application and the second application are different applications. In accordance with some embodiments, the user interface for the communication application includes displayed representations of the one or more other participants in the ongoing communication (e.g., 1704).

In accordance with some embodiments, the payment transaction is initiated along with another communication (e.g., a text message, email, or phone call).

In accordance with some embodiments, initiating the payment transaction comprises: determining the quantity of the one or more other participants; and in accordance with a determination that the quantity of the one or more participants is one, enabling the user to initiate the payment transaction without explicitly identifying the recipient of the payment. For example, the device receives user input indicating an amount of the payment transaction and forgoes receiving user input indicating recipients of the payment transaction. For example, the device receives an input indicting the amount, but does not ask for recipients because there is only one recipient—the one other participant.

In accordance with some embodiments, initiating the payment transaction comprises: determining the quantity of the one or more other participants, and in accordance with a determination that the quantity of the one or more participants is greater than one, requesting user input indicating an amount of the payment transaction and user input indicating the one or more other participants are recipients of the payment transaction. For example, if there are multiple participants, the user selects one or more of the participants for payment before initiating the payment transaction.

In accordance with some embodiments, the communication application is a messaging application and the one or more other participants are participants of a displayed conversation. In accordance with some embodiments, the communication application is an electronic mail application and the one or more other participants are participants of a displayed electronic mail. In accordance with some embodiments, the communication application is a phone application and the one or more other participants are participants of an active phone conversation. In accordance with some embodiments, the communication application is a calendar application and the one or more other participants are invitees of a displayed calendar event. In accordance with some embodiments, the communication application is a calendar application and the one or more other participants are invitees of a displayed calendar event that have accepted the displayed calendar event.

In accordance with some embodiments, initiating the payment transaction includes requesting user input indicating an amount of the payment transaction.

In accordance with some embodiments, the one or more other participants are within a defined proximity to the electronic device. For example, the device provides a quick and easy way to send payments to members of a calendar invite who are currently at the restaurant with the user (e.g., within a defined proximity), so "pay user" affordances are displayed only for members of the calendar invite who are in close proximity to the user and not for members of the calendar invite who are not in close proximity to the user.

FIG. 18 is a flow diagram illustrating method 1800 for method for initiating a payment transaction with participants of an ongoing communication in accordance with some embodiments. Method 1800 is performed at a device (e.g., 100, 300). The device has a display (e.g., 112, 340), a processor (e.g., 120, 310), and memory (e.g., 102, 370) storing one or more programs for execution by the processor. Some operations in method 1800 may be combined, the order of some operations may be changed, and some operations may be omitted.

As described below, method 1800 provides an intuitive way for initiating a payment transaction with participants of an ongoing communication in accordance with some embodiments. The method reduces the cognitive burden on a user when initiating payments, thereby creating a more efficient human-machine interface. For battery-operated computing devices, enabling a user to initiate payments faster and more efficiently conserves power and increases the time between battery charges.

At block 1802, a user interface for a communication application that includes a user interface (e.g., 1702) indicative of ongoing communication (e.g., a phone call, a text or multimedia messaging conversation, an email thread) between a user of the device and one or more other participants (e.g., 1704 "M. Smith") is displayed. The user interface for the communication application includes a payment affordance (e.g., 1706).

At block 1804, while displaying the user interface (e.g., 1702) indicative of the ongoing communication, activation of the payment affordance (e.g., 1706) is detected.

At block 1806, in response to detecting activation of the payment affordance (e.g., 1706), a payment transaction is initiated between the user and the one or more other participants (e.g., 1704) in the ongoing communication.

In accordance with some embodiments, the processes described in relation to FIGS. 14 and 13A-13D can be used to determine the payment account used to initiate the payment transaction between the user and the one or more other participants.

Note that details of the processes described above with respect to method 1800 (e.g., FIGS. 18 and 17A-17B) are also applicable in an analogous manner to the methods described below and above. For example, methods 600, 800, 1000, 1200, 1400, 1600, 2000, and 2200 may include one or more of the characteristics of the various methods described above with reference to method 1800. For brevity, these details are not repeated below.

Figure 19:
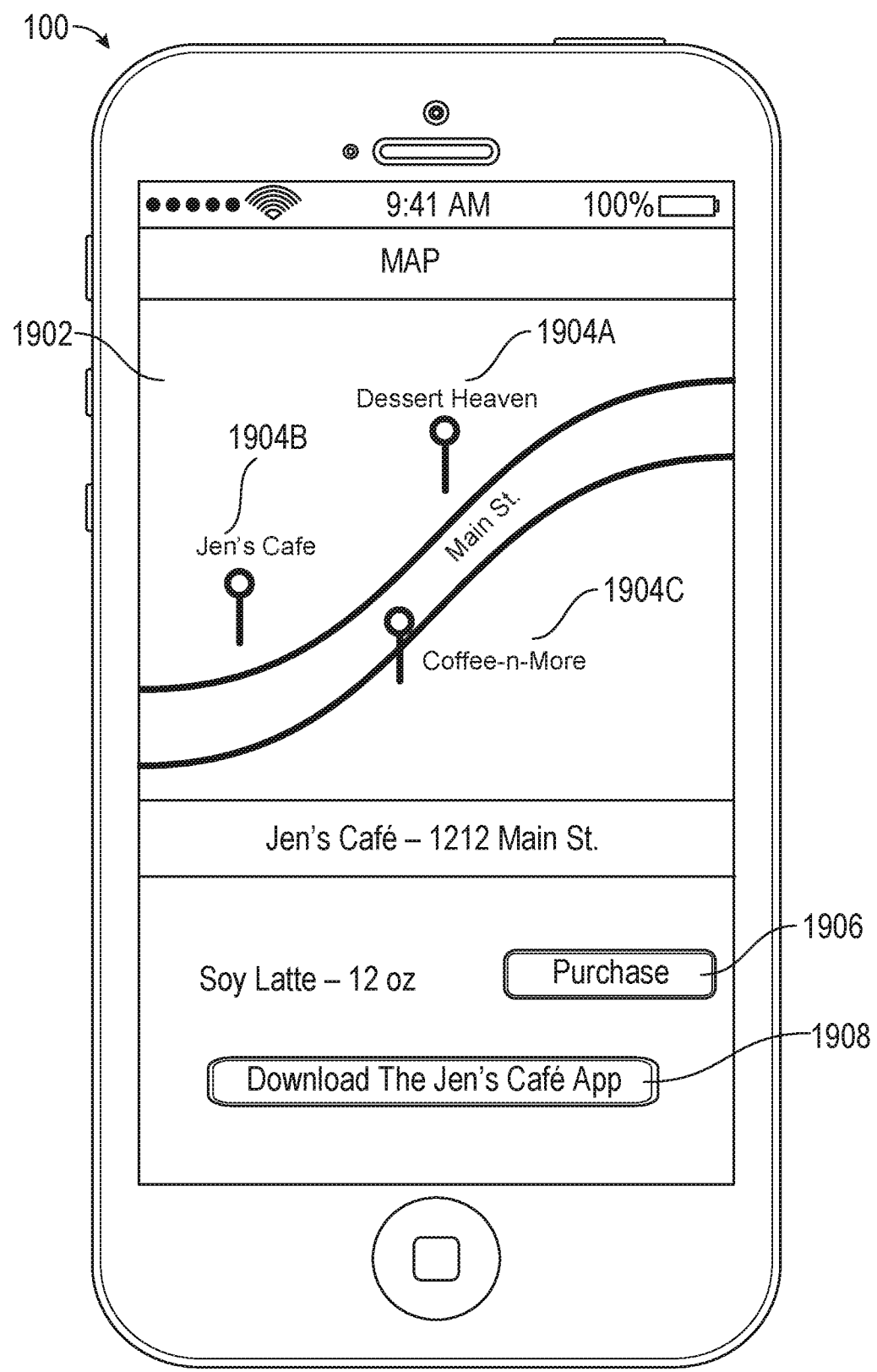
FIG. 19 illustrates an exemplary user interface for invoking an application of a retailer based on the availability of the application in accordance with some embodiments.

FIG. 19 illustrates an exemplary user interface for making a payment transaction using an electronic device (e.g., 100, 300) in accordance with some embodiments. The user interfaces are used to illustrate the processes described below, including the process in FIG. 20.

The device displays a user interface (e.g., 1902) for a first application (e.g., map application or web browser application that displays information about goods or services). The user interface (e.g., 1902) for the first application includes information identifying a plurality of retailers (e.g., 1904A-1904C for selecting items to purchase). The device receives a request to initiate a payment transaction with a first retailer of the plurality of retailers (e.g., user taps on the purchase selection affordance 1906). In response to receiving the request to initiate a payment transaction with the first retailer: in accordance with a determination that an application of the first retailer (e.g., an application designated by the first retailer for handling payment transactions from mobile devices, such as an application that is branded with the brand of the first retailer) is available on the device, the device invokes the application of the first retailer, wherein the application of the first retailer enables the user to initiate a payment transaction with the first retailer (e.g., the first retailer's application is displayed and provides options for making the purchase), and in accordance with a determination that an application of the first retailer is not available on the device, the device provides the user with an option for proceeding with the payment transaction without invoking the application of the first retailer (e.g., a separate application not provided by the retailer is invoked and provides options for making the purchase).

In some embodiments, in accordance with a determination that the application of the first retailer is not available on the device and is available for download, the device displays a download affordance (e.g., 1908) associated with the application of the retailer. For example, the download affordance, when activated, initiates a download (and/or installation) of the application of the first retailer to the electronic device.

In accordance with some embodiments, the application of the first retailer is not available when it is not installed on the device. For example, the application of the first retailer is determined to be not available even if the application of the first retailer is available for download.

In some embodiments, in accordance with a determination that the application of the first retailer is not available on the device, the device determines whether the application of the first retailer is available for download. In accordance with a determination that the application of the first retailer is available for download, the device displays a download affordance (e.g., 1908) associated with the application of the retailer. The download affordance, when activated, initiates a download (and/or installation) of the application of the first retailer to the electronic device. In accordance with a determination that an application of the first retailer is not available for download, the device provides the user with the option for proceeding with the payment transaction without invoking an application of the retailer (e.g., a separate application not provided by the retailer is invoked and provides options for making the purchase).

In accordance with some embodiments, providing the user with the option for proceeding with the payment transaction without invoking an application of the first retailer comprises: determining a type of the first retailer, selecting a first template from among a plurality of templates based on the type of the first retailer, and displaying one or more items (e.g., goods or services) of the first retailer using the selected first template.

In accordance with some embodiments, the device provides the user with the option for proceeding with a second payment transaction with a second retailer of the plurality of retailers without invoking an application of the second retailer by: determining a type of the second retailer, selecting a second template from among the plurality of templates based on the type of the second retailer, displaying one or more items (e.g., goods or services) of the second retailer using the selected second template, and wherein the first template and the second template are the same when the type of the first retailer and the type of the second retailer are the same.

In accordance with some embodiments, the first template and the second template are different when the type of the first retailer and the type of the second retailer are different.

In accordance with some embodiments, providing the user with the option for proceeding with the payment transaction without invoking an application of the retailer comprises invoking a second application. The application of the first retailer, the first application, and the second application are different applications.

In accordance with some embodiments, the first retailer populates the selected first template with the one or more items. For example, the first retailer populates the template such as by specifying the items that the retailer sells and their cost.

In accordance with some embodiments, publicly available information is used to populate the selected first template with the one or more items. For example, a menu is retrieved from public website and used to populate the selected first template.

In accordance with some embodiments, the device receives a request to authorize the payment transaction. In response to receiving the request to authorize the payment transaction, the device authorizes the payment transaction.

In accordance with some embodiments, the first application is a maps application or a browser application.

In accordance with some embodiments, the second application includes a payment affordance for proceeding with the payment transaction using a payment account linked to the electronic device.

Examples of types of retailers include: event retailers, such as movie theaters and concert venues; eating establishments, such as restaurants, bars, and coffee shops; transportation companies, such as taxis, buses, trains, and airlines; lodging establishments, such as motels and hotels; and clothing stores, such as dress stores and shoe stores.

An example template for the lodging establishment may include, for example, the number of rooms, the booking dates, the size of bed (e.g., queen or king), the number of beds (e.g., 1 or 2), the check-in time, and the link. An example template for transportation companies may include, for example, the expected departure and arrival time, the number of passengers, the class of seat (e.g., coach, business, and first class). An example template for an event retailer may include, for example, the date of the function, the type of seat (e.g., upper deck, lower deck, and general admission), the number of tickets, the ticket pickup type (e.g., will call, print-at-home, email, and postal mail). An example template for an eating establishment may include, for example, the types of food, the types of drinks, the size of drinks, and available reservation dates and times.

FIG. 20 is a flow diagram illustrating a method for invoking an application of a retailer based on the availability of the application in accordance with some embodiments. Method 2000 is performed at a device (e.g., 100, 300) with a display. Some operations in method 2000 may be combined, the order of some operations may be changed, and some operations may be omitted.

As described below, method 2000 provides an intuitive way for invoking an application of a retailer. The method reduces the cognitive burden on a user when making a payment transaction, thereby creating a more efficient human-machine interface. For battery-operated computing devices, enabling a user to make a payment transaction faster and more efficiently conserves power and increases the time between battery charges.

At block 2002, a user interface (e.g., 1902) for a first application is displayed (e.g., map application or web browser application that displays information about goods or services). The user interface (e.g., 1902) for the first application includes information identifying a plurality of retailers (e.g., 1904A-1904C).

At block 2004, a request to initiate a payment transaction with a first retailer (e.g., 1904B) of the plurality of retailers (e.g., 1904A-1904C) is received (e.g., user taps on the purchase selection affordance).

At block 2006, in response to receiving the request to initiate a payment transaction with the first retailer: at block 2008, in accordance with a determination that an application of the first retailer (e.g., an application designated by the first retailer for handling payment transactions from mobile devices, such as an application that is branded with the brand of the first retailer) is available on the device, the application of the first retailer is invoked. The application of the first retailer enables the user to initiate a payment transaction with the first retailer (e.g., the first retailer's application is displayed and provides options for making the purchase). At block 2010, in accordance with a determination that an application of the first retailer is not available on the device, the user is provided with an option for proceeding with the payment transaction without invoking the application of the first retailer (e.g., a separate application not provided by the retailer is invoked and provides options for making the purchase).

In accordance with some embodiments, the processes described in relation to FIGS. 14 and 13A-13D can be used to determine the payment account used to initiate the payment transaction with the first retailer.

Note that details of the processes described above with respect to method 2000 (e.g., FIGS. 19 and 20) are also applicable in an analogous manner to the methods described below and above. For example, methods 600, 800, 1000, 1200, 1400, 1600, 1800, and 2200 may include one or more of the characteristics of the various methods described above with reference to method 2000. For brevity, these details are not repeated below.

Figure 21:
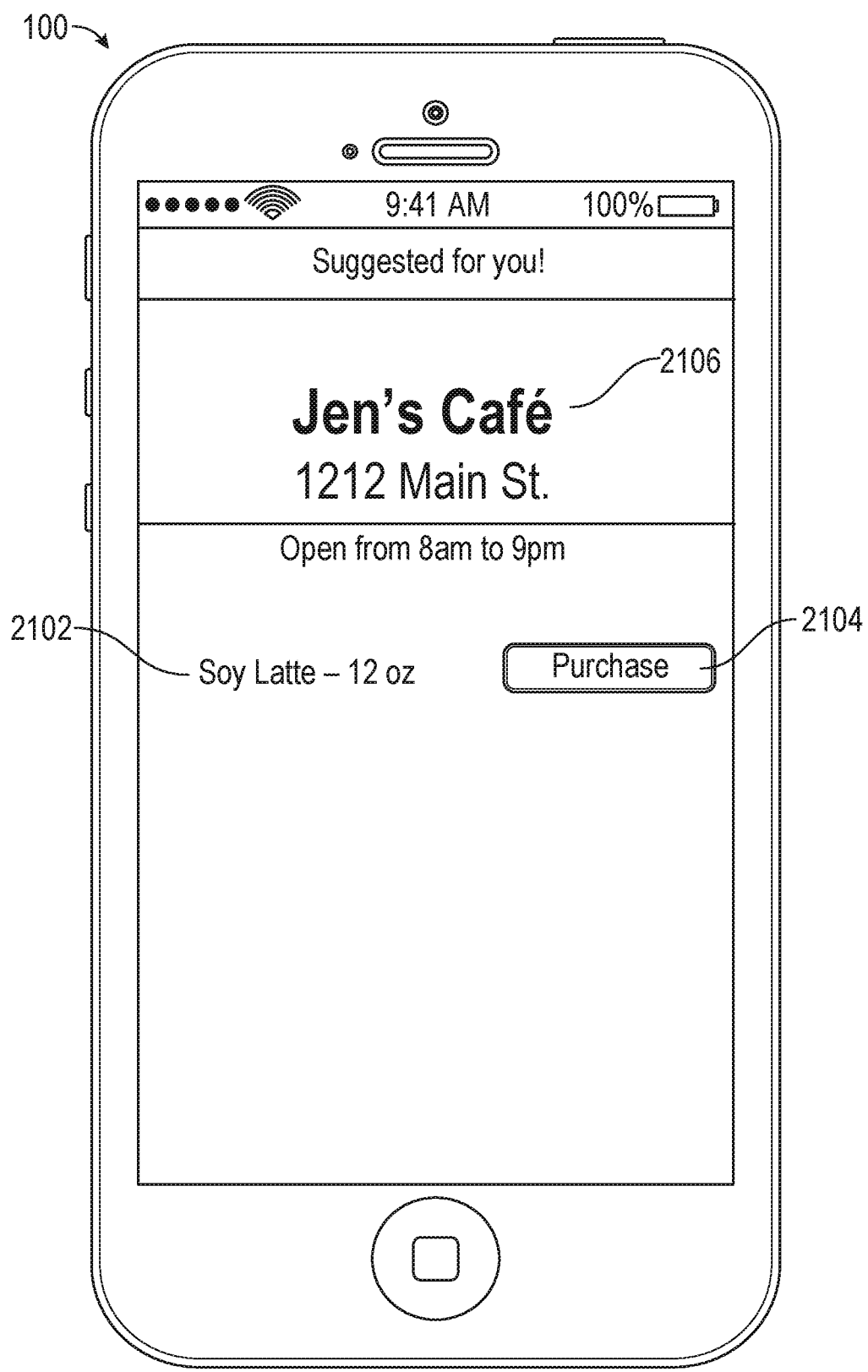
FIG. 21 illustrates an exemplary user interface for providing a purchase recommendation in accordance with some embodiments.

FIG. 21 illustrates an exemplary user interface for providing a purchase recommendation using an electronic device (e.g., 100, 300) in accordance with some embodiments. The user interface is used to illustrate the processes described below, including the process in FIG. 22.

The device obtains a history of payment transactions associated with one or more payment accounts linked to the device (e.g., purchases made using the payment accounts, such as by using the electronic device to make the purchases). The device determines a current location of the device (e.g., using GPS). The device determines, based on at least a portion of the history of payment transactions and the current location of the device, a suggested product (or service) for purchase from a retailer (e.g., a retailer that is proximate to the current location of the device). The device displays an indication (e.g., 2102) of the suggested product for purchase. The device displays an affordance (e.g., 2104) associated with a payment transaction of the suggested product (e.g., a "purchase" affordance for purchasing the suggested product).

While displaying the affordance (e.g., 2104) associated with the payment transaction, the device detects activation of the affordance (e.g., 2104) associated with the payment transaction. In response to detecting activation of the affordance associated with the payment transaction, the device initiates a process for authorizing the payment transaction of the suggested product (e.g., displaying a purchase user interface indicating the suggested product and a price of the suggested product, or authorizing purchase of the suggested product).

In accordance with some embodiments, the device detects a fingerprint on a fingerprint sensor of the electronic device. In response to detecting the fingerprint on the fingerprint sensor, the device determines whether the fingerprint is consistent with an enrolled fingerprint that is enabled to authorize payment transactions. In accordance with a determination that a respective fingerprint is consistent with the enrolled fingerprint, the device authorizes the payment transaction. In accordance with a determination that the respective fingerprint is not consistent with the enrolled fingerprint, the device forgoes authorization of the payment transaction (e.g., the device does not authorize the payment transaction, meaning authorization is still required to proceed with the payment transaction).

In accordance with some embodiments, the displayed indication of the suggested product for purchase is displayed without explicit user input requesting a suggestion (e.g., the indication of the suggested product happens automatically).

In accordance with some embodiments, the displayed indication of the suggested product for purchase is displayed in response to an explicit user input requesting a suggestion (e.g., asking a personal assistant for suggestions).

In accordance with some embodiments, the displayed indication of the suggested product for purchase is displayed in response to an implicit user input (e.g., the user turning toward a store window and looking into the store window and then pulling out the device, looking at the display of the device or unlocking the device, and opening a maps application or a digital personal assistant application on the device).

In accordance with some embodiments, the suggested product (or service) for purchase from the retailer is determined based on a current time of day (or day of week).

In accordance with some embodiments, the suggested product (or service) for purchase from the retailer is determined based on the orientation of the device (e.g., the suggestion is based on which business the user is facing, as determined by a direction that a back of the device is facing).

In accordance with some embodiments, while displaying the indication of the suggested product for purchase, the device displays the name and business hours (e.g., 2106) of the retailer.

In accordance with some embodiments, while displaying the indication of the suggested product for purchase, the device displays one or more reviews for the suggested product.

In accordance with some embodiments, while displaying the indication of the suggested product for purchase, the device displays an affordance for purchasing a second suggested product, the second suggested product determined based on the suggested product and one or more reviews of the second suggested product.

In accordance with some embodiments, while displaying the indication of the suggested product for purchase, the device displays an affordance for purchasing a third suggested product, the third suggested product determined based on the current location.

In accordance with some embodiments, the device authorizes the payment transaction of the suggested product using a secure element integrated into the electronic device.

In accordance with some embodiments, the suggested product is a coffee. The device receives confirmation of completion of the payment transaction of the coffee. The device transmits purchase details of the coffee to the retailer (e.g., sending coffee size and flavor preferences to the retailer before or after finalizing the payment). The device displays an indication of the availability for pickup of the coffee at the retailer (e.g., when the retailer has indicated that the coffee is available for pickup and/or when the retailer indicates a predicted time at which the coffee will be available for pickup).

FIG. 22 is a flow diagram illustrating a method for providing a purchase recommendation using an electronic device in accordance with some embodiments. Method 2200 is performed at a device (e.g., 100, 300) with a display. Some operations in method 2200 may be combined, the order of some operations may be changed, and some operations may be omitted.

As described below, method 2200 provides an intuitive way for providing a purchase recommendation. The method reduces the cognitive burden on a user for receiving a recommendation and making a purchase, thereby creating a more efficient human-machine interface. For battery-operated computing devices, enabling a user to access a purchase recommendation faster and more efficiently conserves power and increases the time between battery charges.

At block 2202, a history of payment transactions associated with one or more payment accounts linked to the device is obtained (e.g., purchases made using the payment accounts, such as by using the electronic device to make the purchases).

At block 2204, a current location of the device is determined (e.g., using GPS).

At block 2206, based on at least a portion of the history of payment transactions and the current location of the device, a suggested product (or service) for purchase from a retailer is determined (e.g., a retailer that is proximate to the current location of the device).

At block 2208, an indication of the suggested product (e.g., 2102) for purchase is displayed.

At block 2210, an affordance (e.g., 2104) associated with a payment transaction of the suggested product is displayed (e.g., a "purchase" button for purchasing the suggested product).

At block 2212, while displaying the affordance (e.g., 2104) associated with the payment transaction, activation of the affordance (e.g., 2104) associated with the payment transaction is detected.

At block 2214, in response to detecting activation of the affordance (e.g., 2104) associated with the payment transaction, a process for authorizing the payment transaction of the suggested product is initiated (e.g., displaying a purchase user interface indicating the suggested product and a price of the suggested product, or authorizing purchase of the suggested product).

In accordance with some embodiments, the processes described in relation to FIGS. 14 and 13A-13D can be used to determine the payment account used in the process for authorizing the payment transaction.

Note that details of the processes described above with respect to method 2200 (e.g., FIGS. 21 and 22) are also applicable in an analogous manner to the methods described above. For example, methods 600, 800, 1000, 1200, 1400, 1600, 1800, and 2000 may include one or more of the characteristics of the various methods described above with reference to method 2200. For brevity, these details are not repeated below.

Figure 23:
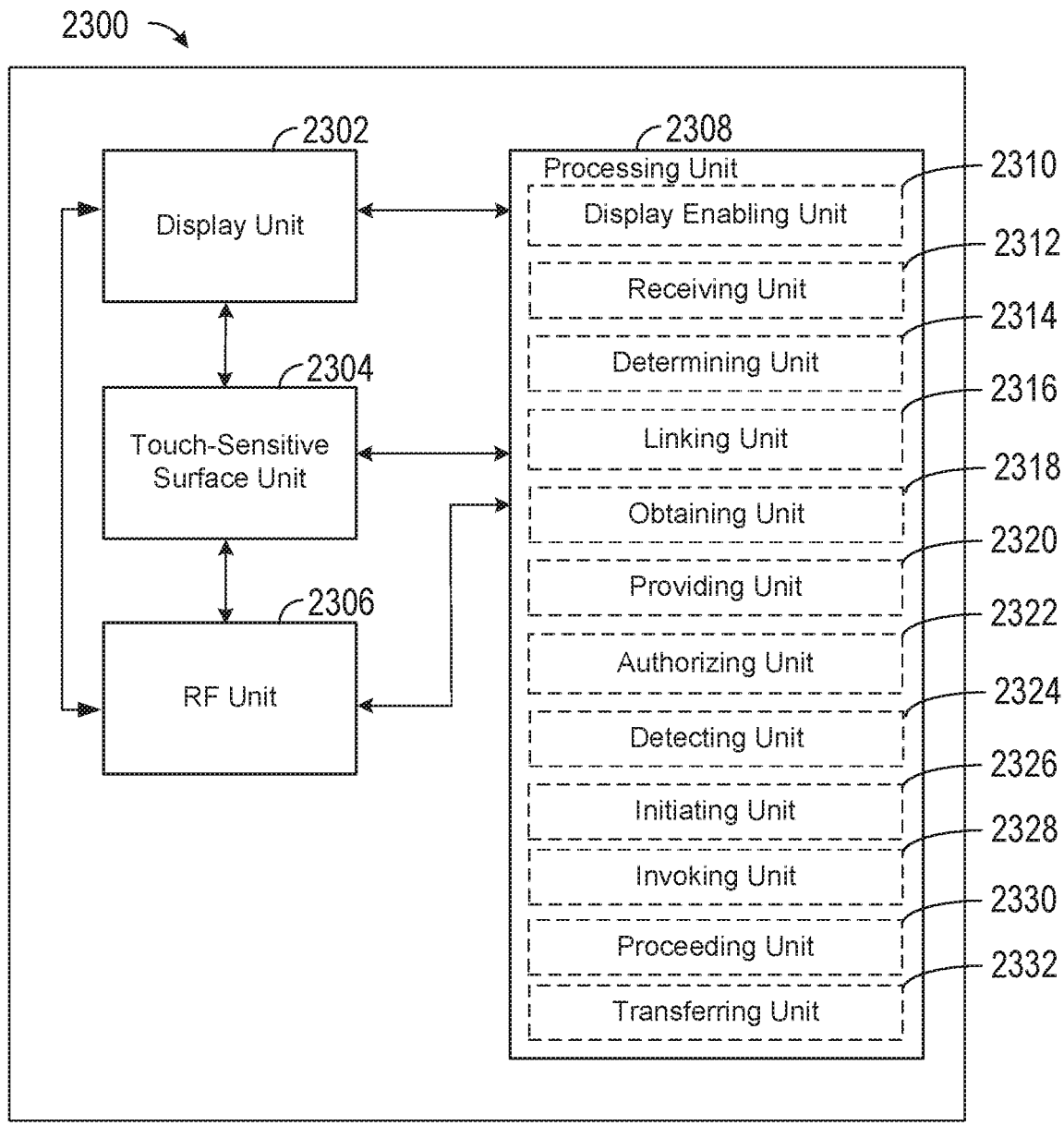
FIG. 23 illustrates a functional block diagram in accordance with some embodiments.

FIG. 23 shows exemplary functional blocks of an electronic device 2300 that, in some embodiments, perform the features described above. As shown in FIG. 23, an electronic device 2300 includes a display unit 2302 configured to display graphical objects; a touch-sensitive surface unit 2304 configured to receive user gestures (e.g., touches); one or more RF units 2306 configured to detect and communicate with external electronic devices; and a processing unit 2308 coupled to display unit 2302, touch-sensitive surface unit 2304, and RF units 2306. In some embodiments, the processing unit 2308 includes a display enabling unit 2310, a receiving unit 2312, a determining unit 2314, a linking unit 2316, an obtaining unit 2318, a providing unit 2320, an authorizing unit 2322, a detecting unit 2324, an initiating unit 2326, an invoking unit 2328, a proceeding unit 2330, and a transferring unit 2332. The units of FIG. 23 may be used to implement the various techniques and methods described above with respect to FIGS. 5-22.

For example, the display enabling unit 2310 can be used for: displaying an indication of the digital item that is associated with the purchased item; displaying a user interface for a communication application that includes a user interface indicative of ongoing communication between a user of the device and one or more other participants; displaying a user interface for a first application; and displaying an indication of the suggested product for purchase; displaying an affordance associated with a payment transaction of the suggested product; displaying, on the display, an electronic wallet comprising a respective representation of a payment account, wherein the respective representation of the payment account includes first transaction information for a first payment transaction associated with the payment account; displaying second transaction information for the second payment transaction, the second transaction information based on information locally available to the electronic device; displaying, on the display, a user interface for a first application, wherein the user interface for the first application includes a payment affordance associated with a payment transaction; and displaying, on the display, a user interface for the second application, wherein the user interface for the second application includes the first transaction information received from the first application and includes second transaction information provided by the second application, wherein the second transaction information is not available to the first application.

For example, the receiving unit 2312 can be used for: receiving a payment transaction request of a payment transaction, wherein the first payment account and the second payment account are both available to provide payment for the payment transaction; and receiving a request to initiate a payment transaction with a first retailer of the plurality of retailers; receiving a request to link a payment account associated with a credit card to a respective device, wherein the request includes information about the credit card.

For example, the determining unit 2314 can be used for: determining that the purchased item is associated with a digital item, wherein the digital item is different from the purchased item; determining a current location of the device; determining, based on at least a portion of the history of payment transactions and the current location of the device, a suggested product for purchase from a retailer; determining whether further verification is needed to link the payment account to the respective device; and determining whether authorization to proceed with a payment transaction is provided.

For example, the linking unit 2316 can be used for: linking a plurality of payment accounts to the electronic device, wherein the plurality of payment accounts include a first payment account and a second payment account that is different from the first payment account; and linking the payment account to the respective device and providing an indication that the payment account has been linked to the respective device.

For example, the obtaining unit 2318 can be used for: obtaining payment account selection information; and obtaining a history of payment transactions associated with one or more payment accounts linked to the device.

For example, the providing unit 2320 can be used for: providing payment in the payment transaction using the first payment account; providing payment in the payment transaction using the second payment account; providing the user with an option for proceeding with the payment transaction without invoking the application of the first retailer; providing an indication that further verification is needed to link the payment account to the respective device; providing an indication requesting authorization to proceed with the payment transaction.

For example, the authorizing unit 2322 can be used for: authorizing a payment transaction for a purchased item using a payment account linked to the electronic device.

For example, the detecting unit 2324 can be used for: detecting activation of the payment affordance; detecting activation of the affordance associated with the payment transaction; detecting, by the short-range communication radio, presence of a field generated by a contactless payment transaction terminal; detecting a second payment transaction associated with the payment account using the electronic device; and detecting selection of the payment affordance.

For example, the initiating unit 2326 can be used for: initiating a payment transaction between the user and the one or more other participants in the ongoing communication; and initiating a process for authorizing the payment transaction of the suggested product.

For example, the invoking unit 2328 can be used for: invoking the application of the first retailer.

For example, the proceeding unit 2330 can be used for: proceeding with the payment transaction with the contactless payment transaction terminal.

For example, the transferring unit 2332 can be used for: transferring first transaction information about the payment transaction from the first application to a second application.

The functional blocks of the device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein.

The operations described above with reference to the figures may be implemented by components depicted in FIGS. 1A-1B, 2, 3 and 23. For example, detection operations, display operations, and determination operations may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, 2, 3 and 23.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
   a display;
   a touch-sensitive surface;
   one or more processors; and
   memory storing one or more programs configured to be executed by the one or more processors, the one or more programs including instructions for:
   displaying, on the display, a user interface that includes a first activatable user interface object that, when activated, initiates a process for authenticating a secure transaction related to content included in the user interface;
   while displaying the user interface, detecting, via the touch-sensitive surface, an activation of the first activatable user interface object;
   in response to detecting the activation of the first activatable user interface object, displaying, on the display, a transaction overlay, wherein:
      the transaction overlay covers a first portion of the user interface, including the first activatable user interface object, such that the first portion of the user interface and the first activatable user interface object are no longer visible on the display,
      the transaction overlay does not cover a second portion of the user interface such that the second portion of the user interface remains visible on the display, and
      the transaction overlay includes a representation of an account for use in the secure transaction;
      the transaction overlay includes shipping information related to the secure transaction and a second activatable user interface object which, when activated, initiates a process for modifying the shipping information; and
   while concurrently displaying the transaction overlay and the second portion of the user interface that was displayed prior to detecting the activation of the first activatable user interface object, displaying, in the transaction overlay, instructions for authenticating the secure transaction related to the content included in the user interface.

2. The electronic device of claim 1, wherein the electronic device includes a biometric sensor, and wherein the instructions for authenticating the secure transaction include instructions for providing biometric authentication, via the biometric sensor, to authenticate the secure transaction.

3. The electronic device of claim 2, wherein the biometric sensor is a fingerprint sensor, and wherein the instructions for authenticating the secure transaction include a graphical representation of a simulated fingerprint.

4. The electronic device of claim 2, wherein the one or more programs further include instructions for:
   while displaying, in the transaction overlay, the instructions for providing biometric authentication, receiving, via the biometric sensor, biometric information; and
   in response to receiving the biometric information, in accordance with a determination that the biometric information is consistent with registered biometric information, displaying, on the display, confirmation information associated with the secure transaction, wherein the displayed confirmation information replaces display of the transaction overlay.

5. The electronic device of claim 4, wherein the displayed confirmation information further replaces display of the second portion of the content of the user interface.

6. The electronic device of claim 4, wherein the one or more programs further include instructions for:
   in response to receiving the biometric information, in accordance with a determination that the biometric information is inconsistent with the registered biometric information, maintaining display of the transaction overlay without displaying the confirmation information.

7. The electronic device of claim 4, wherein the one or more programs further include instructions for:
in response to receiving the biometric information, in accordance with a determination that the biometric information is inconsistent with the registered biometric information:
maintaining display of the transaction overlay; and
displaying, in the transaction overlay, an activatable user interface object for authenticating the secure transaction using passcode authentication.

8. The electronic device of claim 1, wherein the instructions for authenticating the secure transaction include a graphical representation indicative of a method of biometric authentication.

9. The electronic device of claim 1, wherein the instructions for authenticating the secure transaction include text instructions for providing biometric authentication.

10. The electronic device of claim 1, wherein the transaction overlay further includes account information associated with the account for use in the secure transaction.

11. The electronic device of claim 1, wherein the transaction overlay further includes a third activatable user interface object which, when activated, initiates a process for changing the account for use in the secure transaction.

12. A non-transitory computer-readable storage medium storing one or more programs configured to be executed by one or more processors of an electronic device with a display and a touch-sensitive surface, the one or more programs including instructions for:
displaying, on the display, a user interface that includes a first activatable user interface object that, when activated, initiates a process for authenticating a secure transaction related to content included in the user interface;
while displaying the user interface, detecting, via the touch-sensitive surface, an activation of the first activatable user interface object;
in response to detecting the activation of the first activatable user interface object, displaying, on the display, a transaction overlay, wherein:
the transaction overlay covers a first portion of the user interface, including the first activatable user interface object, such that the first portion of the user interface and the first activatable user interface object are no longer visible on the display,
the transaction overlay does not cover a second portion of the user interface such that the second portion of the user interface remains visible on the display, and
the transaction overlay includes a representation of an account for use in the secure transaction;
the transaction overlay includes shipping information related to the secure transaction and a second activatable user interface object which, when activated, initiates a process for modifying the shipping information; and
while concurrently displaying the transaction overlay and the second portion of the user interface that was displayed prior to detecting the activation of the first activatable user interface object, displaying, in the transaction overlay, instructions for authenticating the secure transaction related to the content included in the user interface.

13. The non-transitory computer-readable storage medium of claim 12, wherein the electronic device includes a biometric sensor, and wherein the instructions for authenticating the secure transaction include instructions for providing biometric authentication, via the biometric sensor, to authenticate the secure transaction.

14. The non-transitory computer-readable storage medium of claim 13, wherein the biometric sensor is a fingerprint sensor, and wherein the instructions for authenticating the secure transaction include a graphical representation of a simulated fingerprint.

15. The non-transitory computer-readable storage medium of claim 13, wherein the one or more programs further include instructions for:
while displaying, in the transaction overlay, the instructions for providing biometric authentication, receiving, via the biometric sensor, biometric information; and
in response to receiving the biometric information, in accordance with a determination that the biometric information is consistent with registered biometric information, displaying, on the display, confirmation information associated with the secure transaction, wherein the displayed confirmation information replaces display of the transaction overlay.

16. The non-transitory computer-readable storage medium of claim 15, wherein the displayed confirmation information further replaces display of the second portion of the content of the user interface.

17. The non-transitory computer-readable storage medium of claim 15, wherein the one or more programs further include instructions for:
in response to receiving the biometric information, in accordance with a determination that the biometric information is inconsistent with the registered biometric information, maintaining display of the transaction overlay without displaying the confirmation information.

18. The non-transitory computer-readable storage medium of claim 15, wherein the one or more programs further include instructions for:
in response to receiving the biometric information, in accordance with a determination that the biometric information is inconsistent with the registered biometric information:
maintaining display of the transaction overlay; and
displaying, in the transaction overlay, an activatable user interface object for authenticating the secure transaction using passcode authentication.

19. The non-transitory computer-readable storage medium of claim 12, wherein the instructions for authenticating the secure transaction include a graphical representation indicative of a method of biometric authentication.

20. The non-transitory computer-readable storage medium of claim 12, wherein the instructions for authenticating the secure transaction include text instructions for providing biometric authentication.

21. The non-transitory computer-readable storage medium of claim 12, wherein the transaction overlay further includes account information associated with the account for use in the secure transaction.

22. The non-transitory computer-readable storage medium of claim 12, wherein the transaction overlay further includes a third activatable user interface object which, when activated, initiates a process for changing the account for use in the secure transaction.

23. A method, comprising:
at an electronic device with a display and a touch-sensitive surface:

displaying, on the display, a user interface that includes a first activatable user interface object that, when activated, initiates a process for authenticating a secure transaction related to content included in the user interface;

while displaying the user interface, detecting, via the touch-sensitive surface, an activation of the first activatable user interface object;

in response to detecting the activation of the first activatable user interface object, displaying, on the display, a transaction overlay, wherein:

the transaction overlay covers a first portion of the user interface, including the first activatable user interface object, such that the first portion of the user interface and the first activatable user interface object are no longer visible on the display, the transaction overlay does not cover a second portion of the user interface such that the second portion of the user interface remains visible on the display, and the transaction overlay includes a representation of an account for use in the secure transaction;

the transaction overlay includes shipping information related to the secure transaction and a second activatable user interface object which, when activated, initiates a process for modifying the shipping information; and while concurrently displaying the transaction overlay and the second portion of the user interface that was displayed prior to detecting the activation of the first activatable user interface object, displaying, in the transaction overlay, instructions for authenticating the secure transaction related to the content included in the user interface.

24. The method of claim 23, wherein the electronic device includes a biometric sensor, and wherein the instructions for authenticating the secure transaction include instructions for providing biometric authentication, via the biometric sensor, to authenticate the secure transaction.

25. The method of claim 24, wherein the biometric sensor is a fingerprint sensor, and wherein the instructions for authenticating the secure transaction include a graphical representation of a simulated fingerprint.

26. The method of claim 24, further comprising:
while displaying, in the transaction overlay, the instructions for providing biometric authentication, receiving, via the biometric sensor, biometric information; and in response to receiving the biometric information, in accordance with a determination that the biometric information is consistent with registered biometric information, displaying, on the display, confirmation information associated with the secure transaction, wherein the displayed confirmation information replaces display of the transaction overlay.

27. The method of claim 26, wherein the displayed confirmation information further replaces display of the second portion of the content of the user interface.

28. The method of claim 26, further comprising:
in response to receiving the biometric information, in accordance with a determination that the biometric information is inconsistent with the registered biometric information, maintaining display of the transaction overlay without displaying the confirmation information.

29. The method of claim 26, further comprising:
in response to receiving the biometric information, in accordance with a determination that the biometric information is inconsistent with the registered biometric information:

maintaining display of the transaction overlay; and displaying, in the transaction overlay, an activatable user interface object for authenticating the secure transaction using passcode authentication.

30. The method of claim 23, wherein the instructions for authenticating the secure transaction include a graphical representation indicative of a method of biometric authentication.

31. The method of claim 23, wherein the instructions for authenticating the secure transaction include text instructions for providing biometric authentication.

32. The method of claim 23, wherein the transaction overlay further includes account information associated with the account for use in the secure transaction.

33. The method of claim 23, wherein: the transaction overlay further includes a third activatable user interface object which, when activated, initiates a process for changing the account for use in the secure transaction.

* * * * *